US006991167B2

(12) United States Patent
Check et al.

(10) Patent No.: US 6,991,167 B2

(45) Date of Patent: Jan. 31, 2006

(54) BIOPTICAL LASER SCANNING SYSTEM PROVIDING 360° OF OMNIDIRECTIONAL BAR CODE SYMBOL SCANNING COVERAGE AT A POINT OF SALE (POS) STATION

(75) Inventors: Frank Check, San Jose, CA (US); LeRoy Dickson, Leeds, UT (US); John Groot, San Jose, CA (US); Timothy Good, Blackwood, NJ (US)

(73) Assignee: Metrologic Instruments, Inc., Blackwood, NJ (US)

(*) Notice: Subject to any disclaimer, the term of this patent is extended or adjusted under 35 U.S.C. 154(b) by 223 days.

(21) Appl. No.: 10/436,893

(22) Filed: May 13, 2003

(65) Prior Publication Data

US 2004/0134987 A1 Jul. 15, 2004

Related U.S. Application Data

(63) Continuation of application No. 09/551,887, filed on Apr. 18, 2000, now Pat. No. 6,758,402, which is a continuation-in-part of application No. 08/949,915, filed on Oct. 14, 1997, now Pat. No. 6,158,659, which is a continuation-in-part of application No. 08/726,522, filed on Oct. 7, 1996, now Pat. No. 6,073,846, which is a continuation-in-part of application No. 08/615,054, filed on Mar. 12, 1996, now Pat. No. 6,286,760, which is a continuation of application No. 08/573,949, filed on Dec. 18, 1995, now abandoned, which is a continuation-in-part of application No. 08/561,479, filed on Nov. 20, 1995, now Pat. No. 5,661,292, which is a continuation-in-part of application No. 08/476,069, filed on Jun. 7, 1995, now Pat. No. 5,591,953, which is a continuation of application No. 08/475,376, filed on Jun. 7, 1995, now Pat. No. 5,637,852, which is a continuation of application No. 08/439,224, filed on May 11, 1995, now Pat. No. 5,627,359, which is a continuation of application No. 08/293,695, filed on Aug. 19, 1994, now Pat. No. 5,468,951, which is a continuation of application No. 08/293,493, filed on Aug. 19, 1994, now Pat. No. 5,525,789, and a continuation of application No. 08/292,237, filed on Aug. 17, 1994, now Pat. No. 5,808,285.

(51) Int. Cl.
*G06K 7/10* (2006.01)

(52) U.S. Cl. ............................ 235/462.14; 235/462.25; 235/472.01

(58) Field of Classification Search ............................... 235/462.01–462.47, 235/235/235/235/235/235/235/235/ 235/235/235/235/235/472.01, 472.02, 472.03, 235/454, 455, 494, 470

See application file for complete search history.

(56) References Cited

U.S. PATENT DOCUMENTS 3,902,048 A 8/1975 Fleischer et al.

(Continued)

FOREIGN PATENT DOCUMENTS

EP 0 492 065 A2 7/1992

(Continued)

OTHER PUBLICATIONS

Web–based product brochure for the PSC Magellan SL® 360–Degree Scanner/Scale by PSC Inc., www.pscnet.com/ magslspe.html#spec5, 2000, pp. 1–4.

(Continued)

*Primary Examiner*—Thien M. Le

(74) *Attorney, Agent, or Firm*—Thomas J. Perkowski, Esq., P.C.

(57) ABSTRACT

Disclosed is a bioptical laser scanning system that provides 360° of omnidirectional bar code symbol scanning coverage at a point of sale (POS) station. The system generates a 3-D omnidirectional laser scanning pattern between the horizontal and vertical scanning windows during system operation. The laser scanning pattern of the present invention comprises a complex of pairs of quasi-orthogonal laser scanning planes, each composed by a plurality of substantially-vertical laser scanning planes for reading bar code symbols having bar code elements (i.e. ladder-type bar code symbols) that are oriented substantially horizontal with respect to the horizontal scanning window, and a plurality of substantially-horizontal laser scanning planes for reading bar code symbols having bar code elements (i.e. picket-fence type bar code symbols) that are oriented substantially vertical with respect to the horizontal scanning window.

7 Claims, 252 Drawing Sheets

U.S. PATENT DOCUMENTS

| | | | | | |
|---|---|---|---|---|---|
| 3,919,527 | A | | 11/1975 | Bowen et al. | |
| 3,947,816 | A | | 3/1976 | Rabedeau | |
| 3,978,317 | A | | 8/1976 | Yamaguchib et al. | |
| 4,006,343 | A | | 2/1977 | Izura et al. | |
| 4,026,630 | A | | 5/1977 | Wollenmann | |
| 4,064,390 | A | * | 12/1977 | Hildebrand et al. | 235/470 |
| 4,093,865 | A | | 6/1978 | Nickl | |
| 4,097,729 | A | | 6/1978 | Seligman et al. | |
| 4,113,343 | A | | 9/1978 | Pole et al. | |
| 4,333,006 | A | | 6/1982 | Gorin et al. | |
| 4,364,627 | A | | 12/1982 | Haines | |
| 4,378,142 | A | | 3/1983 | Ono | |
| 4,415,224 | A | | 11/1983 | Dickson | |
| 4,416,505 | A | | 11/1983 | Dickson | |
| 4,428,643 | A | | 1/1984 | Kay | |
| 4,429,946 | A | | 2/1984 | Haines | |
| 4,591,242 | A | | 5/1986 | Broockman et al. | |
| 4,610,500 | A | | 9/1986 | Kramer | |
| 4,639,070 | A | | 1/1987 | Ikeda et al. | |
| 4,647,143 | A | | 3/1987 | Yamazaki et al. | |
| 4,652,732 | A | | 3/1987 | Nickl | |
| 4,713,532 | A | | 12/1987 | Knowles | |
| 4,748,316 | A | | 5/1988 | Dickson | |
| 4,753,502 | A | | 6/1988 | Ono | |
| 4,758,058 | A | | 7/1988 | Cato et al. | |
| 4,766,298 | A | | 8/1988 | Meyers | |
| 4,790,612 | A | | 12/1988 | Dickson | |
| 4,794,237 | A | | 12/1988 | Ferrante | |
| 4,795,224 | A | | 1/1989 | Goto | |
| 4,800,256 | A | | 1/1989 | Brookkman et al. | |
| 4,861,973 | A | | 8/1989 | Hellekson et al. | |
| 4,904,034 | A | | 2/1990 | Narayan et al. | |
| 4,957,336 | A | | 9/1990 | Hasegawa et al. | |
| 4,960,985 | A | * | 10/1990 | Knowles | 235/462.4 |
| 4,973,112 | A | | 11/1990 | Kramer | |
| 5,000,529 | A | | 3/1991 | Katoh et al. | |
| 5,019,714 | A | * | 5/1991 | Knowles | 250/568 |
| 5,026,975 | A | | 6/1991 | Guber et al. | |
| 5,039,184 | A | | 8/1991 | Murakawa et al. | |
| 5,073,702 | A | | 12/1991 | Schuhmacher | |
| 5,124,537 | A | | 6/1992 | Chandler et al. | |
| 5,132,524 | A | | 7/1992 | Singh et al. | |
| 5,144,118 | A | | 9/1992 | Actis et al. | |
| 5,153,417 | A | | 10/1992 | Sakai et al. | |
| 5,162,929 | A | | 11/1992 | Roddy et al. | |
| 5,206,491 | A | | 4/1993 | Katoh et al. | |
| 5,212,370 | A | | 5/1993 | Wittensoldner et al. | |
| 5,216,230 | A | | 6/1993 | Nakazawa | |
| 5,229,588 | A | | 7/1993 | Detwiler et al. | |
| 5,286,961 | A | | 2/1994 | Saegusa | |
| 5,296,689 | A | | 3/1994 | Reddersen et al. | |
| 5,361,158 | A | | 11/1994 | Tang | |
| 5,459,308 | A | | 10/1995 | Detwiler et al. | |
| 5,475,207 | A | | 12/1995 | Bobba et al. | |
| 5,484,990 | A | | 1/1996 | Lindacher et al. | |
| 5,491,328 | A | | 2/1996 | Rando | |
| 5,495,097 | A | | 2/1996 | Katz et al. | |
| 5,504,595 | A | | 4/1996 | Marom et al. | |
| 5,510,605 | A | | 4/1996 | Miyazaki | |
| 5,550,655 | A | | 8/1996 | Kayashima et al. | |
| 5,555,130 | A | | 9/1996 | Marom et al. | |
| 5,557,093 | A | | 9/1996 | Knowles et al. | |
| 5,684,289 | A | | 11/1997 | Detwiler et al. | |
| 5,689,102 | A | | 11/1997 | Schonenberg et al. | |
| 5,693,930 | A | | 12/1997 | Katoh et al. | |
| 5,723,852 | A | | 3/1998 | Rando et al. | |
| 5,801,370 | A | | 9/1998 | Katoh et al. | |
| 5,814,803 | A | | 9/1998 | Olmstead et al. | |
| 5,837,988 | A | | 11/1998 | Bobba et al. | |
| 5,869,827 | A | | 2/1999 | Rando | |
| 5,886,336 | A | | 3/1999 | Tang et al. | |
| 6,098,885 | A | * | 8/2000 | Knowles et al. | 235/462.4 |
| 6,223,986 | B1 | | 5/2001 | Bobba et al. | |
| 6,237,851 | B1 | * | 5/2001 | Detwiler | 235/462.38 |
| 6,328,215 | B1 | | 12/2001 | Dickson et al. | |
| 6,330,973 | B1 | | 12/2001 | Bridgelall et al. | |
| 6,543,694 | B1 | * | 4/2003 | Detwiler | 235/462.4 |
| 6,758,402 | B1 | * | 7/2004 | Check et al. | 235/462.34 |
| 2002/0038820 | A1 | * | 4/2002 | Check et al. | 235/462.14 |
| 2003/0001010 | A1 | * | 1/2003 | Schmidt et al. | 235/385 |
| 2004/0108383 | A1 | * | 6/2004 | Good et al. | 235/462.32 |
| 2004/0134987 | A1 | * | 7/2004 | Check et al. | 235/462.14 |

FOREIGN PATENT DOCUMENTS

| | | | |
|---|---|---|---|
| EP | 0 572 685 | A1 | 12/1993 |
| EP | 0 663 643 | A2 | 7/1995 |
| EP | 0 444 958 | A1 | 9/2001 |
| JP | 54-819 | | 1/1979 |
| JP | 51-33710 | | 3/1979 |
| JP | 56-47019 | A | 4/1981 |
| JP | 64-48017 | | 2/1989 |
| WO | WO 99/01839 | | 1/1999 |

OTHER PUBLICATIONS

IBM Technical Disclosure Bulletin entitled "Low–Profile Holographic Bar Code Scanner" by LeRoy Dickson and Robert Cato, vol. 31, No. 12, May 1989,pp. 205–206.

IBM Technical Disclosure Bulletin entitled "Dual–Purpose Holographic Optical Element for a Scanner", vol. 29, No. 7, Dec. 1986, pp. 2892–2893.

IBM Technical Disclosure Bulletin entitled "Chromatic Correction for a Laser Diode/Holographic Deflector" by G.T. Sincerbox, vol. 27, No. 5, Oct. 1984, pp. 2892–2893.

IBM Technical Disclosure Bulletin entitled "Aberrant Holographic Focusing Element for Post–Objective Holographic Deflector" by L. D. Dickson, vol. 26, No. 12, May 1984, pp. 6687–6688.

Scientific Article entitled "Holography in the IBM 3687 Supermarket Scanner" by LeRoy D. Dickson, Glenn T. Sincerbox and Albert D. Wolfheimer, IBM Journal of Research and Development, vol. 26, No. 2, Mar. 1982, pp. 228–234.

IBM Technical Disclosure Bulletin entitled "Correction of Astigmatism for Off–Axis Reconstruction Beam Holographic Deflector" by L.D. Dickson, vol. 23, No. 9, Feb. 1981, pp. 4255–4256.

Scientific Article entitled "Hologram Scanner for POS Bar Code Symbol Reader" by Hiroyuki Ikeda, Seikichi Matsumoto and Takefumi Inagaki, Fujitsu Scientific & Technical Journal, vol. 15, No. 1, Dec. 1979, pp. 59–77.

* cited by examiner

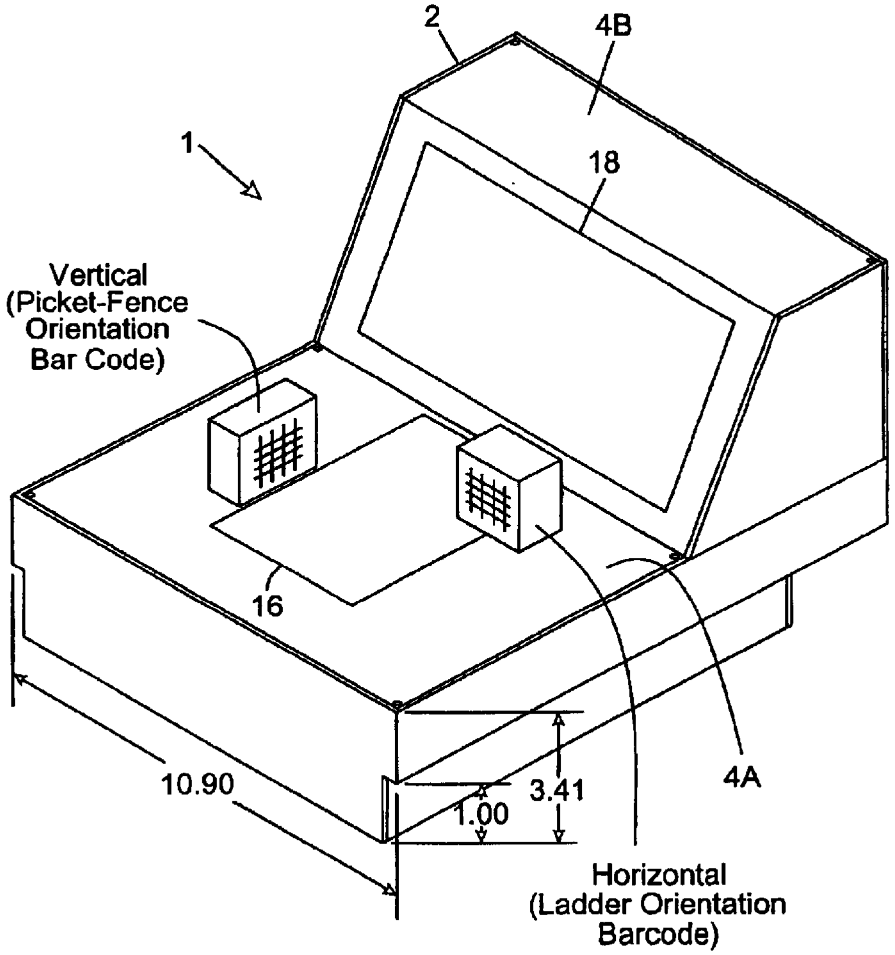
FIG. 1A1

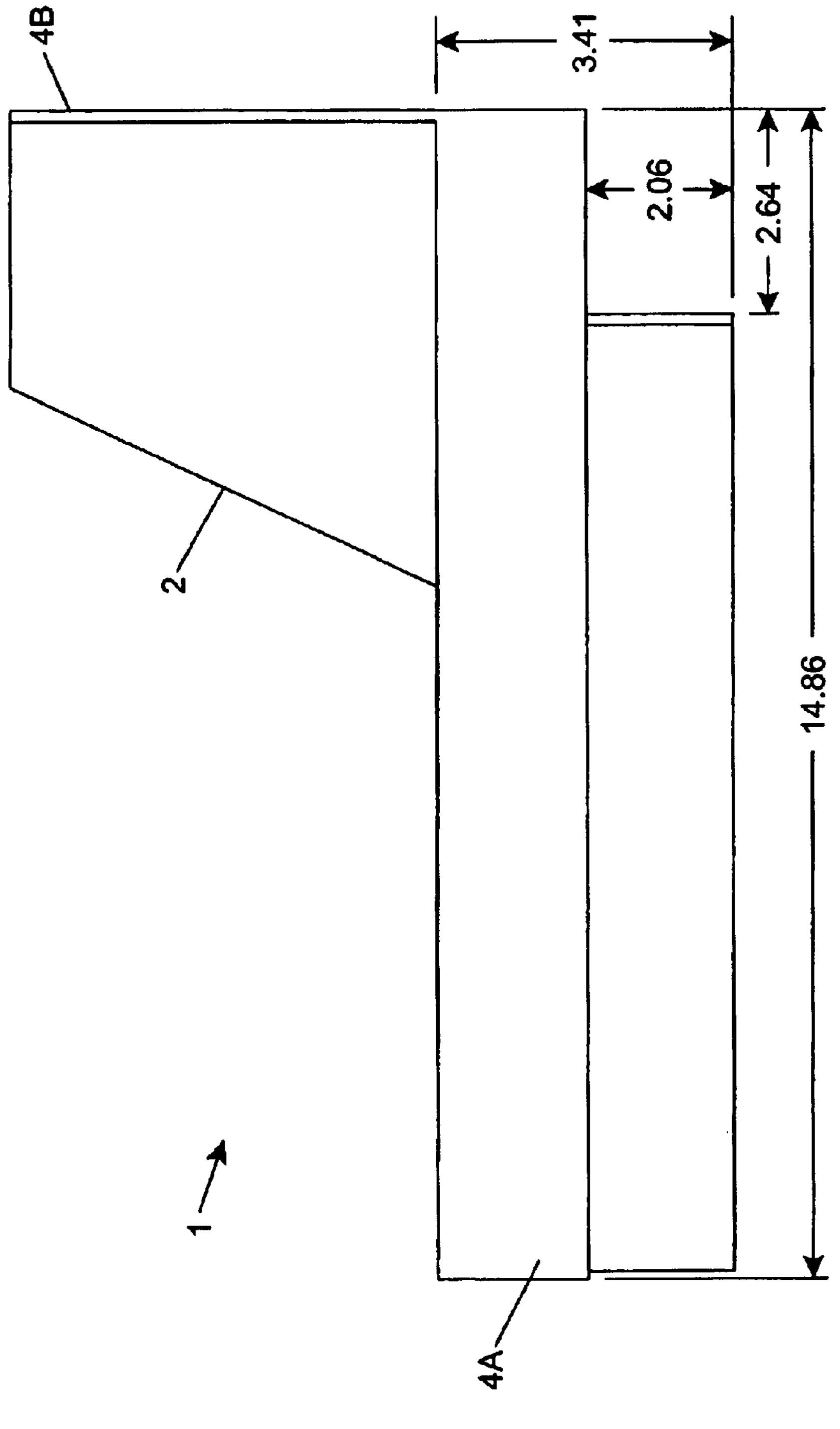
FIG. 1A2

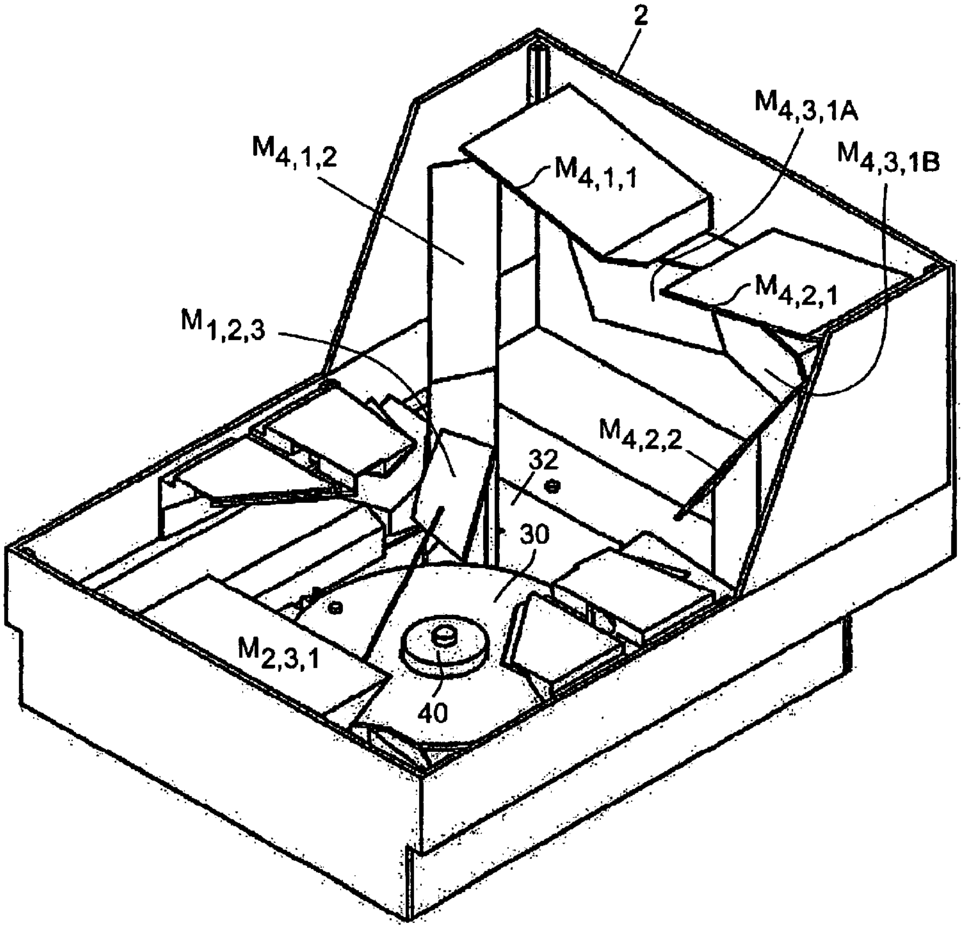
FIG. 1D1

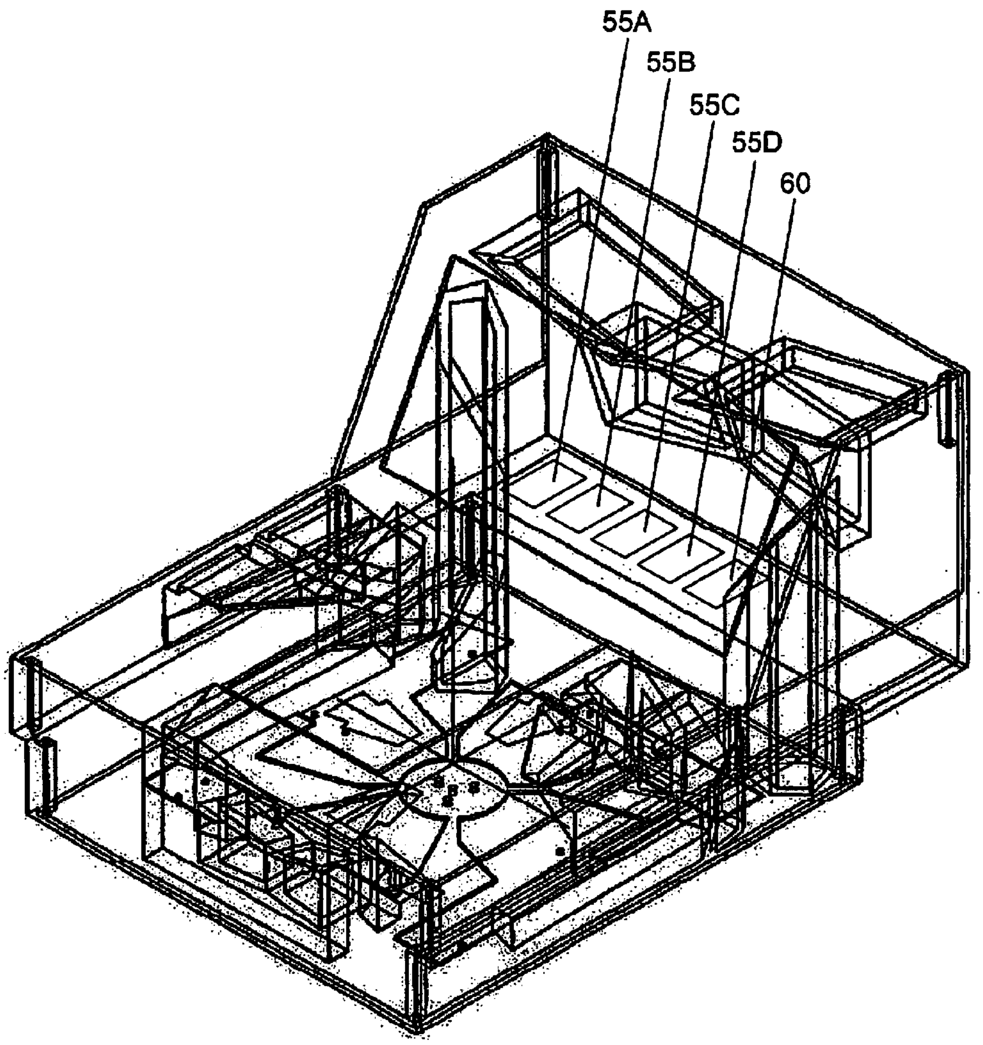
FIG. 1D2

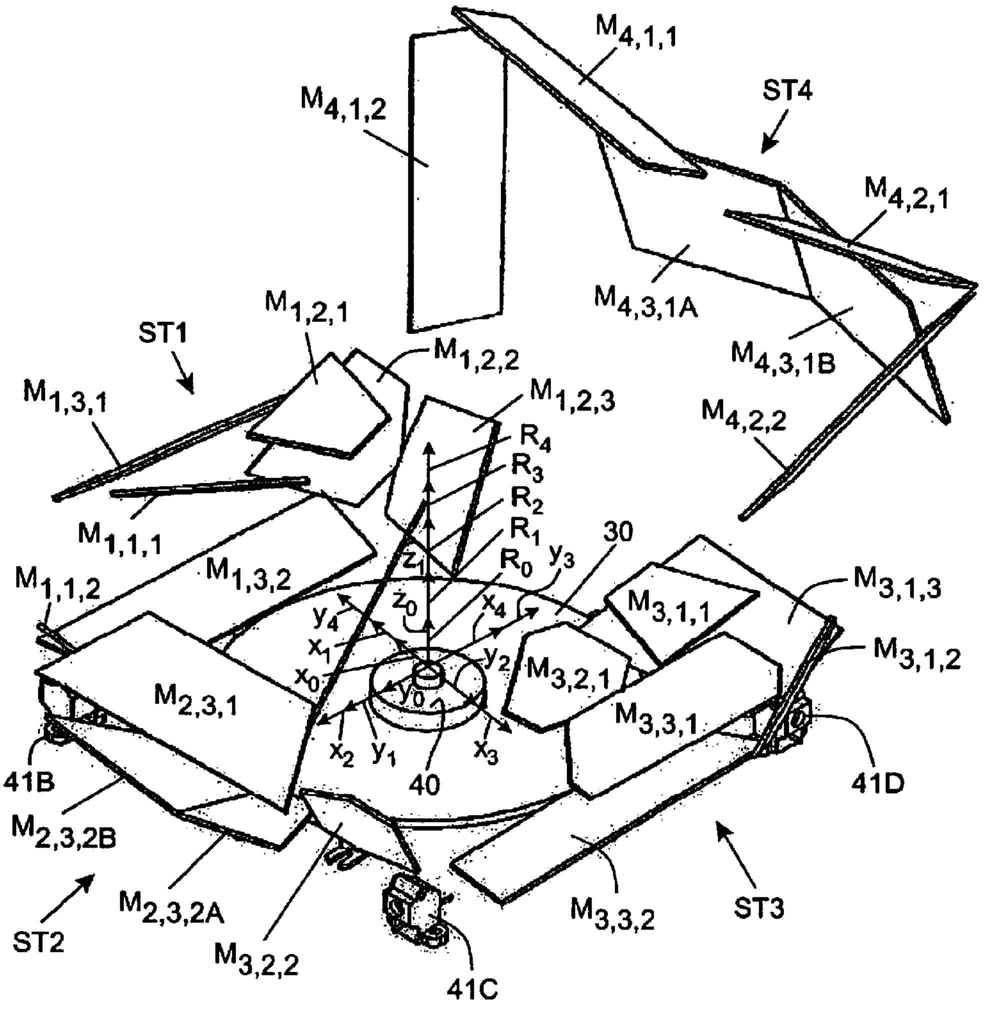
Define: $R_1, R_2, R_3, R_4, R_0$
FIG. 2A1

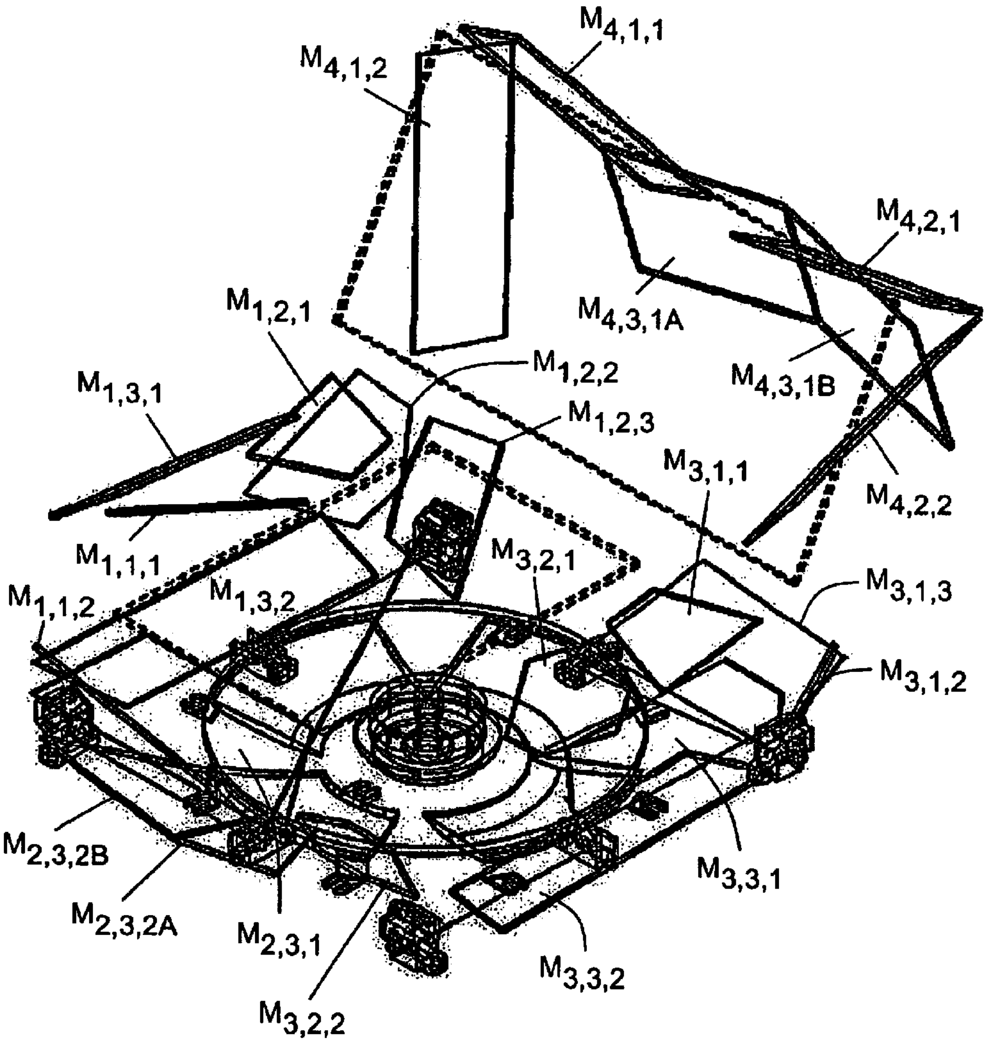
FIG. 2A2

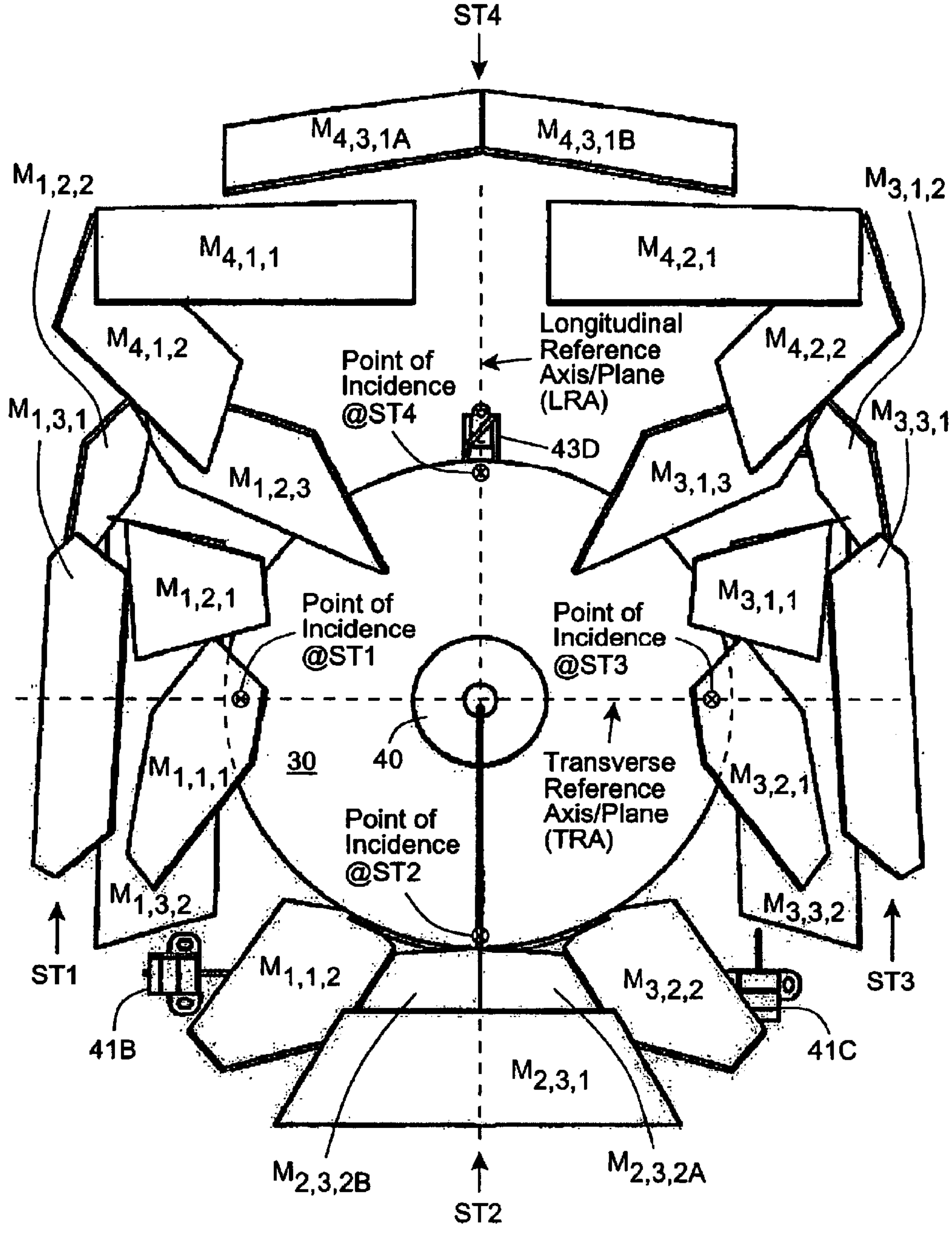
FIG. 2B1

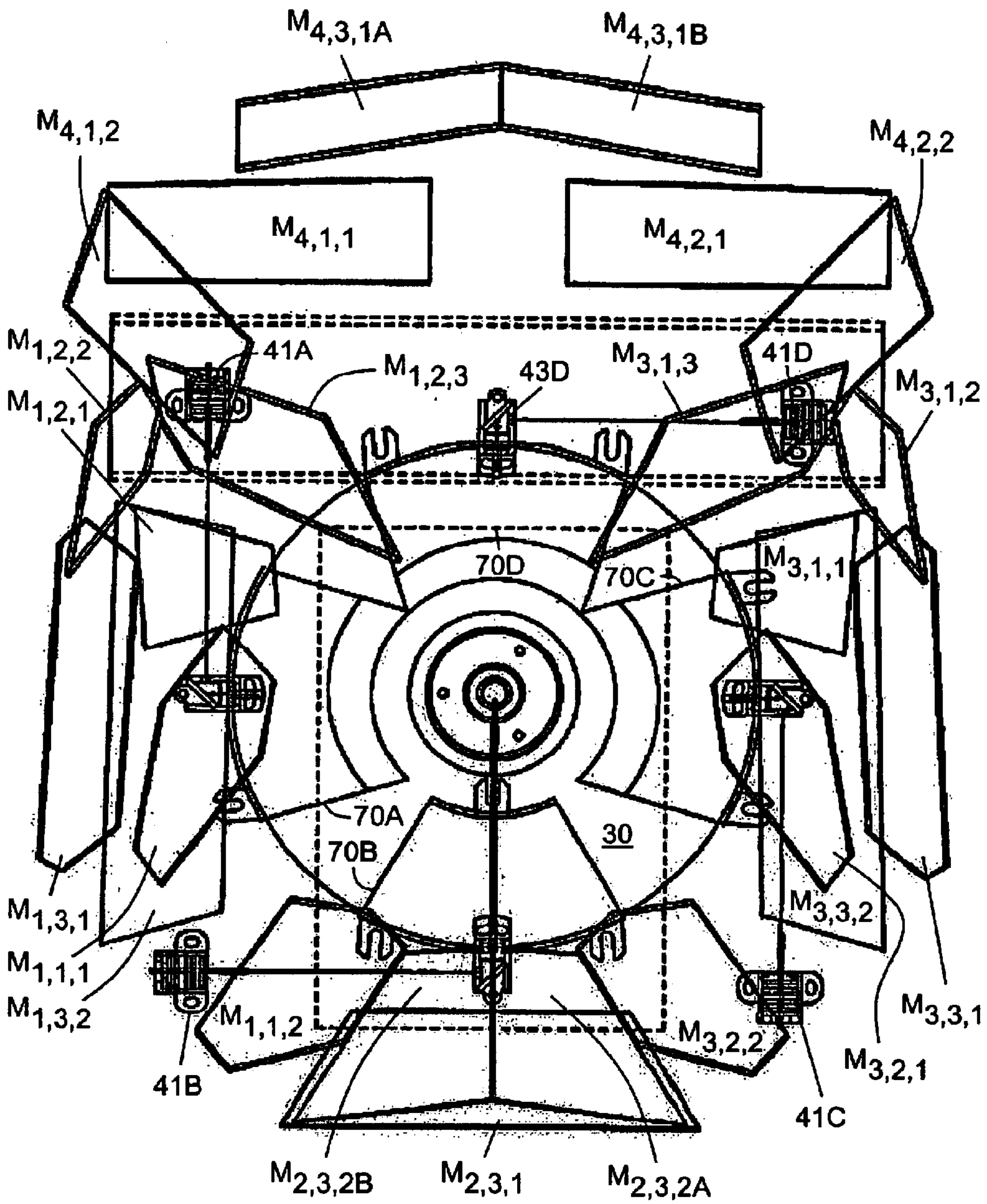
FIG. 2B2

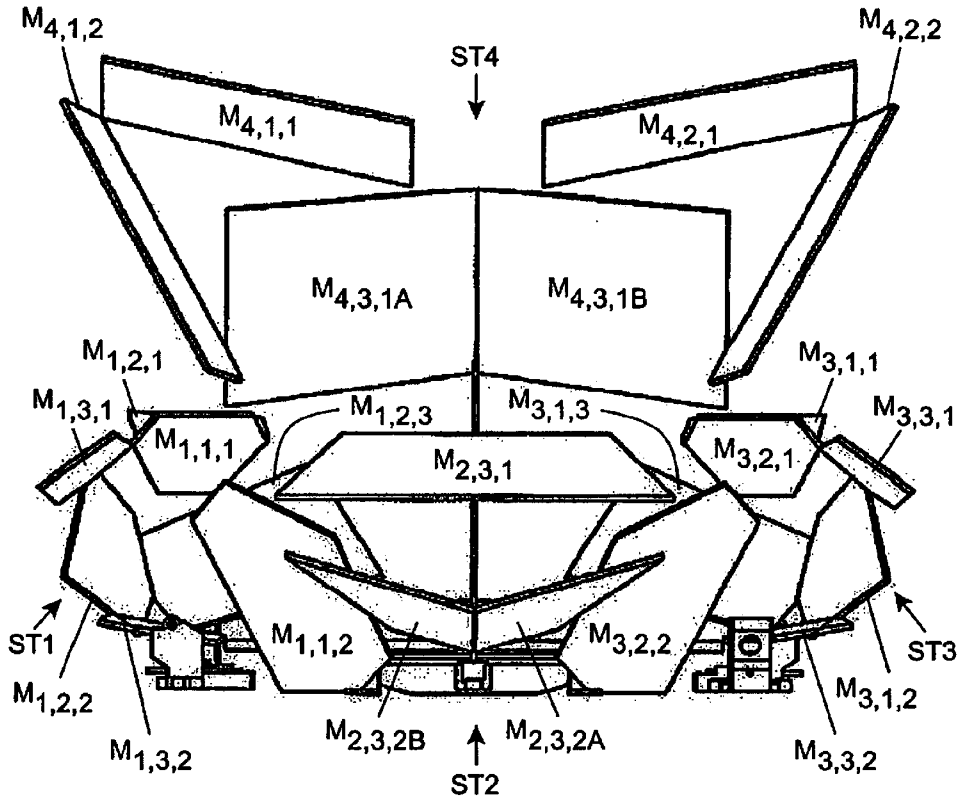
FIG. 2C1

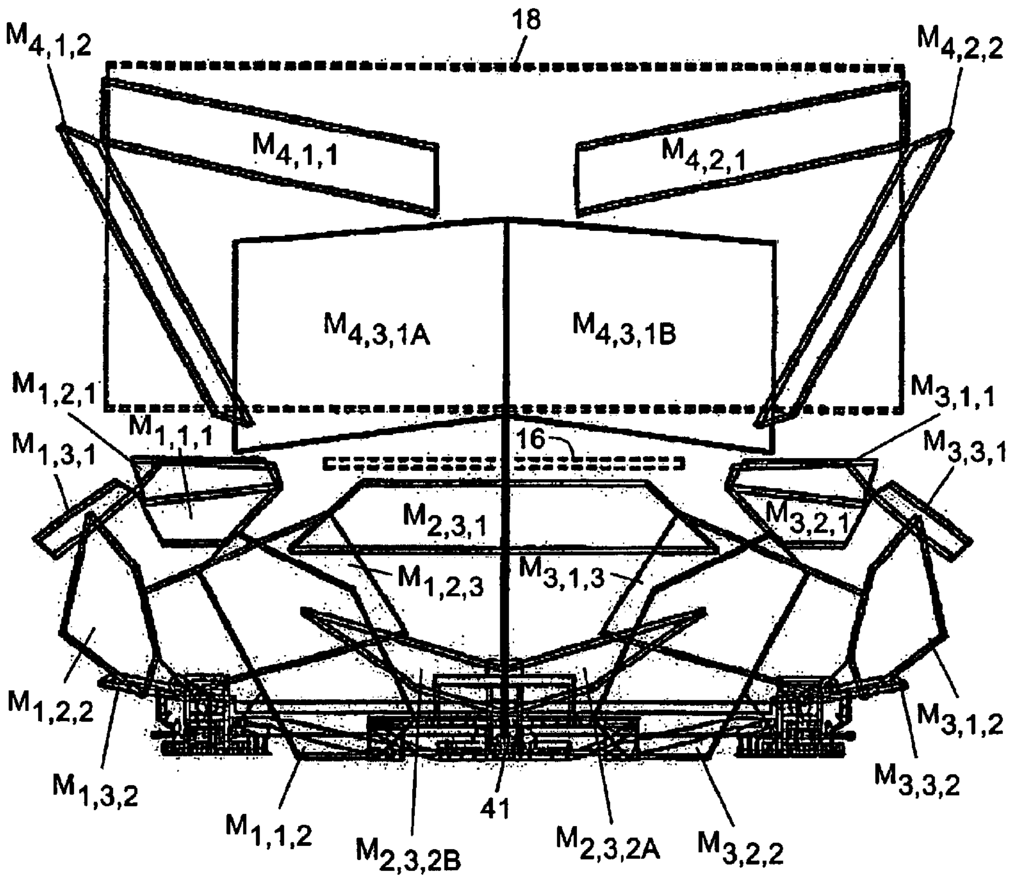
FIG. 2C2

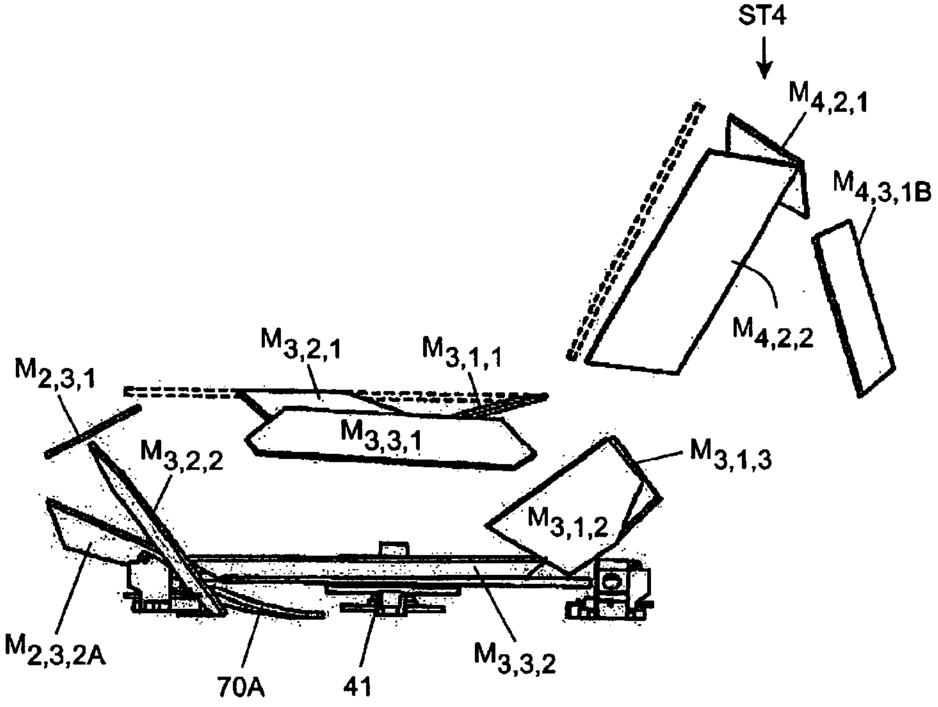
FIG. 2D1

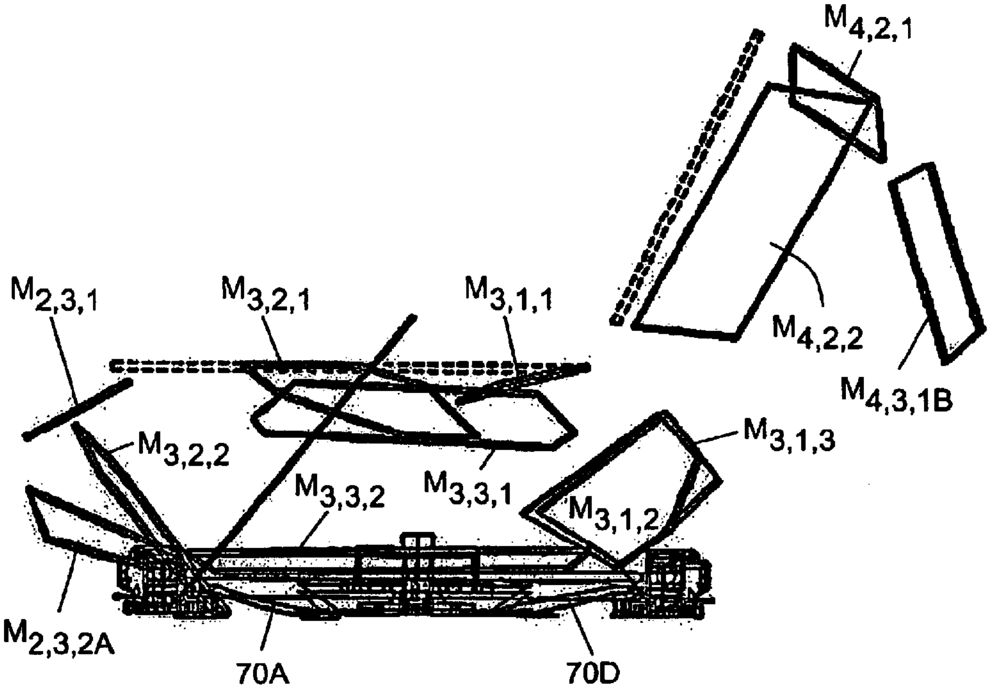
FIG. 2D2

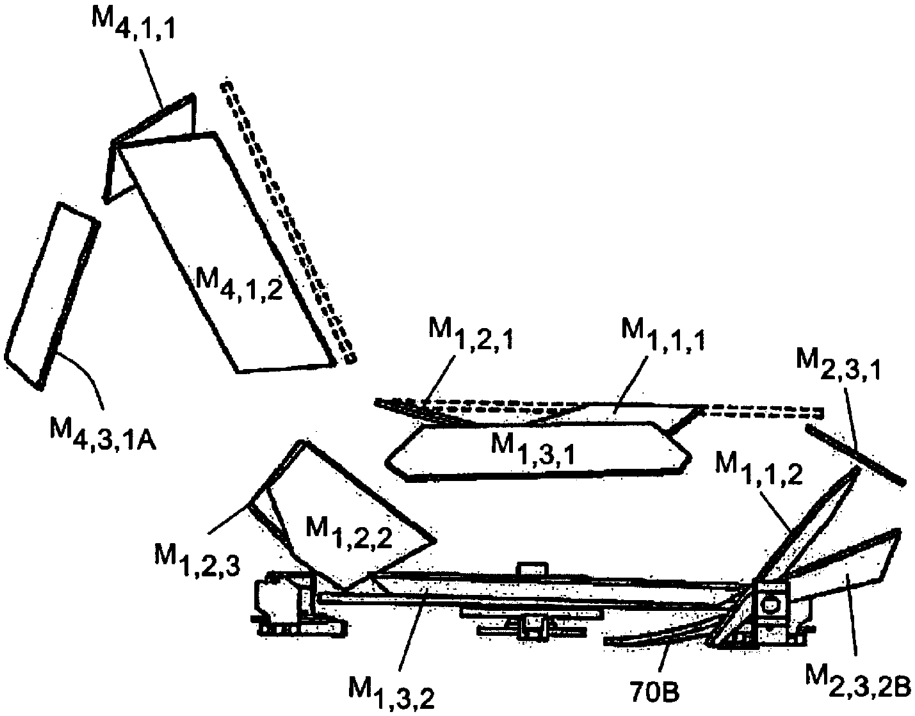
FIG. 2E1

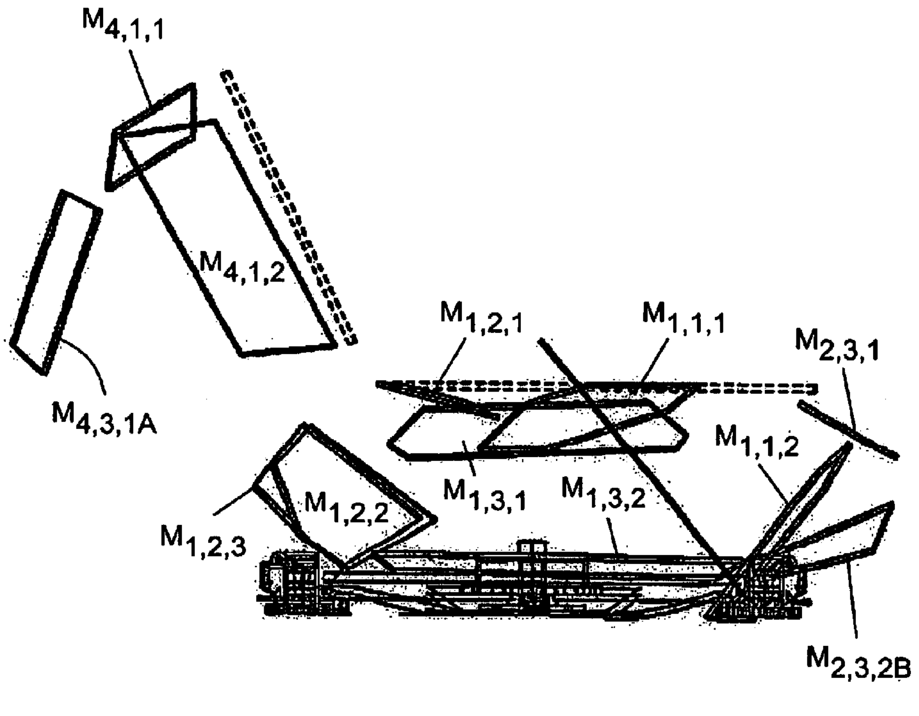
FIG. 2E2

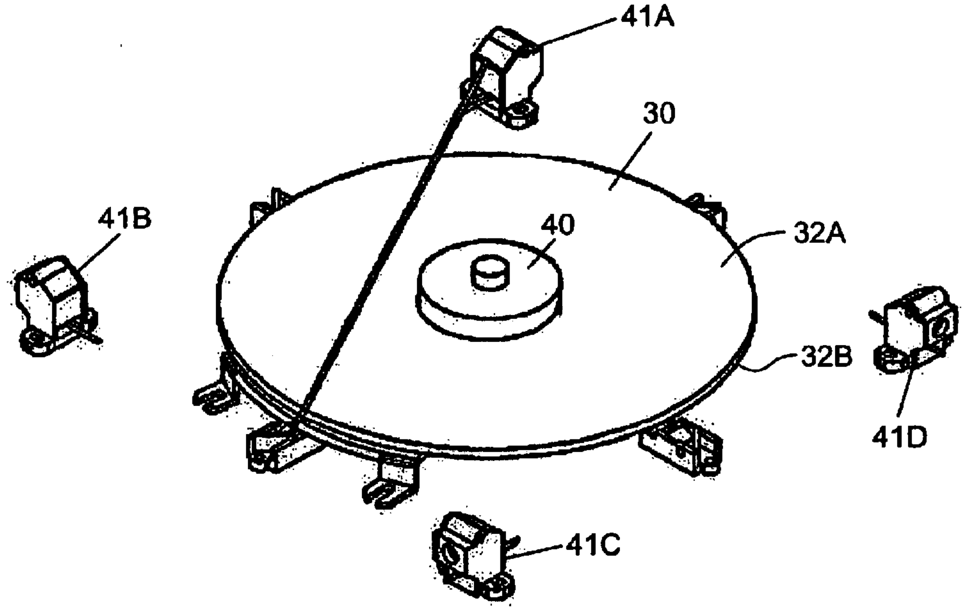
FIG. 2F1

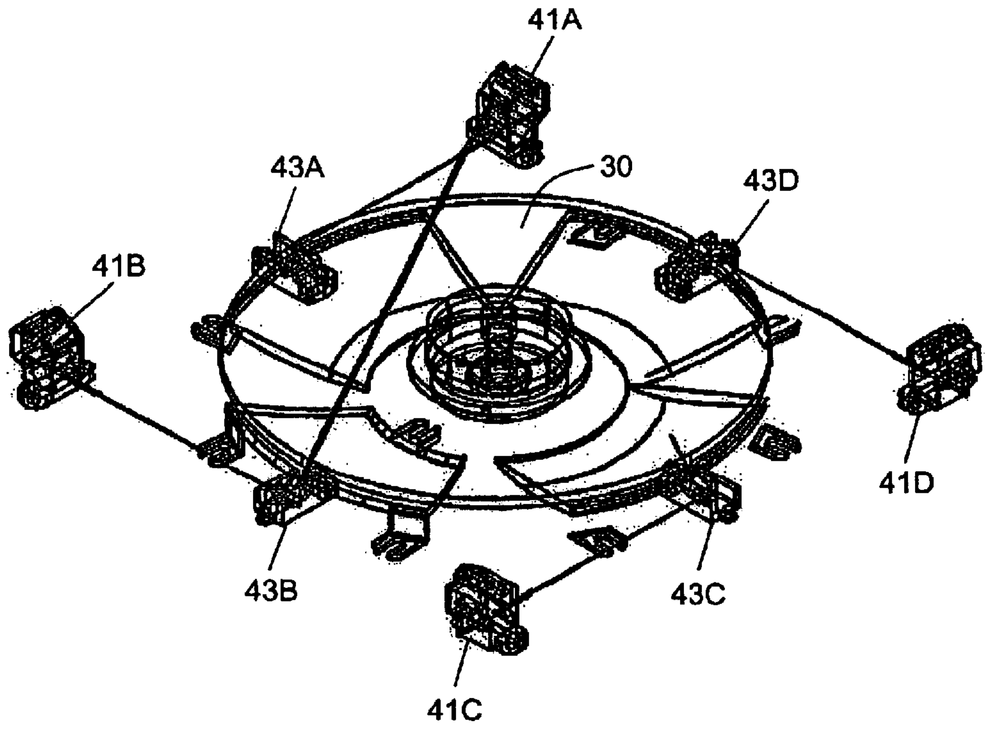
FIG. 2F2

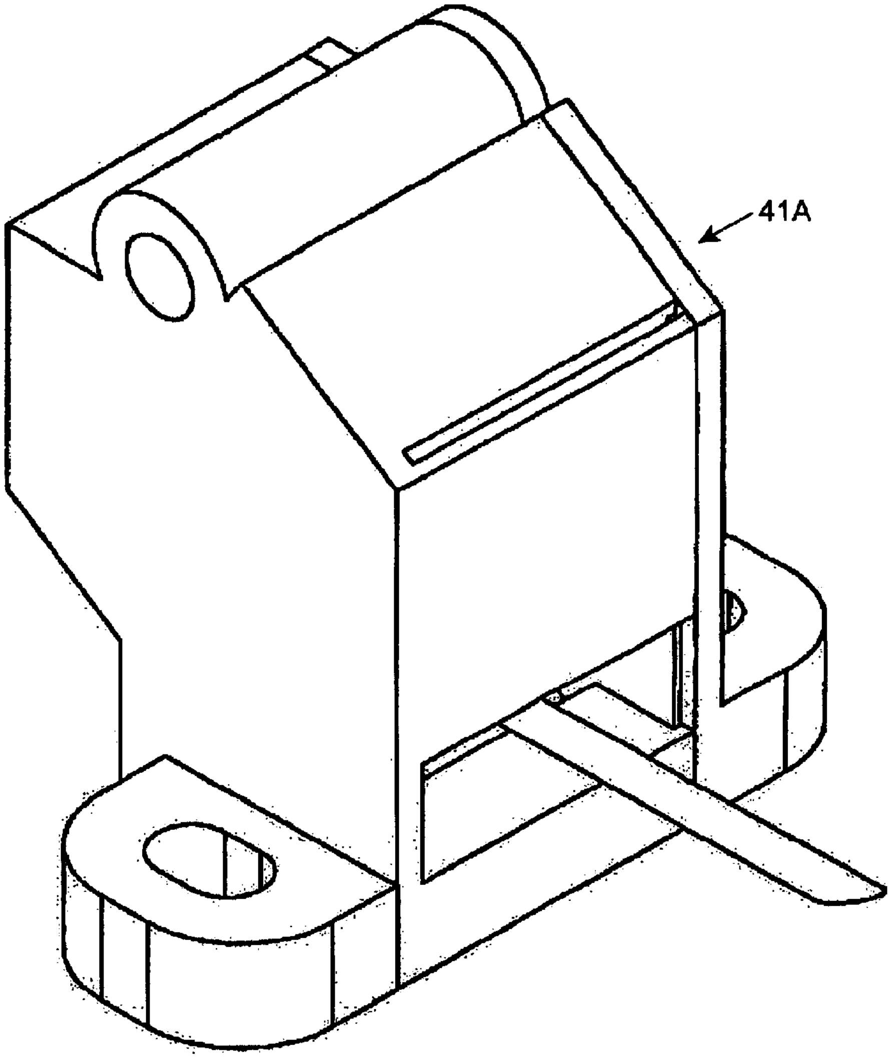
FIG. 2G1

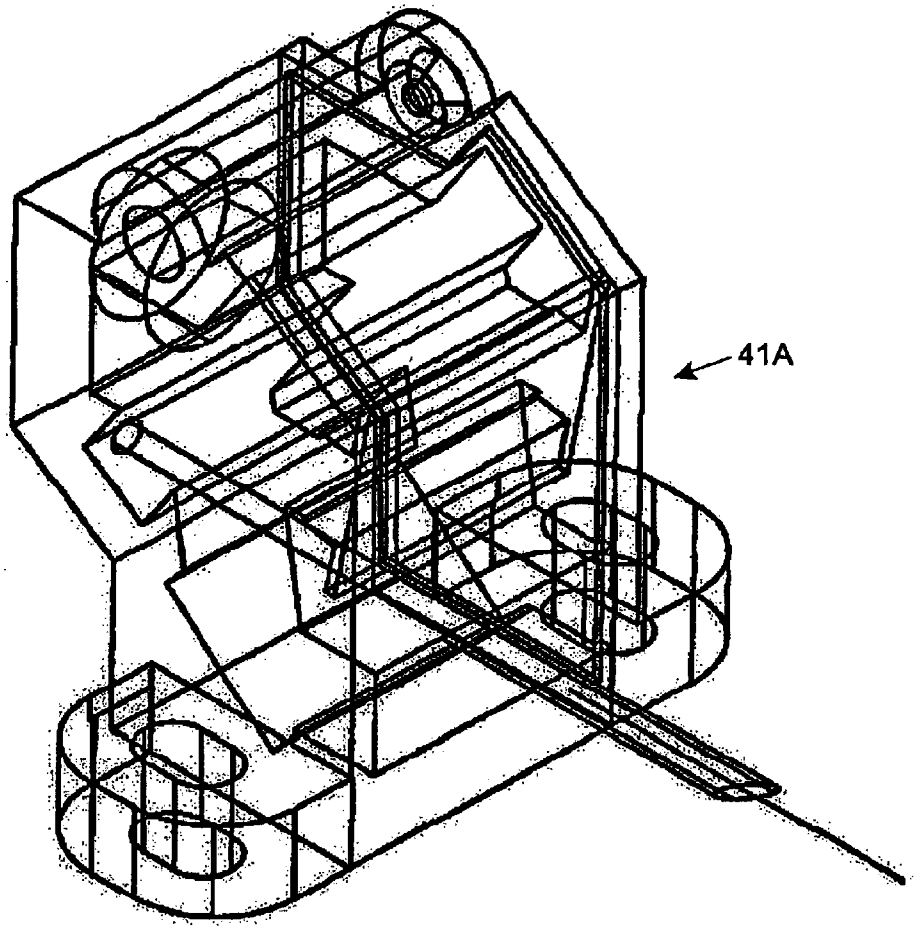
FIG. 2G2

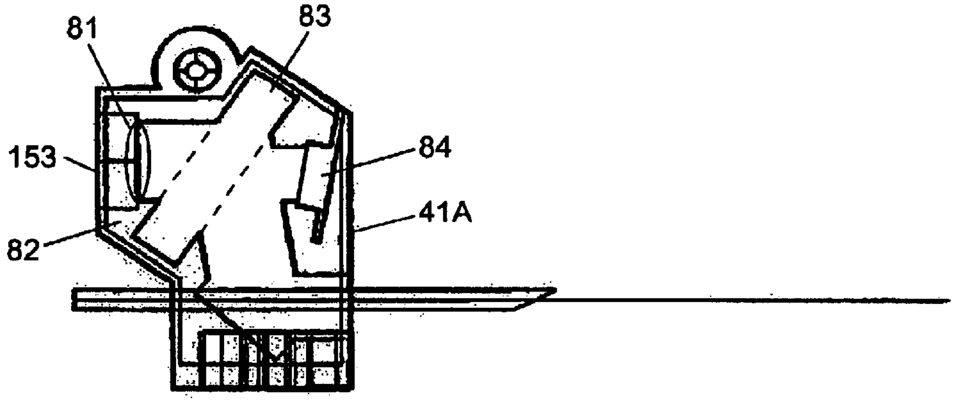
FIG. 2G3

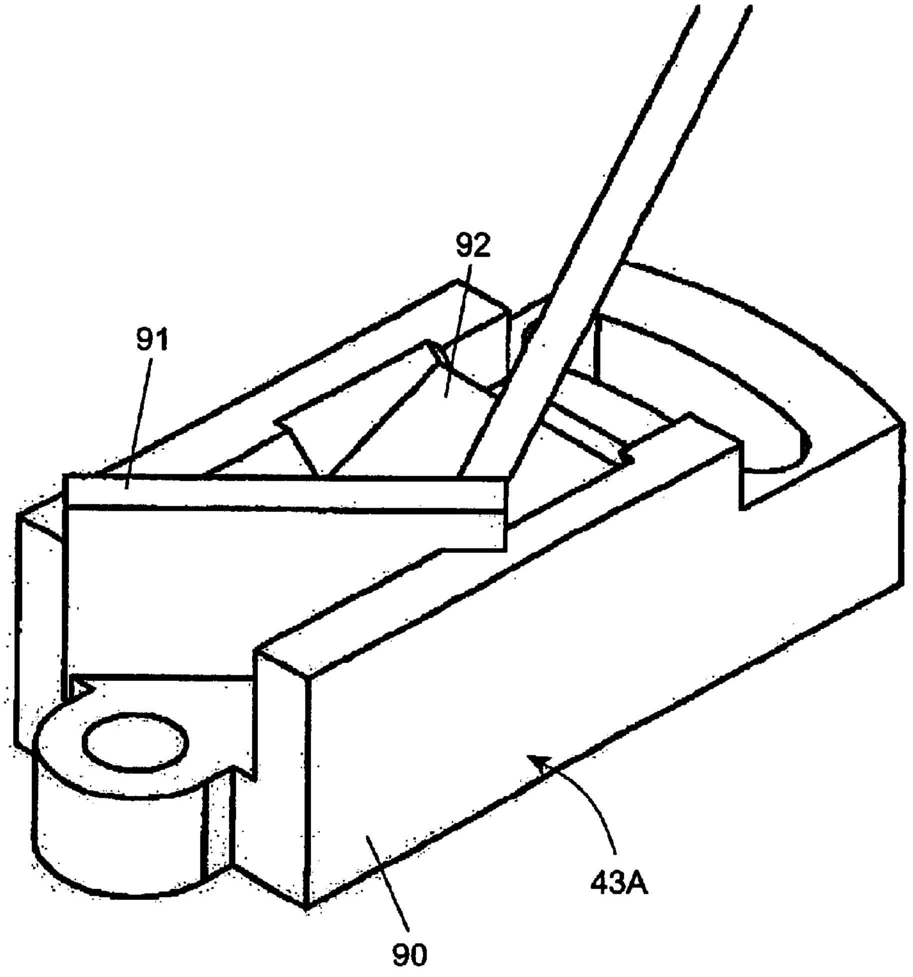
FIG. 2H1

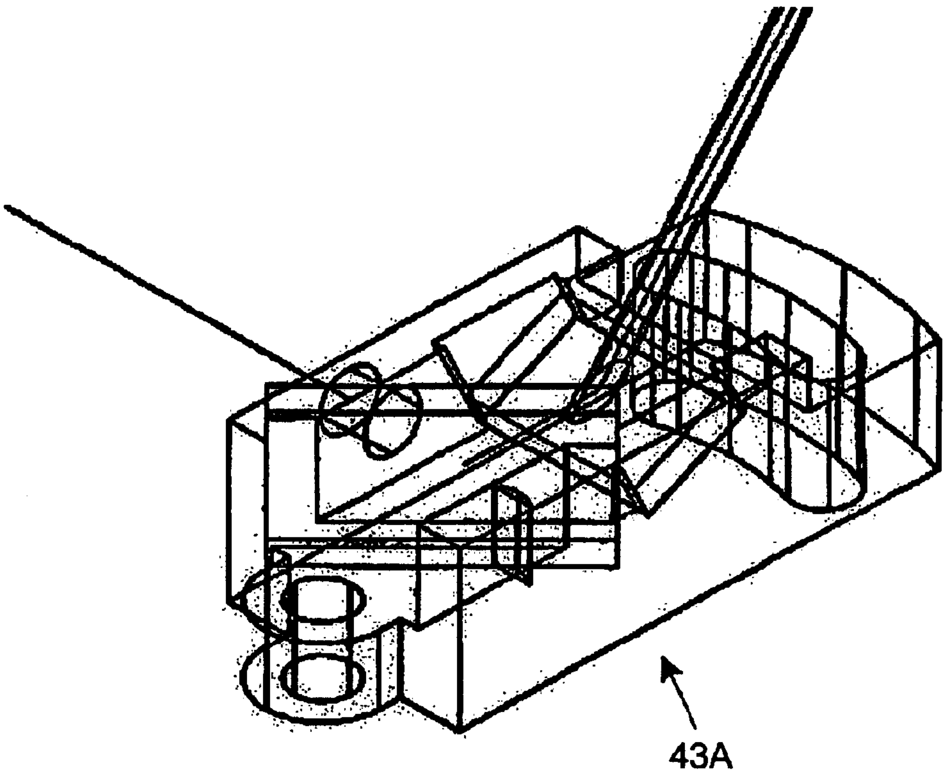
FIG. 2H2

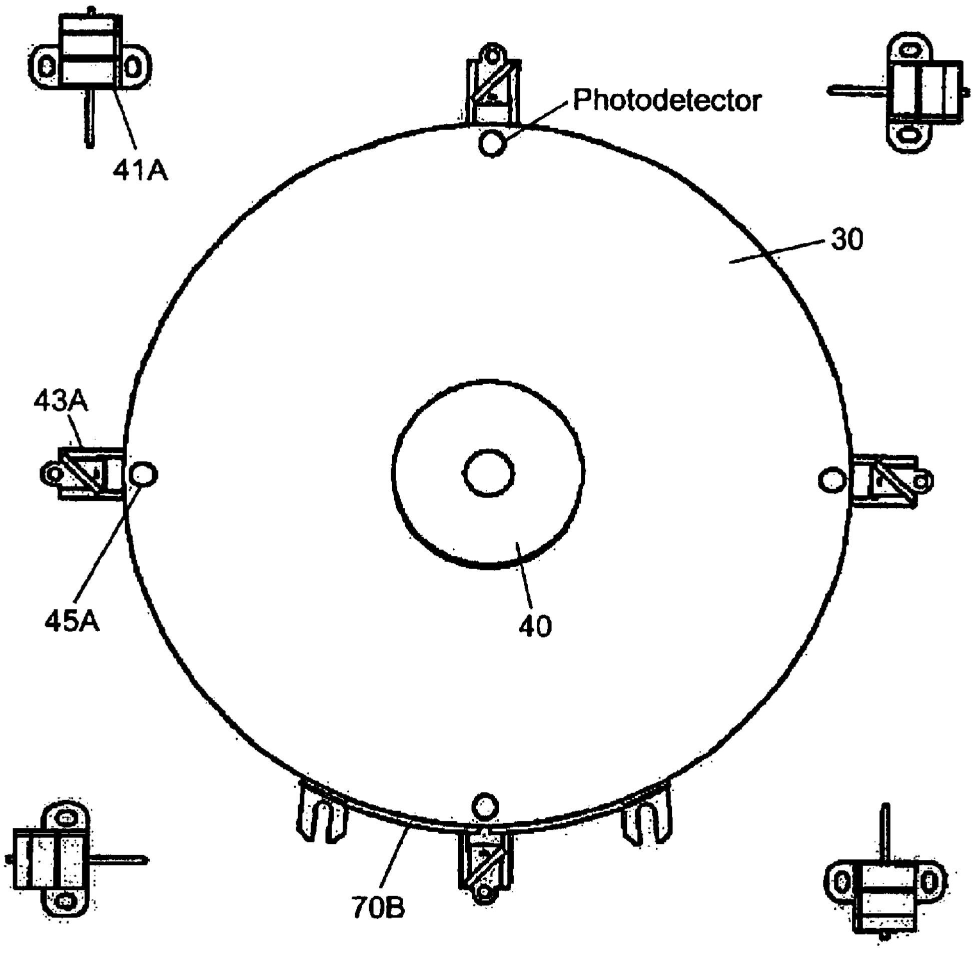
FIG. 2J1

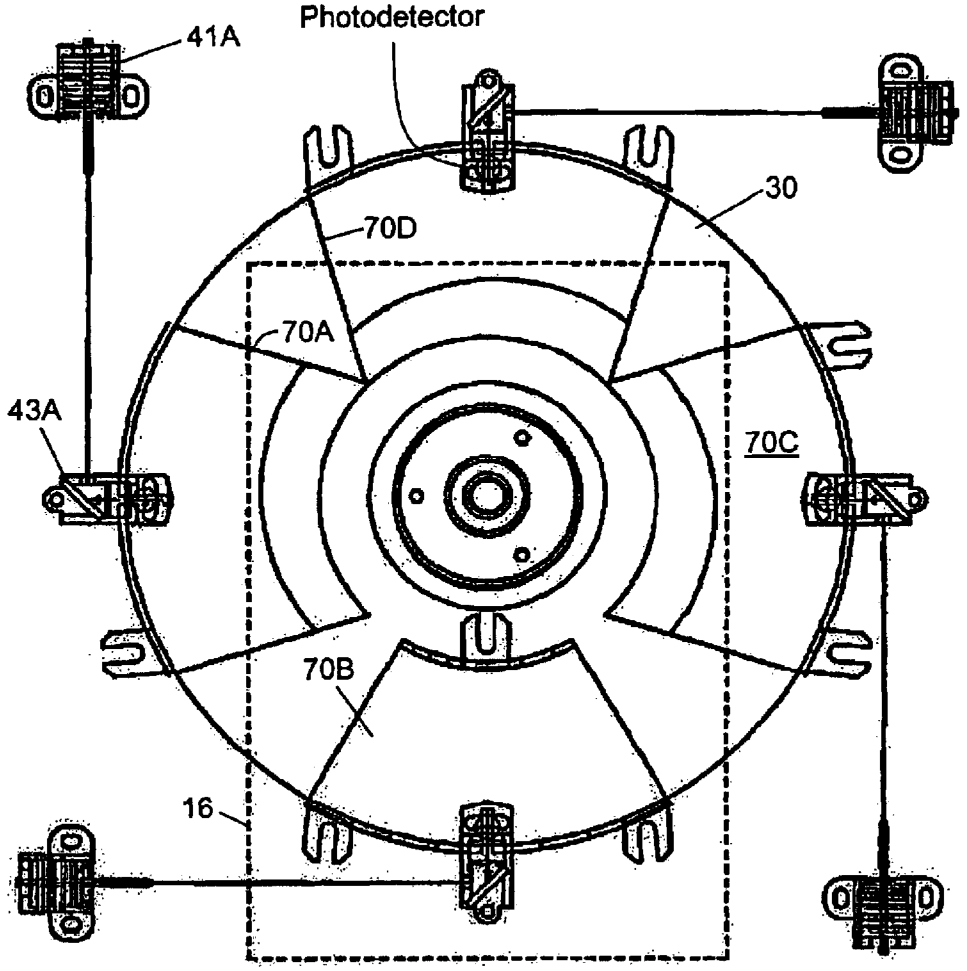
FIG. 2J2

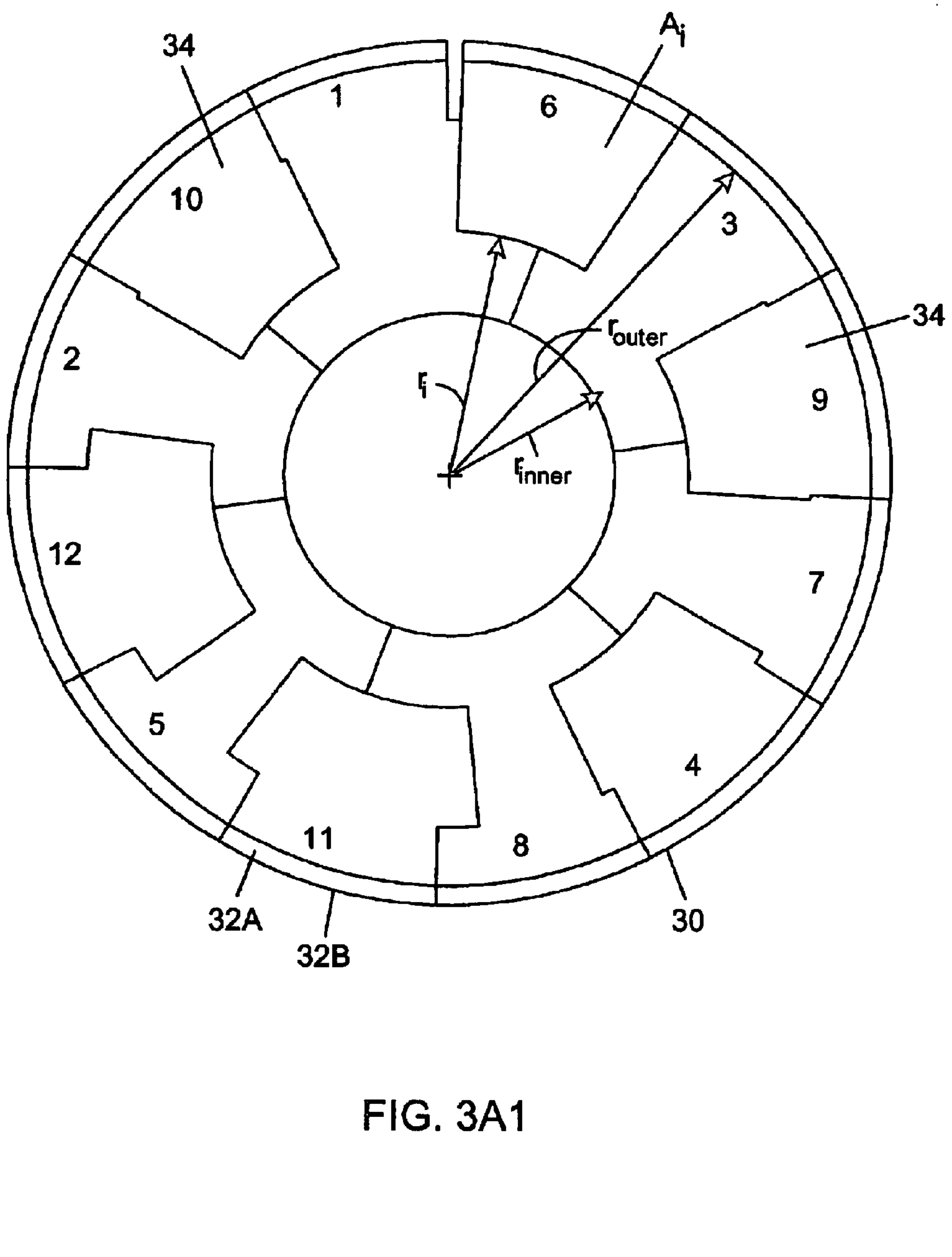
FIG. 3A1

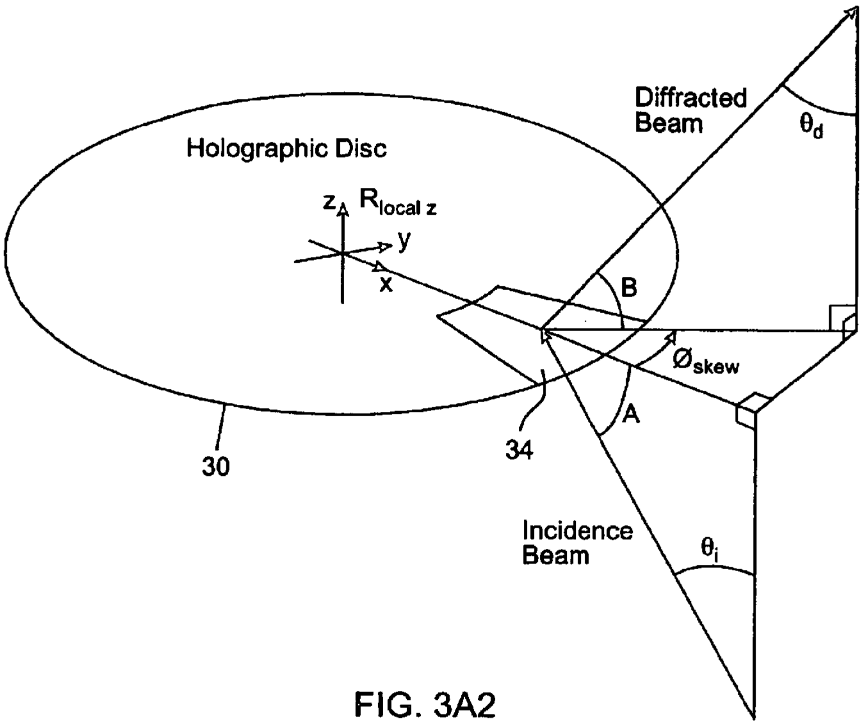
FIG. 3A2
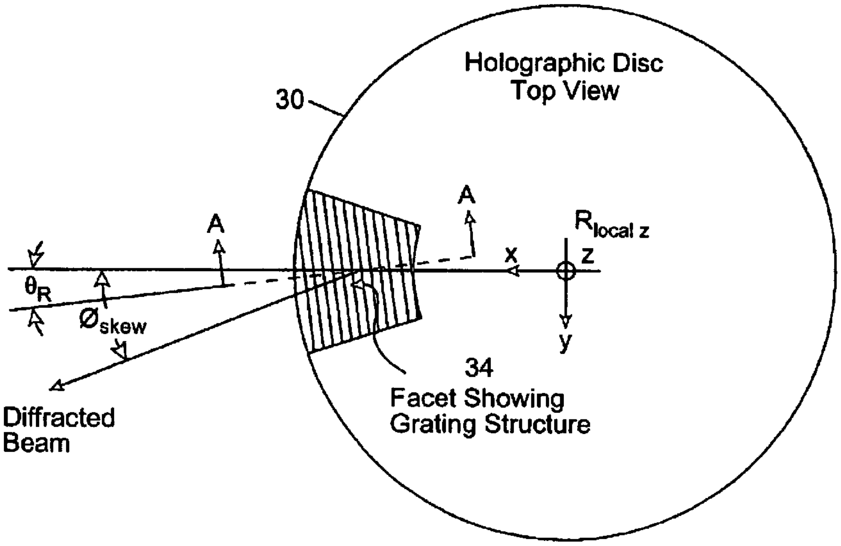
FIG. 3A3

ELEVATION AND SKEW ANGLE CHARACTERISTICS OF FACETS ON HOLOGRAPHIC SCANNING DISK OF THE PRESENT INVENTION

| FACET GROUP NO. | | FACET NO. |
|---|---|---|
| G1 | HIGH ELEVATION ANGLE LEFT SKEW ANGLE | 7, 9, 11 |
| G2 | HIGH ELEVATION ANGLE RIGHT SKEW ANGLE | 8, 10, 12 |
| G3 | LOW ELEVATION ANGLE NO/ZERO SKEW ANGLE | 1, 2, 3, 4, 5, 6 |

FIG. 3A4

Definitions:

R reference vector for incoming beam to disk (same for all facets)
O object vector determined from Angle B.phi
Angle B.theta
Angle B.dist The Reference beam is substantially collimated so for any point x on the disk $R_x = R$
The Object beam for any point x shall be designated as $O_x = O - D$ where D is the vector from the center of the annulus to an arbitrary point x.

The exiting ray is calculated when the facet is rotated such that the arbitrary point x is over the incoming laser beam. The rotation causes a new orientation for $R_x$ in the local co-ordinate system which shall be designated as $R_x'$ Likewise the object ray O is rotated and the new value with respect to the local co-ordinate system is calculated The exiting ray is calculated as $O_x' = R - R_x' + O'$ This is substantially Caulfield's equation (Handbook of Optical Holography) with different notation and some simplification

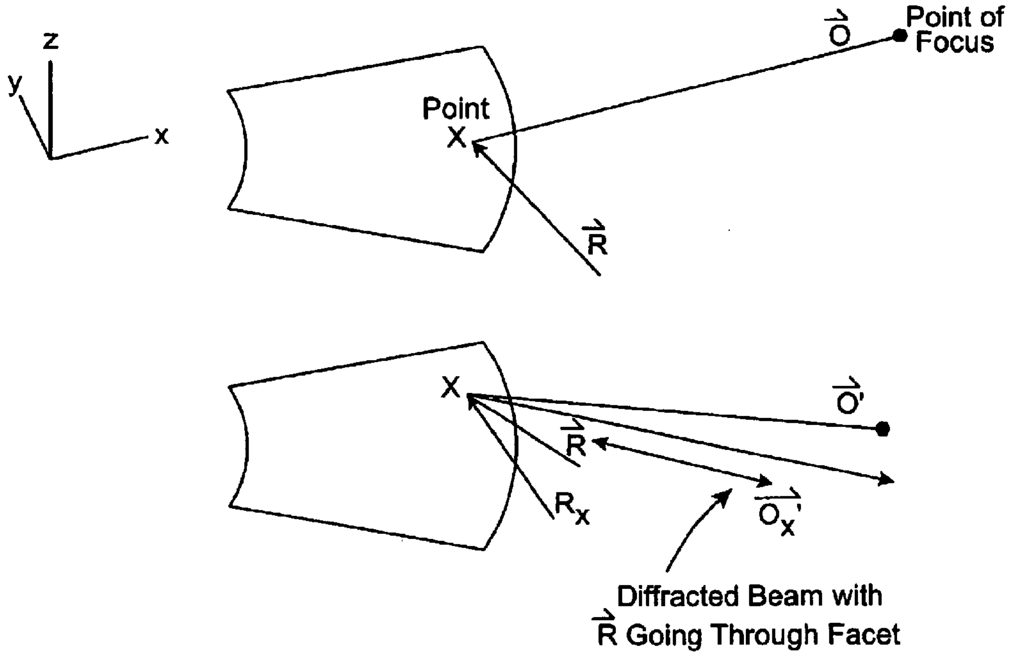

FIG. 3A5A

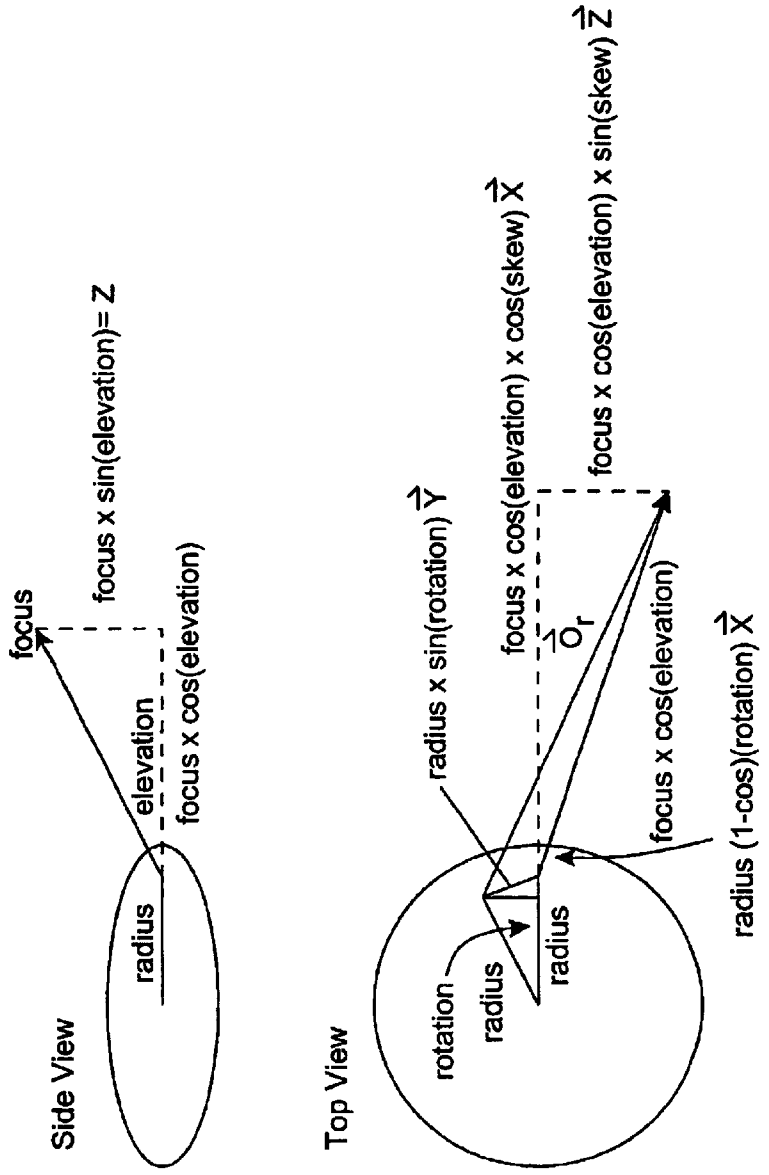
$\vec{1O_r}$ is equal to the sum of these components as shown in the $\vec{1x}$ and $\vec{1y}$ terms on the previous page
FIG. 3A5B Object Ray $$\vec{Or}_k = [\text{focus} \times \cos(\text{elevation}) \times \cos(\text{skew}) + \text{radius}(1 - \cos(\text{rotation})]\vec{X}_k$$

$$+ [\text{focus} \times \cos(\text{elevation}) \times \sin(\text{skew}) + \text{radius} \times \sin(\text{rotation})]\ \vec{Y}_k$$

$$+ [\text{focus} - \sin(\text{elevation})]\vec{Z}_k$$

Where focus = Angle B · distance
elevation = Angle B · phi
skew = Angle B · theta
radius = Angle B · radius
rotation = start middle end of scan angles

FIG. 3A5C

| | A | B | C | D | E | F | G | H | I | J | K | L | M | N | O | P |
|---|---|---|---|---|---|---|---|---|---|---|---|---|---|---|---|---|
| | | MG2@ST1 | | | | MG1@ST1 | | | | MG3@ST1 | | | | | | |
| 1 | **Station 1** | (Local Co-ordinates) | | | | | | | | | | | | | | |
| 2 | | Negative skew (Right) | | | | Positive Skew (Left) | | | | No Skew (Zero) | | | | | | |
| 3 | First Mirror | x | y | z | | x | y | z | | x | y | z | | | | |
| 4 | | 2.55 | -1.80 | 2.70 | | 3.80 | 2.30 | 2.77 | | 4.30 | 1.60 | 2.52 | | | | |
| 5 | | 4.15 | -2.27 | 2.77 | | 4.10 | 1.88 | 2.40 | | 4.95 | 2.15 | 2.04 | | | | |
| 6 | $M_{1,2,1}$ | 3.95 | 0.23 | 2.05 | $M_{1,1,1}$ | 3.80 | 0.14 | 1.80 | $M_{1,3,1}$ | 5.20 | 2.00 | 1.83 | | | | |
| 7 | | 2.42 | -0.24 | 2.25 | | 3.10 | -0.80 | 1.80 | | 5.00 | -1.80 | 1.66 | | | | |
| 8 | | 2.55 | -1.80 | 2.70 | | 2.50 | -0.16 | 2.45 | | 4.70 | -2.10 | 1.87 | | | | |
| 9 | | | | | | 2.65 | 0.76 | 2.77 | | 4.10 | -1.60 | 2.40 | | | | |
| 10 | | | | | | 3.80 | 2.30 | 2.77 | | 4.30 | 1.60 | 2.52 | | | | |
| 11 | | | | | | | | | | | | | | | | |
| 12 | Second Mirror | x | y | z | | x | y | z | | x | y | z | | | | |
| 13 | | 4.00 | -2.63 | 0.05 | | 1.70 | 4.10 | 1.30 | | 3.10 | 2.60 | -0.03 | | | | |
| 14 | | 4.90 | -1.40 | 0.77 | | 3.00 | 4.45 | 1.98 | | 4.50 | 3.00 | 0.22 | | | | |
| 15 | $M_{1,2,2}$ | 4.60 | -3.20 | 2.18 | $M_{1,1,2}$ | 3.40 | 3.99 | 1.50 | $M_{1,3,2}$ | 4.35 | -2.30 | 0.30 | | | | |
| 16 | | 3.70 | -4.10 | 1.06 | | 2.30 | 2.43 | -0.63 | | 3.00 | -2.00 | 0.04 | | | | |
| 17 | | 4.00 | -2.63 | 0.05 | | 1.40 | 2.57 | -0.63 | | 3.10 | 2.60 | -0.03 | | | | |
| 18 | | | | | | 1.00 | 2.99 | -0.20 | | | | | | | | |
| 19 | | | | | | 1.70 | 4.10 | 1.30 | | | | | | | | |
| 20 | | | | | | | | | | | | | | | | |
| 21 | Third Mirror | x | y | z | | | | | | | | | | | | |
| 22 | | 4.41 | -4.10 | 1.10 | | | | | | | | | | | | |
| 23 | | 1.97 | -3.30 | 2.20 | | | | | | | | | | | | |
| 24 | $M_{1,2,3}$ | 1.12 | -1.60 | 0.80 | | | | | | | | | | | | |
| 25 | | 2.51 | -2.00 | 0.10 | | | | | | | | | | | | |
| 26 | | 3.53 | -2.70 | 0.10 | | | | | | | | | | | | |
| 27 | | 4.41 | -4.10 | 1.10 | | | | | | | | | | | | |
| 28 | | | | | | | | | | | | | | | | |

| | A | B | C | D | E | F | G | H | I | J | K | L | M | N | O | P |
|---|---|---|---|---|---|---|---|---|---|---|---|---|---|---|---|---|
| 30 | | | | | | | | | | | | | | | | |
| 31 | **Station 2** | (Local Co-ordinates) | | | | | | | | | | | | | | |
| 32 | | Negative skew | | | | Positive Skew | | | | No Skew | | | | No Skew | | |
| 33 | First Mirror | x | y | z | | x | y | z | | x | y | z | | | | |
| 34 | | | | | | | | | | 3.75 | -1.60 | 2.51 | | | | |
| 35 | | | | | | | | | | 5.10 | -2.40 | 1.73 | | | | |
| 36 | | | | | | | | | $M_{2,3,}$ | 5.10 | 2.40 | 1.73 | | | | |
| 37 | | | | | | | | | | 3.75 | 1.60 | 2.51 | | | | |
| 38 | | | | | | | | | | 3.75 | -1.60 | 2.51 | | | | |
| 39 | | | | | | | | | | | | | | | | |
| 40 | | | | | | | | | | | | | | | | |
| 41 | | | | | | | | | | | | | | | | |
| 42 | Second Mirror | x | y | z | | x | y | z | | x | y | z | | x | y | z |
| 43 | | | | | | | | | | 3.00 | 0.00 | -0.11 | | 3.00 | 0.00 | -0.11 |
| 44 | | | | | | | | | | 4.80 | 0.00 | 0.38 | | 4.80 | 0.00 | 0.38 |
| 45 | | | | | | | | | | 5.07 | -2.26 | 1.07 | | 5.07 | 2.26 | 1.07 |
| 46 | | | | | | | | | $M_{3,3,2A}$ | 5.07 | -2.26 | 1.07 | | 5.07 | 2.26 | 1.07 |
| 47 | | | | | | | | | | 3.06 | -1.00 | 0.17 | | 3.06 | 1.00 | 0.17 |
| 48 | | | | | | | | | | 3.00 | 0.00 | -0.11 | | 3.00 | 0.00 | -0.11 |
| 49 | | | | | | | | | | | | | | | | |
| 50 | | | | | | | | | | (Split mirror for generating two sets of horizontal lines) | | | | | | |
| 51 | | | | | | | | | | | | | | | | |
| 52 | | | | | | | | | | | | | | | | |

| | | MG2@ST3 | | | | MG1@ST3 | | | | MG3@ST3 | | | |
|---|---|---|---|---|---|---|---|---|---|---|---|---|---|
| | A | B | C | D | E | F | G | H | I | J | K | L | |
| 54 | **Station 3** | (Local Co-ordinates) | | | | | | | | | | | |
| 55 | | (R)Negative skew | | | | (L)Positive Skew | | | | No Skew | | | |
| 56 | First Mirror | x | y | z | | x | y | z | | x | y | z | |
| 57 | | 3.80 | -2.30 | 2.77 | | 2.55 | 1.80 | 2.70 | | 4.30 | -1.60 | 2.52 | |
| 58 | | 4.10 | -1.88 | 2.40 | | 4.15 | 2.27 | 2.77 | | 4.95 | -2.15 | 2.04 | |
| 59 | $M_{3,2,1}$ | 3.80 | -0.14 | 1.80 | $M_{3,1,1}$ | 3.95 | -0.23 | 2.05 | | 5.20 | -2.00 | 1.83 | $M_{3,3,1}$ |
| 60 | | 3.10 | 0.80 | 1.80 | | 2.42 | 0.24 | 2.25 | | 5.00 | 1.80 | 1.66 | |
| 61 | | 2.50 | 0.16 | 2.45 | | 2.55 | 1.80 | 2.70 | | 4.70 | 2.10 | 1.87 | |
| 62 | | 2.65 | -0.76 | 2.77 | | | | | | 4.10 | 1.60 | 2.40 | |
| 63 | | 3.80 | -2.30 | 2.77 | | | | | | 4.30 | -1.60 | 2.52 | |
| 64 | | | | | | | | | | | | | |
| 65 | Second Mirror | x | y | z | | x | y | z | | x | y | z | |
| 66 | | 1.70 | -4.10 | 1.30 | | 4.00 | 2.63 | 0.05 | | 3.10 | -2.60 | -0.03 | |
| 67 | | 3.00 | -4.45 | 1.98 | | 4.90 | 1.40 | 0.77 | | 4.50 | -3.00 | 0.22 | |
| 68 | | 3.40 | -3.99 | 1.50 | | 4.60 | 3.20 | 2.18 | | 4.35 | 2.30 | 0.30 | |
| 69 | $M_{3,2,2}$ | 2.30 | -2.43 | -0.63 | $M_{3,1,2}$ | 3.70 | 4.10 | 1.06 | | 3.00 | 2.00 | 0.04 | $M_{3,3,2}$ |
| 70 | | 1.40 | -2.57 | -0.63 | | 4.00 | 2.63 | 0.05 | | 3.10 | -2.60 | -0.03 | |
| 71 | | 1.00 | -2.99 | -0.20 | | | | | | | | | |
| 72 | | 1.70 | -4.10 | 1.30 | | | | | | | | | |
| 73 | | | | | | | | | | | | | |
| 74 | Third Mirror | x | y | z | | x | y | z | | | | | |
| 75 | | | | | | 4.41 | 4.10 | 1.10 | | | | | |
| 76 | | | | | | 1.97 | 3.30 | 2.20 | | | | | |
| 77 | | | | | $M_{3,1,3}$ | 1.12 | 1.60 | 0.80 | | | | | |
| 78 | | | | | | 2.51 | 2.00 | 0.10 | | | | | |
| 79 | | | | | | 3.53 | 2.70 | 0.10 | | | | | |
| 80 | | | | | | 4.41 | 4.10 | 1.10 | | | | | |
| 81 | | | | | | | | | | | | | |

FIG. 3D

| | | MG2@ST4 | | | | MG1@ST4 | | | | MG3@ST4 | | | | | | | |
|---|---|---|---|---|---|---|---|---|---|---|---|---|---|---|---|---|---|
| | A | B | C | D | E | F | G | H | I | J | K | L | M | N | O | P | |
| 83 | **Station 4** | (Local Co-ordinates) | | | | | | | | | | | | | | | |
| 84 | | Negative skew | | | | Positive Skew | | | | No Skew | | | | No Skew | | | |
| 85 | First Mirror | x | y | z | | x | y | z | | x | y | z | | x | y | z | |
| 86 | | 4.90 | -0.80 | 6.41 | | 4.90 | 0.80 | 6.41 | | 6.70 | 0.00 | 5.61 | | 6.70 | 0.00 | 5.61 | |
| 87 | | 6.10 | -0.80 | 5.65 | | 6.10 | 0.80 | 5.65 | | 7.40 | 0.00 | 3.32 | | 7.40 | 0.00 | 3.32 | |
| 88 | $M_{4,2,1}$ | 6.00 | -4.50 | 6.47 | $M_{4,1,1}$ | 6.00 | 4.50 | 6.47 | $M_{4,3,1A}$ | 6.95 | -3.00 | 2.90 | | 6.95 | 3.00 | 2.90 | $M_{4,3,1B}$ |
| 89 | | 4.90 | -4.50 | 7.17 | | 4.90 | 4.50 | 7.17 | | 6.20 | -3.00 | 5.34 | | 6.20 | 3.00 | 5.34 | |
| 90 | | 4.90 | -0.80 | 6.41 | | 4.90 | 0.80 | 6.41 | | 6.70 | 0.00 | 5.61 | | 6.70 | 0.00 | 5.61 | |
| 91 | | | | | | | | | | | | | | | | | |
| 92 | | | | | | | | | | (Split mirror for generating two sets of horizontal lines) | | | | | | | |
| 93 | | | | | | | | | | | | | | | | | |
| 94 | Second Mirror | x | y | z | | x | y | z | | x | y | z | | | | | |
| 95 | | 2.85 | -3.20 | 3.37 | | 2.85 | 3.20 | 3.37 | | | | | | | | | |
| 96 | | 4.20 | -2.80 | 3.23 | | 4.20 | 2.80 | 3.23 | | | | | | | | | |
| 97 | $M_{4,2,2}$ | 5.95 | -4.50 | 6.46 | $M_{4,1,2}$ | 5.95 | 4.50 | 6.46 | | | | | | | | | |
| 98 | | 4.60 | -4.95 | 6.68 | | 4.60 | 4.95 | 6.68 | | | | | | | | | |
| 99 | | 2.85 | -3.20 | 3.37 | | 2.85 | 3.20 | 3.37 | | | | | | | | | |
| 100 | | | | | | | | | | | | | | | | | |

FIG. 3E

| | A | B | C | D | E | F | G | H | I | J | K |
|---|---|---|---|---|---|---|---|---|---|---|---|
| 967 | *** Table of Major Dependent Parameters for both the Scanner and the Disk *** | | | | | | | | | | |
| 968 | | | | | | | | | | | |
| 969 | Box height (inches): | | | | N/A | (See Note 1) | | | | | |
| 970 | Box width (inches): | | | | N/A | (See Note 2) | | | | | |
| 971 | Max angle B (degrees): | | | | 62.00 | (See Note 3) | | | | | |
| 972 | Min angle B (degrees): | | | | 38.00 | (See Note 3) | | | | | |
| 973 | Total facet angular sweep (degrees): | | | | 358.14 | (See Note 4) | | | | | |
| 974 | | | | | | | | | | | |
| 975 | Min (angle A - angle B) (degrees): | | | | 0.00 | (See Note 6) | | | | | |
| 976 | Max beam speed (inches per second): | | | | 13704 | | | | | | |
| 977 | Min beam speed (inches per second): | | | | 7158 | | | | | | |
| 978 | Power at data detector (nW): | | | | 872 | | | | | | |
| 979 | Signal voltage (volts): | | | | 5.47 | (See Note 7) | | | | | |
| 980 | Signal voltage at max DOF limits (volts): | | | | 3.45 | (See Note 7) | 0.91 | Max bandwidth (MHz) for | | 7.5 | mil bars |
| 981 | CDRH: | P-avg. Class 2? | Class 2A? | P-pulse Class 1? | | | | | | | |
| 982 | | YES | YES | YES | | (See Note 8) | | | | | |
| 983 | | | | | | | | | | | |
| 984 | IEC: | Single pulse | P-avg. 0.25s | Pulse train correction | | | | | | | |
| 985 | | PASS | PASS | PASS | | (See Note 8) | | | | | |
| 986 | | | | | | | | | | | |
| 987 | | | | | | | | | | | |

FIG. 3F1

| | A | B | C | D | E | F | G | H | I | J | K |
|---|---|---|---|---|---|---|---|---|---|---|---|
| 988 | Note 1: If this entry is highlighted (red) then the value exceeds the specified value for | | | | | | | | | | |
| 989 | the box height (Cell G21). Go to cells G417 to G456 to identify the problem entries | | | | | | | | | | |
| 990 | and make the necessary inner radius adjustments in Cells G215 to G254. | | | | | | | | | | |
| 991 | | | | | | | | | | | |
| 992 | Note 2: This entry is not used in the box design, but it gives an indication of the box | | | | | | | | | | |
| 993 | dimensions that would be established by the width of the tops of the mirrors. | | | | | | | | | | |
| 994 | | | | | | | | | | | |
| 995 | Note 3: Generally, the B angles should range between 40 degrees and 70 degrees. | | | | | | | | | | |
| 996 | Holograms with smaller or larger angles may be difficult to construct. | | | | | | | | | | |
| 997 | | | | | | | | | | | |
| 998 | Note 4: This entry must be less than, but within a few degrees of, 360 degrees. | | | | | | | | | | |
| 999 | To satisfy this requirement, it may be necessary to make adjustments | | | | | | | | | | |
| 1000 | to the focal distances and/or the length of the scan lines. | | | | | | | | | | |
| 1001 | | | | | | | | | | | |
| 1002 | | | | | | | | | | | |
| 1003 | | | | | | | | | | | |
| 1004 | | | | | | | | | | | |
| 1005 | | | | | | | | | | | |
| 1006 | Note 6: This value must be greater than 0.5 degrees to avoid feedback into the | | | | | | | | | | |
| 1007 | laser from disk surface reflections. If it is too small, adjustments must be | | | | | | | | | | |
| 1008 | made to the B angles of the problem facets (See Cells X468 to X507). | | | | | | | | | | |
| 1009 | | | | | | | | | | | |
| 1010 | Note 7: The signal voltage must be greater than some value established by the signal | | | | | | | | | | |
| 1011 | processor requirements. Typically, this value should be greater than 2 volts. | | | | | | | | | | |
| 1012 | If this value is less than 2 volts, either the laser power must be increased or | | | | | | | | | | |
| 1013 | the focal distances must be decreased. | | | | | | | | | | |
| 1014 | | | | | | | | | | | |
| 1015 | Note 8: All CDRH/IEC entries must be YES or PASS. If not, laser power must be reduced. | | | | | | | | | | |
| 1016 | (Modify laser power in Cell B799.) | | | | | | | | | | |

FIG. 3F2

| | A | B | C | D | E | F |
|---|---|---|---|---|---|---|
| 457 | | | | | | |
| 458 | d = distance from disk to base of scanner (inches): | | | | | |
| 459 | | | | | | |
| 460 | Rotational speed of disk (rpm) | | | | | |
| 461 | | | | | | |
| 462 | DiskStratos_4.xls | | | | | |
| 463 | | | | | | |
| 464 | | Diffraction | Geometrical | | | Angle of |
| 465 | Facet | Focal length | Focal length | Angle A | Angle B | Diffraction |
| 466 | | (inches) | (Inches) | (degrees) | (degrees) | (degrees) |
| 467 | | Given | | Given | Given | |
| 468 | 1 | 12.5 | 12.68 | 52 | 38.00 | 52.00 |
| 469 | 2 | 11.5 | 11.64 | 52 | 40.00 | 50.00 |
| 470 | 3 | 12.7 | 12.88 | 52 | 42.00 | 48.00 |
| 471 | 4 | 11.5 | 11.64 | 52 | 44.00 | 46.00 |
| 472 | 5 | 12.7 | 12.88 | 52 | 48.00 | 42.00 |
| 473 | 6 | 12.0 | 12.15 | 52 | 52.00 | 38.00 |
| 474 | 7 | 14.7 | 14.99 | 52 | 58.00 | 32.00 |
| 475 | 8 | 14.7 | 14.99 | 52 | 58.00 | 32.00 |
| 476 | 9 | 13.5 | 13.72 | 52 | 60.00 | 30.00 |
| 477 | 10 | 13.5 | 13.72 | 52 | 60.00 | 30.00 |
| 478 | 11 | 14.8 | 15.09 | 52 | 62.00 | 28.00 |
| 479 | 12 | 14.8 | 15.09 | 52 | 62.00 | 28.00 |

FIG. 3G1A

| | G | H | I | J | K | L | M |
|---|---|---|---|---|---|---|---|
| 457 | | | | | | | |
| 458 | 0 | | | | | | |
| 459 | | | | | | | |
| 460 | 5200 | | | | | | Maximum |
| 461 | | | | | | | Collection |
| 462 | 650 | nm | | | Accounting for | Light | Area |
| 463 | Focal plane | 359.13 | | | dead time for | Collection | (ignoring |
| 464 | scan line | | Scan mult. | Rotation | laser beam | Factor | notch) |
| 465 | length | Scan Angle | Factor (m) | Angle | 1.23 | | |
| 466 | (inches) | (degrees) | | (degrees) | (degrees) | | (sq. in.) |
| 467 | | | | | | | |
| 468 | 9.750 | 42.61 | 1.62 | 26.24 | 27.47 | 1.00 | 2.28 |
| 469 | 9.750 | 45.95 | 1.62 | 28.35 | 29.58 | 0.80 | 1.81 |
| 470 | 9.750 | 42.00 | 1.58 | 26.66 | 27.89 | 0.92 | 2.09 |
| 471 | 9.750 | 45.95 | 1.57 | 29.19 | 30.42 | 0.71 | 1.62 |
| 472 | 9.750 | 42.00 | 1.50 | 27.97 | 29.21 | 0.79 | 1.79 |
| 473 | 9.750 | 44.22 | 1.46 | 30.28 | 31.51 | 0.64 | 1.47 |
| 474 | 9.750 | 36.69 | 1.31 | 27.99 | 29.23 | 0.87 | 1.97 |
| 475 | 9.750 | 36.69 | 1.31 | 27.99 | 29.23 | 0.87 | 1.97 |
| 476 | 9.750 | 39.71 | 1.30 | 30.65 | 31.88 | 0.71 | 1.61 |
| 477 | 9.750 | 39.71 | 1.30 | 30.65 | 31.88 | 0.71 | 1.61 |
| 478 | 9.750 | 36.46 | 1.25 | 29.19 | 30.42 | 0.83 | 1.88 |
| 479 | 9.750 | 36.46 | 1.25 | 29.19 | 30.42 | 0.83 | 1.88 |

FIG. 3G1B

| | N | O | P | Q | R | S | T | U |
|---|---|---|---|---|---|---|---|---|
| 457 | Notch size in mirror | | | | | | | |
| 458 | TG (12/21/99) | | | | | | | |
| 459 | 3.5 mm x 5.1 m | (3.5 mm x 6.5 mm at disk) | | | | | | |
| 460 | Design | | | | | | | |
| 461 | Collection | | | | | | | |
| 462 | Area | Beam speed | Beam speed | Beam speed | Beam | | | |
| 463 | (Includes | at center of | at max depth | at min depth | skew | Facet count | | |
| 464 | notch loss of | scan line | of field | of field | angle | function | Number of | |
| 465 | 0.035 | | | | | 1 = facet | facets | |
| 466 | sq. inches) | (inches/sec) | (inches/sec) | (inches/sec) | (degrees) | 0 =no facet | 12 | |
| 467 | | | | | | | Max freq. | Min Freq. |
| 468 | 2.27 | 11052 | 13704 | 8400 | 0 | 1 | 0.914 | 0.560 |
| 469 | 1.81 | 10150 | 12798 | 7502 | 0 | 1 | 0.853 | 0.500 |
| 470 | 2.08 | 10895 | 13468 | 8321 | 0 | 1 | 0.898 | 0.555 |
| 471 | 1.63 | 9858 | 12429 | 7286 | 0 | 1 | 0.829 | 0.486 |
| 472 | 1.79 | 10383 | 12835 | 7930 | 0 | 1 | 0.856 | 0.529 |
| 473 | 1.47 | 9544 | 11929 | 7158 | 0 | 1 | 0.795 | 0.477 |
| 474 | 1.97 | 10492 | 12634 | 8351 | 28 | 1 | 0.842 | 0.557 |
| 475 | 1.97 | 10492 | 12634 | 8351 | -28 | 1 | 0.842 | 0.557 |
| 476 | 1.62 | 9524 | 11640 | 7407 | 28 | 1 | 0.776 | 0.494 |
| 477 | 1.62 | 9524 | 11640 | 7407 | -28 | 1 | 0.776 | 0.494 |
| 478 | 1.88 | 10068 | 12108 | 8027 | 28 | 1 | 0.807 | 0.535 |
| 479 | 1.88 | 10068 | 12108 | 8027 | -28 | 1 | 0.807 | 0.535 |

FIG. 3G2A

| | V | W | X | Y | Z | AA | AB |
|---|---|---|---|---|---|---|---|
| 457 | | | | | | | |
| 458 | | | | | | | |
| 459 | NOTE: If any entry in these two columns is less than 0.5 degrees | | | | | | |
| 460 | (highlighted in red), the corresponding B angle should be changed. | | | | | | |
| 461 | This is accomplished by modifying the "Distance from rotational axis" | | | | | | |
| 462 | entry for that line (cells G46 to G85). | | | | | | |
| 463 | | | | | | | |
| 464 | | | Angle A - Angle B | | | | |
| 465 | | | (Absolute value) | | | | |
| 466 | | | (degrees) | | | | |
| 467 | Bandwidth | | | | | | |
| 468 | 0.354 | | 14.00 | | | | |
| 469 | 0.353 | | 12.00 | | | | |
| 470 | 0.343 | | 10.00 | | | | |
| 471 | 0.343 | | 8.00 | | | | |
| 472 | 0.327 | | 4.00 | | | | |
| 473 | 0.318 | | 0.00 | | | | |
| 474 | 0.286 | | 6.00 | | | | |
| 475 | 0.286 | | 6.00 | | | | |
| 476 | 0.282 | | 8.00 | | | | |
| 477 | 0.282 | | 8.00 | | | | |
| 478 | 0.272 | | 10.00 | | | | |
| 479 | 0.272 | | 10.00 | | | | |

FIG. 3G2B

| | A | B | C | D | E |
|---|---|---|---|---|---|
| 508 | Avg. f.l. (In.) | 13.46 | Average angle B (degrees): | | 52.00 |
| 509 | Avg waist loc | 13.24 | Maximum angle B (degrees): | | 62.00 |
| 510 | Approximate minimum box width: | | | N/A | inches |
| 511 | (Based on large mirror as limitation) | | | | |
| 512 | | | | | |
| 513 | | | | | |
| 514 | | | | | |
| 515 | *** Master Hologram Exposure Information *** | | | | |
| 516 | DiskStratos_4.xls | | | | |
| 517 | Gelatin Refractive Indexes | | | Wavelengths (microns) | |
| 518 | Before processing: | | 1.53 | Scanner: | 0.65 |
| 519 | After processing: | | 1.4 | Exposure: | 0.488 |
| 520 | | | | | |
| 521 | Facet | | | | |
| 522 | | Grating spacing at scan region (microns) | | | |
| 523 | | Design wavelength = | | 0.65 | microns |
| 524 | 1 | | 0.4631 | | |
| 525 | 2 | | 0.4704 | | |
| 526 | 3 | | 0.4784 | | |
| 527 | 4 | | 0.4869 | | |
| 528 | 5 | | 0.5059 | | |
| 529 | 6 | | 0.5279 | | |
| 530 | 7 | | 0.5674 | | |
| 531 | 8 | | 0.5674 | | |
| 532 | 9 | | 0.5826 | | |
| 533 | 10 | | 0.5826 | | |
| 534 | 11 | | 0.5990 | | |
| 535 | 12 | | 0.5990 | | |

FIG. 3H1

| | F | G | H | I | J | K | L |
|---|---|---|---|---|---|---|---|
| 508 | | | Average: | 1.42 | | | |
| 509 | | SUMS —> | 488.46 | | 344.36 | 359.13 | 9.65 |
| 510 | | | | | | | |
| 511 | | Total facet angular sweep (degrees): | | | | 359.13 | |
| 512 | | | | | | | |
| 513 | | | | | | | |
| 514 | | | | | | | |
| 515 | | | | | | | |
| 516 | | 650 | nm | | | | |
| 517 | | | | | | | |
| 518 | | Distance from beam incidence point on disk to 488 nm reference point: | | | | | |
| 519 | | Diffraction | Diffraction | | Exposure angles at reference point at 488 nm | | |
| 520 | | angle from | angle from | | Reference | Object | |
| 521 | Facet | annulus | reference point | | Beam | Beam | |
| 522 | | (degrees) | (degrees) | | (degrees) | (degrees) | |
| 523 | | | | | | | |
| 524 | 1 | 52.00 | 52.00 | | 25.13 | 38.99 | |
| 525 | 2 | 50.00 | 50.00 | | 25.45 | 37.42 | |
| 526 | 3 | 48.00 | 48.00 | | 25.78 | 35.82 | |
| 527 | 4 | 46.00 | 46.00 | | 26.12 | 34.20 | |
| 528 | 5 | 42.00 | 42.00 | | 26.81 | 30.90 | |
| 529 | 6 | 38.00 | 38.00 | | 27.53 | 27.53 | |
| 530 | 7 | 32.00 | 32.00 | | 28.64 | 22.38 | |
| 531 | 8 | 32.00 | 32.00 | | 28.64 | 22.38 | |
| 532 | 9 | 30.00 | 30.00 | | 29.02 | 20.64 | |
| 533 | 10 | 30.00 | 30.00 | | 29.02 | 20.64 | |
| 534 | 11 | 28.00 | 28.00 | | 29.40 | 18.89 | |
| 535 | 12 | 28.00 | 28.00 | | 29.40 | 18.89 | |

FIG. 3H2

| | M | N | O | P | Q | R | S | T | U | V |
|---|---|---|---|---|---|---|---|---|---|---|
| 508 | | | | | | | | | | |
| 509 | 21.99 | 21.99 | | <——SUMS | | | | | | |
| 510 | | Vmax (in/s): | 13704 | | | | | | | |
| 511 | | Vmin (in/s): | 7158 | | | | | | | |
| 512 | | Ratio | 1.91 | | | | | | | |
| 513 | | | | | | | | | | |
| 514 | | | | | | | | | | |
| 515 | | | | | | | | | | |
| 516 | | | | | | | | | | |
| 517 | | | | | | | | | | |
| 518 | 0 | inch | | | | | | | | |
| 519 | | | | | | | | | | |
| 520 | | | | | | | | | | |
| 521 | | | alpha-1 | beta-1 | phi | theta-1 | L | theta-2 | alpha-2 | beta-2 |
| 522 | | | (degrees) | (degrees) | (degrees) | (degrees) | (microns) | (degrees) | (degrees) | (degrees) |
| 523 | | | | | | | | | | |
| 524 | | | 26.09 | 34.25 | 85.92 | 30.17 | 0.46 | 20.20 | 16.12 | 24.28 |
| 525 | | | 26.09 | 33.17 | 86.46 | 29.63 | 0.47 | 19.86 | 16.31 | 23.40 |
| 526 | | | 26.09 | 32.06 | 87.01 | 29.07 | 0.48 | 19.50 | 16.52 | 22.49 |
| 527 | | | 26.09 | 30.92 | 87.59 | 28.50 | 0.49 | 19.14 | 16.72 | 21.55 |
| 528 | | | 26.09 | 28.55 | 88.77 | 27.32 | 0.51 | 18.38 | 17.15 | 19.61 |
| 529 | | | 26.09 | 26.09 | 90.00 | 26.09 | 0.53 | 17.58 | 17.58 | 17.58 |
| 530 | | | 26.09 | 22.24 | 91.92 | 24.17 | 0.57 | 16.33 | 18.26 | 14.41 |
| 531 | | | 26.09 | 22.24 | 91.92 | 24.17 | 0.57 | 16.33 | 18.26 | 14.41 |
| 532 | | | 26.09 | 20.92 | 92.58 | 23.51 | 0.58 | 15.90 | 18.48 | 13.32 |
| 533 | | | 26.09 | 20.92 | 92.58 | 23.51 | 0.58 | 15.90 | 18.48 | 13.32 |
| 534 | | | 26.09 | 19.59 | 93.25 | 22.84 | 0.60 | 15.47 | 18.71 | 12.22 |
| 535 | | | 26.09 | 19.59 | 93.25 | 22.84 | 0.60 | 15.47 | 18.71 | 12.22 |

FIG. 3H3

| | A | B | C | D | E | F | G | H |
|---|---|---|---|---|---|---|---|---|
| 566 | *** Modified Exposure Angles to Correct for Post-processing Residual Gelatin Swell *** | | | | | | | |
| 567 | DiskStratos_4.xls | | | | | | 650 | nm |
| 568 | Percent gelatin swell (from measurements) delta-t/t: | | | | 20% | | | |
| 569 | | | | | | | | |
| 570 | | Exposure angles at 488 nm | | | Exposure angles to compensate for swell | | | |
| 571 | | Reference | Object | | Reference | Object | | gamma(sw) |
| 572 | Facet | Beam | Beam | | Beam | Beam | | |
| 573 | | (degrees) | (degrees) | | (degrees) | (degrees) | | |
| 574 | | | | | | | | |
| 575 | 1 | 25.13 | 38.99 | | 23.85 | 40.50 | | -4.08 |
| 576 | 2 | 25.45 | 37.42 | | 24.34 | 38.70 | | -3.54 |
| 577 | 3 | 25.78 | 35.82 | | 24.83 | 36.88 | | -2.99 |
| 578 | 4 | 26.12 | 34.20 | | 25.35 | 35.04 | | -2.41 |
| 579 | 5 | 26.81 | 30.90 | | 26.41 | 31.31 | | -1.23 |
| 580 | 6 | 27.53 | 27.53 | | 27.53 | 27.53 | | 0.00 |
| 581 | 7 | 28.64 | 22.38 | | 29.28 | 21.77 | | 1.92 |
| 582 | 8 | 28.64 | 22.38 | | 29.28 | 21.77 | | 1.92 |
| 583 | 9 | 29.02 | 20.64 | | 29.89 | 19.83 | | 2.58 |
| 584 | 10 | 29.02 | 20.64 | | 29.89 | 19.83 | | 2.58 |
| 585 | 11 | 29.40 | 18.89 | | 30.50 | 17.89 | | 3.25 |
| 586 | 12 | 29.40 | 18.89 | | 30.50 | 17.89 | | 3.25 |

FIG. 3I1

| | I | J | K | L | M | N | O |
|---|---|---|---|---|---|---|---|
| 566 | | | | | | | |
| 567 | | | | | | | |
| 568 | | | | | | | |
| 569 | | | | | | | |
| 570 | | | | | | | |
| 571 | gamma(0) | A | B | C | Z | alpha-0 | beta-0 |
| 572 | | | | | | | |
| 573 | | | | | | | |
| 574 | | | | | | | |
| 575 | -4.90 | 1.99 | 0.17 | 0.69 | 0.26 | 15.33 | 25.12 |
| 576 | -4.25 | 1.99 | 0.15 | 0.68 | 0.27 | 15.62 | 24.12 |
| 577 | -3.58 | 1.99 | 0.12 | 0.67 | 0.27 | 15.93 | 23.10 |
| 578 | -2.90 | 1.99 | 0.10 | 0.66 | 0.28 | 16.25 | 22.04 |
| 579 | -1.48 | 2.00 | 0.05 | 0.63 | 0.29 | 16.90 | 19.86 |
| 580 | 0.00 | 2.00 | 0.00 | 0.60 | 0.30 | 17.58 | 17.58 |
| 581 | 2.31 | 2.00 | -0.08 | 0.56 | 0.32 | 18.65 | 14.03 |
| 582 | 2.31 | 2.00 | -0.08 | 0.56 | 0.32 | 18.65 | 14.03 |
| 583 | 3.10 | 1.99 | -0.11 | 0.55 | 0.33 | 19.01 | 12.81 |
| 584 | 3.10 | 1.99 | -0.11 | 0.55 | 0.33 | 19.01 | 12.81 |
| 585 | 3.90 | 1.99 | -0.14 | 0.53 | 0.33 | 19.37 | 11.58 |
| 586 | 3.90 | 1.99 | -0.14 | 0.53 | 0.33 | 19.37 | 11.58 |

FIG. 3I2

| | A | B | C | D | E | F | G | H |
|---|---|---|---|---|---|---|---|---|
| 617 | *** Analysis of the Focus Shift and Out-of-focus Spot Size for Converging Reference Beam *** | | | | | | | |
| 618 | (Not applicable for Stratos) | | | | | | | |
| 619 | Convergence of the reference beam: | | | | -1477 | mm | | |
| 620 | Focal length of parabolic mirror: | | | | 58.82 | mm | | |
| 621 | Distance from parabolic mirror to detector: | | | | 60 | mm | | |
| 622 | | Design | Par. Mirror | Required | Object | Image | Image | Spot size |
| 623 | Facet | Focal length | Eff. width | foc. length | distance | distance | shift | at detector |
| 624 | | (mm) | (mm) | (mm) | (mm) | (mm) | (mm) | (mm) |
| 625 | | | | | | | | |
| 626 | | | | | | | | |
| 627 | 1 | 317.50 | 40 | 404.42 | -14858.75 | 59.05 | -0.95 | 0.64 |
| 628 | 2 | 292.10 | 40 | 364.09 | 31841.43 | 58.71 | -1.29 | 0.88 |
| 629 | 3 | 322.58 | 40 | 412.69 | -11828.19 | 59.11 | -0.89 | 0.60 |
| 630 | 4 | 292.10 | 40 | 364.09 | 31841.43 | 58.71 | -1.29 | 0.88 |
| 631 | 5 | 322.58 | 40 | 412.69 | -11828.19 | 59.11 | -0.89 | 0.60 |
| 632 | 6 | 304.80 | 40 | 384.03 | -48230.76 | 58.89 | -1.11 | 0.75 |
| 633 | 7 | 373.38 | 40 | 499.67 | -4485.04 | 59.60 | -0.40 | 0.27 |
| 634 | 8 | 373.38 | 40 | 499.67 | -4485.04 | 59.60 | -0.40 | 0.27 |
| 635 | 9 | 342.90 | 40 | 446.55 | -6818.26 | 59.33 | -0.67 | 0.45 |
| 636 | 10 | 342.90 | 40 | 446.55 | -6818.26 | 59.33 | -0.67 | 0.45 |
| 637 | 11 | 375.92 | 40 | 504.23 | -4375.15 | 59.62 | -0.38 | 0.25 |
| 638 | 12 | 375.92 | 40 | 504.23 | -4375.15 | 59.62 | -0.38 | 0.25 |

FIG. 3J1

| | I | J | K | L | M |
|---|---|---|---|---|---|
| 617 | | | | | |
| 618 | | | | | |
| 619 | | | | | |
| 620 | | | | | |
| 621 | | | | | |
| 622 | | | | | |
| 623 | | | | | |
| 624 | | | | | |
| 625 | 0.88 | | | | |
| 626 | | | | | |
| 627 | Distance (Cell E621) may have to be adjusted | | | | |
| 628 | so that the maximum spot size at the detector is | | | | |
| 629 | approximately the same when the 1/2 depth of field value | | | | |
| 630 | is negative as it is when the 1/2 depth of field value is positive. | | | | |
| 631 | (The 1/2 depth of field value is located at Cell G19) | | | | |
| 632 | | | | | |
| 633 | | | | | |
| 634 | | | | | |
| 635 | | | | | |
| 636 | | | | | |
| 637 | | | | | |
| 638 | | | | | |

FIG. 3J2

Focal distances and distances to the window for the Stratos scanner
LDD 12/7/99 RPH

| Facet | Diffraction Focal length (inches) Given | Distance to horizontal window (inches) | Difference (inches) | Distance to vertical window (inches) | Difference (inches) | Operator side Distance to horizontal window (inches) | Difference (inches) |
|---|---|---|---|---|---|---|---|
| 1 | 12.5 | 8.5 | 4 | 10.2 | 2.3 | 8 | 4.5 |
| 2 | 11.5 | 8.8 | 2.7 | 10.2 | 1.3 | 8.42 | 3.08 |
| 3 | 12.7 | 9.2 | 3.5 | 10.2 | 2.5 | 8.85 | 3.85 |
| 4 | 11.5 | 9.5 | 2 | 10.2 | 1.3 | 9.25 | 2.25 |
| 5 | 12.7 | 9.8 | 2.9 | 10.2 | 2.5 | 9.7 | 3 |
| 6 | 12 | 10.2 | 1.8 | 10.2 | 1.8 | 10.1 | 1.9 |
| 7 | 14.7 | 10.6 | 4.1 | 14.1 | 0.6 | | |
| 8 | 14.7 | 9.7 | 5 | 14.1 | 0.6 | | |
| 9 | 13.5 | 11.2 | 2.3 | 13.8 | -0.3 | | |
| 10 | 13.5 | 9.8 | 3.7 | 13.8 | -0.3 | | |
| 11 | 14.8 | 11.1 | 3.7 | 13.6 | 1.2 | | |
| 12 | 14.8 | 9.6 | 5.2 | 13.6 | 1.2 | | |

The horizontal window lines from the even numbered vertical facets 8, 10, 12 are near the vertical window.

FIG. 3K

| | A | B | C | D | E | F | G | H | I |
|---|---|---|---|---|---|---|---|---|---|
| 1 | *** CDRH/IEC Calculations to Verify that the Scanner Meets the Laser Class Requirements *** | | | | | | | | |
| 2 | | | | | | | | | |
| 3 | The number of overlapping lines (N-overlap) must be determined from the scanner data. | | | | | | | | |
| 4 | A safe assumption for our scanners is to consider that two scan lines are overlapped | | | | | | | | |
| 5 | ONLY when the difference between their diffraction angles (B) is less than 2 degrees. | | | | | | | | |
| 6 | All else being equal, the slowest scan lines (largest angle B) will be the worst case scan lines. | | | | | | | | |
| 7 | | | | | | | | | |
| 8 | N-overlap: | 1 | | | | | | | |
| 9 | Motor speed (rpm): | | | 5200 | | | | | |
| 10 | Alpha-min (radians): | | | 0.0015 | (from standard) | | | | |
| 11 | FWHM P-divergence of laser (deg.): | | | 8 | (Linked from Tmc spreadsheet) | | | | |
| 12 | FWHM S-divergence of laser (deg.): | | | 30 | (Linked from Tmc spreadsheet) | | | | |
| 13 | Focal length of collimating lens (mm): | | | 6.1 | (Linked from Tmc spreadsheet) | | | | |
| 14 | Angle of incidence at MF plate (deg.): | | | 29.23 | | | | | |
| 15 | Angle of diffraction at MF plate (deg.): | | | 42.12 | | | | | |
| 16 | X-p (mm): | | | 0.87 | | | | | |
| 17 | X-s (mm): | | | 3.93 | | | | | |
| 18 | Average source dimension (mm): | | | 2.40 | | | | | |
| 19 | Distance to aperture (mm): | | | 200 | (actual distance or 200 mm, whichever is greater) | | | | |
| 20 | Alpha (radians): | | | 0.012 | | | | | |
| 21 | C6: | | | 7.996 | | | | | |
| 22 | | | | | | | | | |

FIG. 3L1A

| | A | B | C | D | E | F | G | H | I |
|---|---|---|---|---|---|---|---|---|---|
| 23 | | | | | | | | | |
| 24 | | Laser power | tc (200) | ti (actual) | | | | | |
| 25 | | at window | 7 mm transit | 7 mm transit | P x ti | | | | |
| 26 | Facet | (mW) | time at | time at | (Joules) | | | | |
| 27 | | | d = 200 mm | actual d | | | | | |
| 28 | | | (seconds) | (seconds) | | | Facet count | | |
| 29 | | | | | | | | | |
| 30 | 1 | 0.86 | 3.95856E-05 | 3.95856E-05 | 0.0000339 | | 1 | | |
| 31 | 2 | 0.86 | 3.96549E-05 | 3.96549E-05 | 0.0000341 | | 1 | | |
| 32 | 3 | 0.86 | 4.08001E-05 | 4.08001E-05 | 0.0000351 | | 1 | | |
| 33 | 4 | 0.86 | 4.08315E-05 | 4.08315E-05 | 0.0000352 | | 1 | | |
| 34 | 5 | 0.86 | 4.28115E-05 | 4.28115E-05 | 0.0000370 | | 1 | | |
| 35 | 6 | 0.87 | 4.40086E-05 | 4.40086E-05 | 0.0000381 | | 1 | | |
| 36 | 7 | 0.87 | 4.90358E-05 | 4.90358E-05 | 0.0000425 | | 1 | | |
| 37 | 8 | 0.87 | 4.90358E-05 | 4.90358E-05 | 0.0000425 | | 1 | | |
| 38 | 9 | 0.87 | 4.96126E-05 | 4.96126E-05 | 0.0000430 | | 1 | | |
| 39 | 10 | 0.87 | 4.96126E-05 | 4.96126E-05 | 0.0000430 | | 1 | | |
| 40 | 11 | 0.87 | 5.14525E-05 | 5.14525E-05 | 0.0000446 | | 1 | | |
| 41 | 12 | 0.87 | 5.14525E-05 | 5.14525E-05 | 0.0000446 | | 1 | | |

FIG. 3L1B

| | A | B | C | D | E | F | G | H |
|---|---|---|---|---|---|---|---|---|
| 912 | Sums: | | | 0.0000515 | 0.0000446 | These values are the sums of the | | |
| 913 | | | | | | worst case (largest) overlap values | | |
| 914 | Duty Cycle: | 0.004459213 | | | | | | |
| 915 | | | | | | | | |
| 916 | Paverage is the sum of the overlap Pi x ti products divided by the sum of the ti times times the duty cycle | | | | | | | |
| 917 | Paverage is, therefore, the sum of the overlap Pi x ti products times the rps of the motor. | | | | | | | |
| 918 | | | | | | | | |
| 919 | CDRH calculations and results | | | | | | | |
| 920 | | | | Class 1 | Class 2? | Class 2A? | | |
| 921 | | | | | | | | |
| 922 | Pavg. (mW): | | 0.003869 | | YES | YES | | |
| 923 | | | | | | | | |
| 924 | P (single pulse) (mW): | | 8.27 | | | | | |
| 925 | (Maximum allowed) | | | | | | | |
| 926 | | | | | | | | |
| 927 | P (single pulse) | | 0.87 | YES | | | | |
| 928 | (Actual) | | | | | | | |
| 929 | | | | | | | | |
| 930 | IEC calculations and results | | | | | | | |
| 931 | | | | | | | | |
| 932 | IEC condition A (Single pulse) | | | | | PASS/FAIL | | |
| 933 | | | | | | | | |
| 934 | P (single pulse) (mW): | | 70.6 | | | PASS | | |
| 935 | (Maximum allowed) | | | | | | | |
| 936 | | | | | | | | |

FIG. 3L2A

| | A | B | C | D | E | F | G | H |
|---|---|---|---|---|---|---|---|---|
| 937 | | | | | | | | |
| 938 | IEC condition B (average power in a 0.25 second pulse train) | | | | | | | |
| 939 | | | | | | | | |
| 940 | Pavg. allowed (mW): | | 7.92 | | | PASS/FAIL | | |
| 941 | | | | | | | | |
| 942 | Pavg. scanner (mW): | | 0.0039 | | | PASS | | |
| 943 | | | | | | | | |
| 944 | | | | | | | | |
| 945 | IEC condition C (pulse train correction factor) | | | | | | | |
| 946 | (For this calculation, you need to insert the sum of the pulse times in the overlapping scan lines) | | | | | | | |
| 947 | | | | | | | | |
| 948 | | | | | | | | |
| 949 | T-total (seconds): | | 0.000051 | | | | | |
| 950 | (sum of pulse times | | | | | | | |
| 951 | in overlap scan lines) | | | | | | | |
| 952 | | | | | | | | |
| 953 | Pmax (mW): | | 66.1 | | | | | |
| 954 | | | | | | | | |
| 955 | Number of pulses in train: | | 21.67 | | | | | |
| 956 | | | | | | | | |
| 957 | Correction factor: | | 0.4635 | | | | | |
| 958 | | | | | | | | |
| 959 | Pmax (PT corrected)(mW): | | 30.63 | | | PASS/FAIL | | |
| 960 | | | | | | | | |
| 961 | Pw (including overlap) | | 0.87 | | | PASS | | |
| 962 | | | | | | | | |

FIG. 3L2B

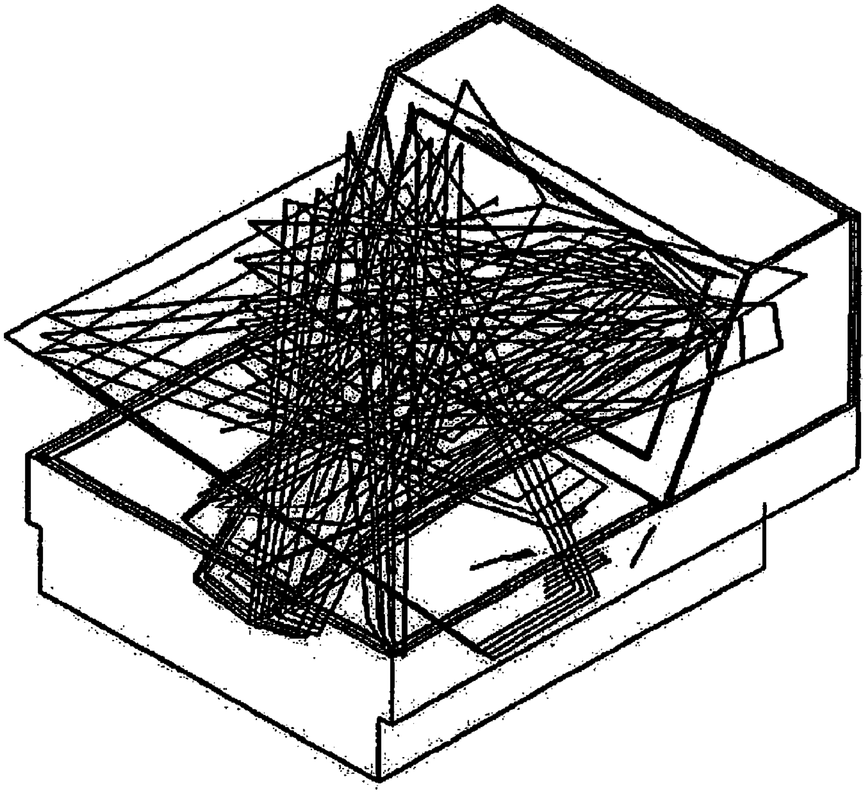
FIG. 5A1

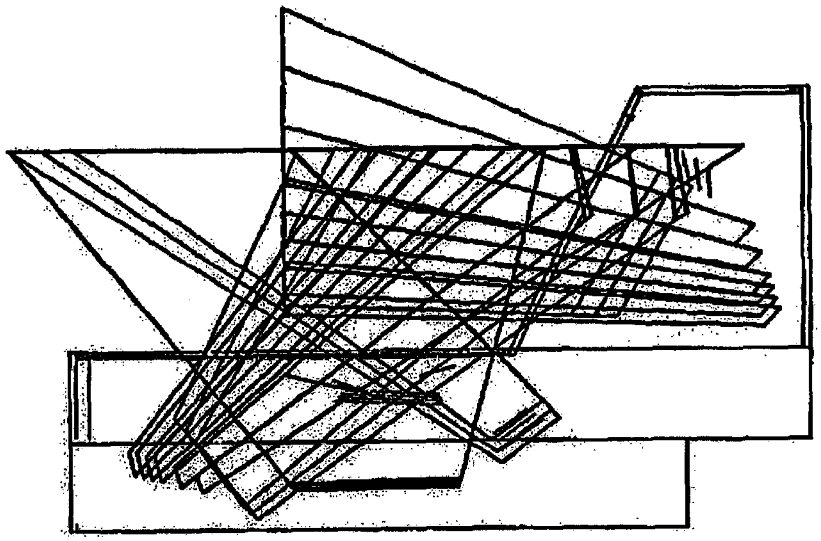
FIG. 5A2

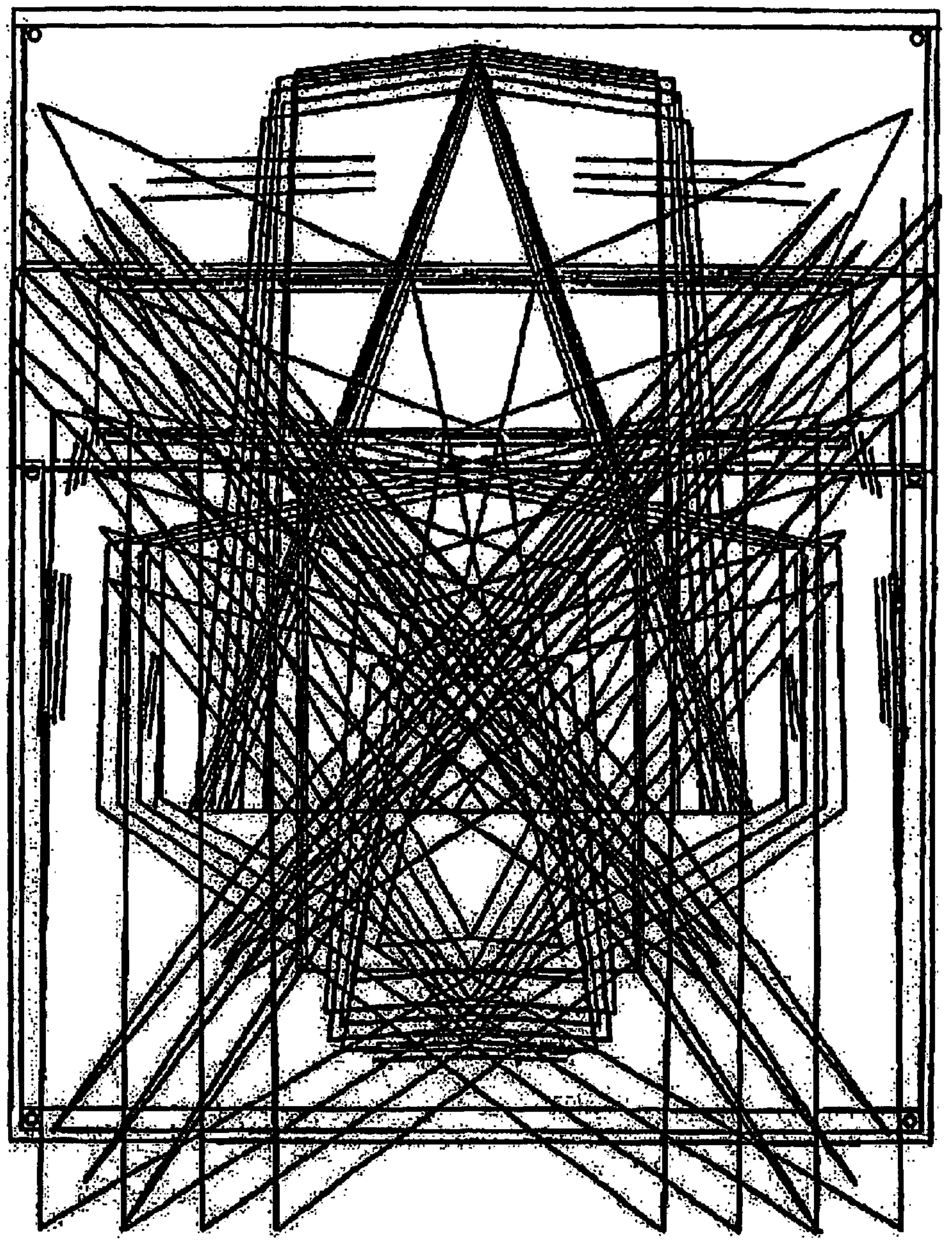
FIG. 5A3

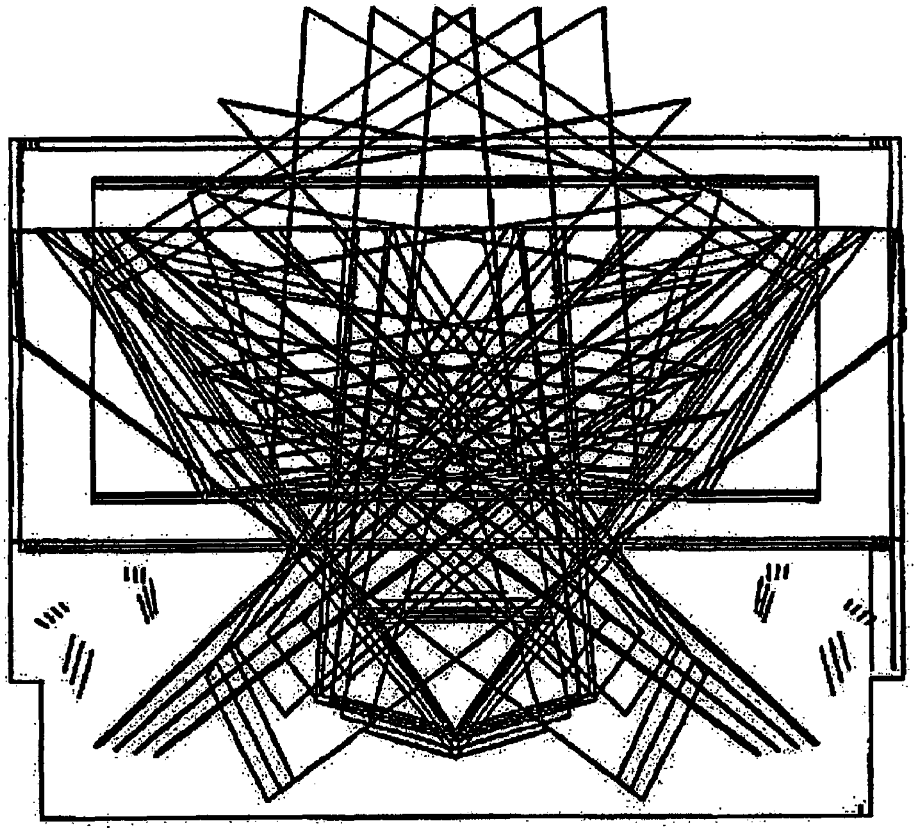
FIG. 5A4

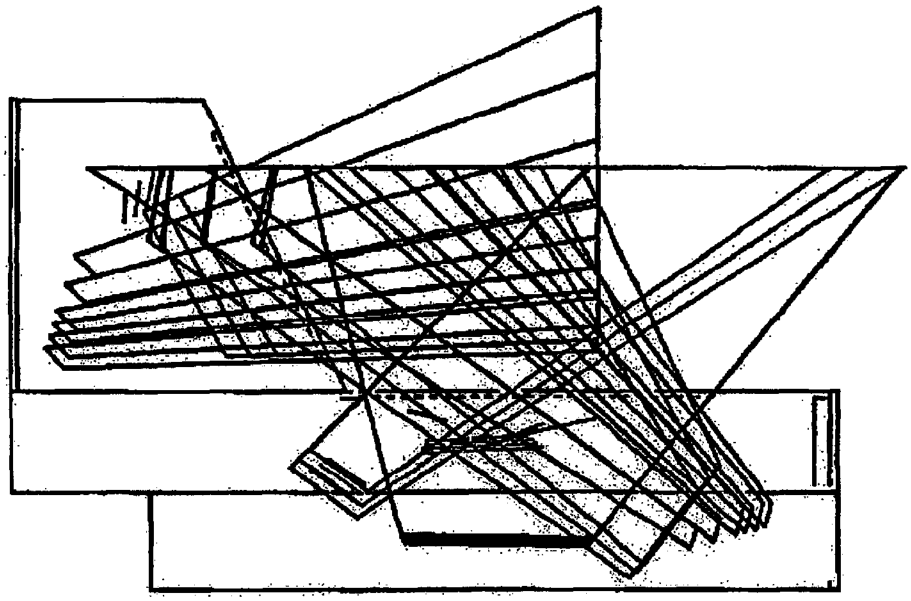
FIG. 5A5

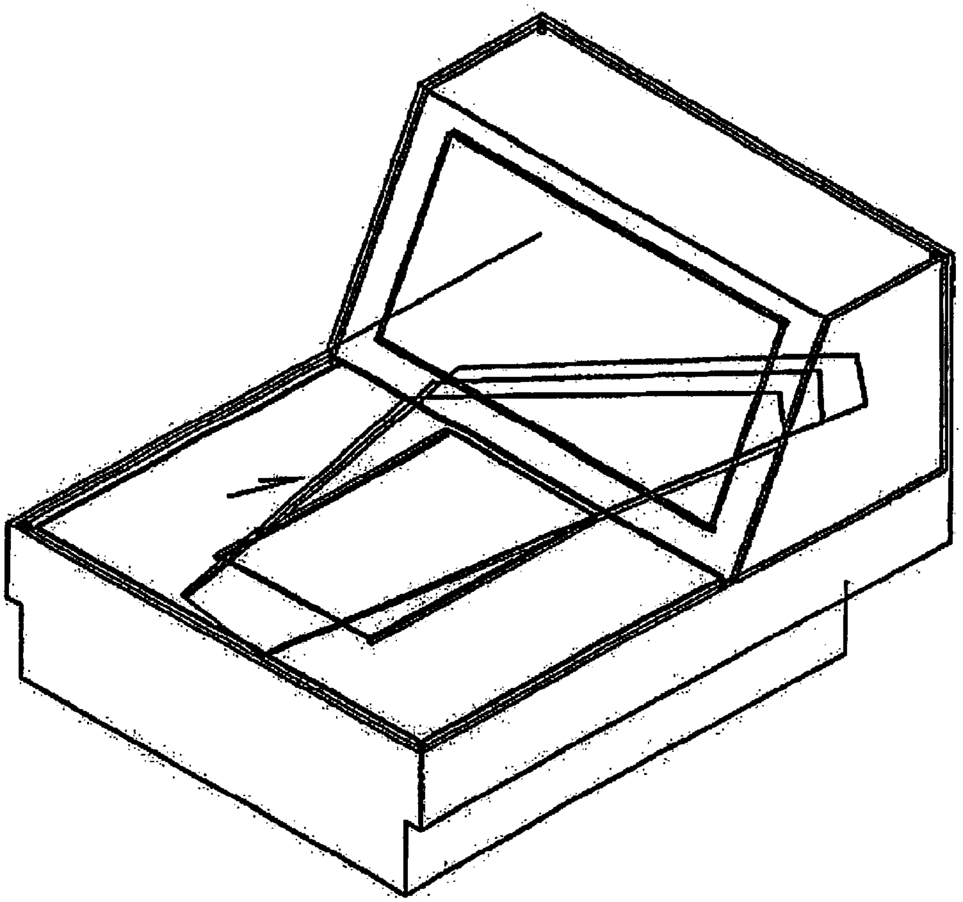
FIG. 5B1

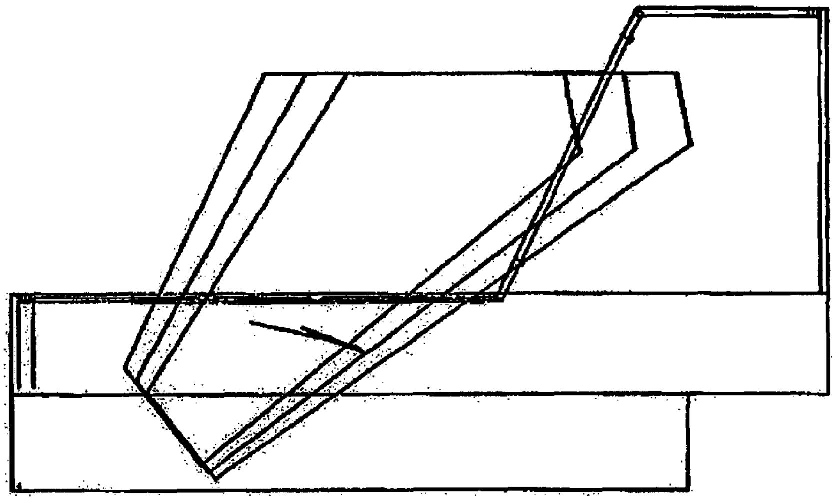
FIG. 5B2

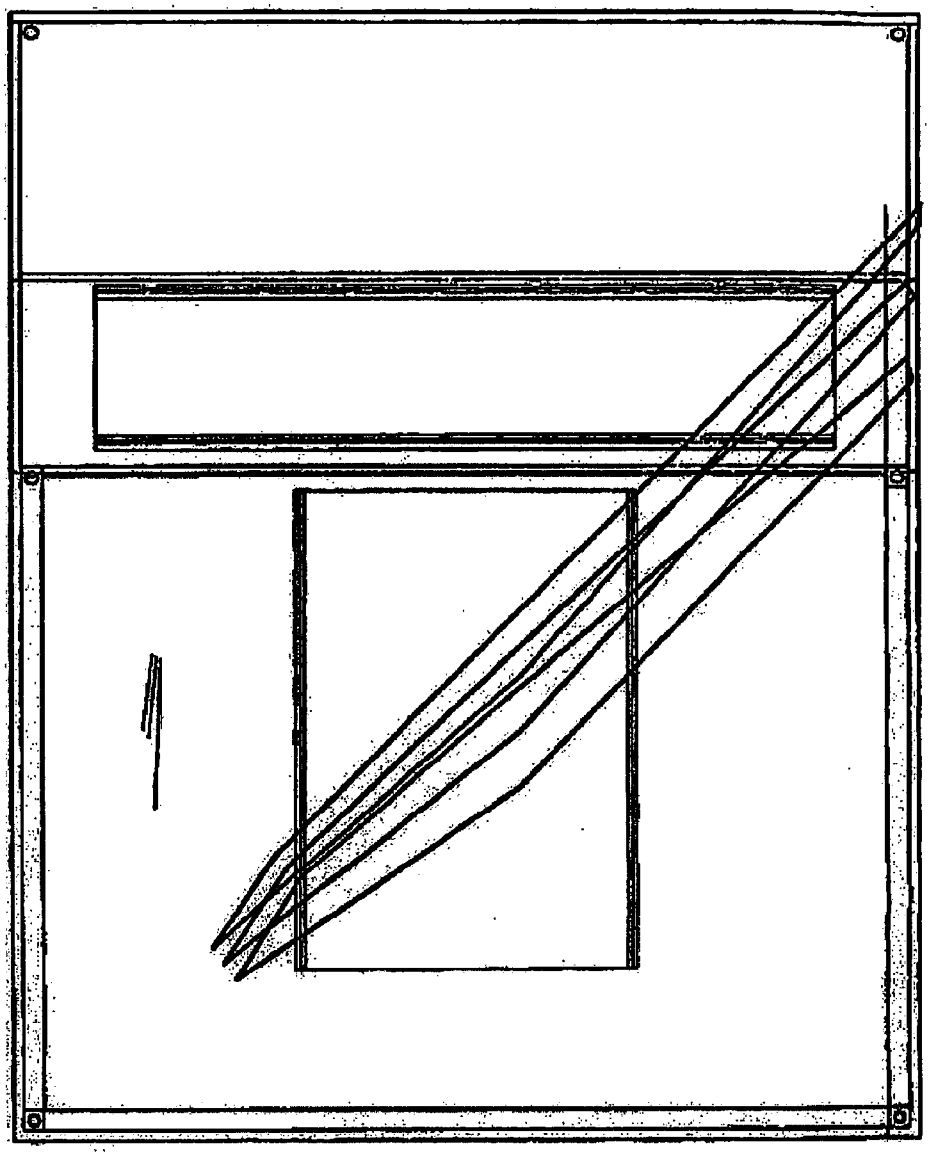
FIG. 5B3

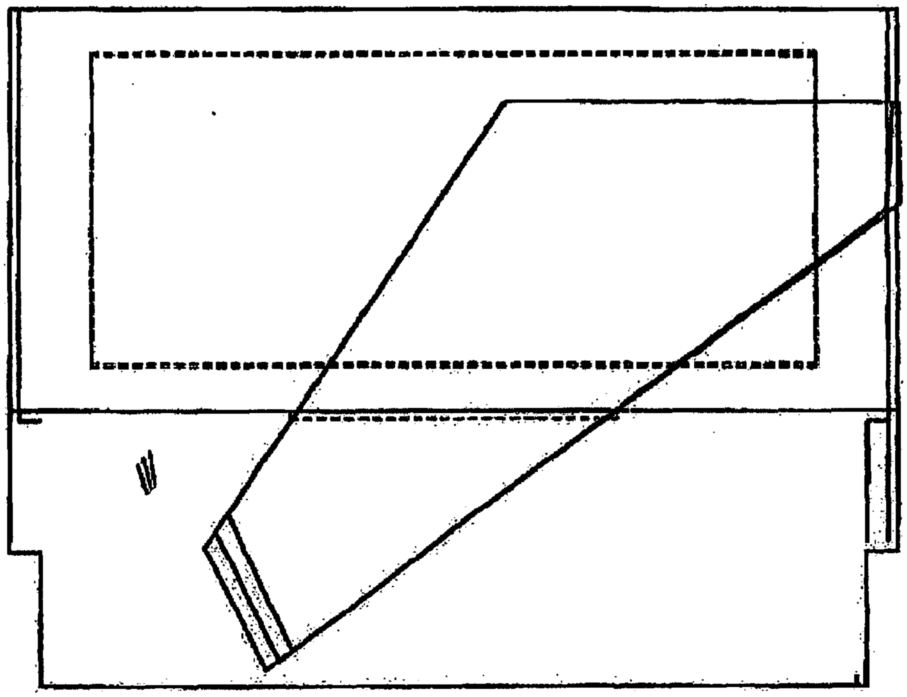
FIG. 5B4

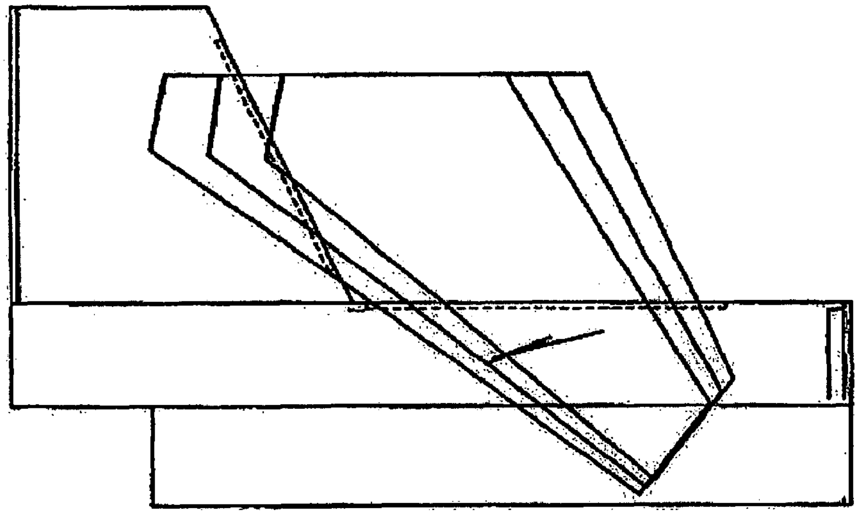
FIG. 5B5

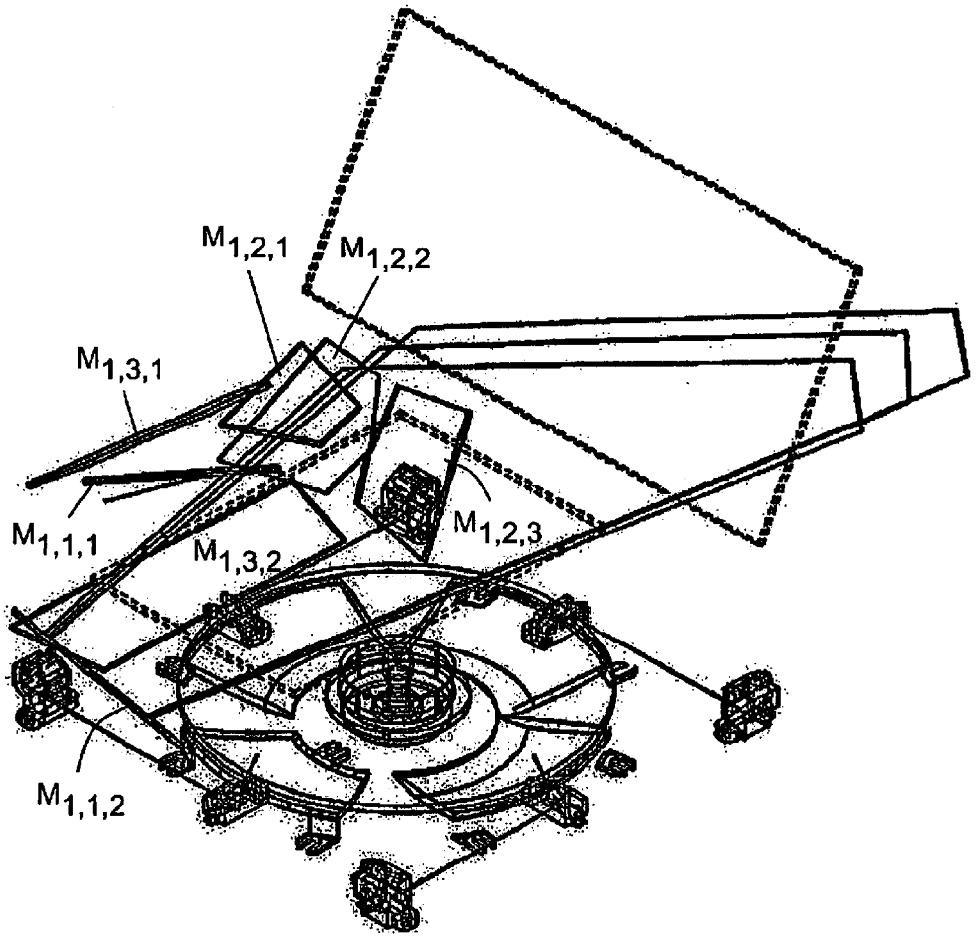
FIG. 5C1

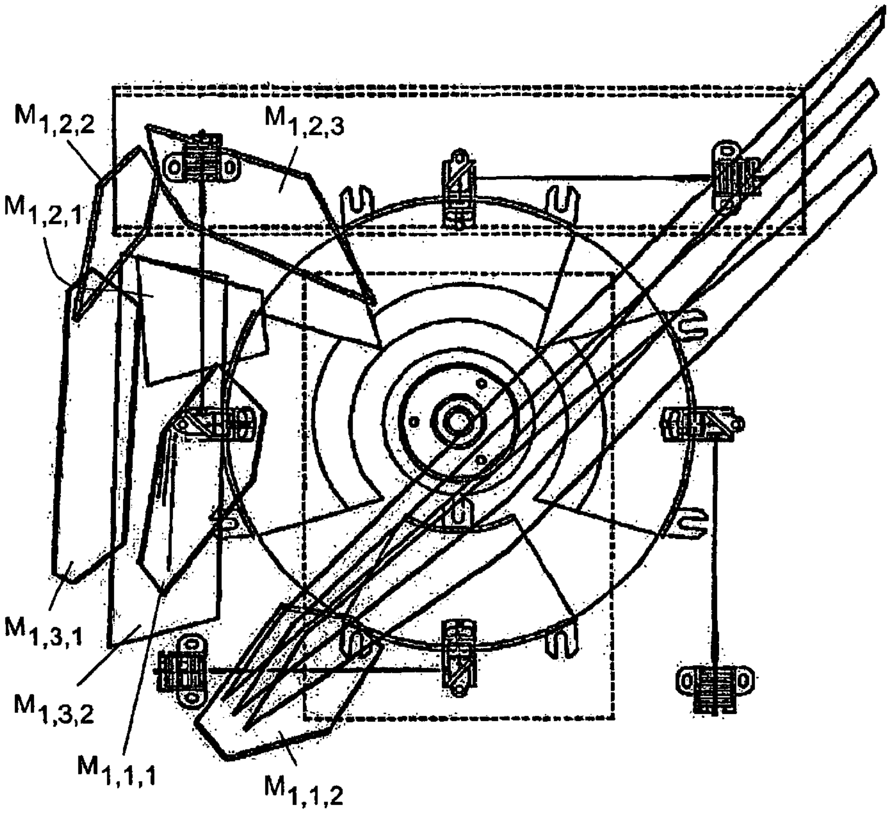
FIG. 5C2

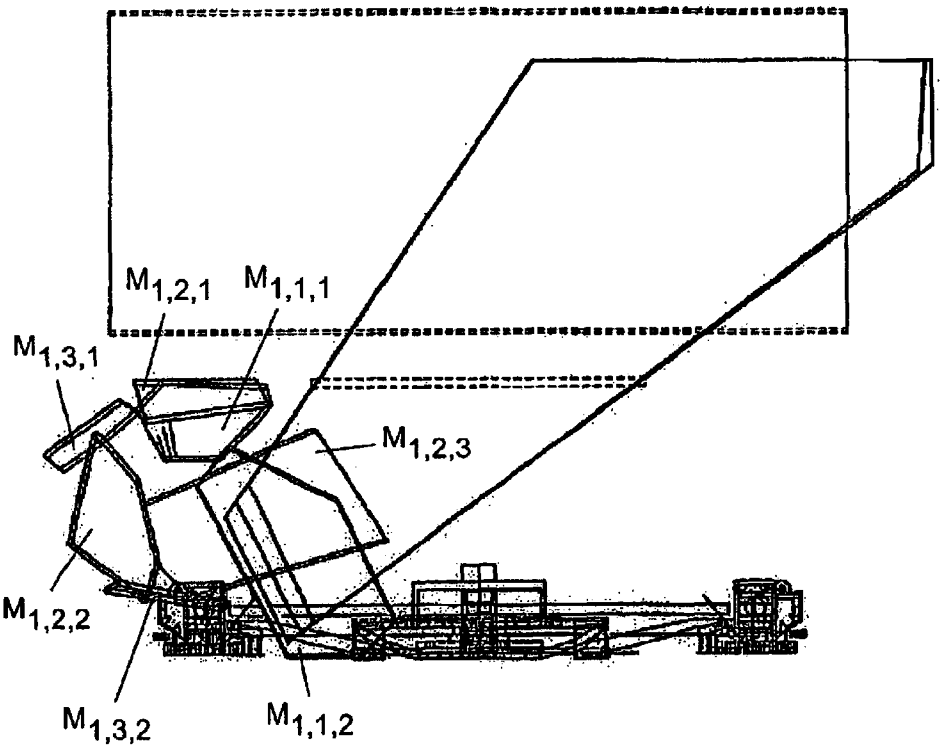
FIG. 5C3

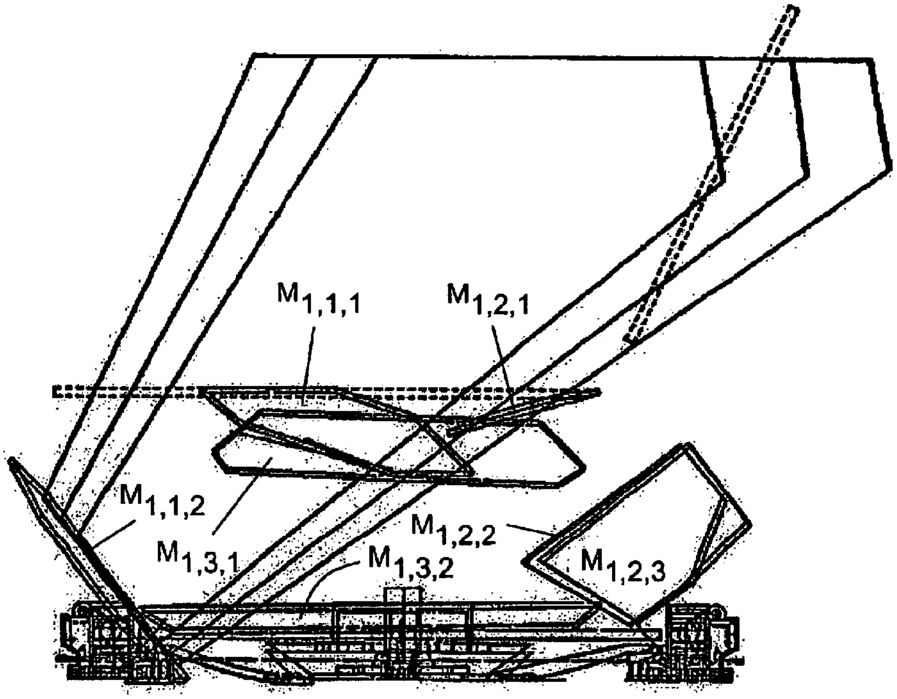
FIG. 5C4

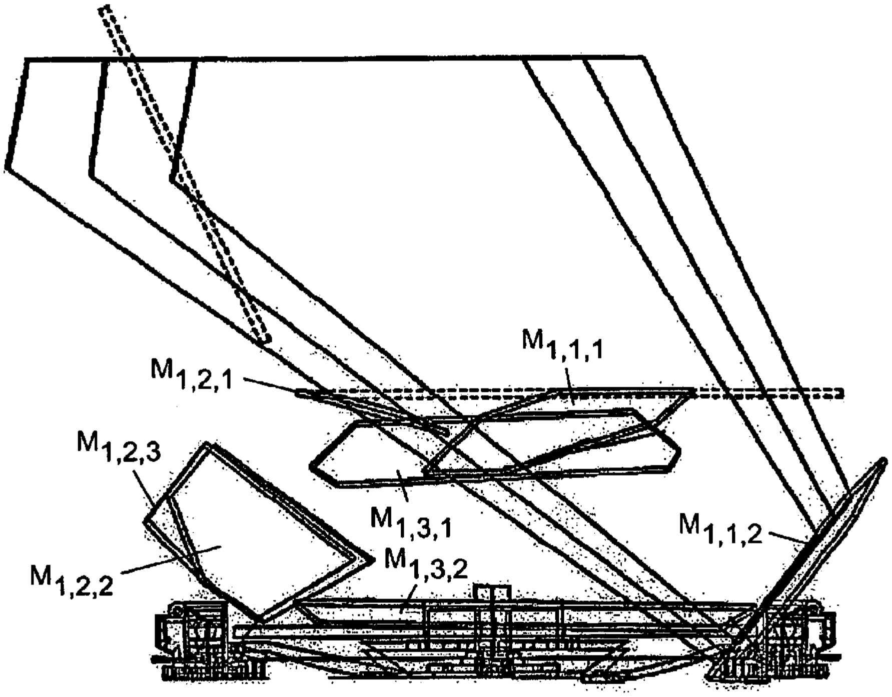
FIG. 5C5

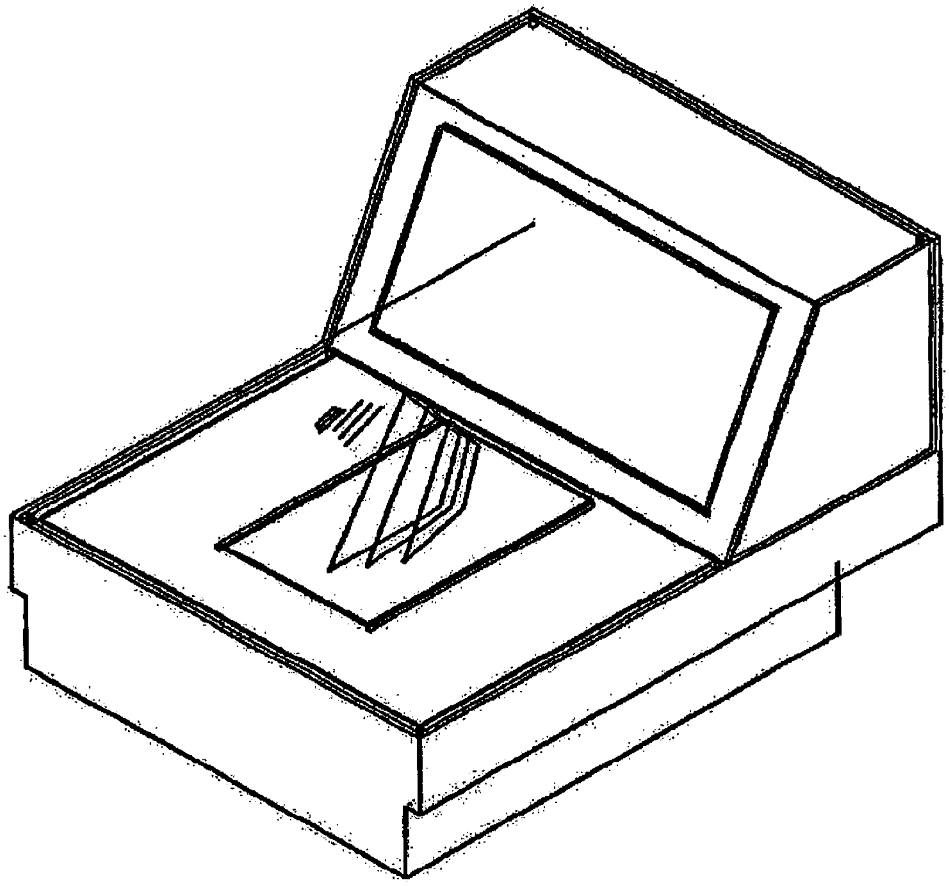
FIG. 5D1

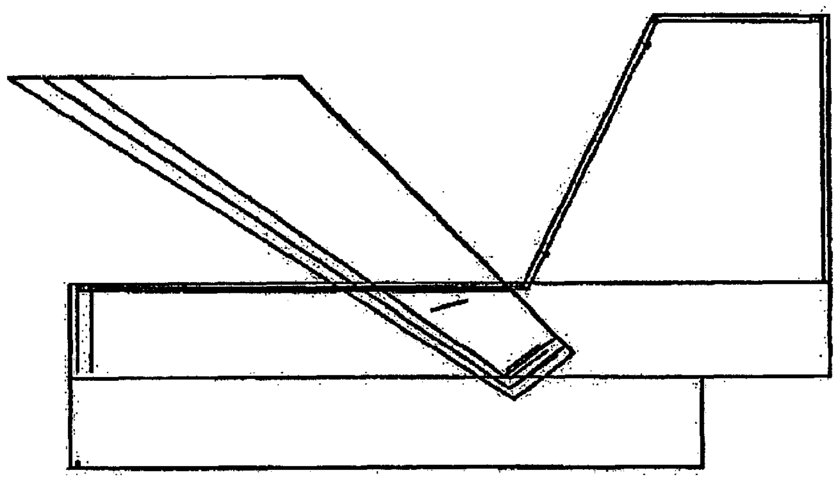
FIG. 5D2

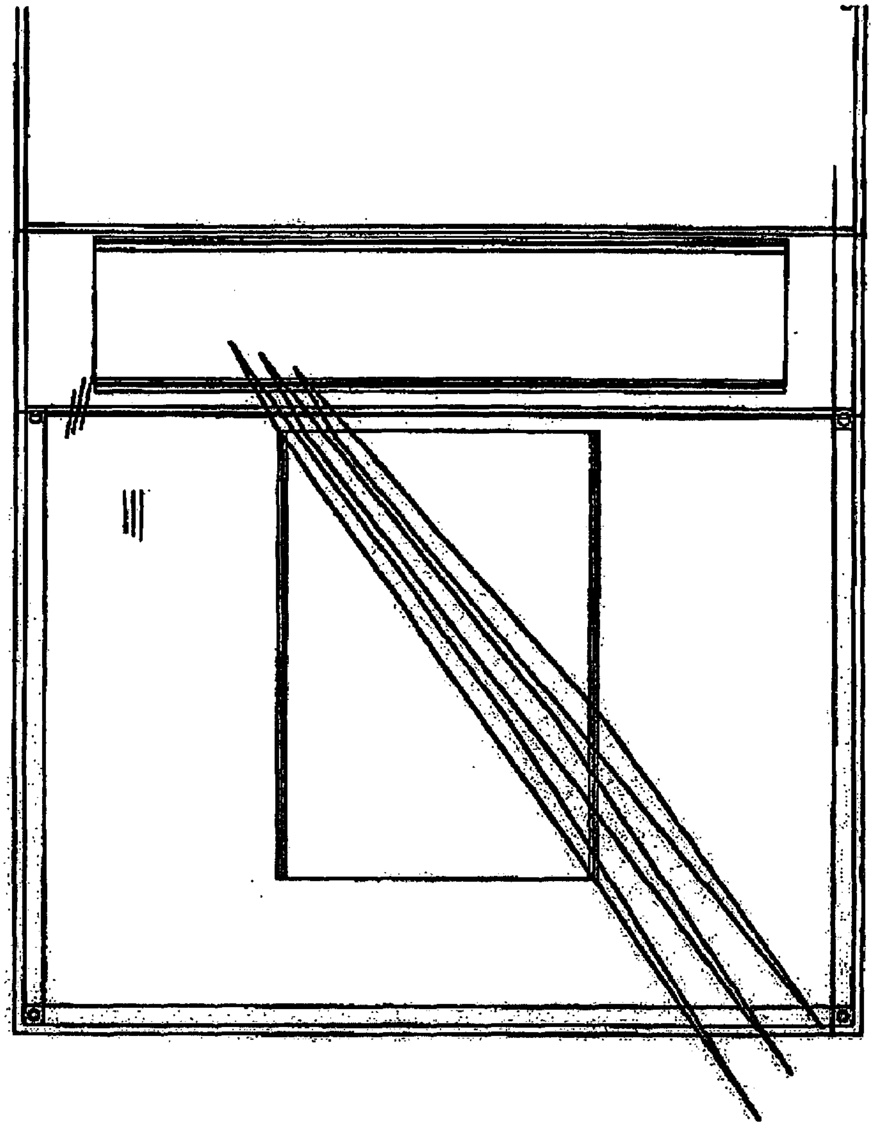
FIG. 5D3

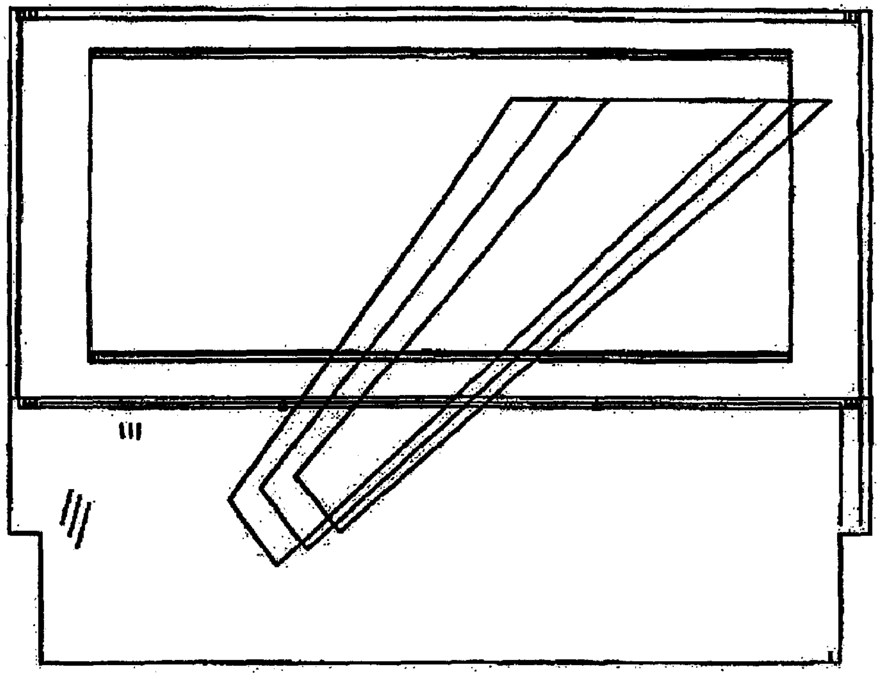
FIG. 5D4

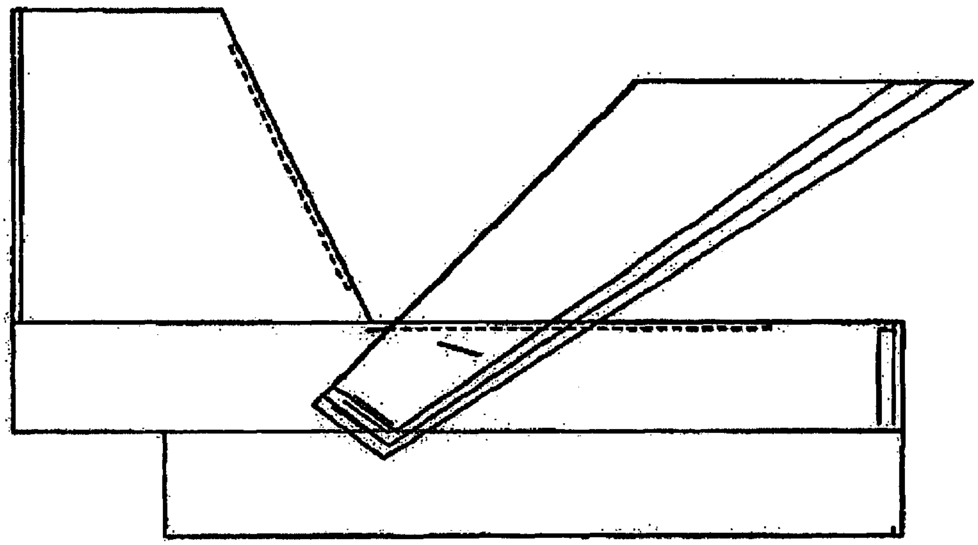
FIG. 5D5

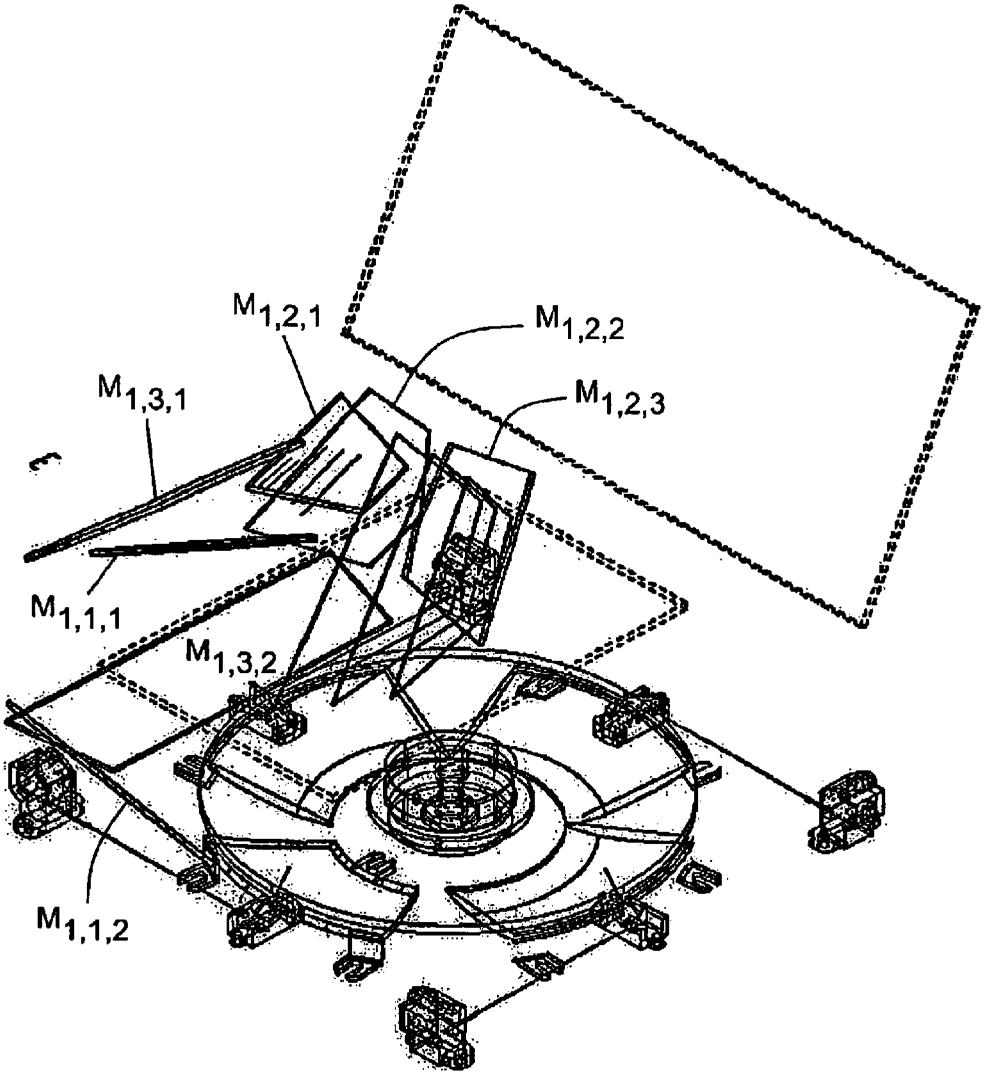
FIG. 5E1

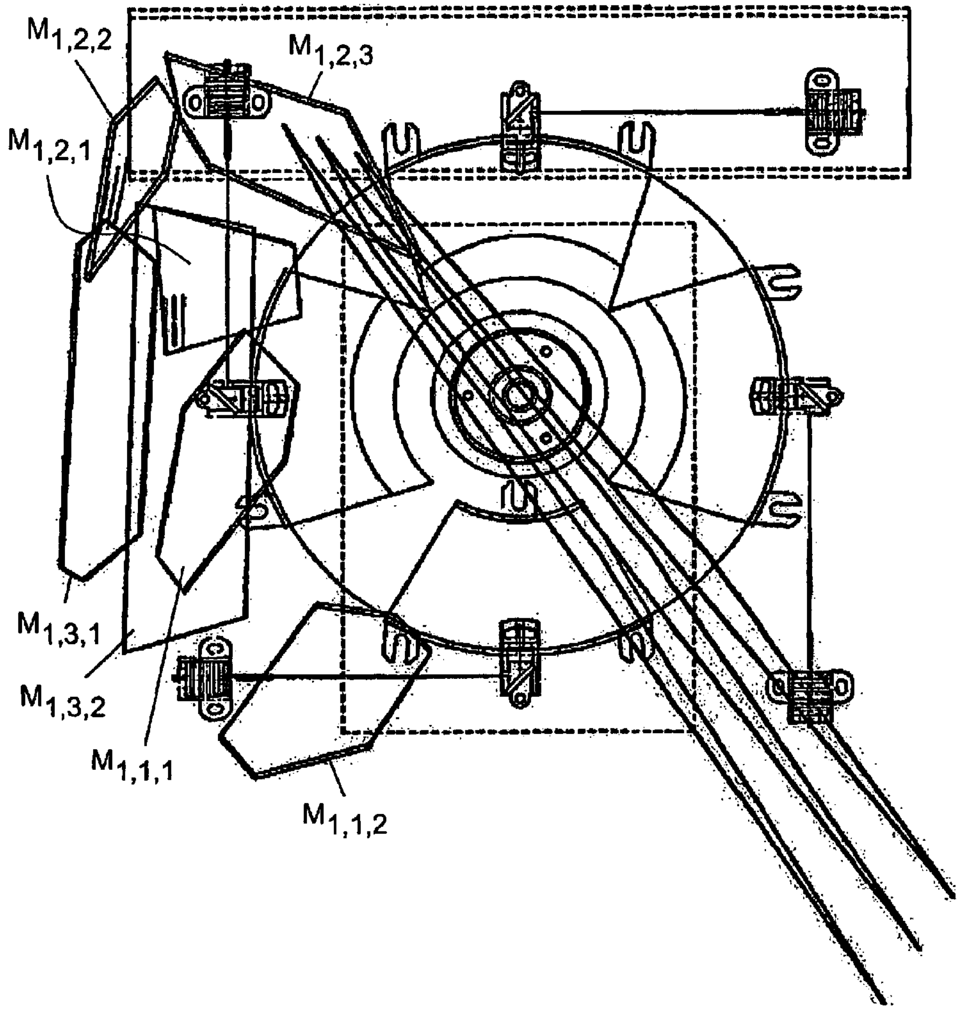
FIG. 5E2

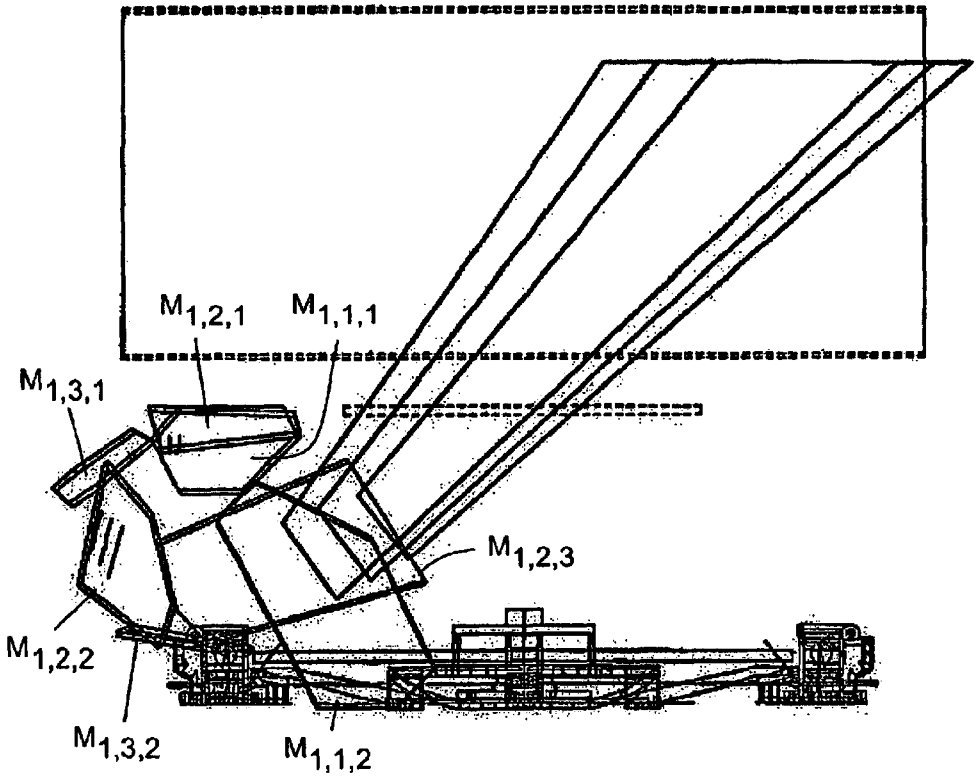
FIG. 5E3

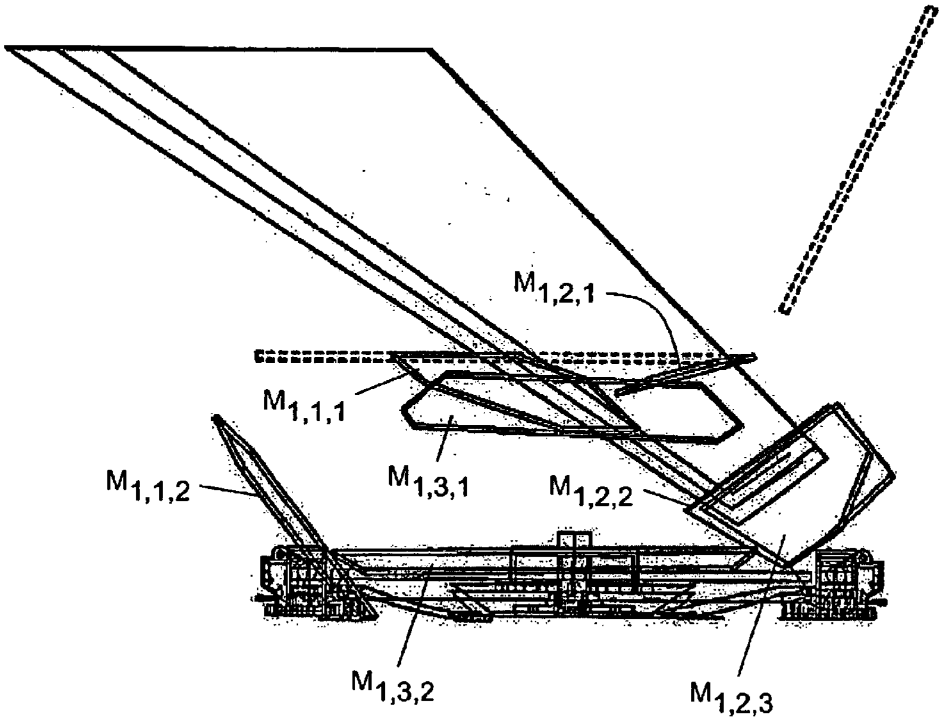
FIG. 5E4

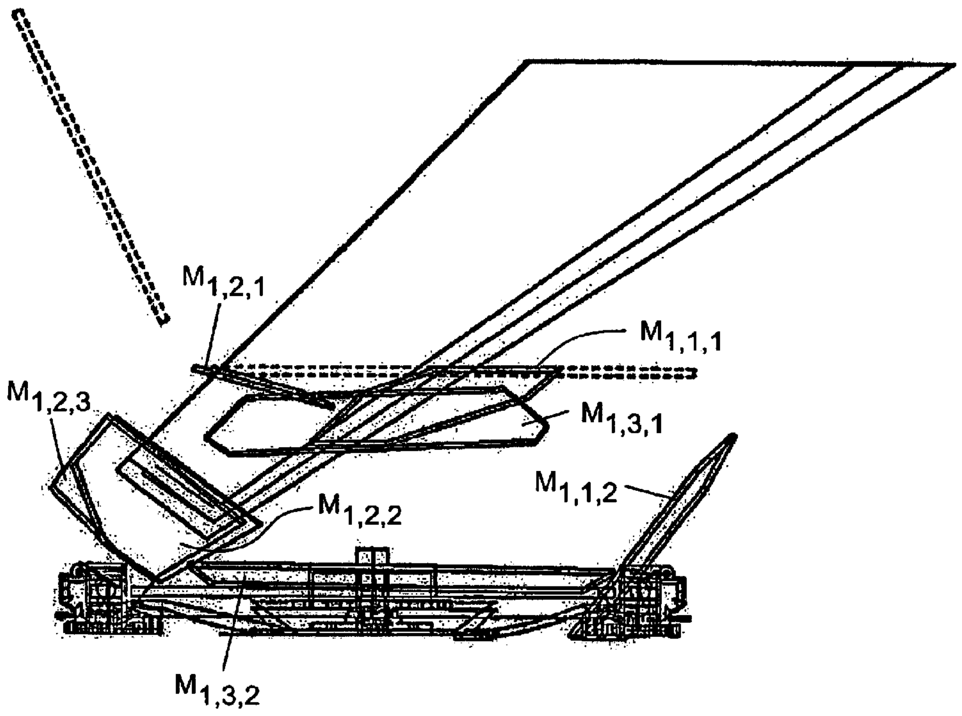
FIG. 5E5

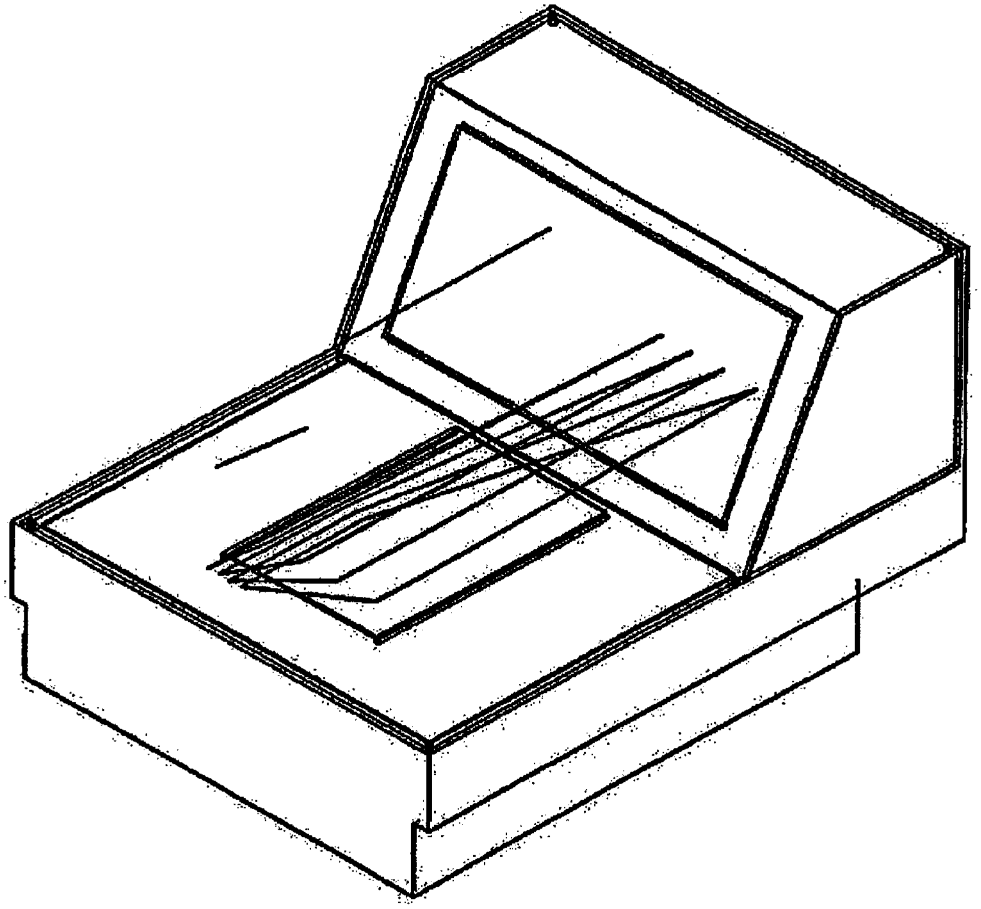
FIG. 5F1

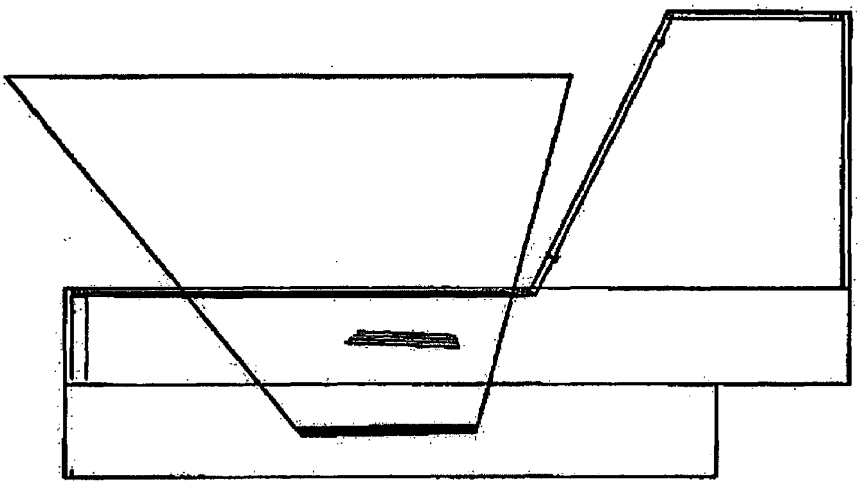
FIG. 5F2

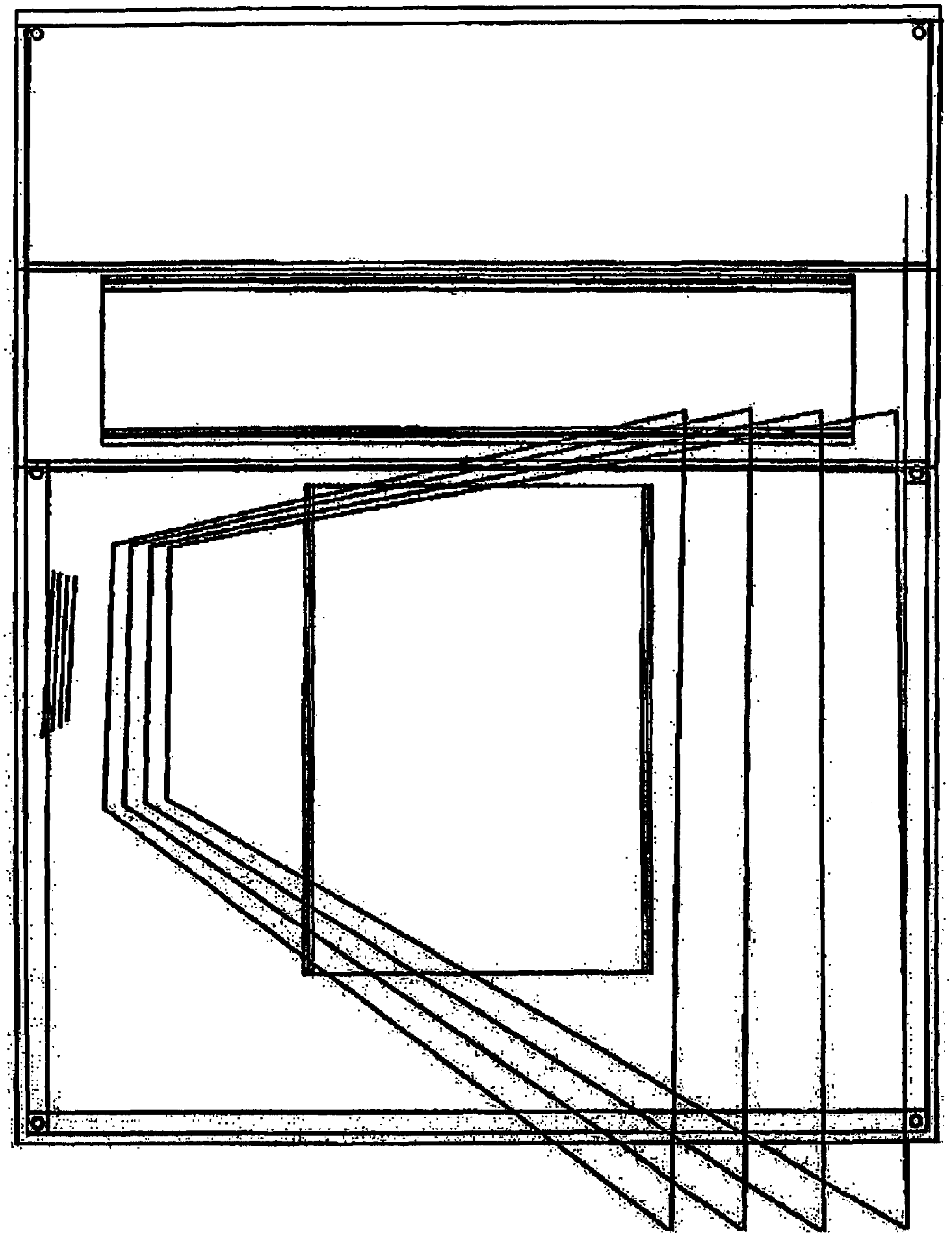
FIG. 5F3

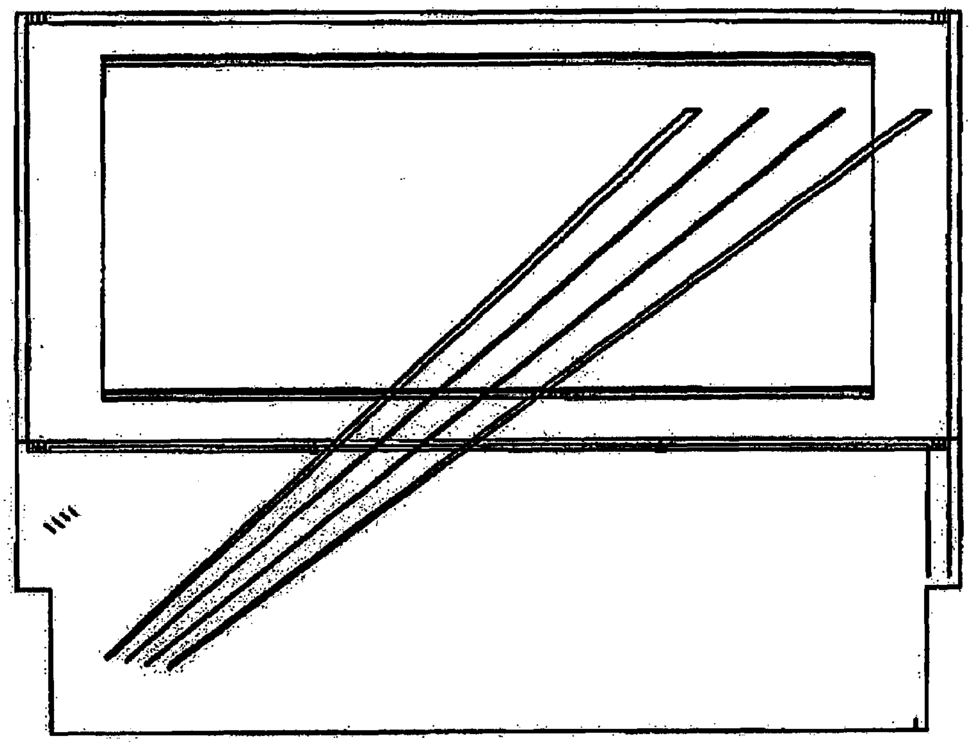
FIG. 5F4

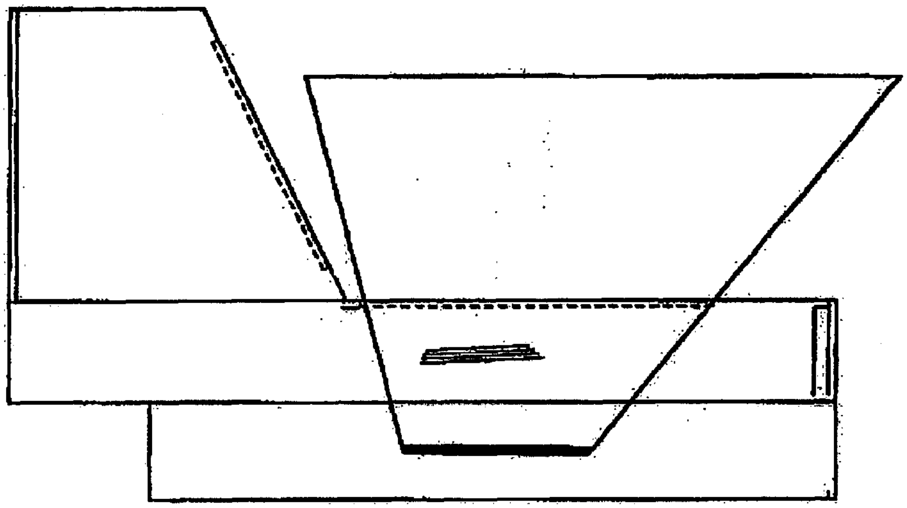
FIG. 5F5

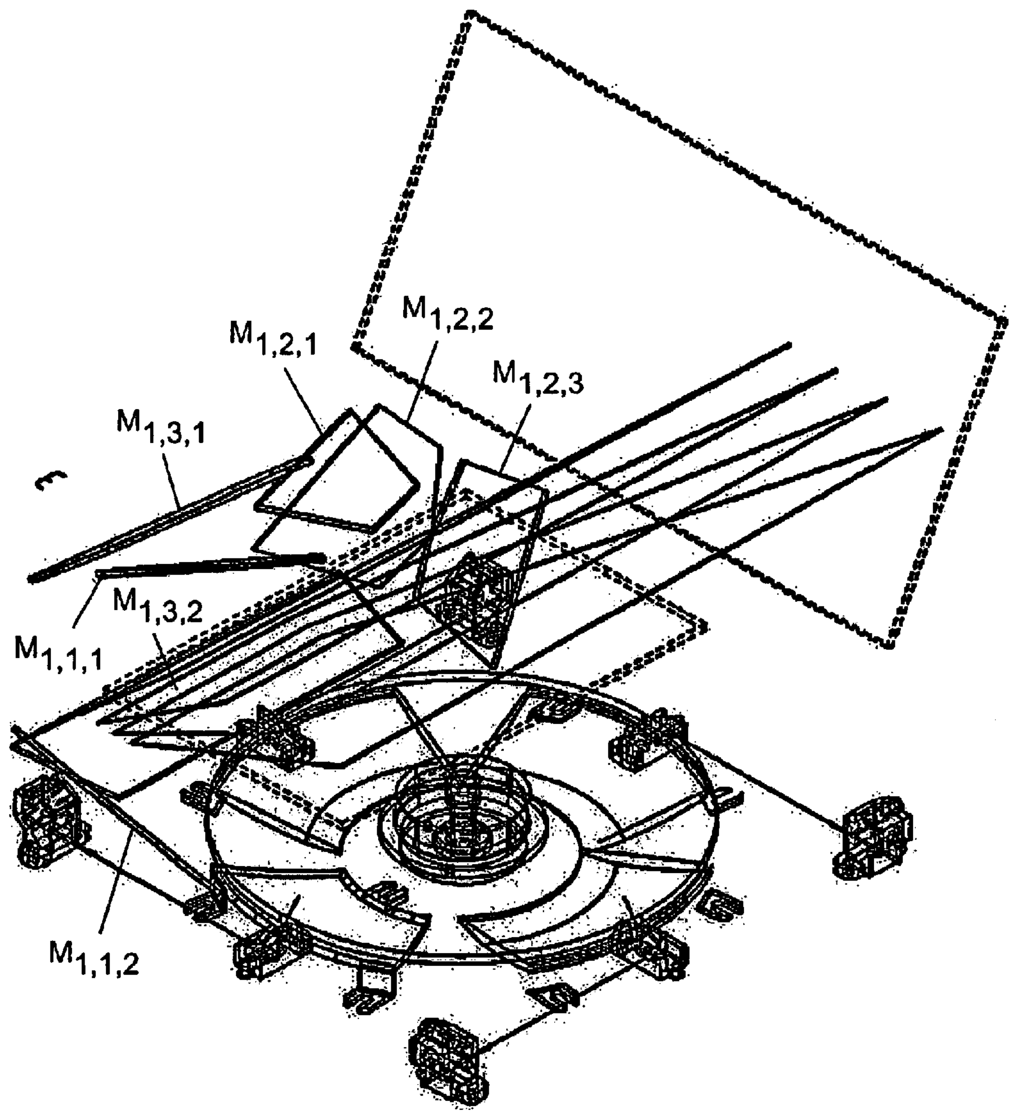
FIG. 5G1

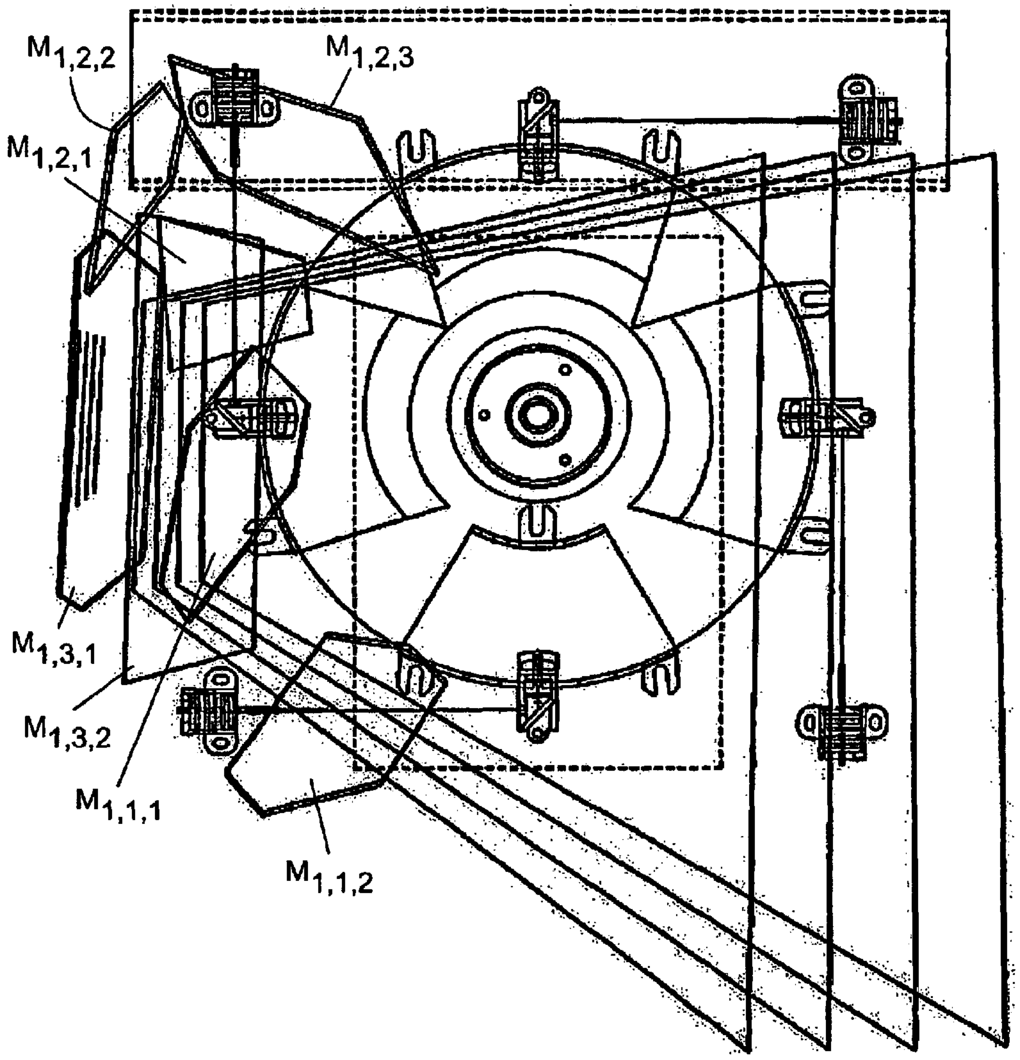
FIG. 5G2

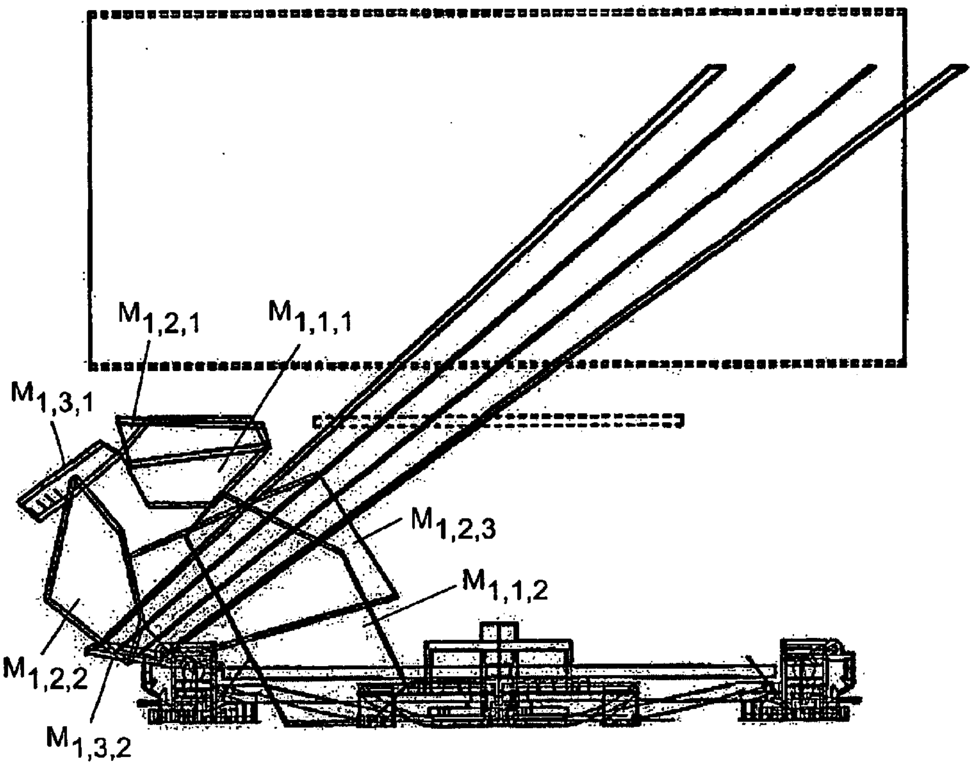
FIG. 5G3

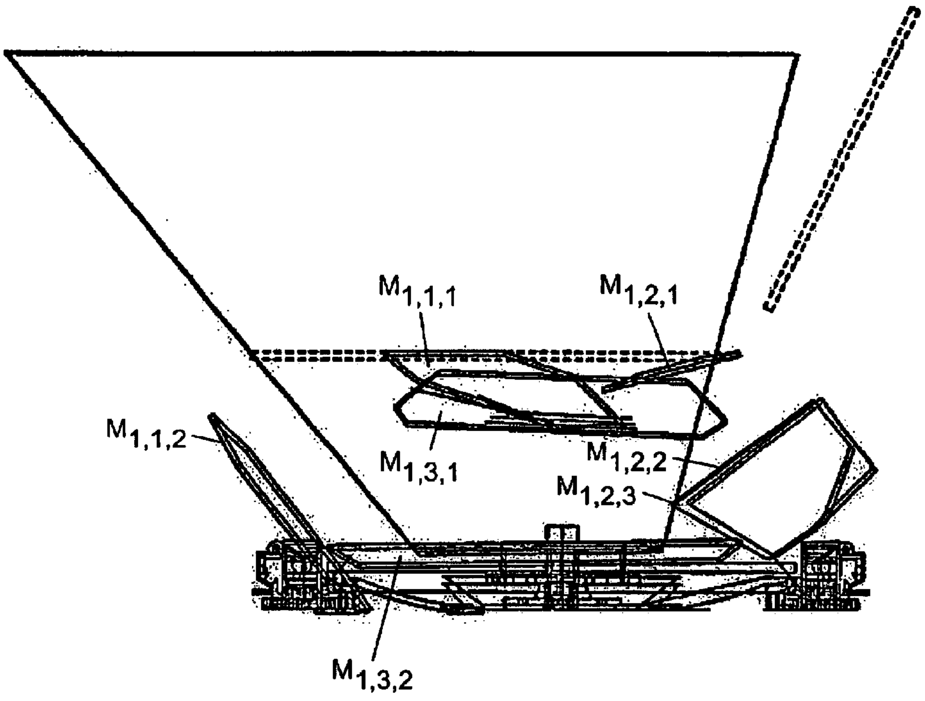
FIG. 5G4

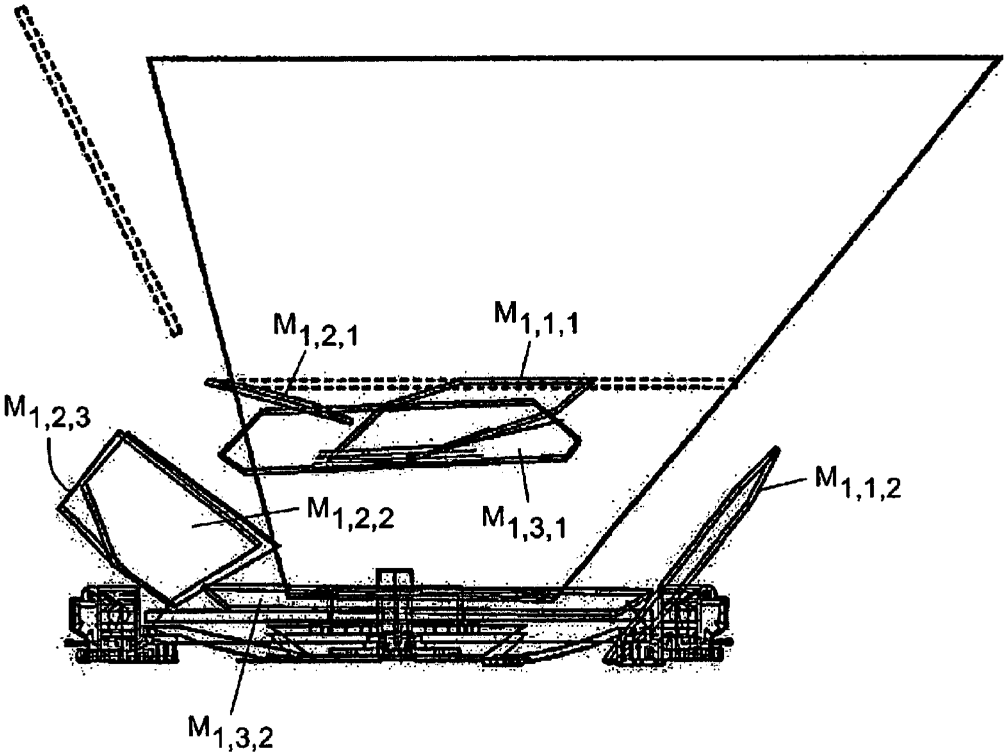
FIG. 5G5

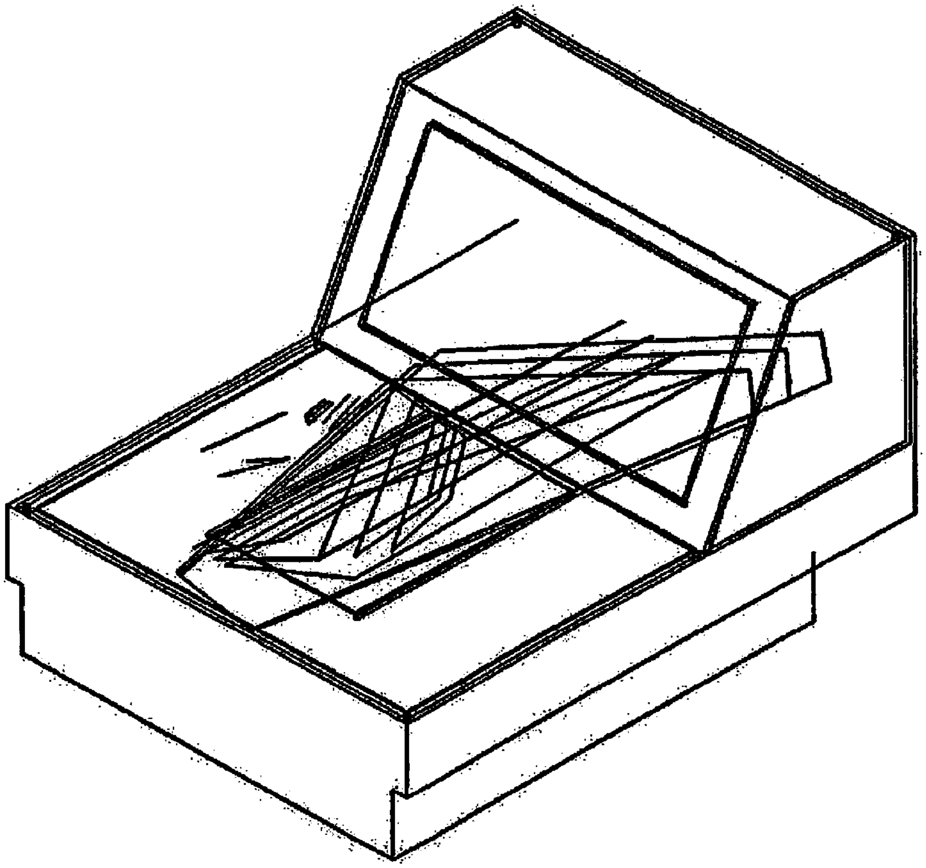
FIG. 5H1

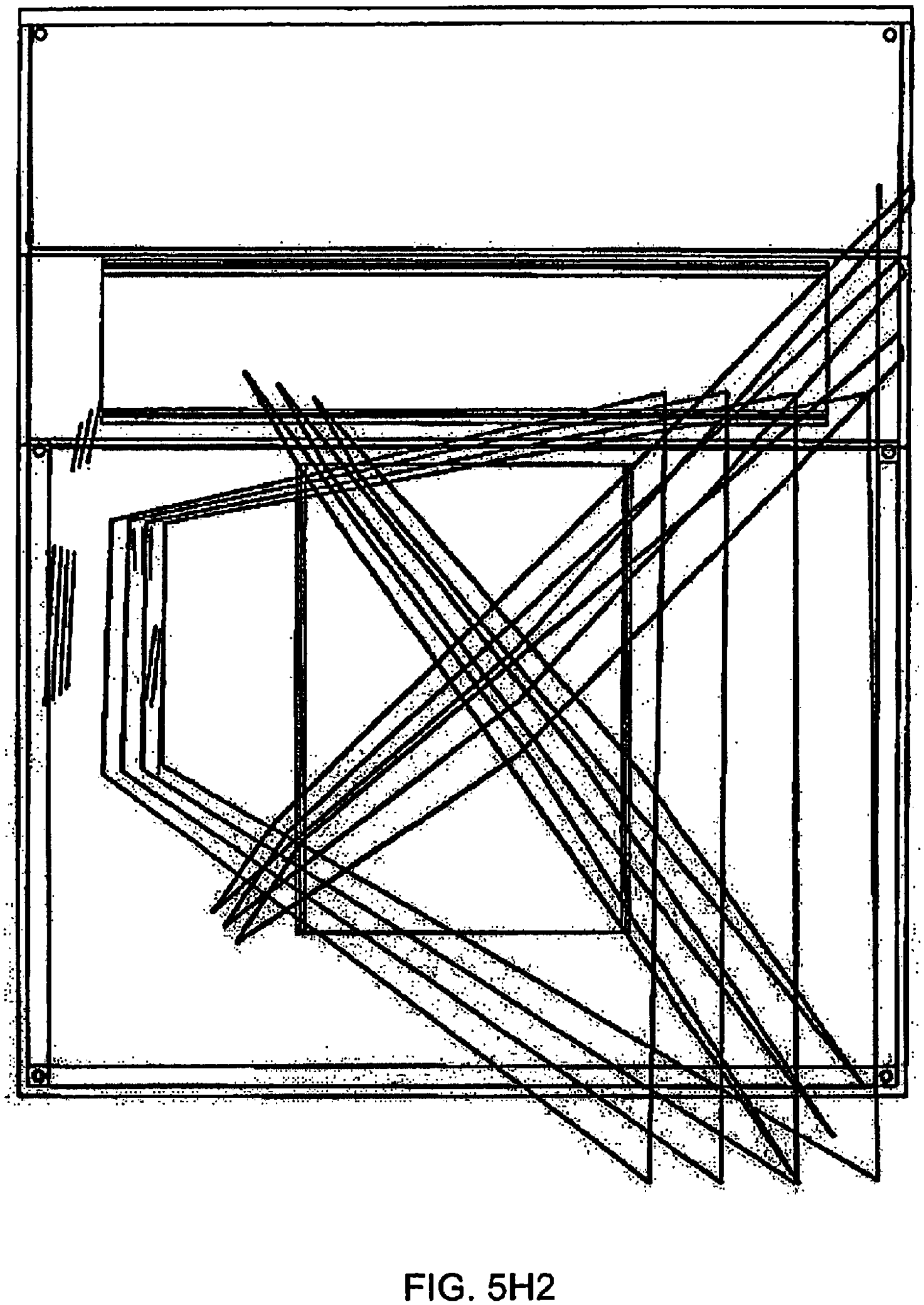
FIG. 5H2

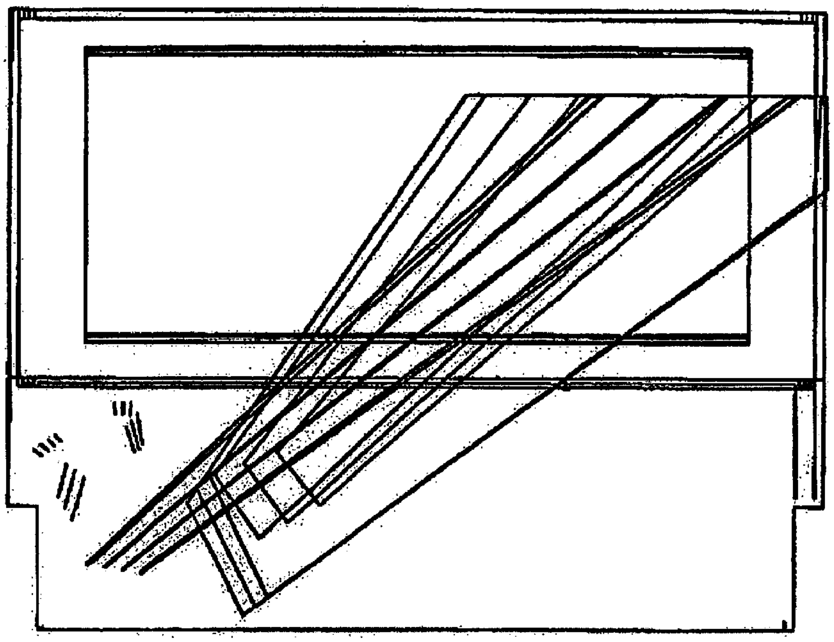
FIG. 5H3

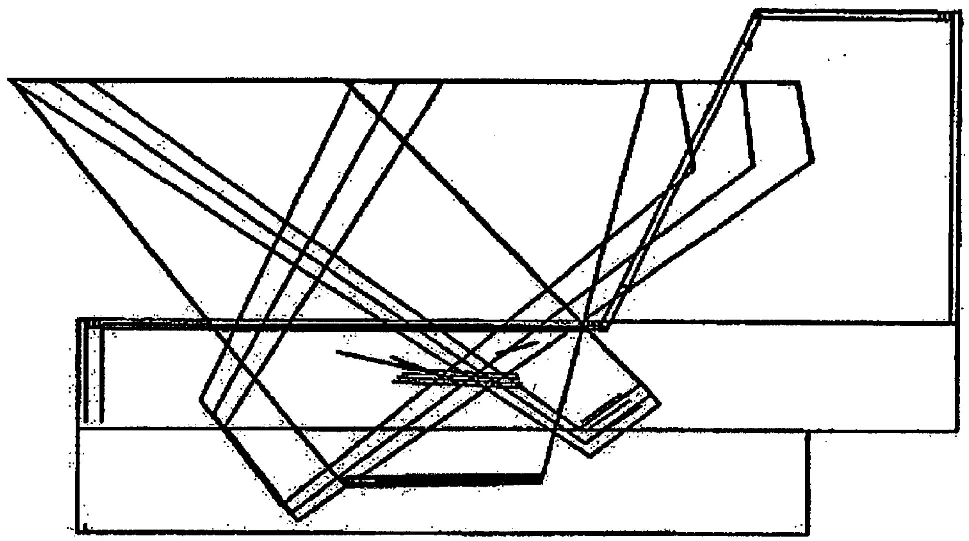
FIG. 5H4

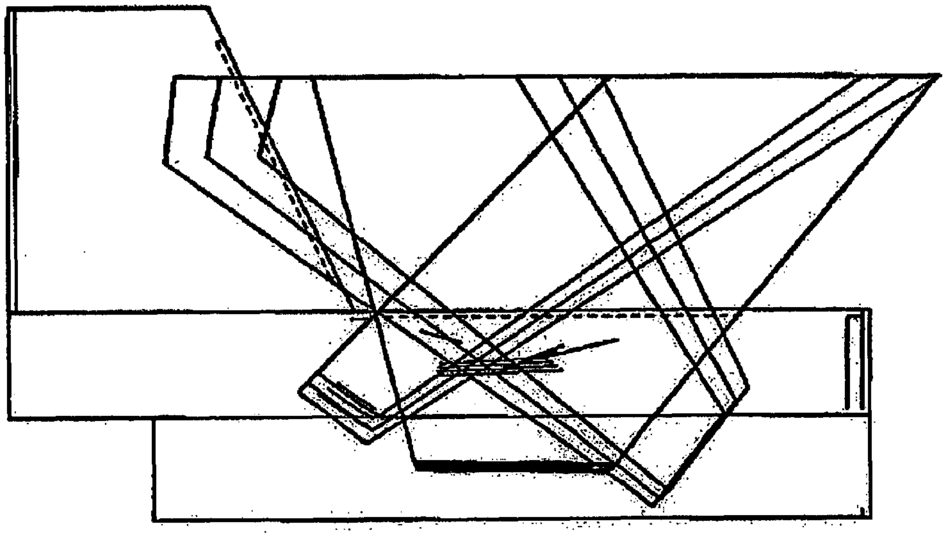
FIG. 5H5

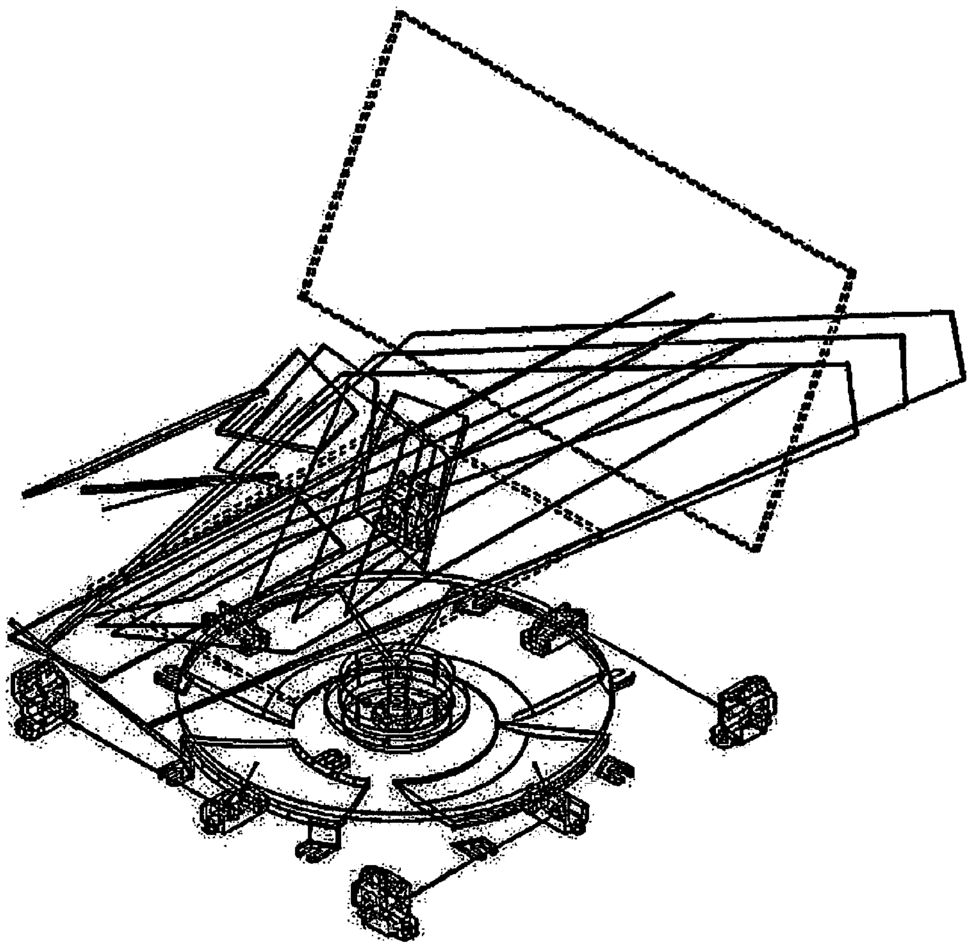
FIG. 5H6

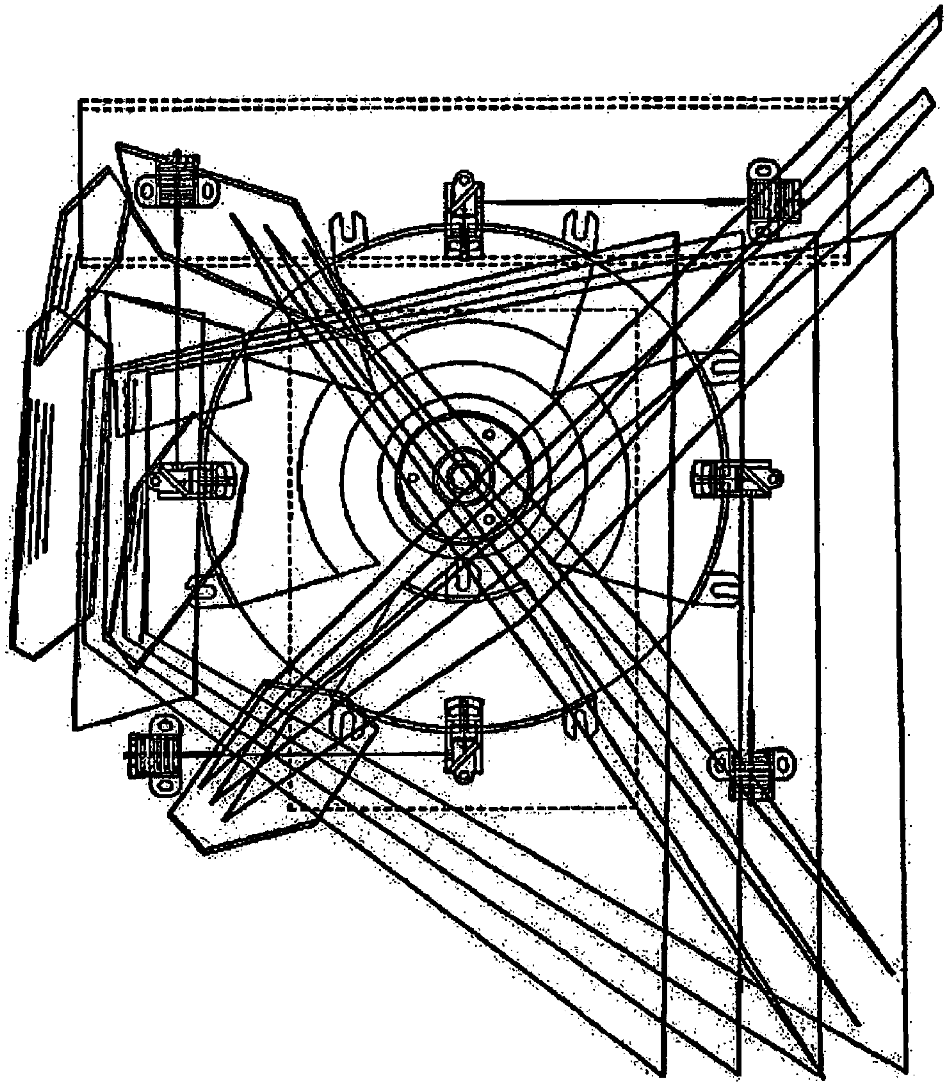
FIG. 5H7

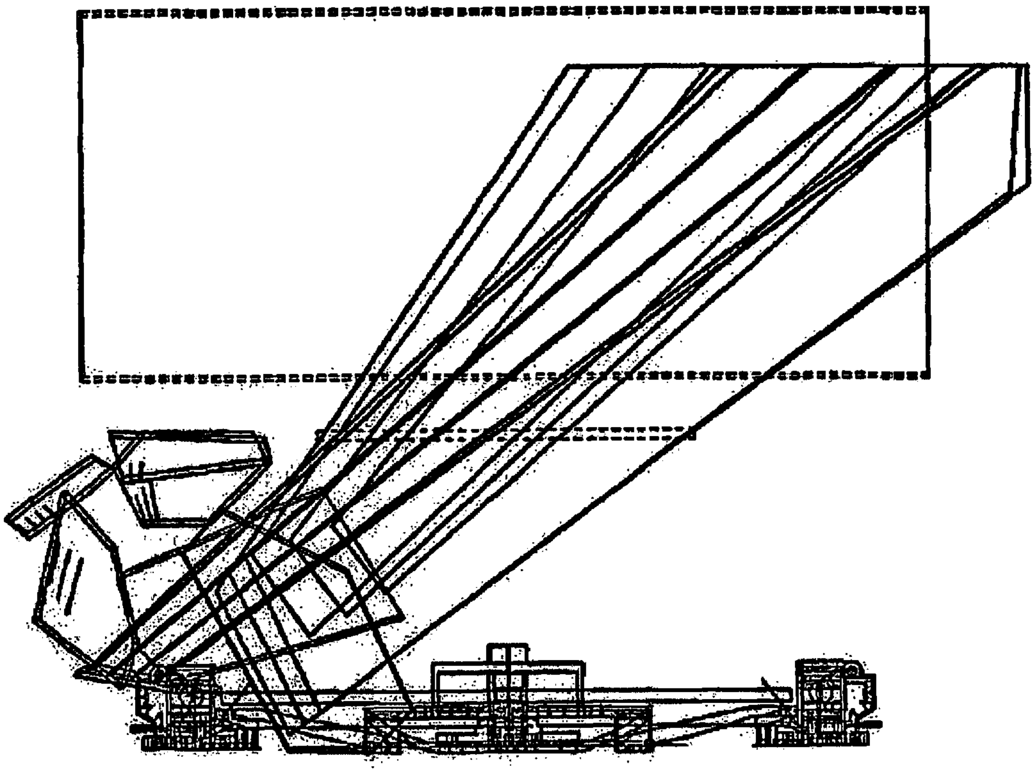
FIG. 5H8

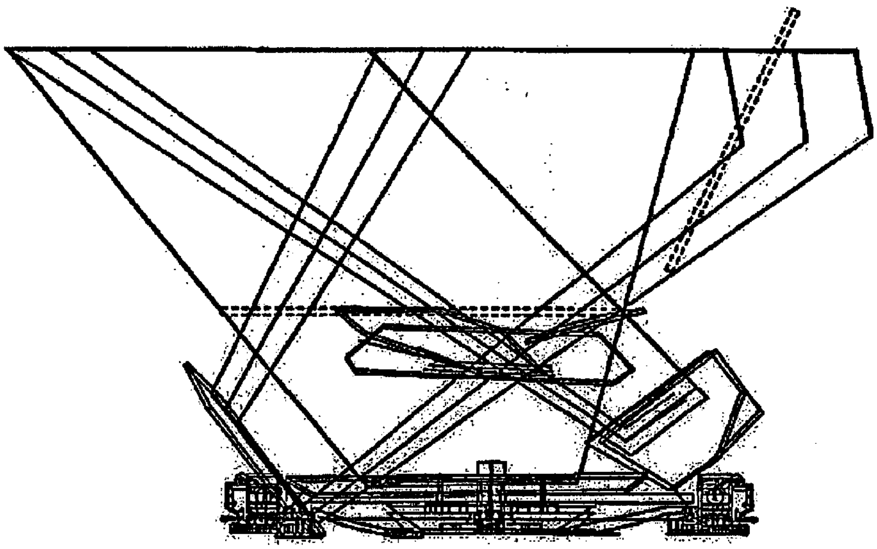
FIG. 5H9

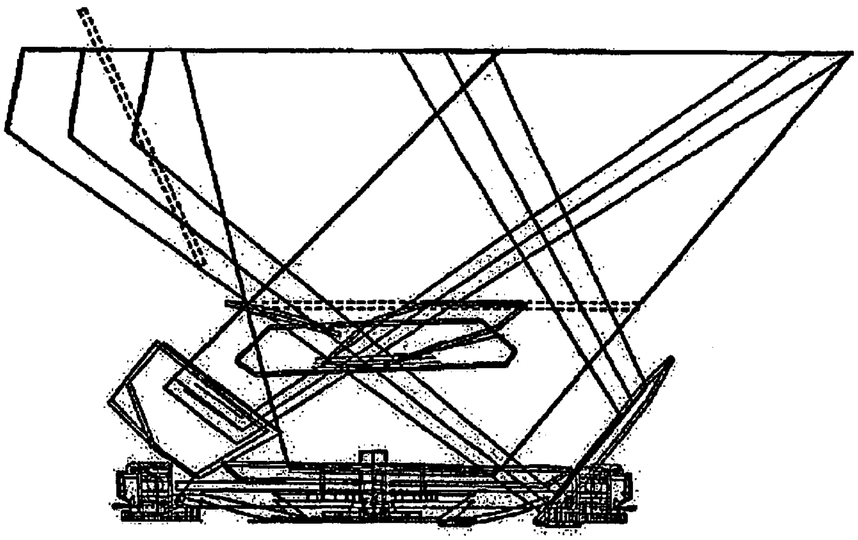
FIG. 5H10

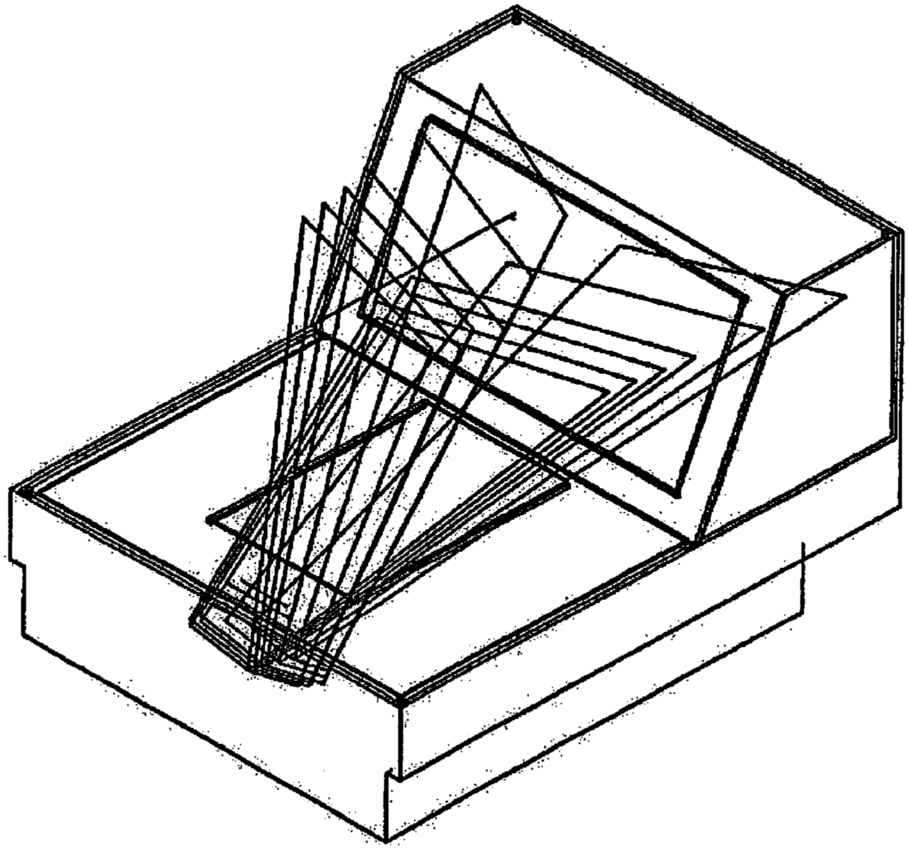
FIG. 5I1

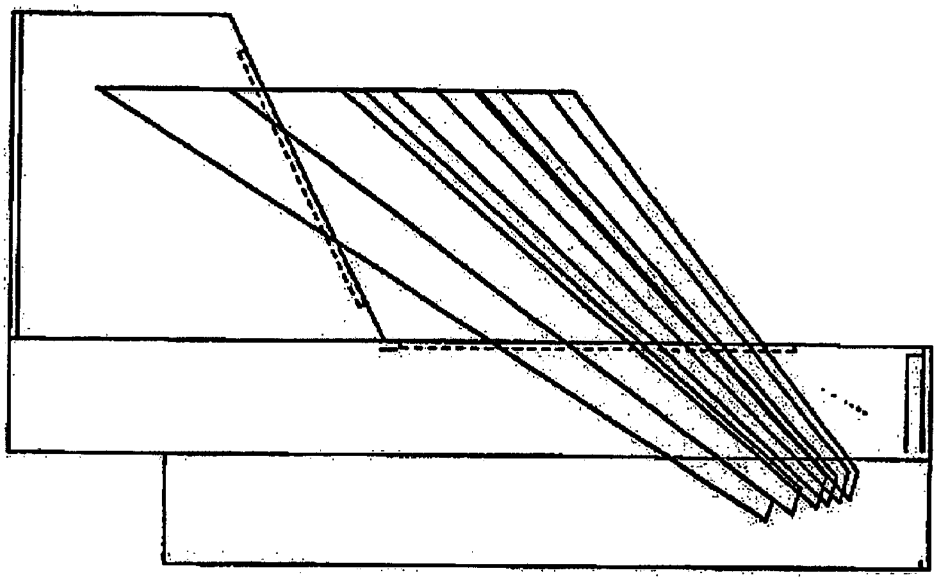
FIG. 5I5

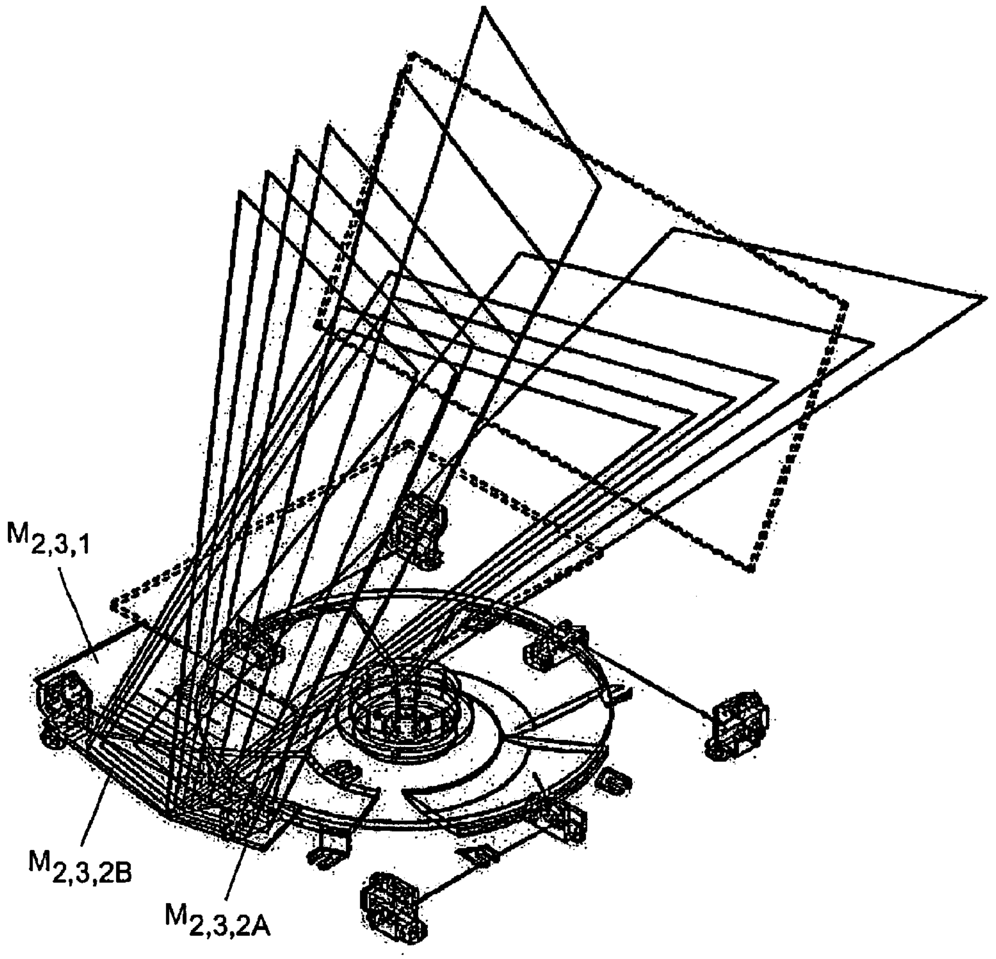
FIG. 5J1

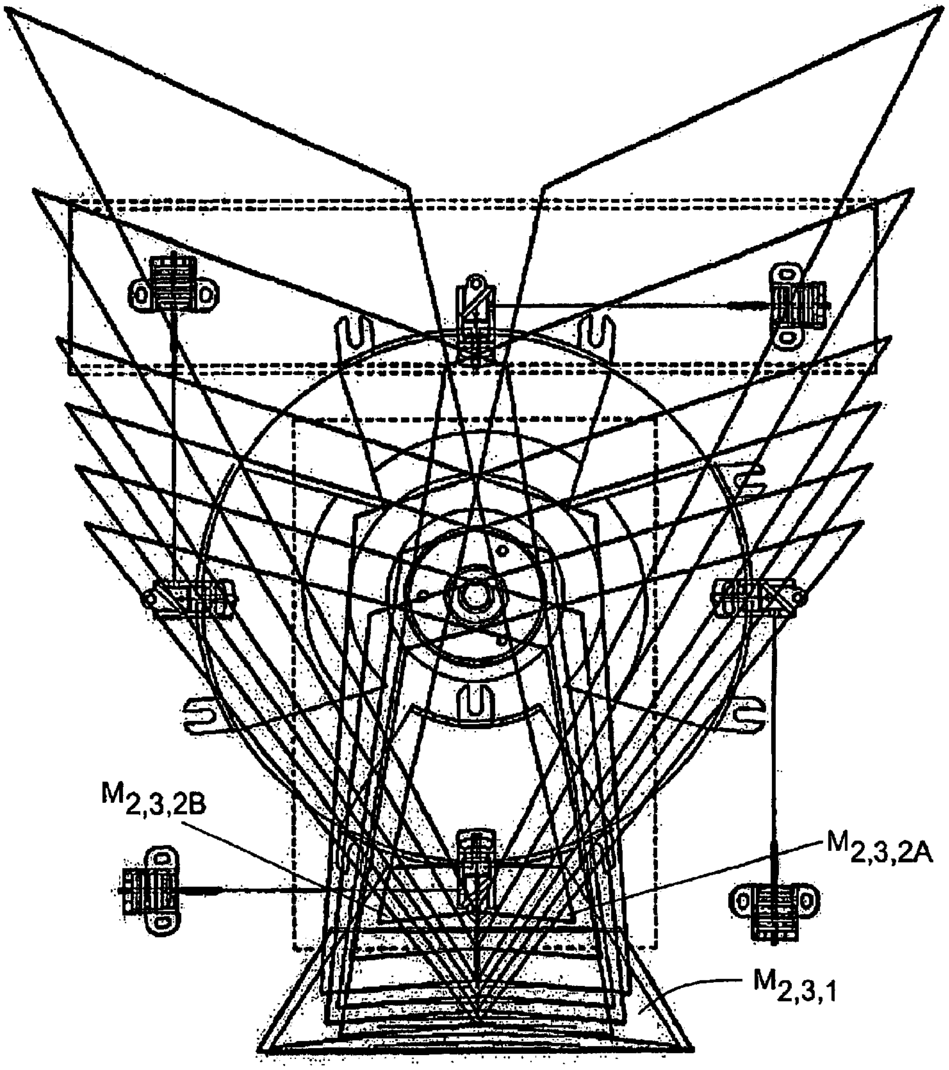
FIG. 5J2

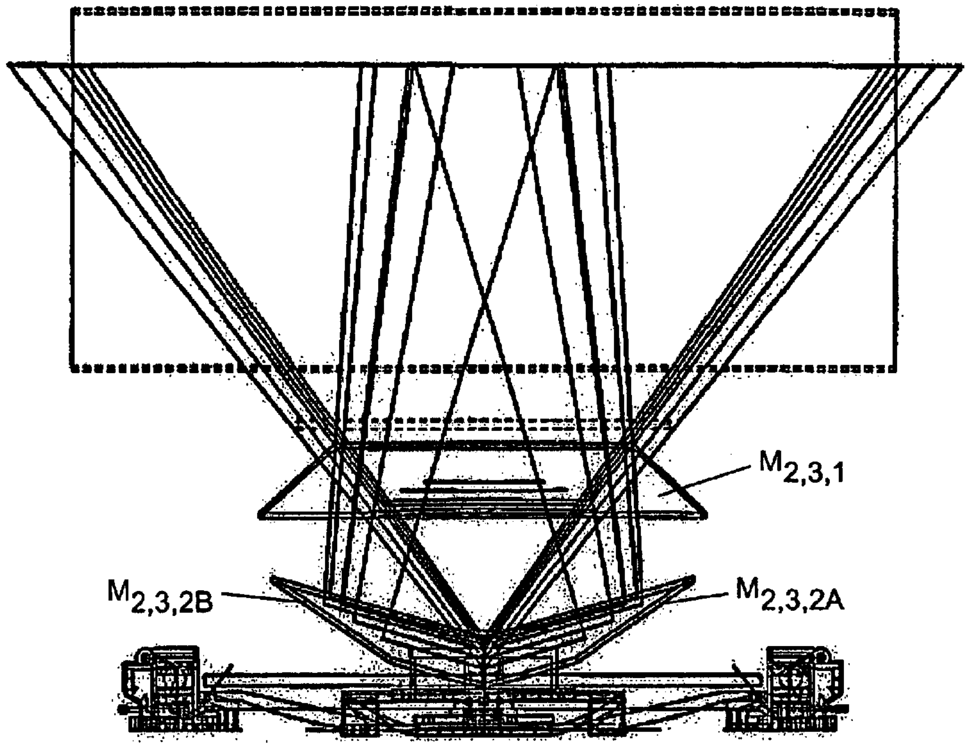
FIG. 5J3

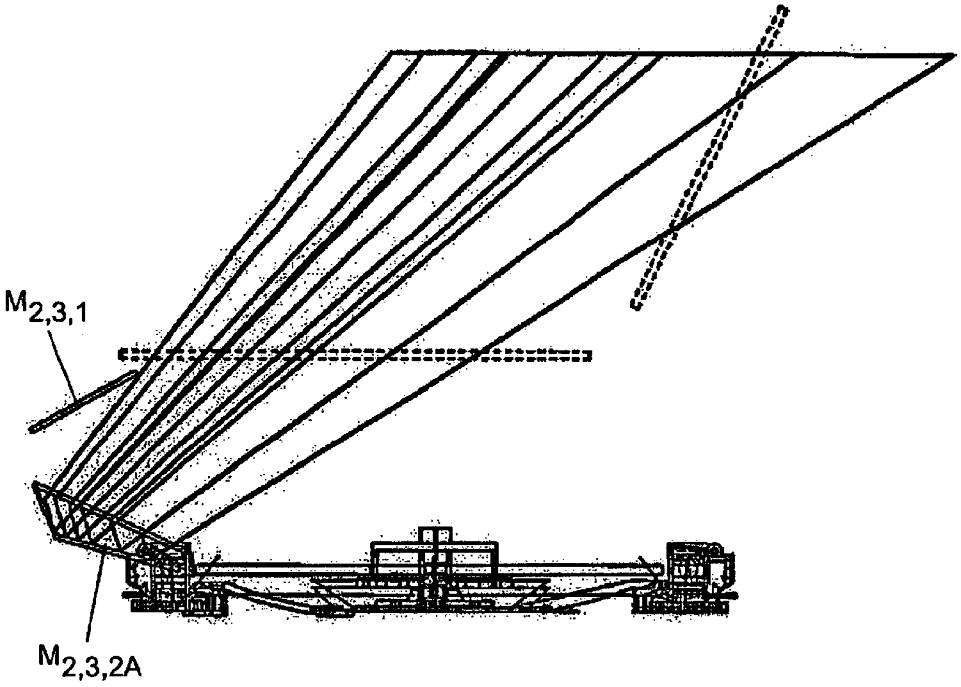
FIG. 5J4

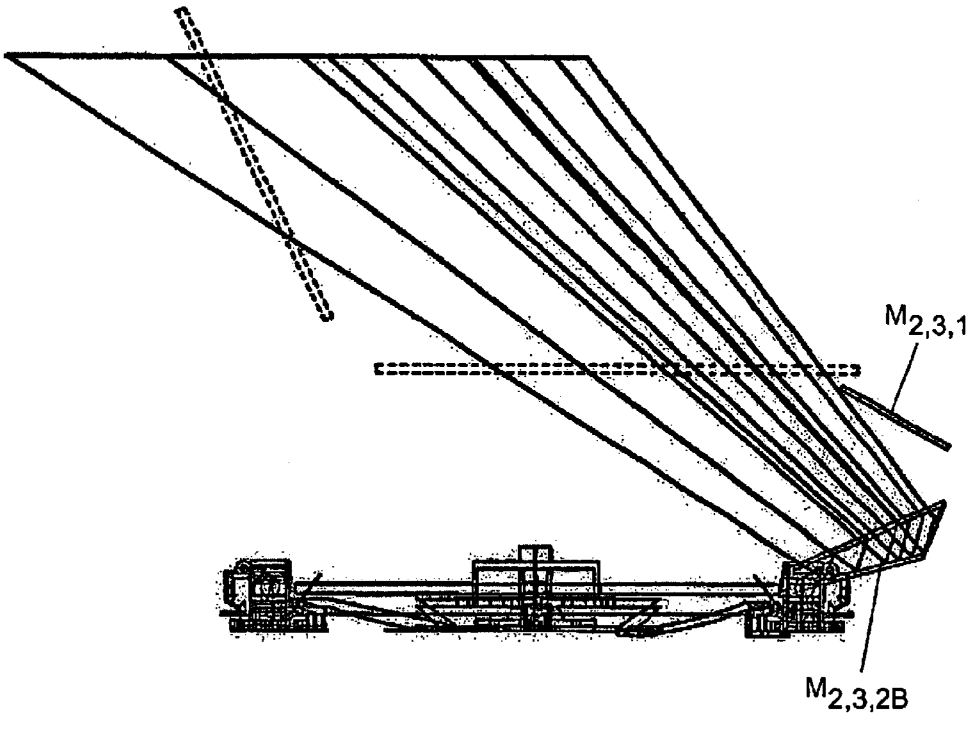
FIG. 5J5

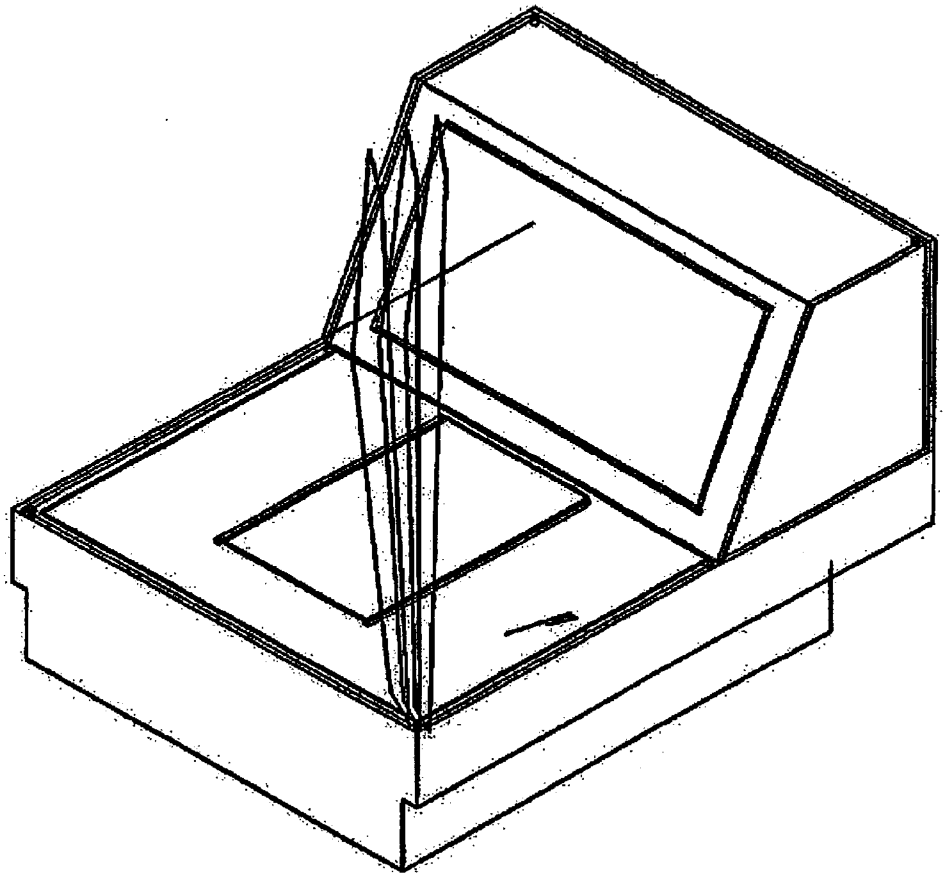
FIG. 5K1

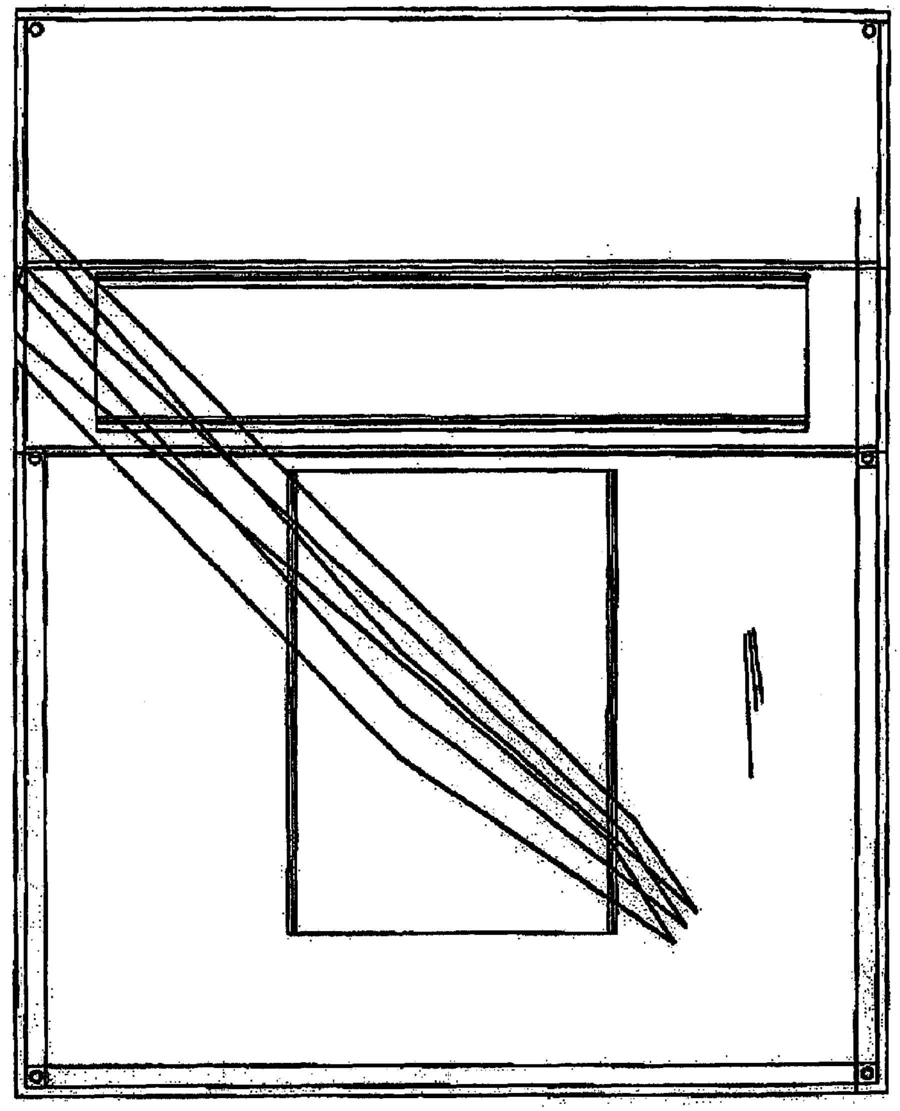
FIG. 5K2

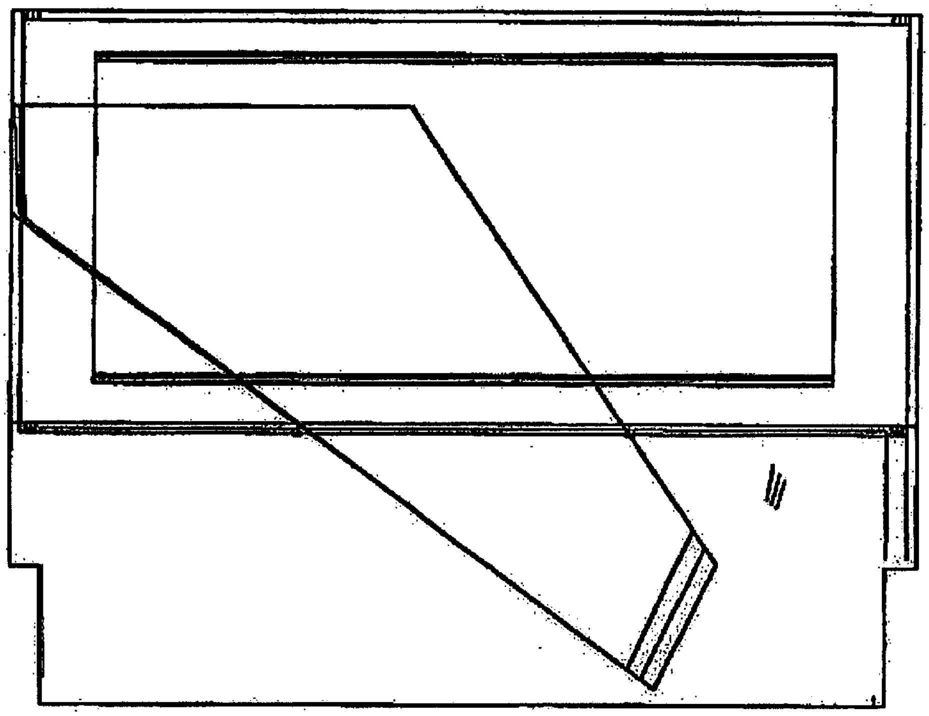
FIG. 5K3

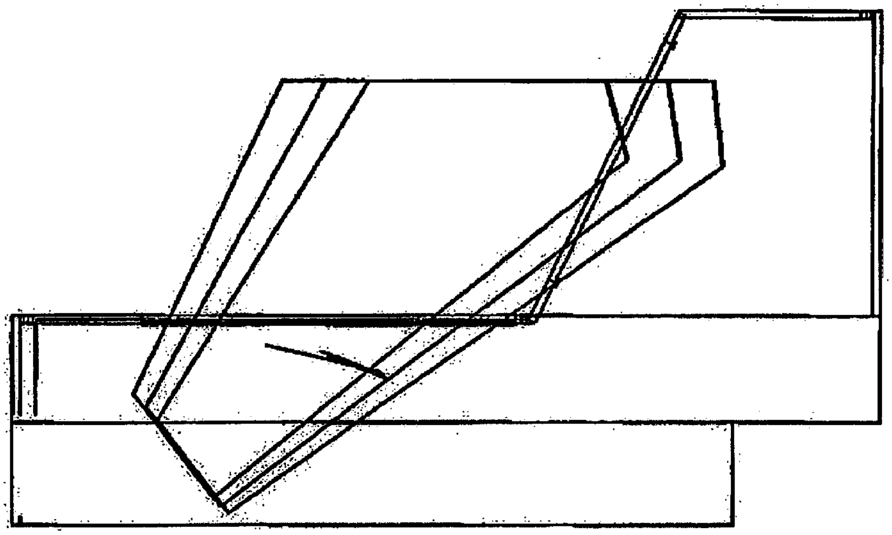
FIG. 5K4

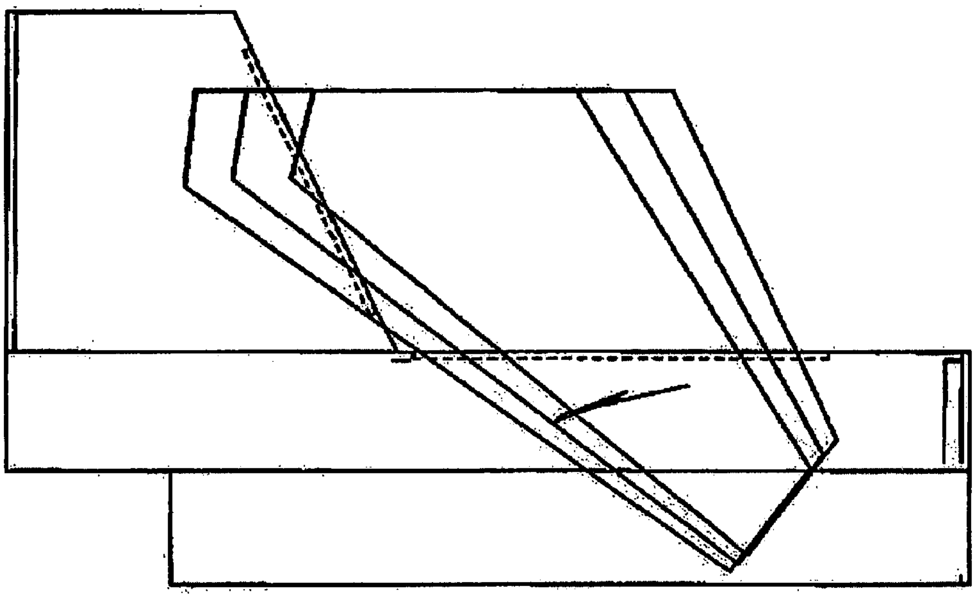
FIG. 5K5

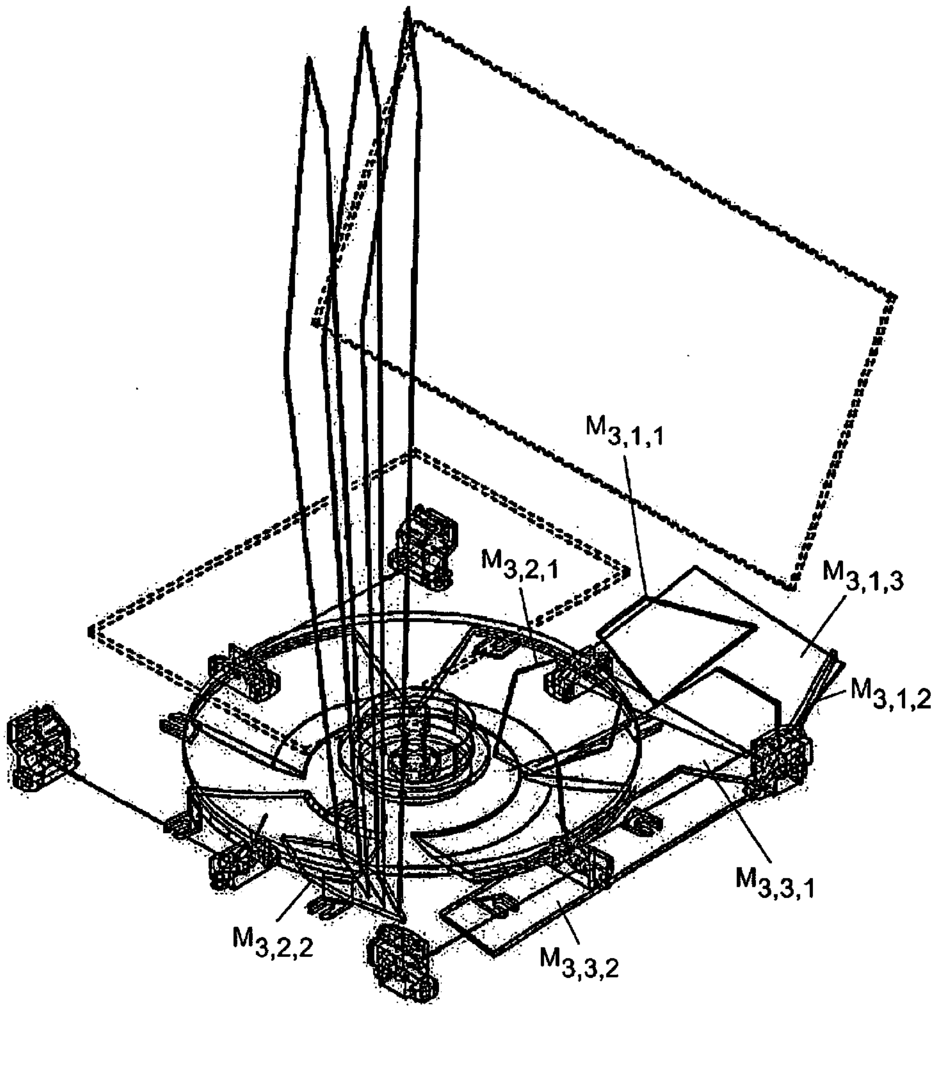
FIG. 5L1

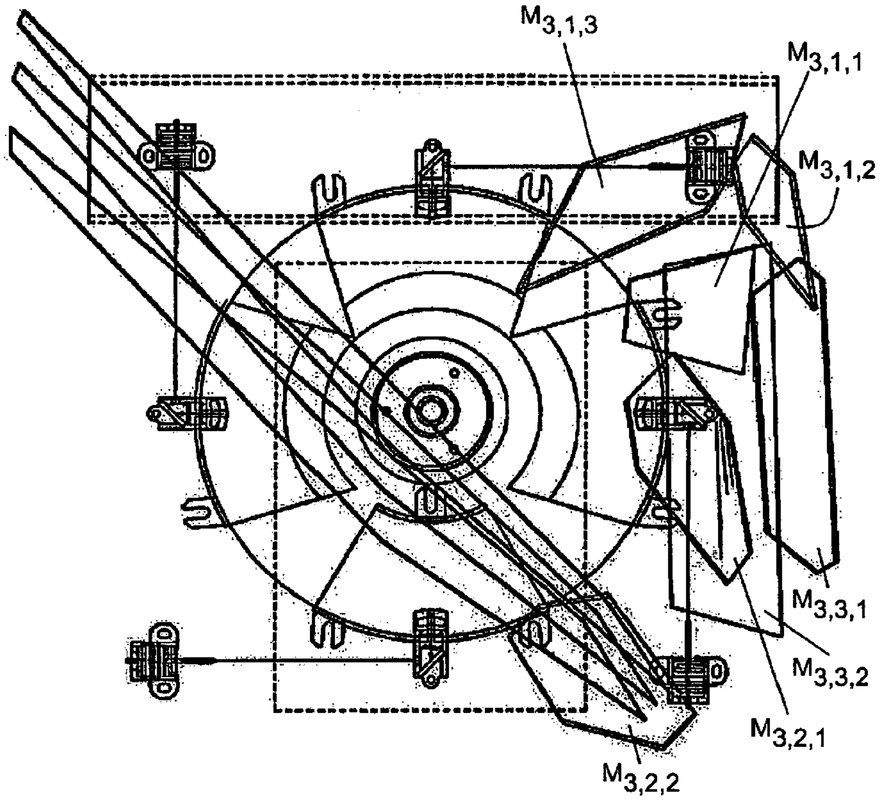
FIG. 5L2

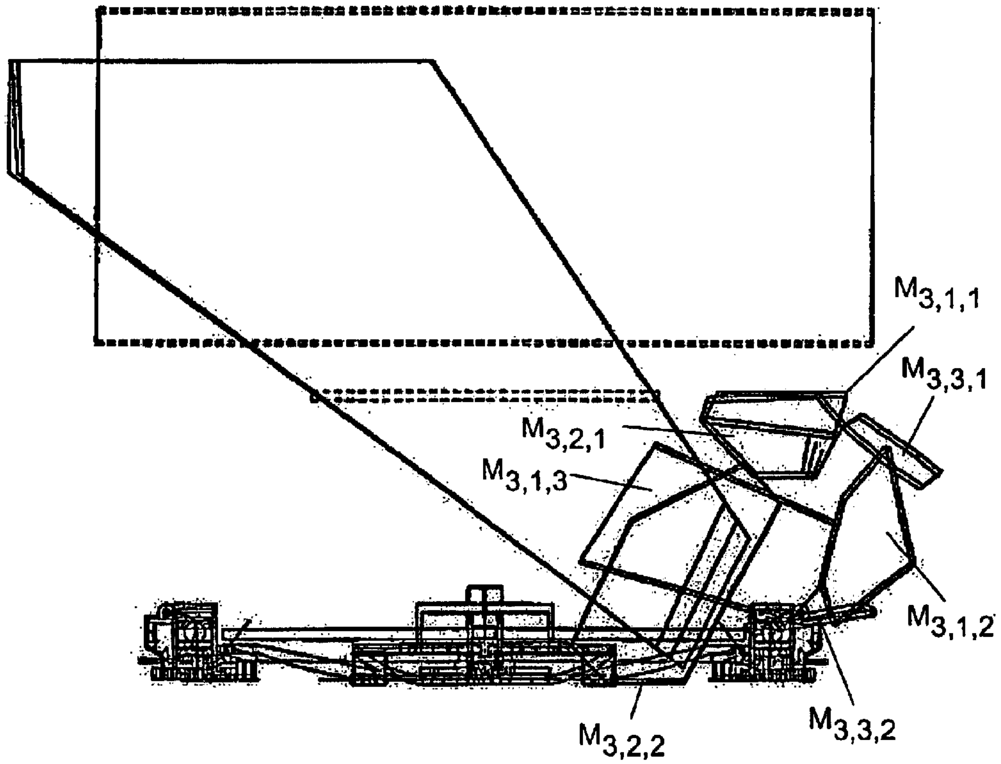
FIG. 5L3

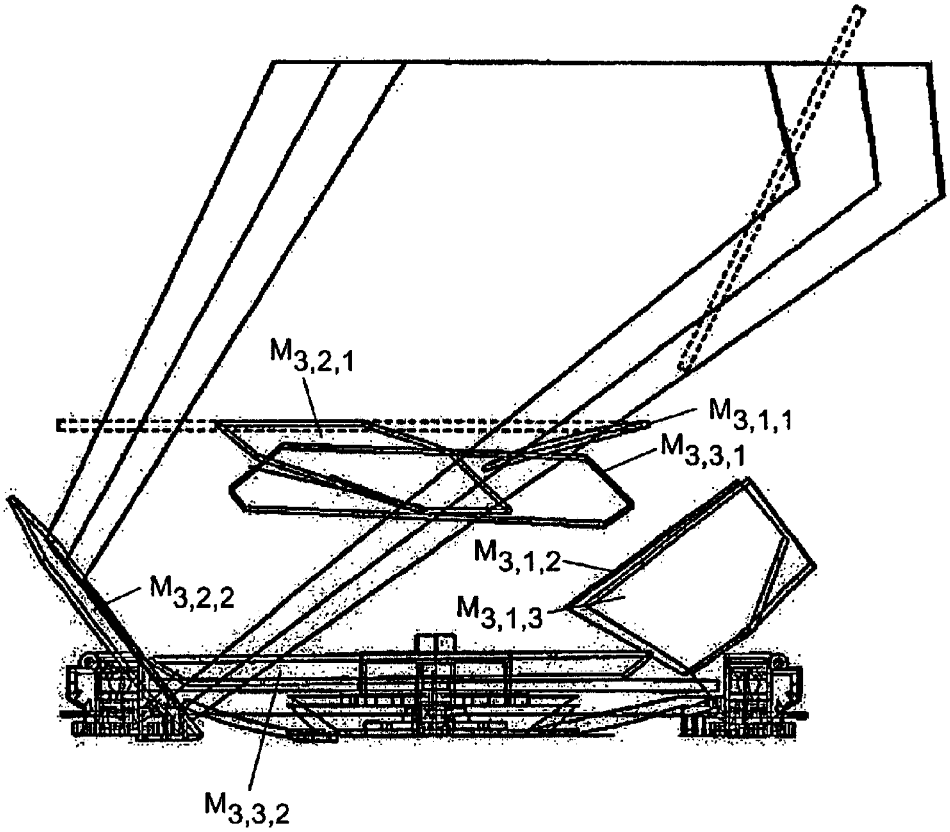
FIG. 5L4

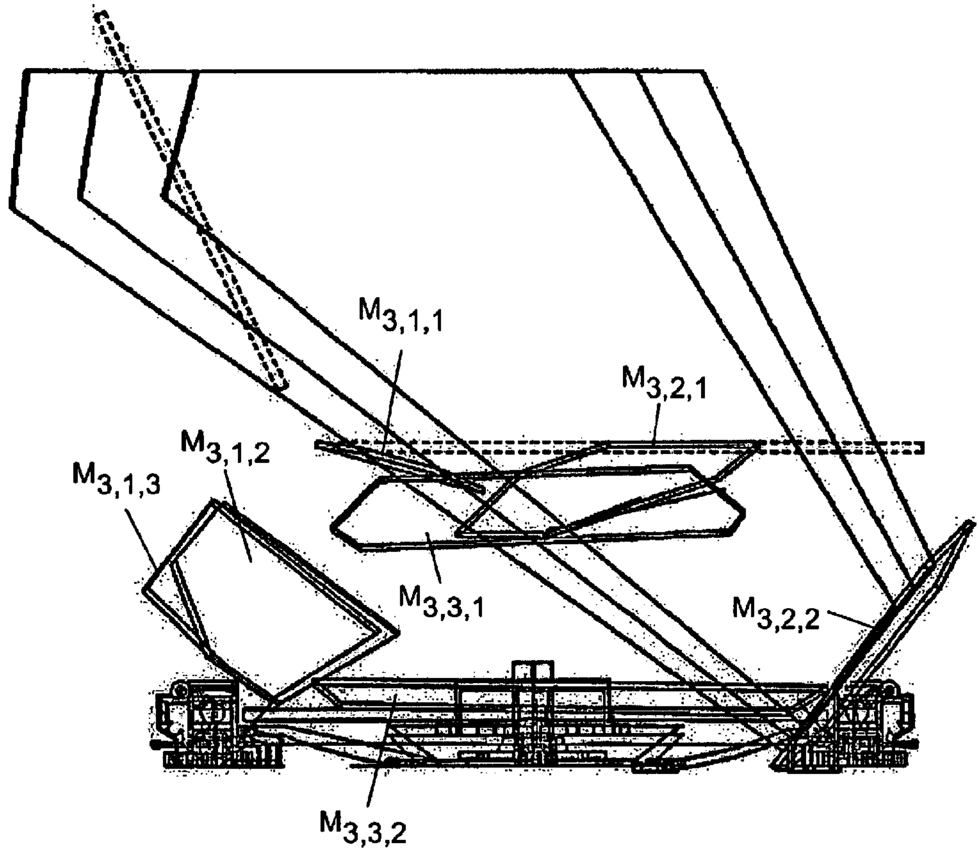
FIG. 5L5

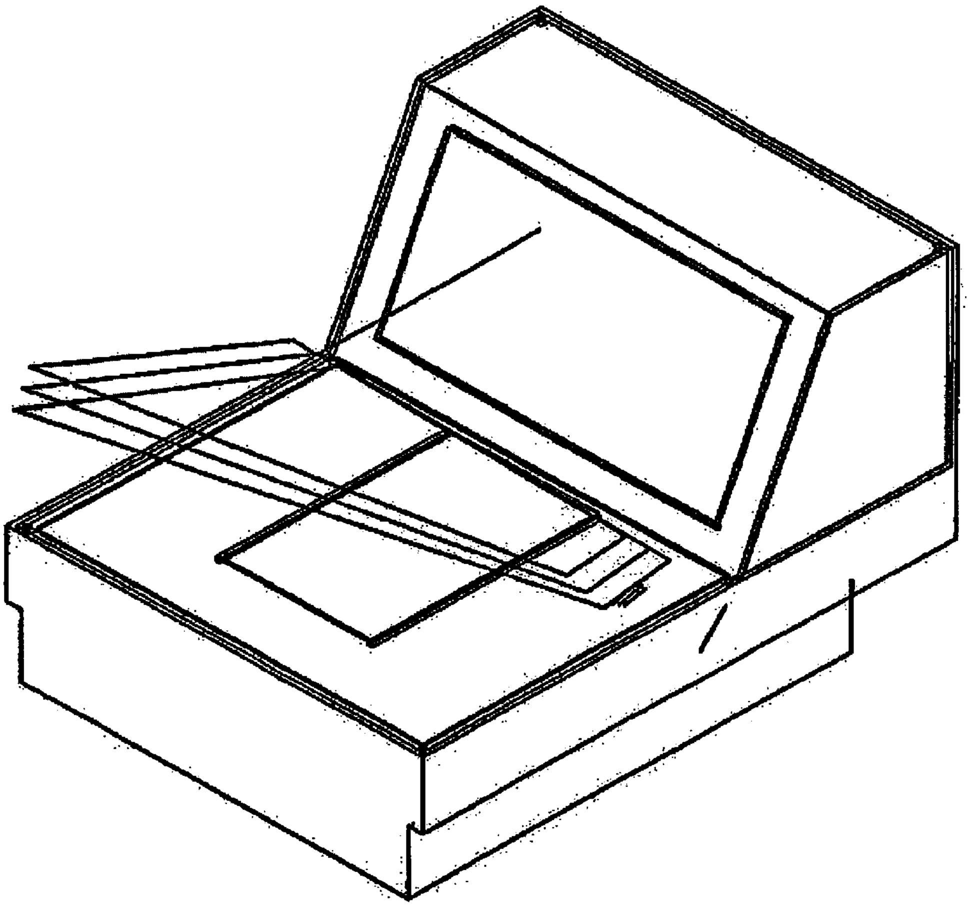
FIG. 5M1

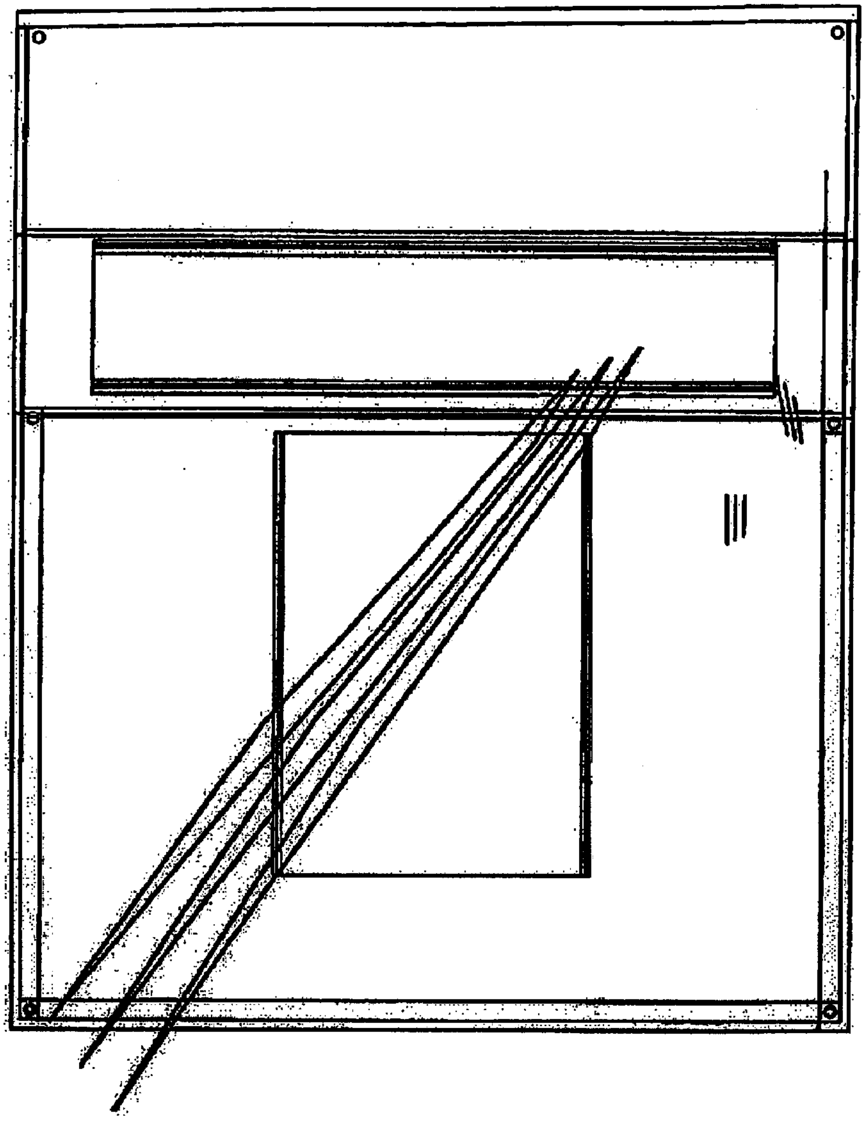
FIG. 5M2

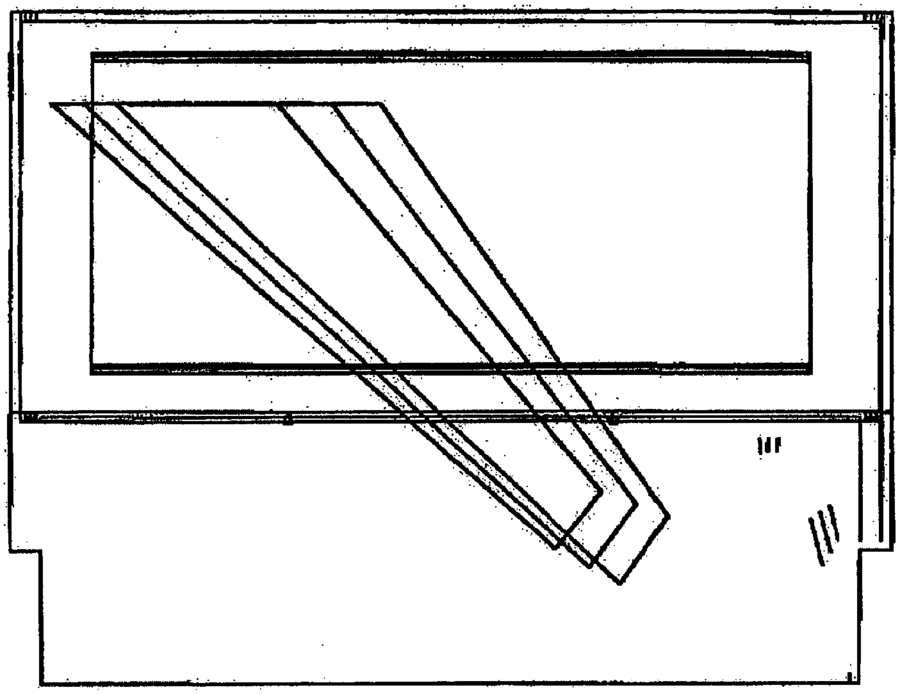
FIG. 5M3

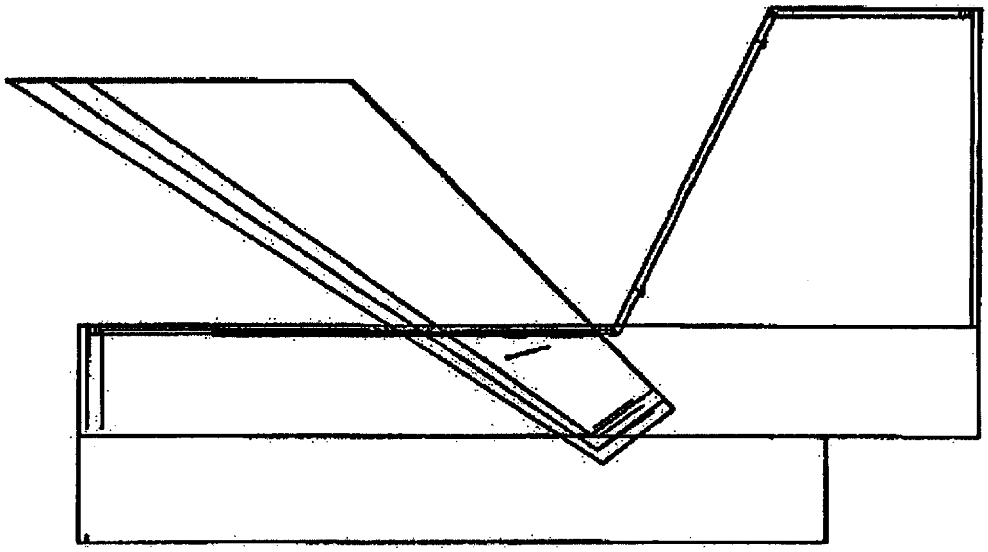
FIG. 5M4

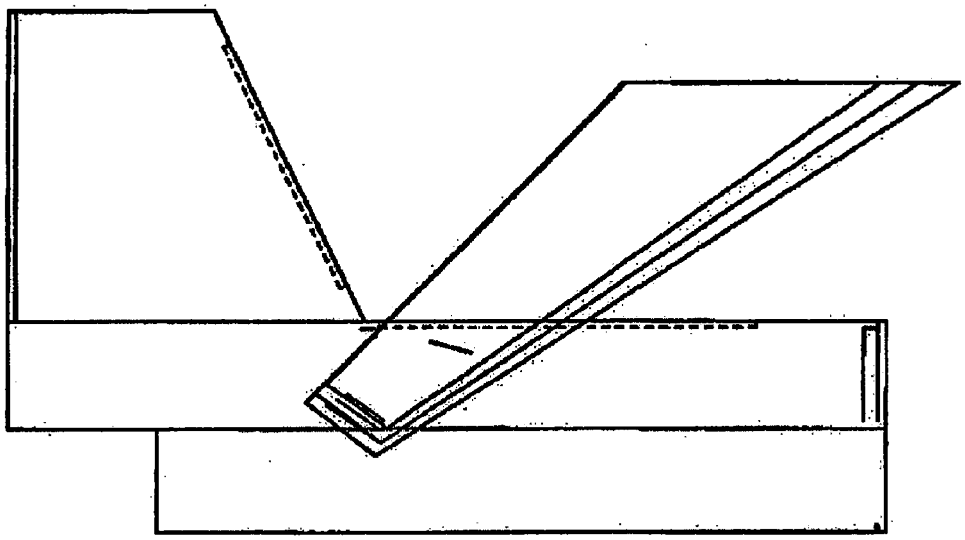
FIG. 5M5

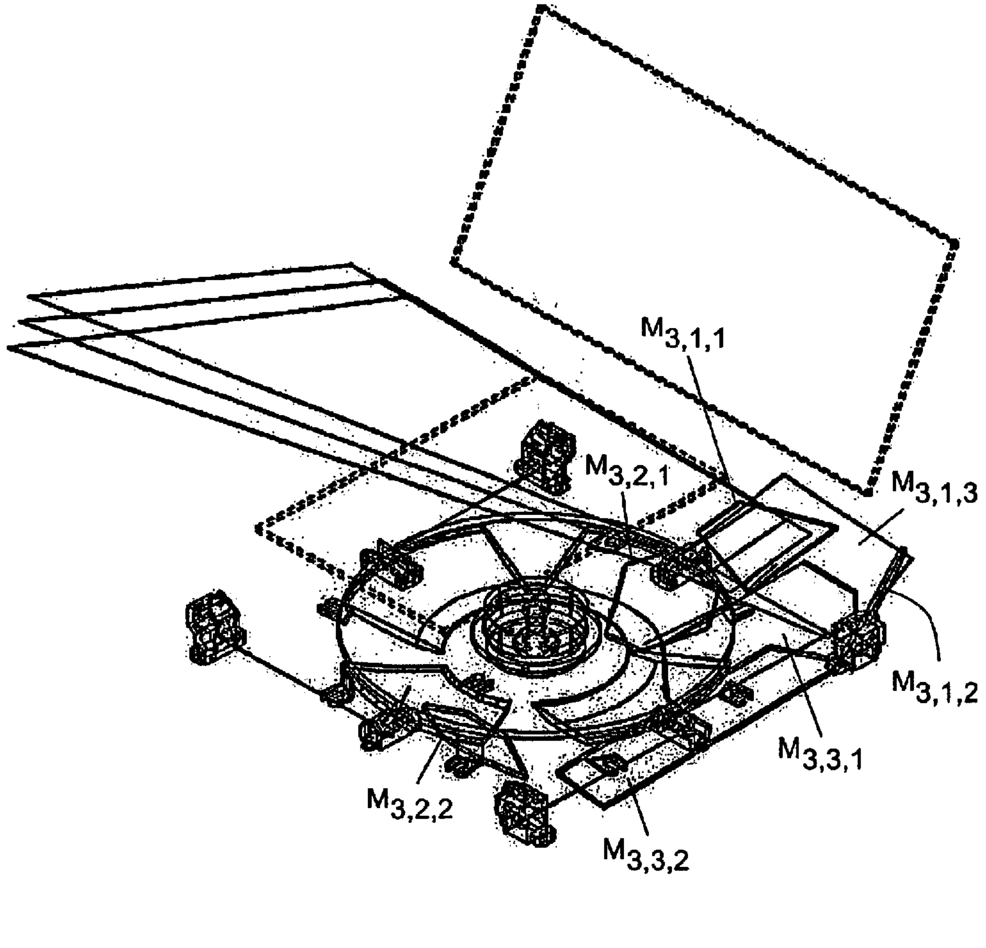
FIG. 5N1

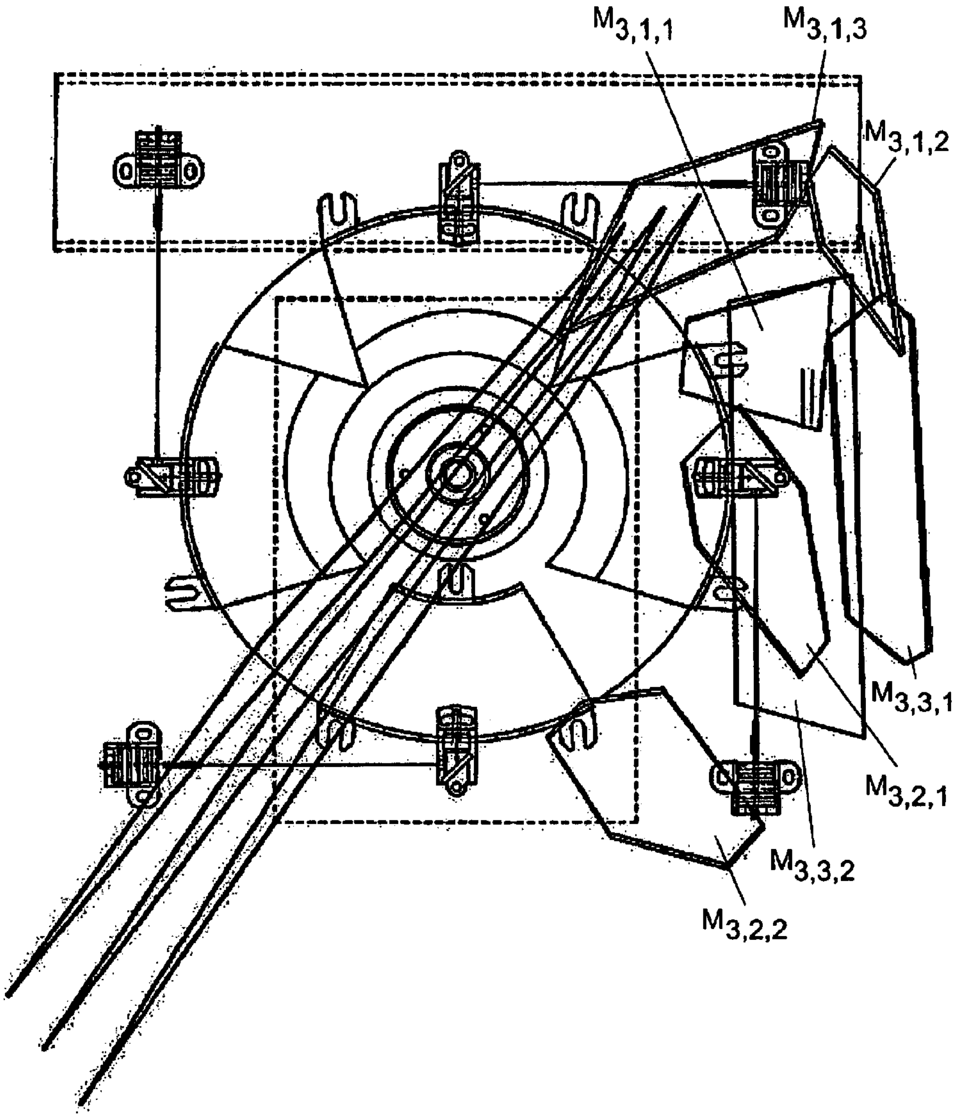
FIG. 5N2

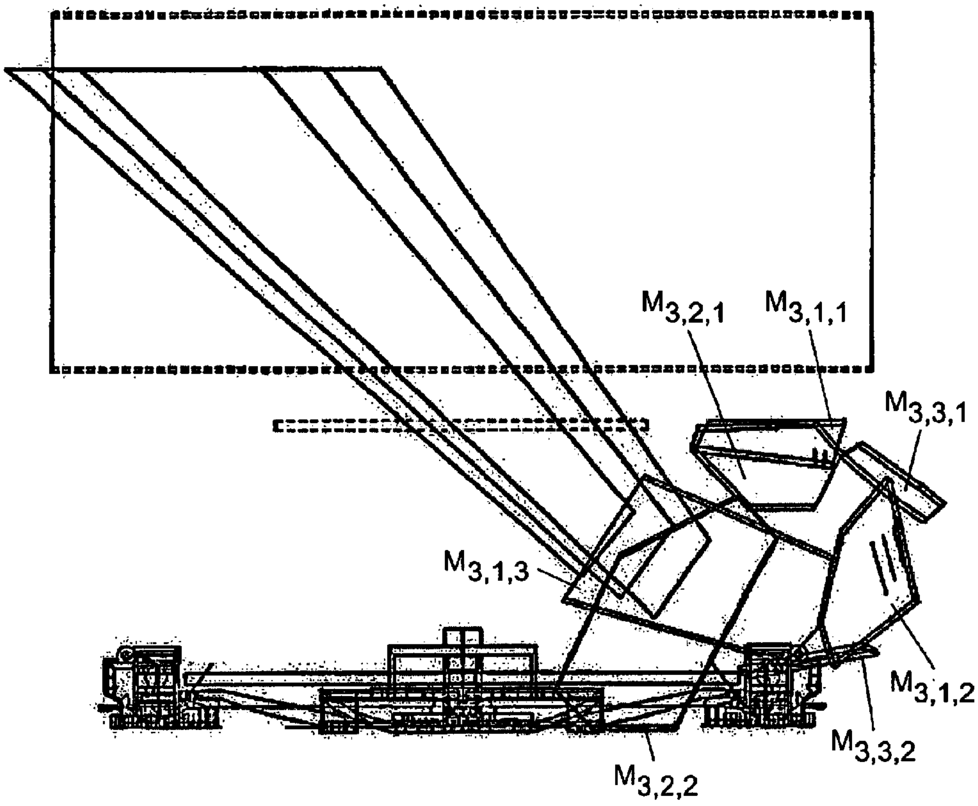
FIG. 5N3

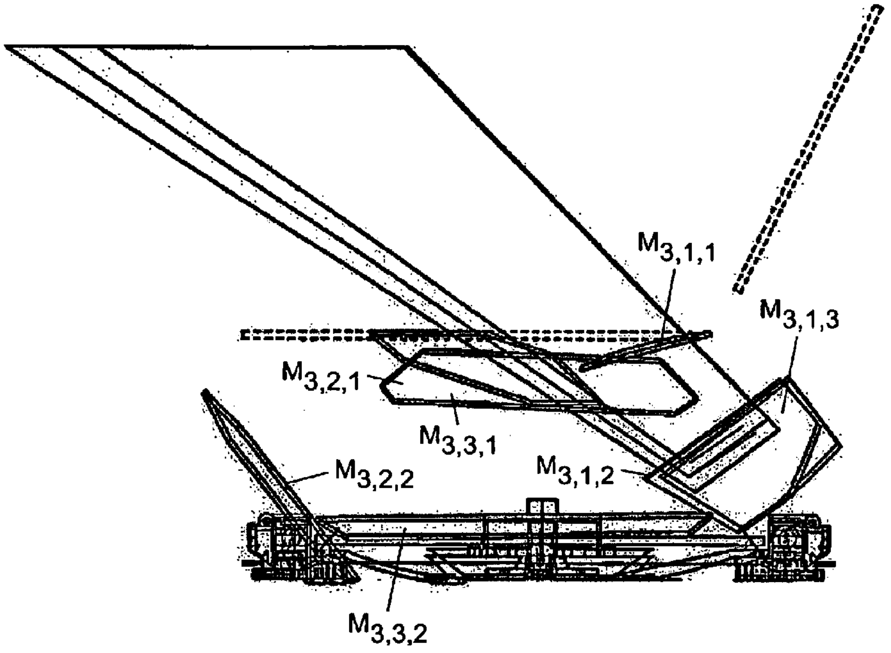
FIG. 5N4

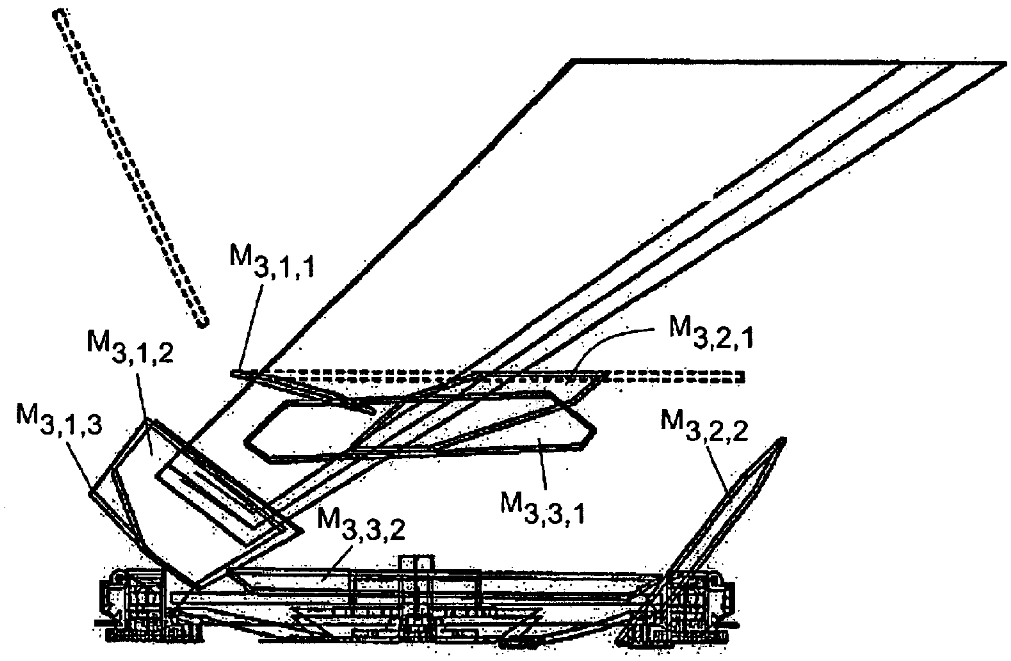
FIG. 5N5

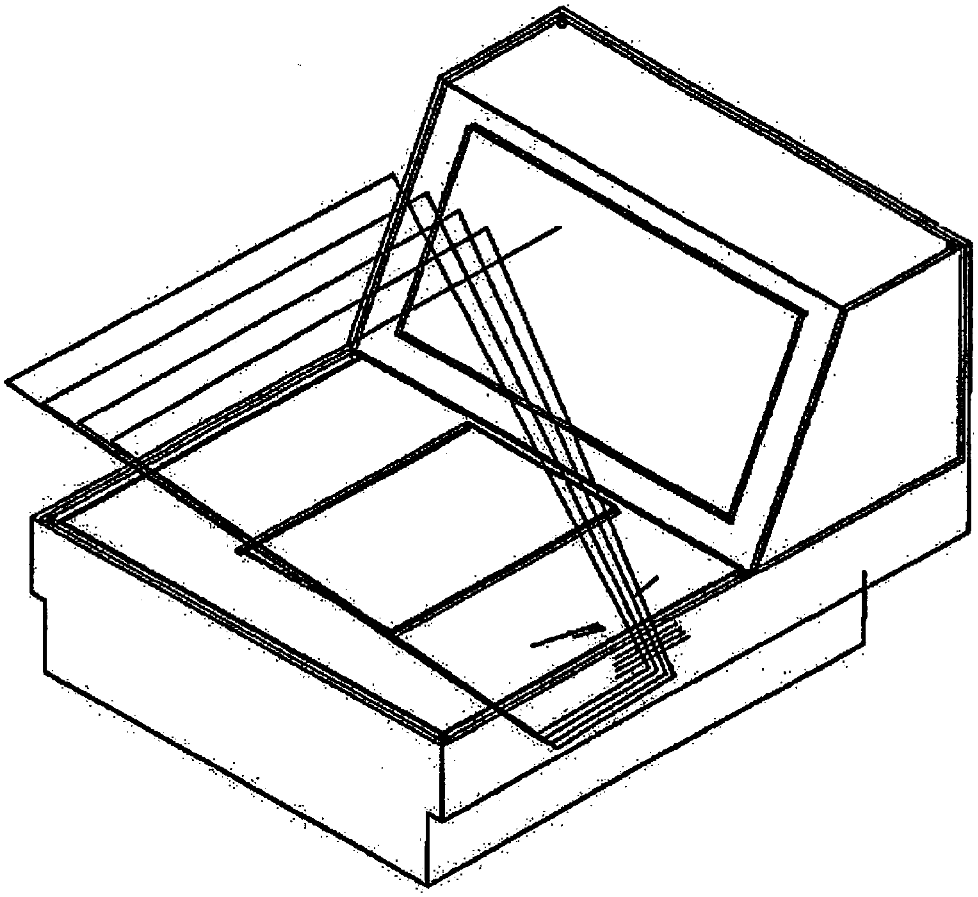
FIG. 5O1

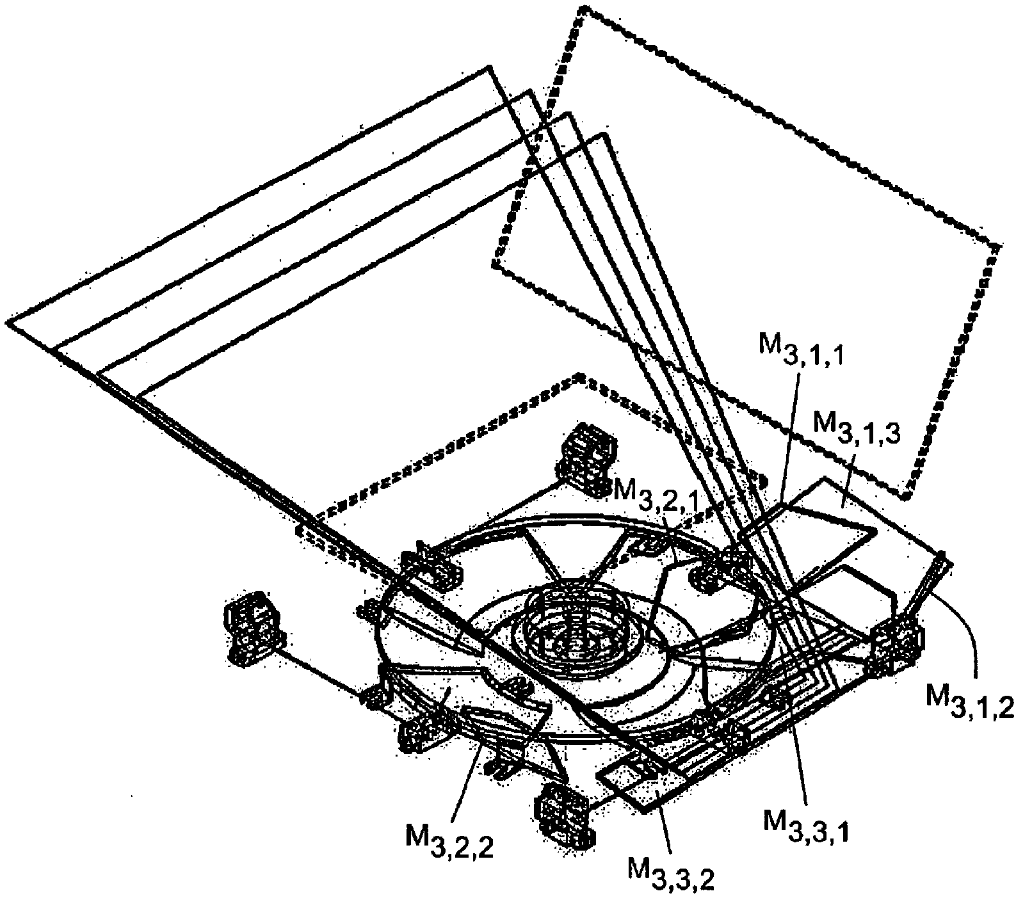
FIG. 5P1

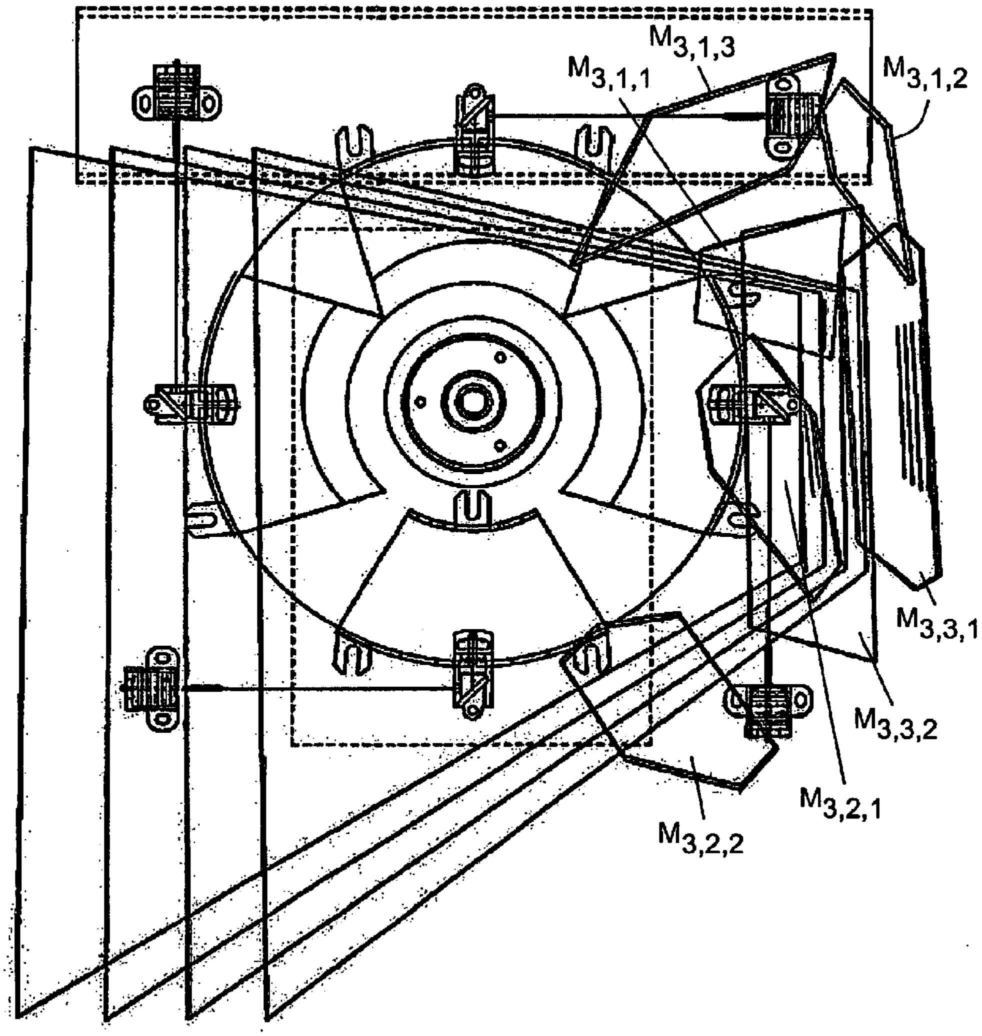
FIG. 5P2

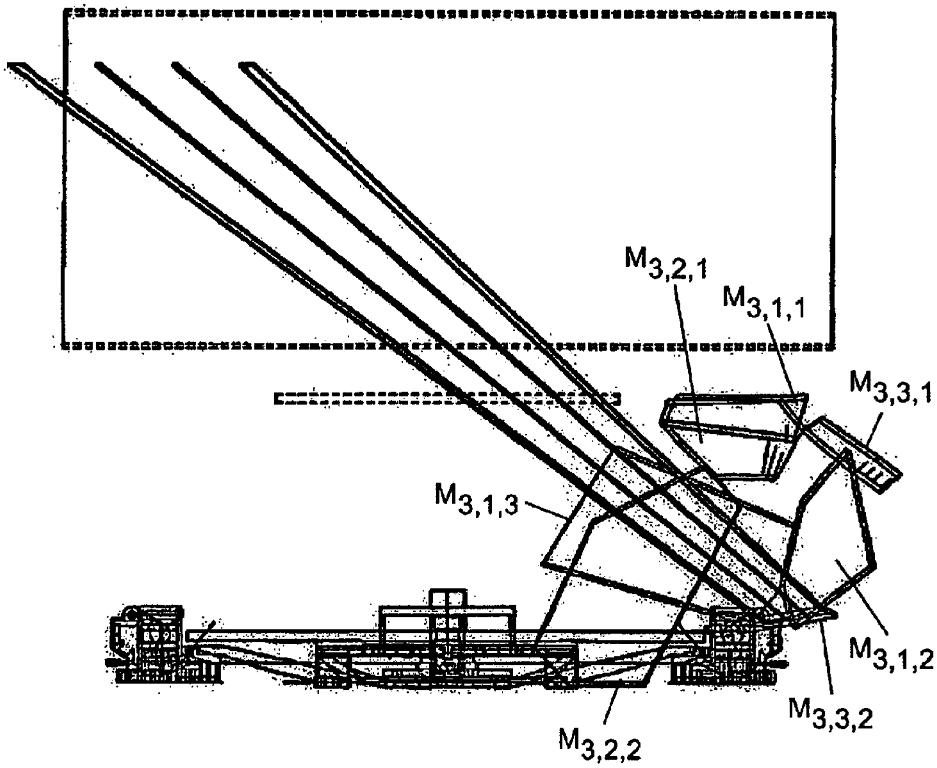
FIG. 5P3

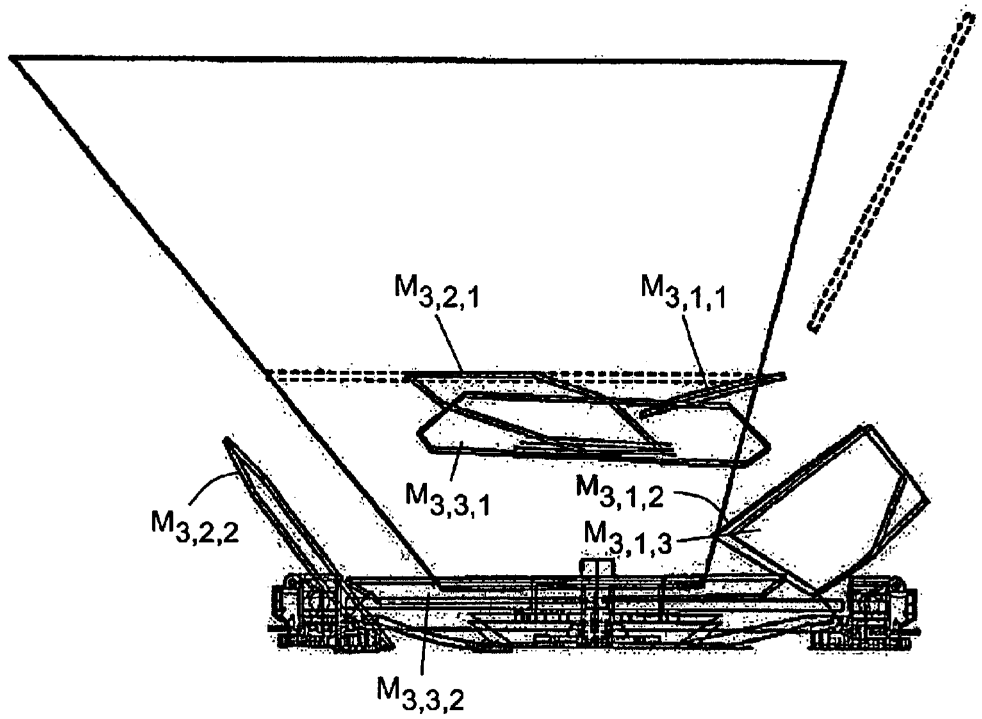
FIG. 5P4

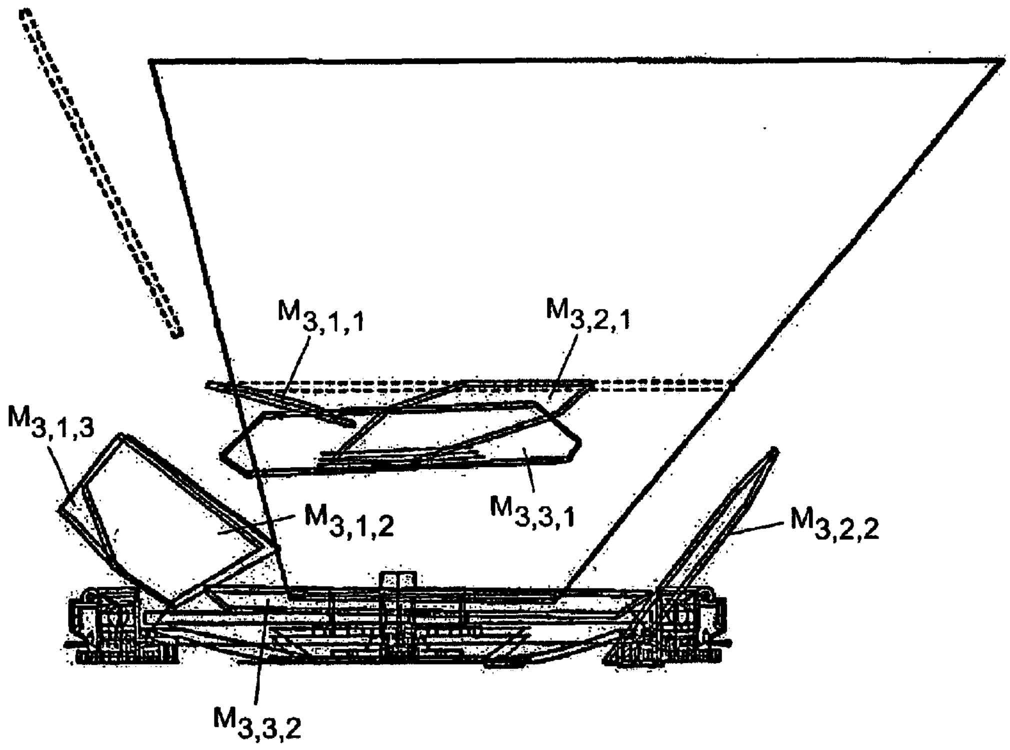
FIG. 5P5

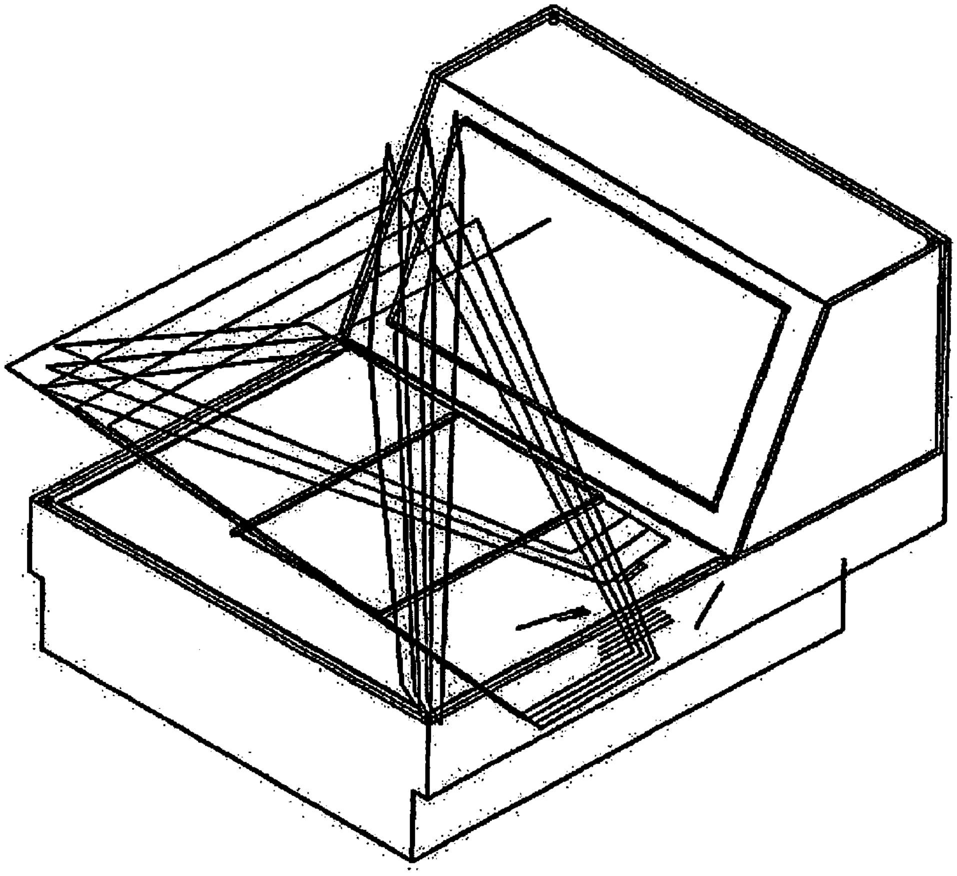
FIG. 5Q1

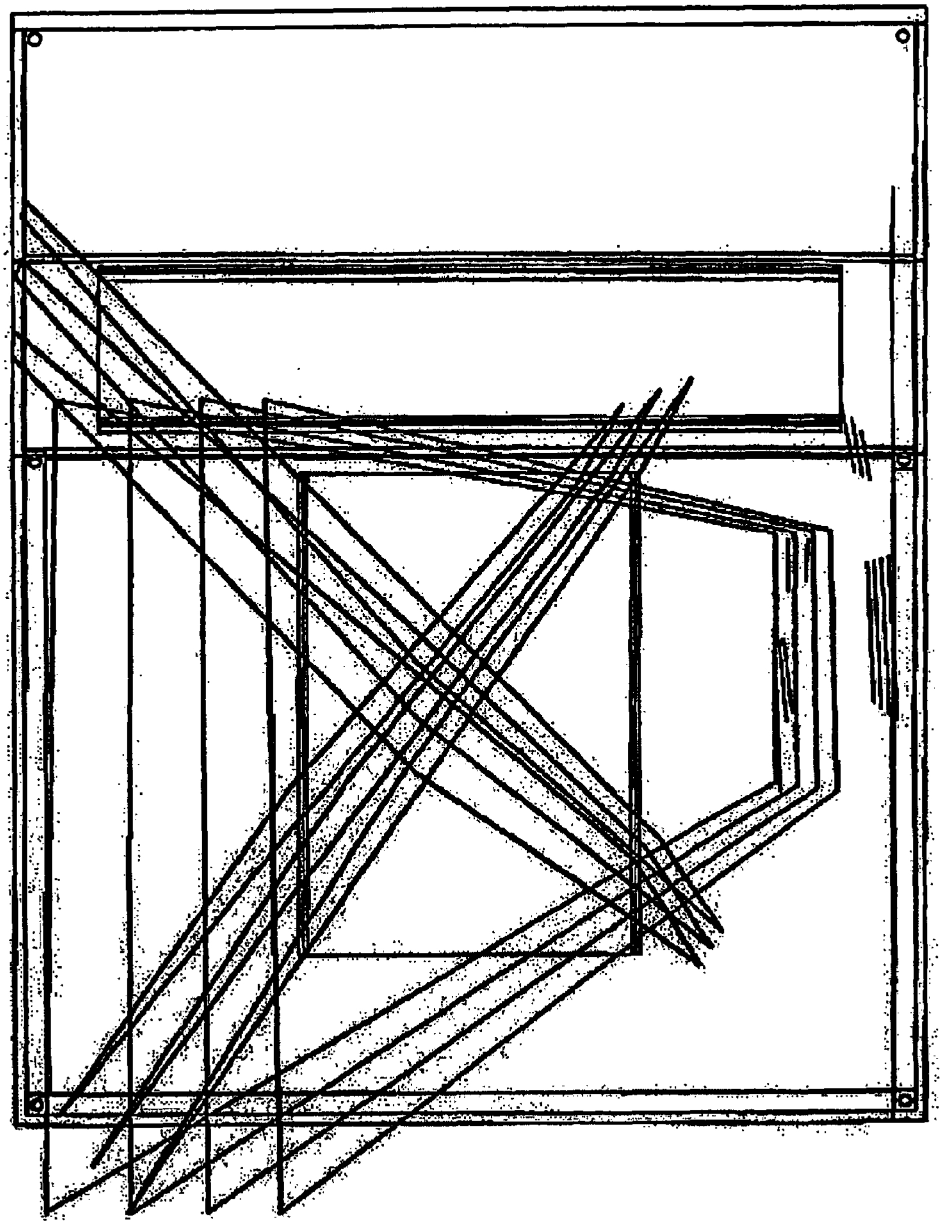
FIG. 5Q2

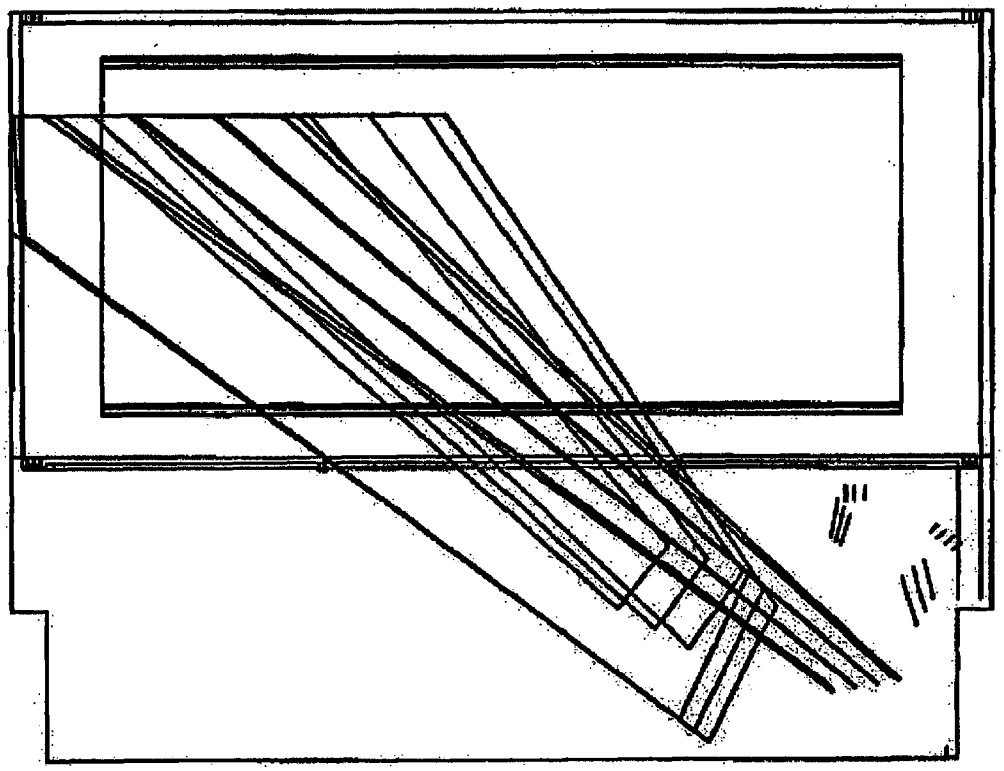
FIG. 5Q3

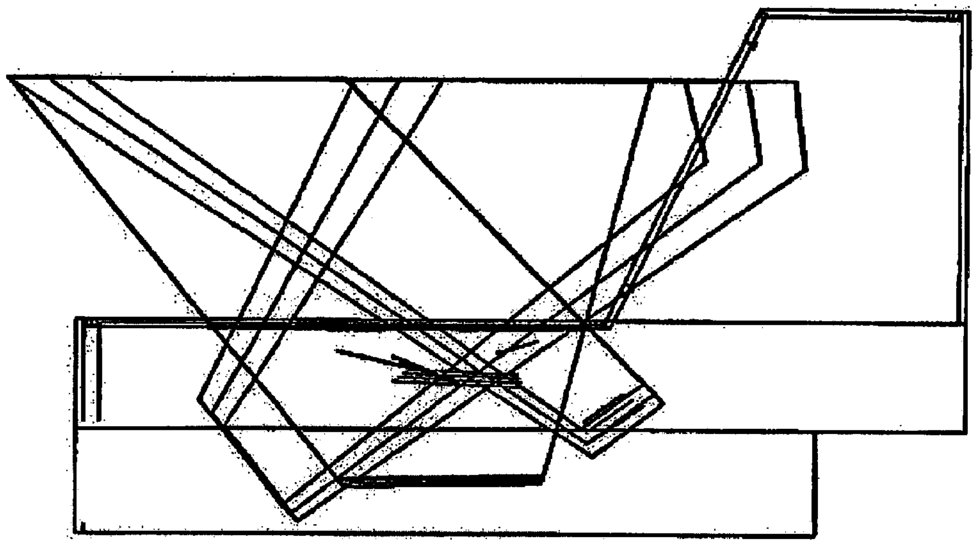
FIG. 5Q4

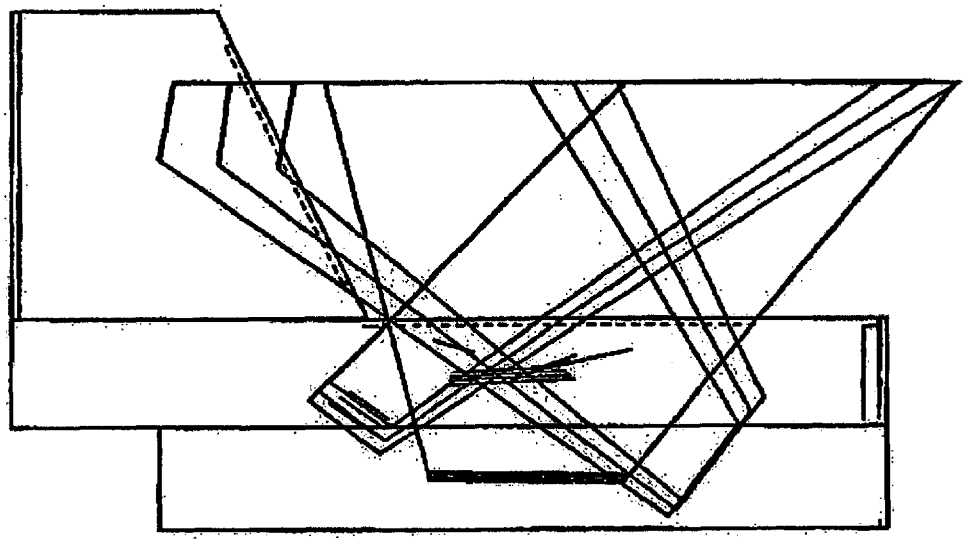
FIG. 5Q5

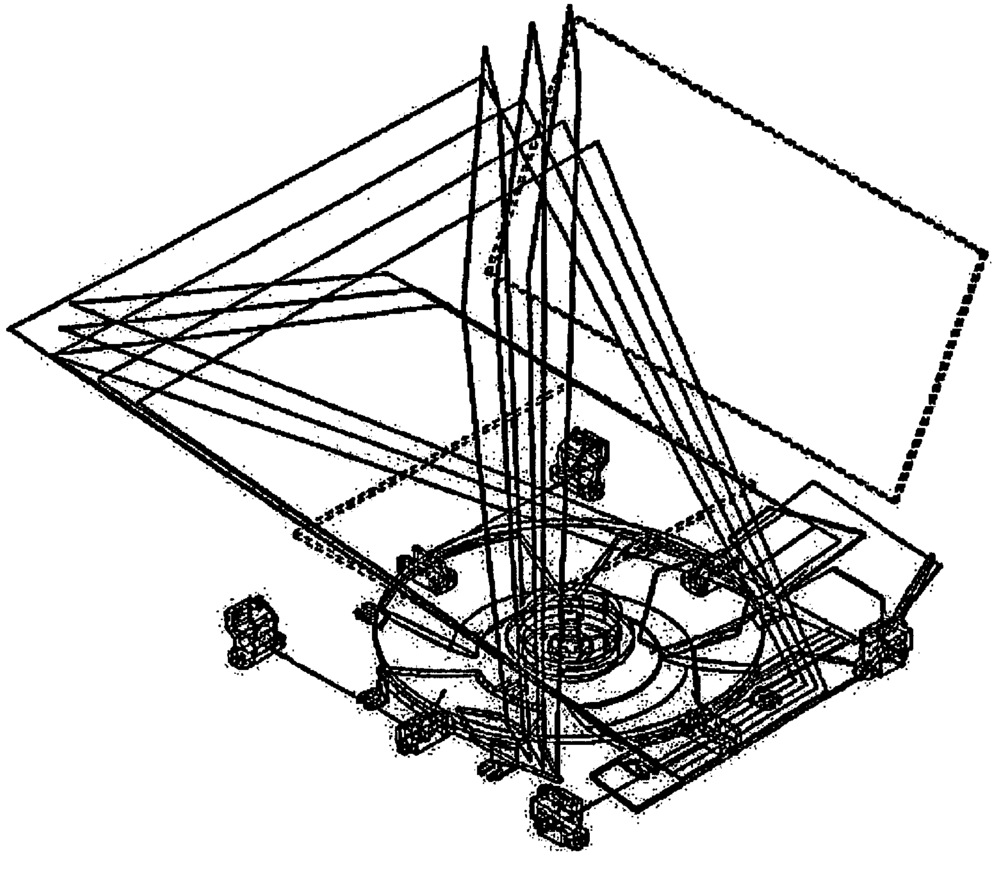
FIG. 5R1

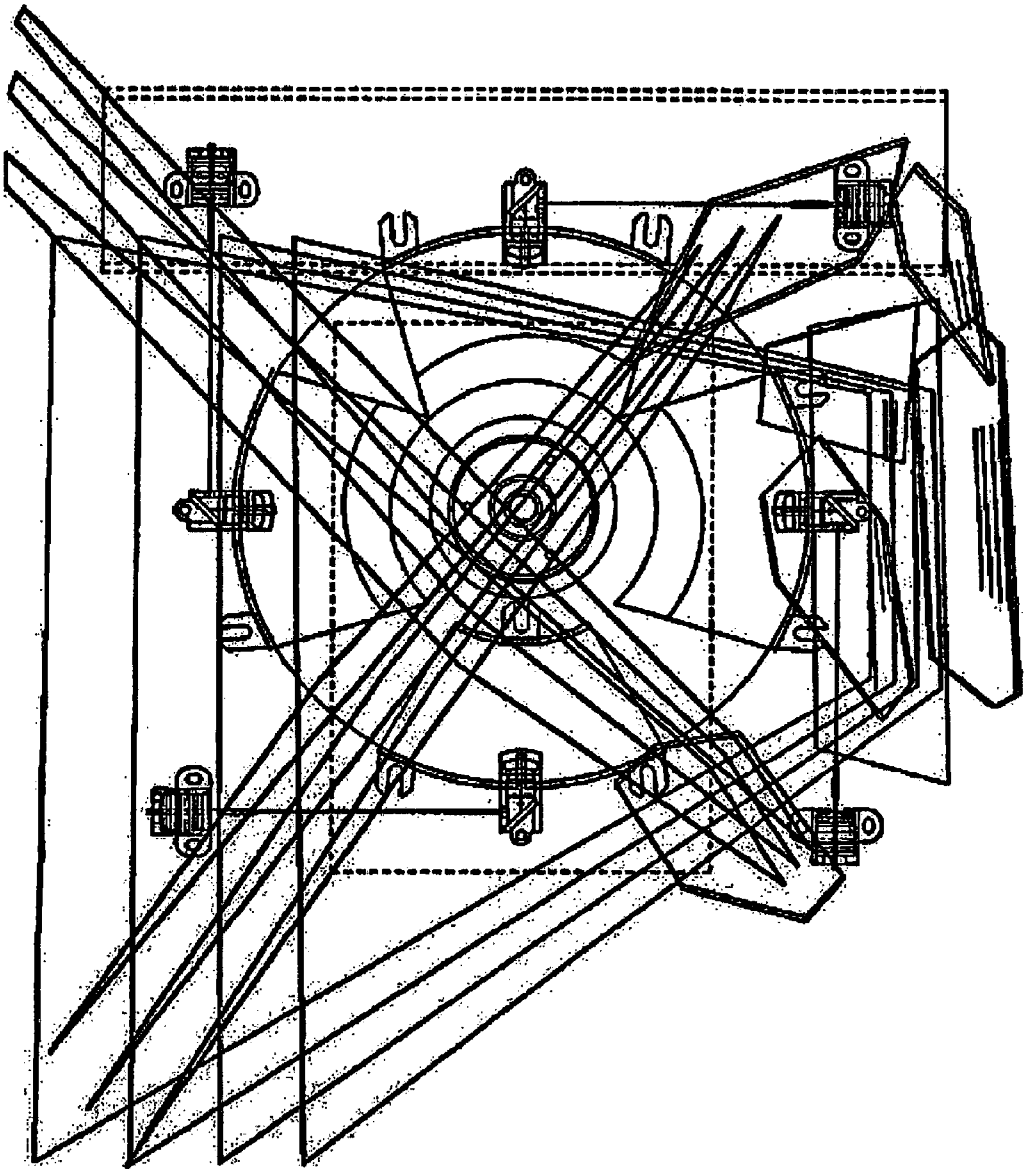
FIG. 5R2

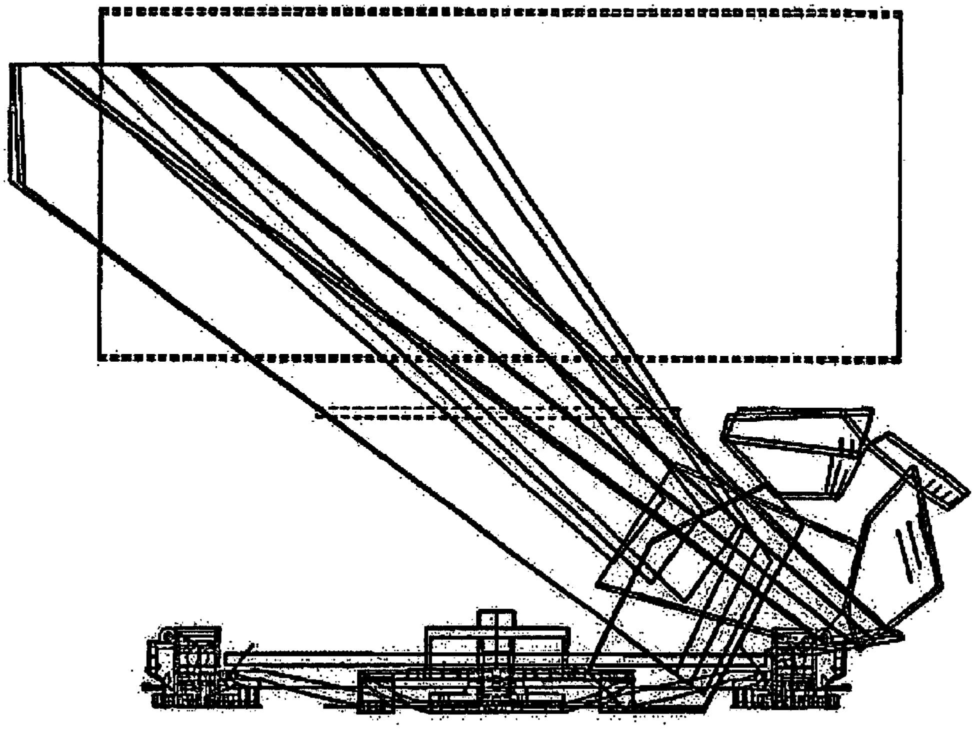
FIG. 5R3

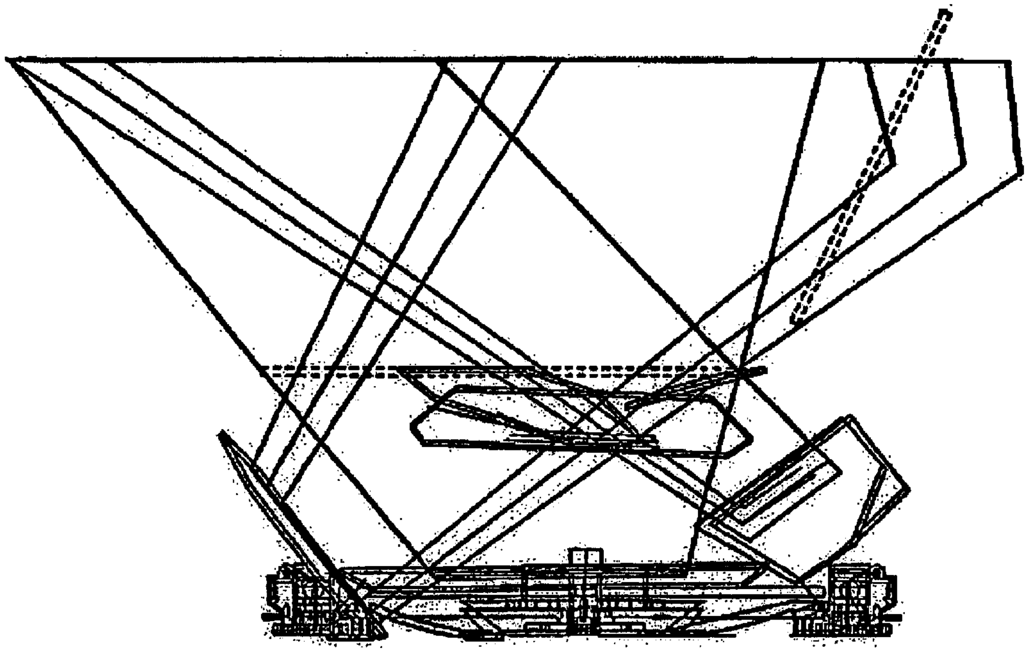
FIG. 5R4

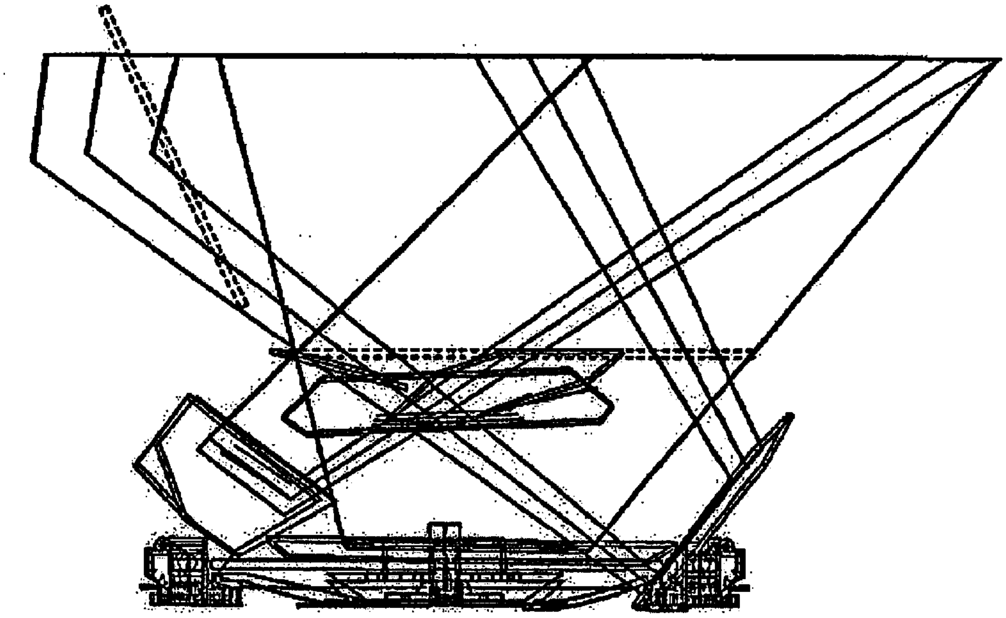
FIG. 5R5

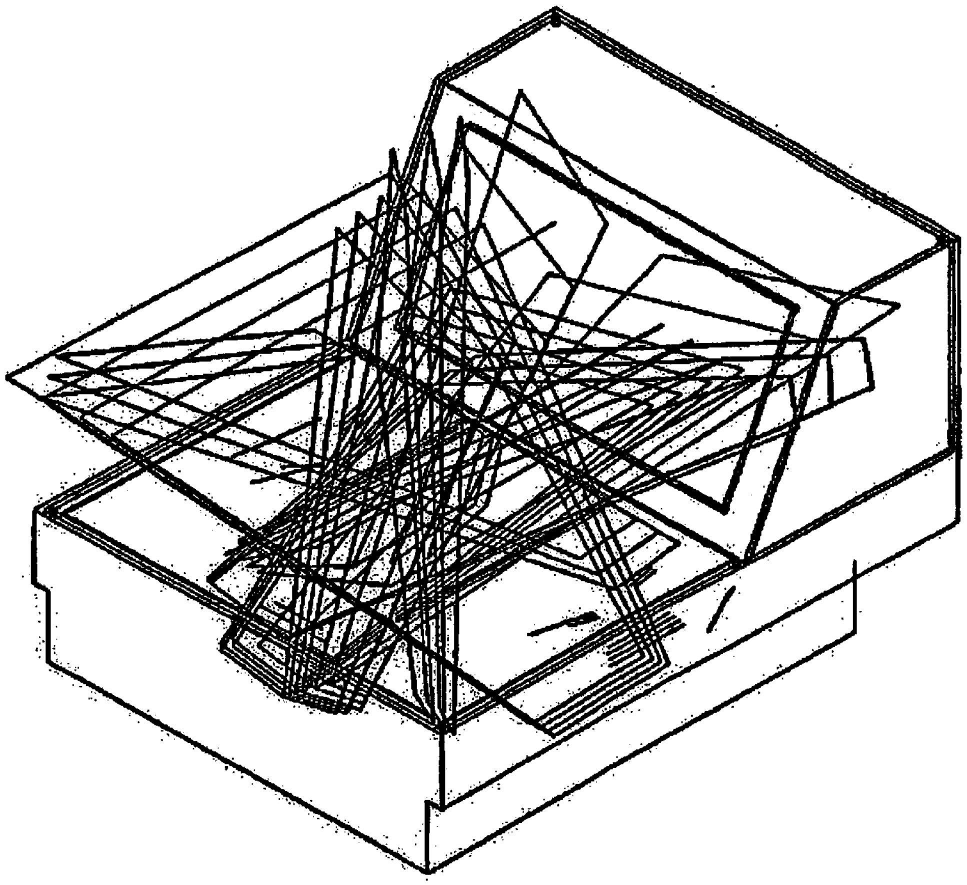
FIG. 5S1

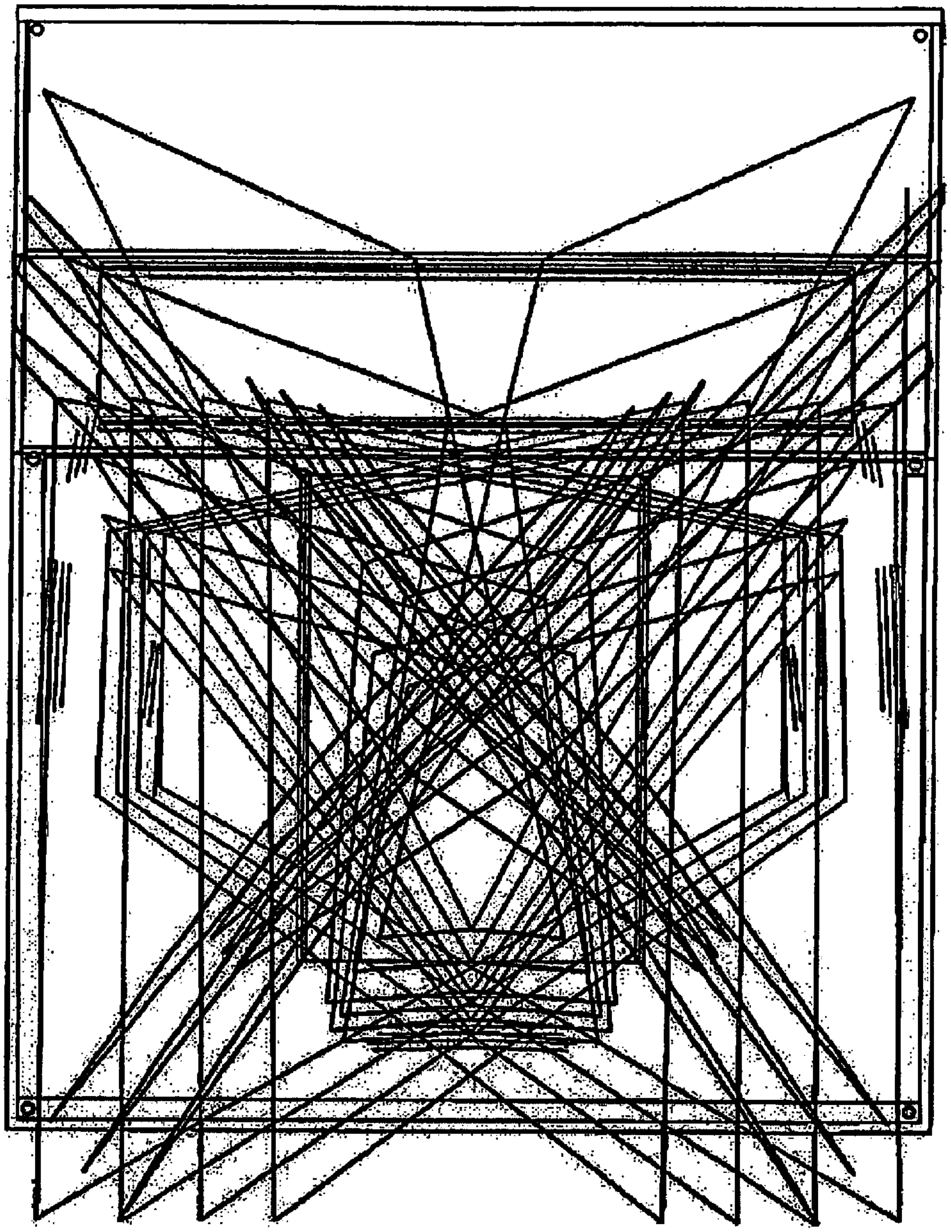
FIG. 5S2

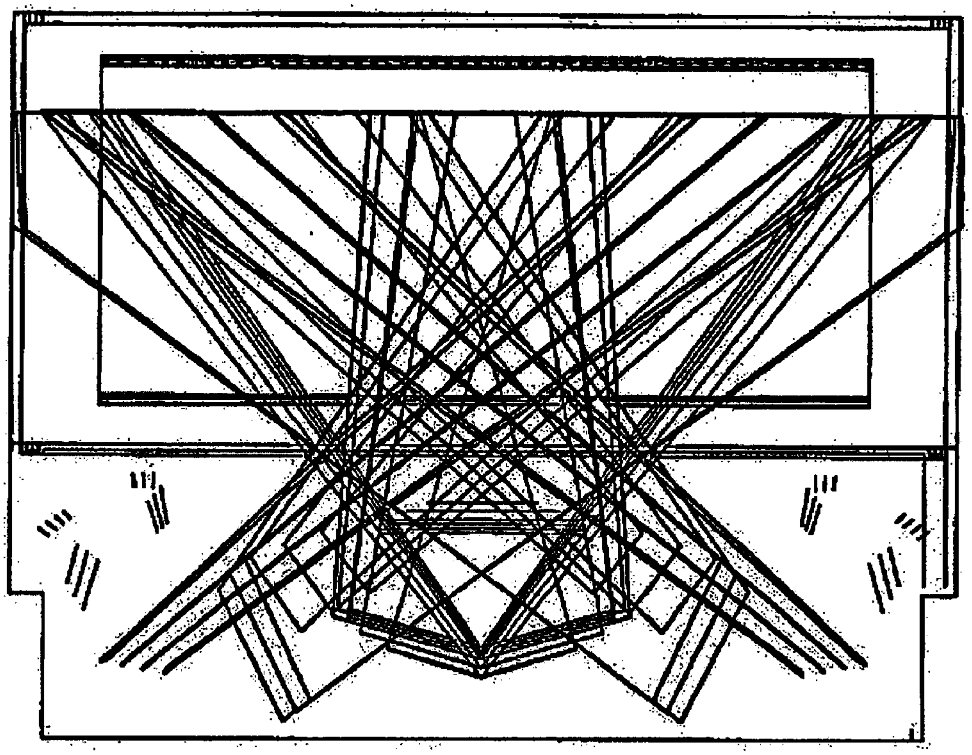
FIG. 5S3

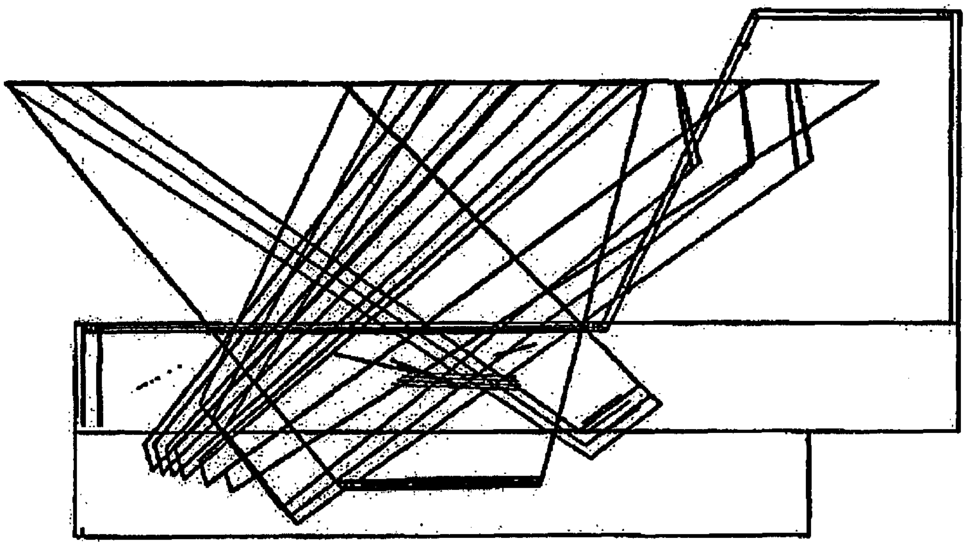
FIG. 5S4

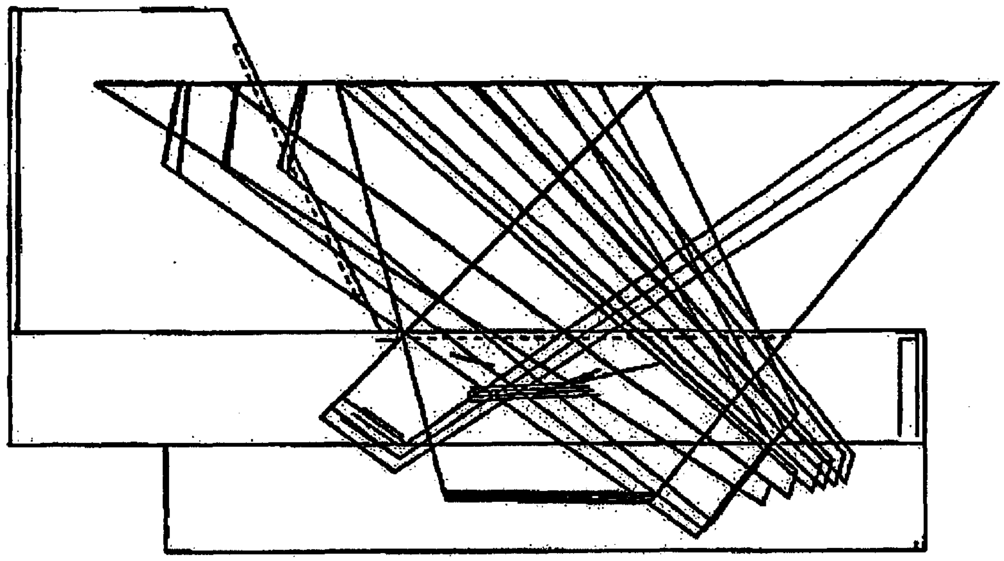
FIG. 5S5

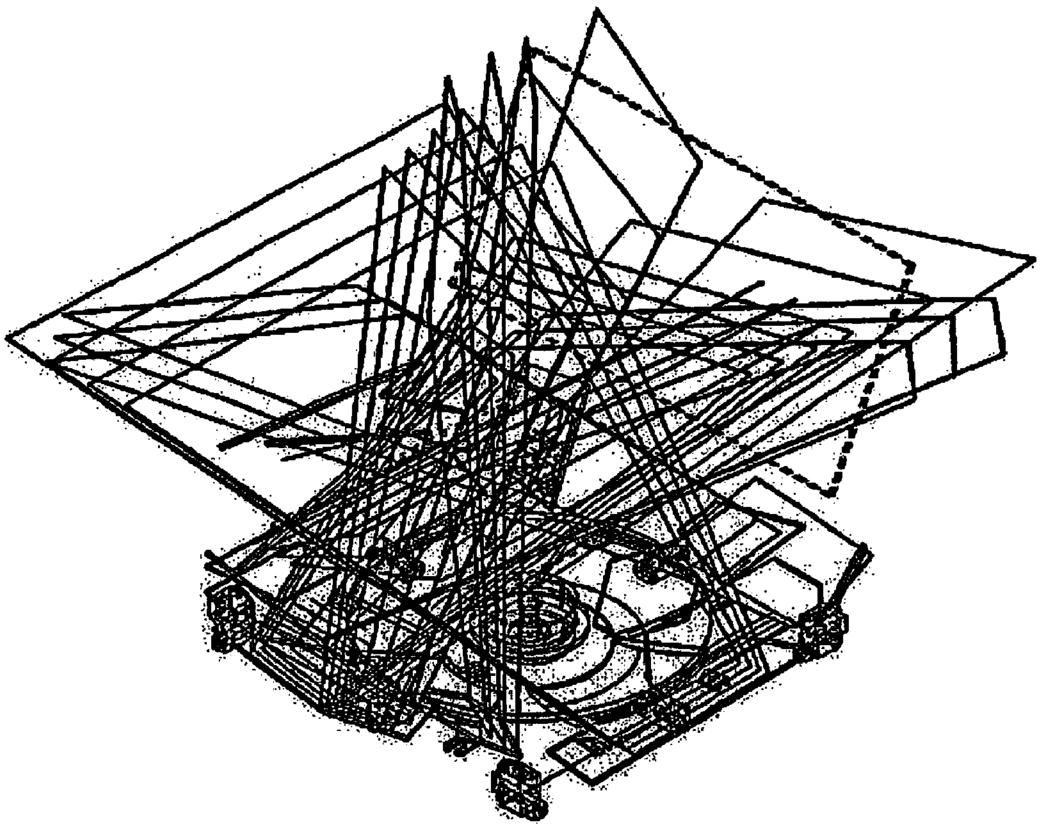
FIG. 5T1

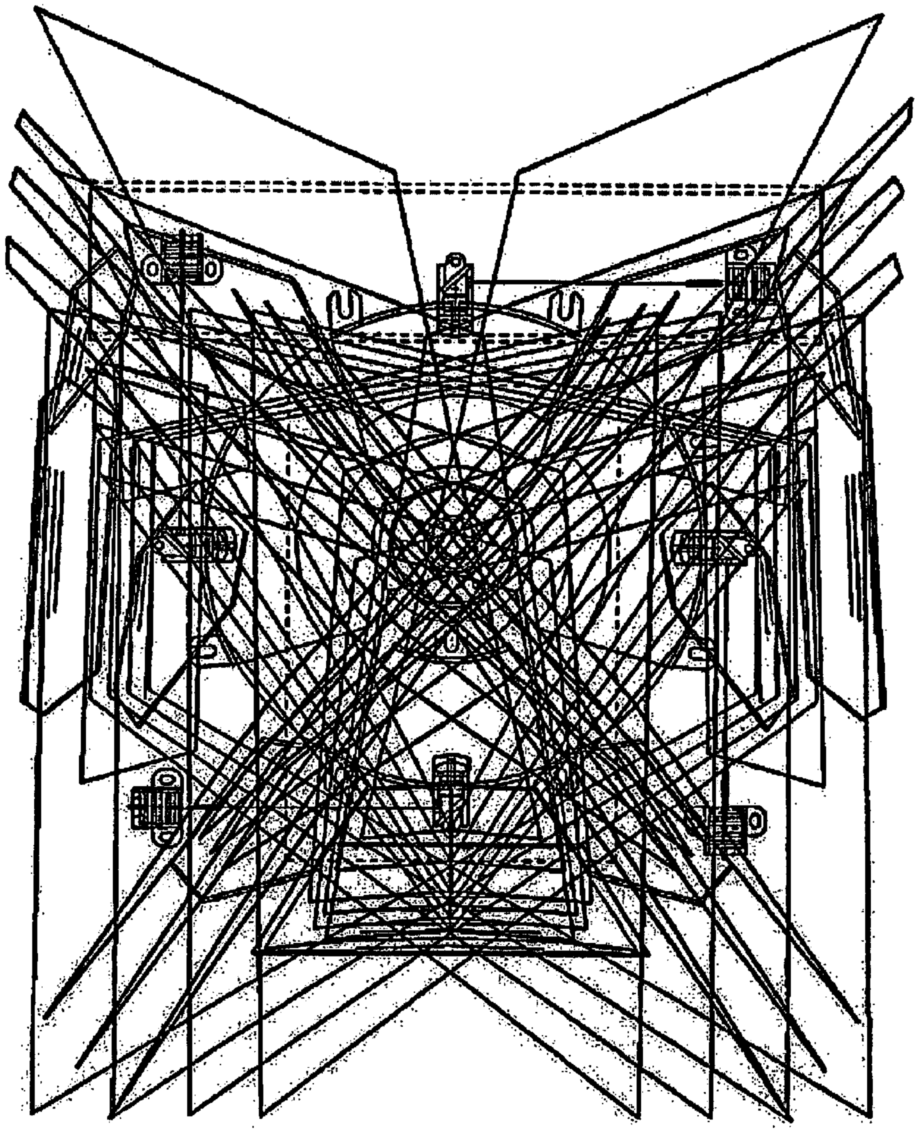
FIG. 5T2

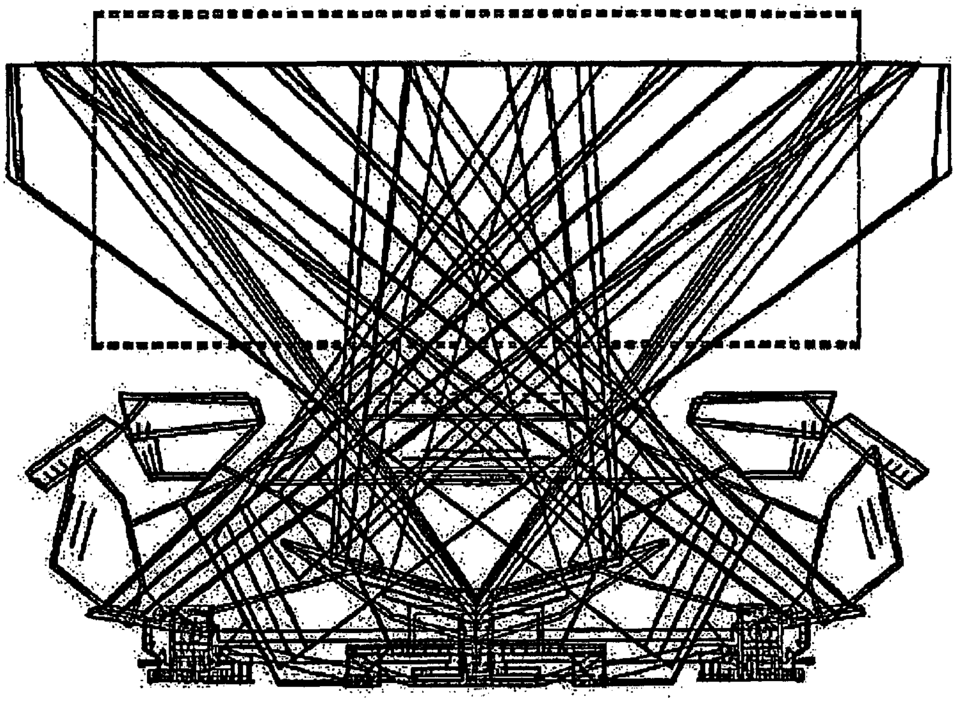
FIG. 5T3

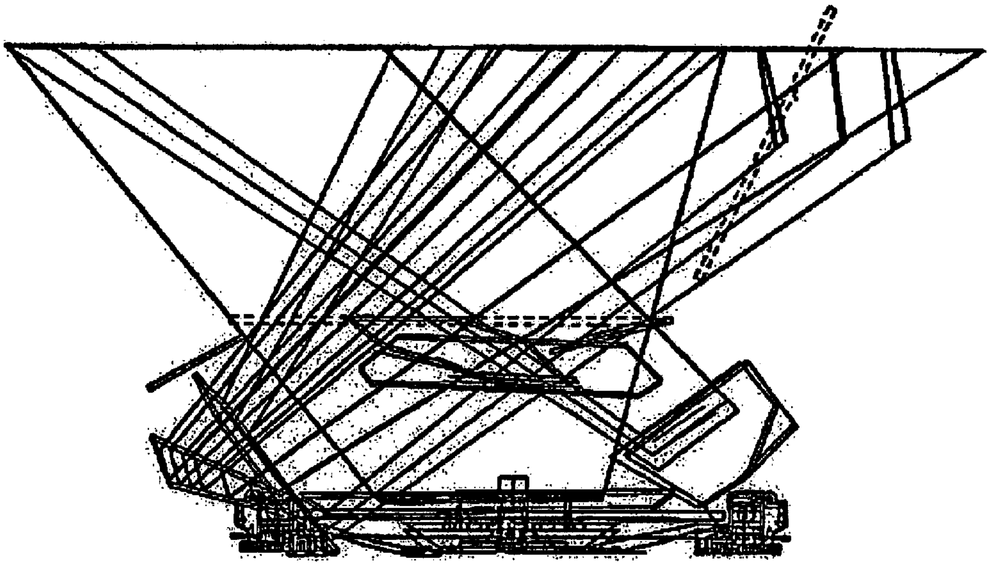
FIG. 5T4

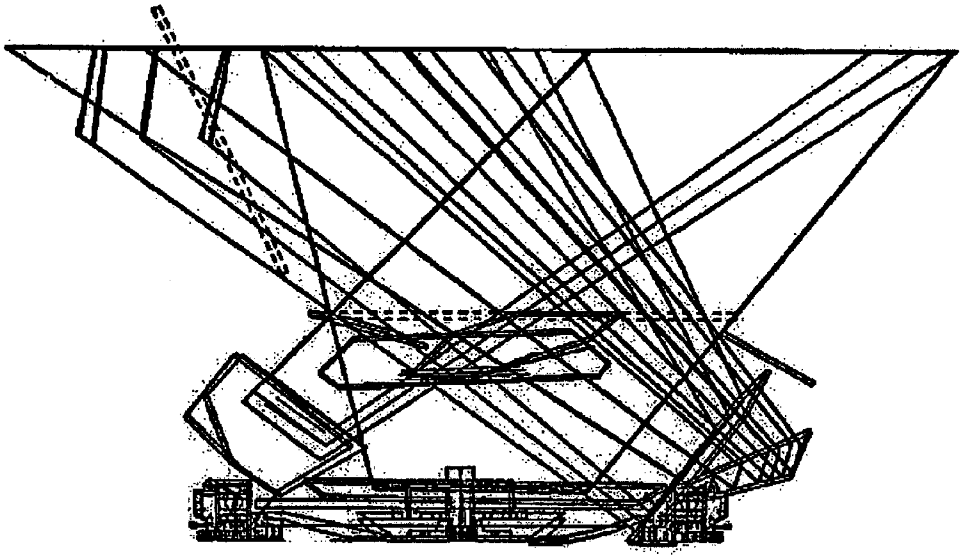
FIG. 5T5

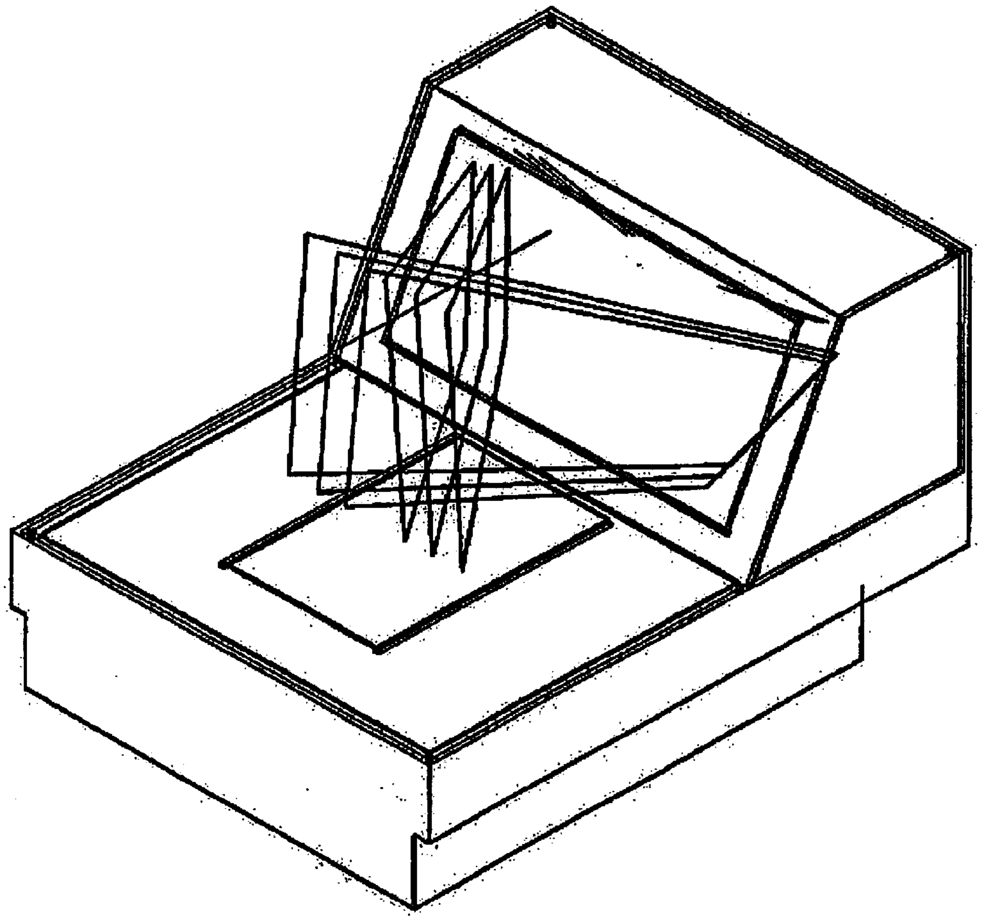
FIG. 5U1

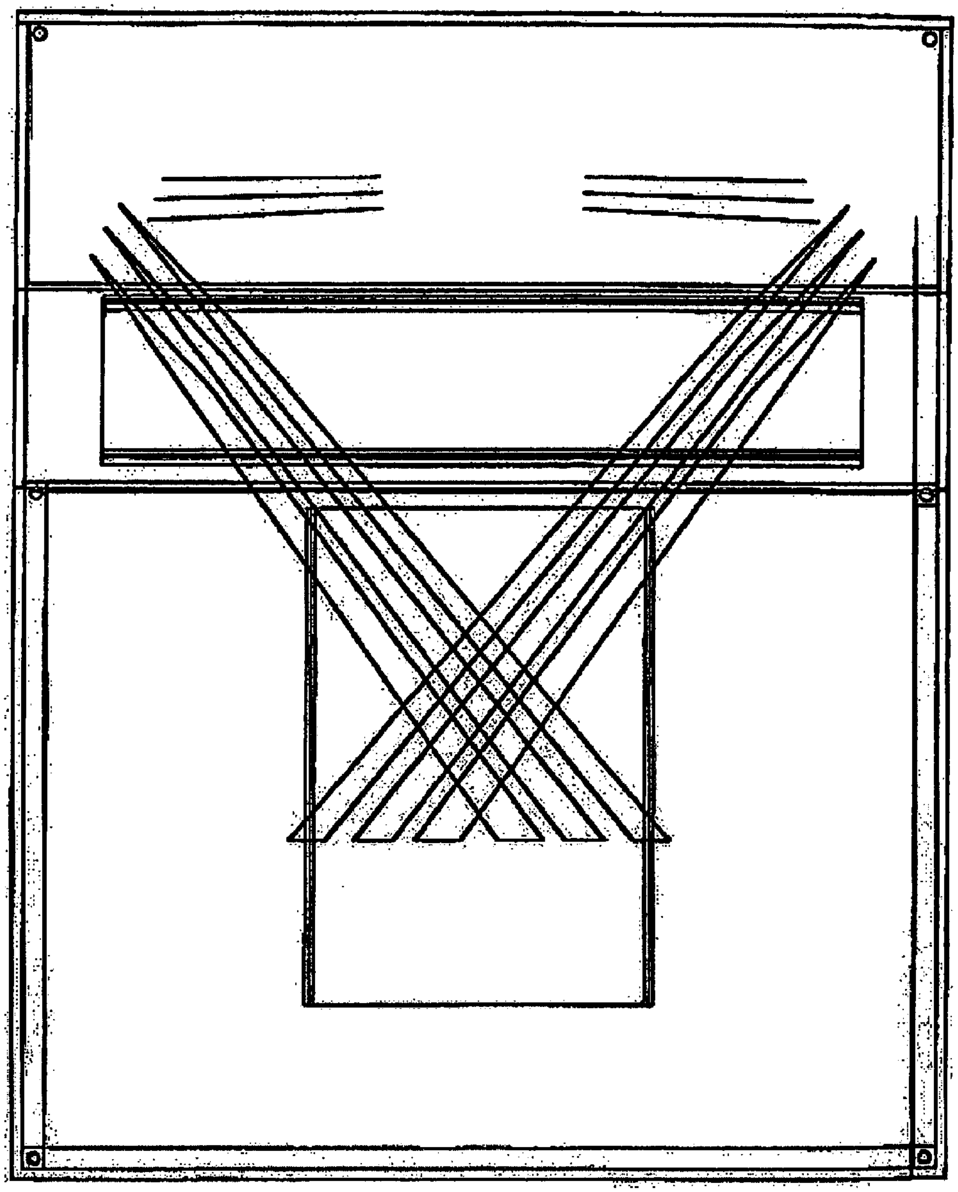
FIG. 5U2

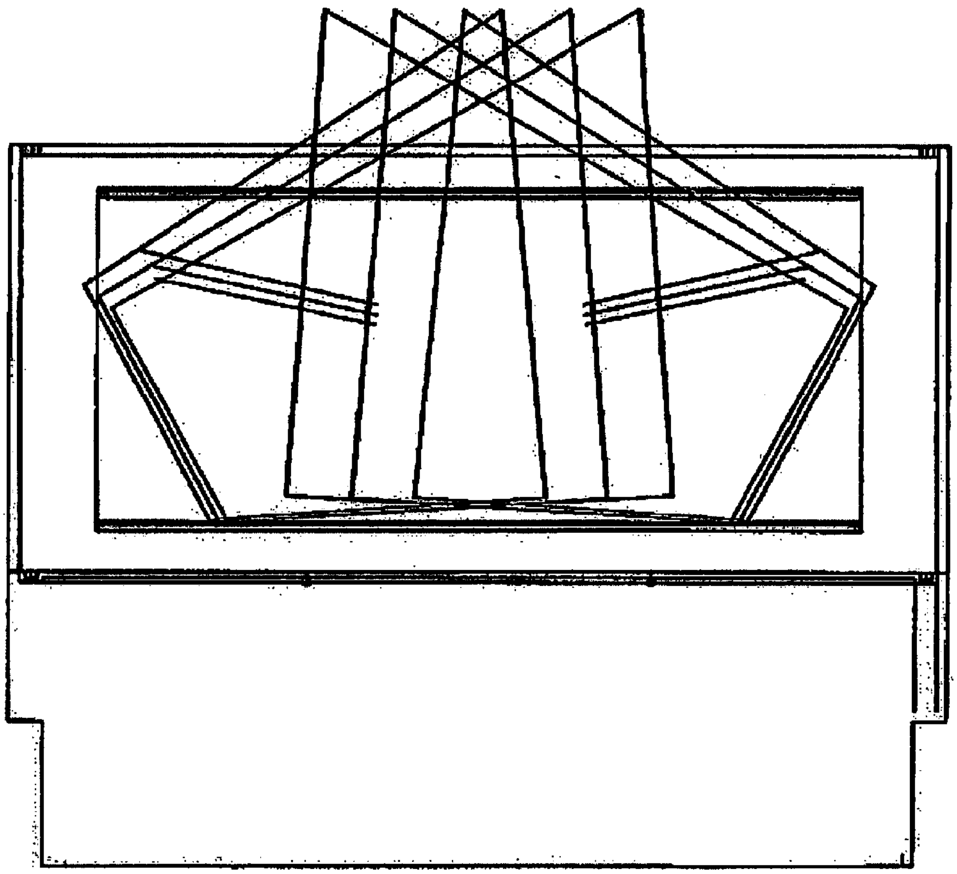
FIG. 5U3

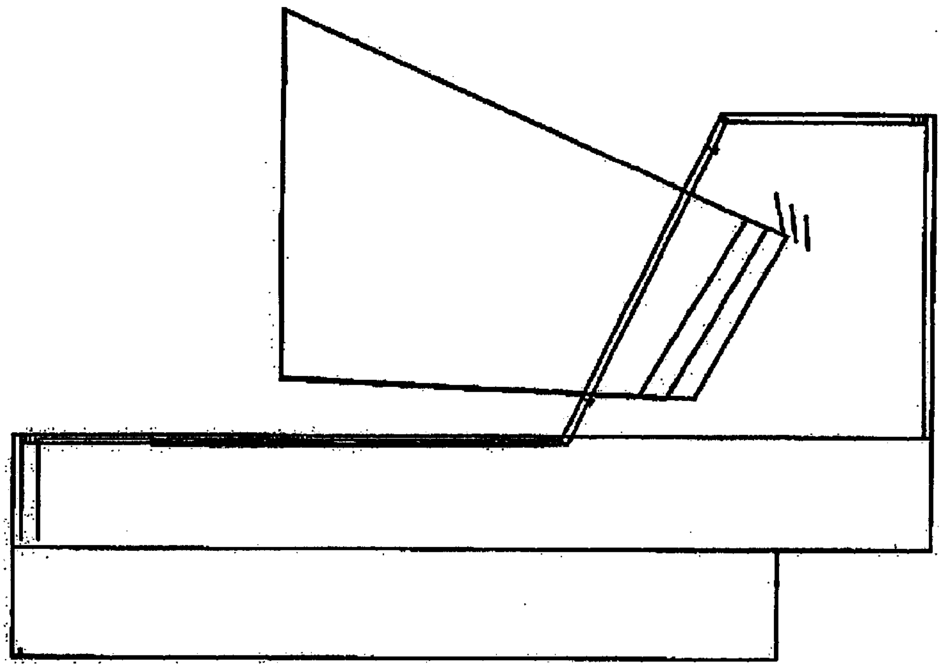
FIG. 5U4

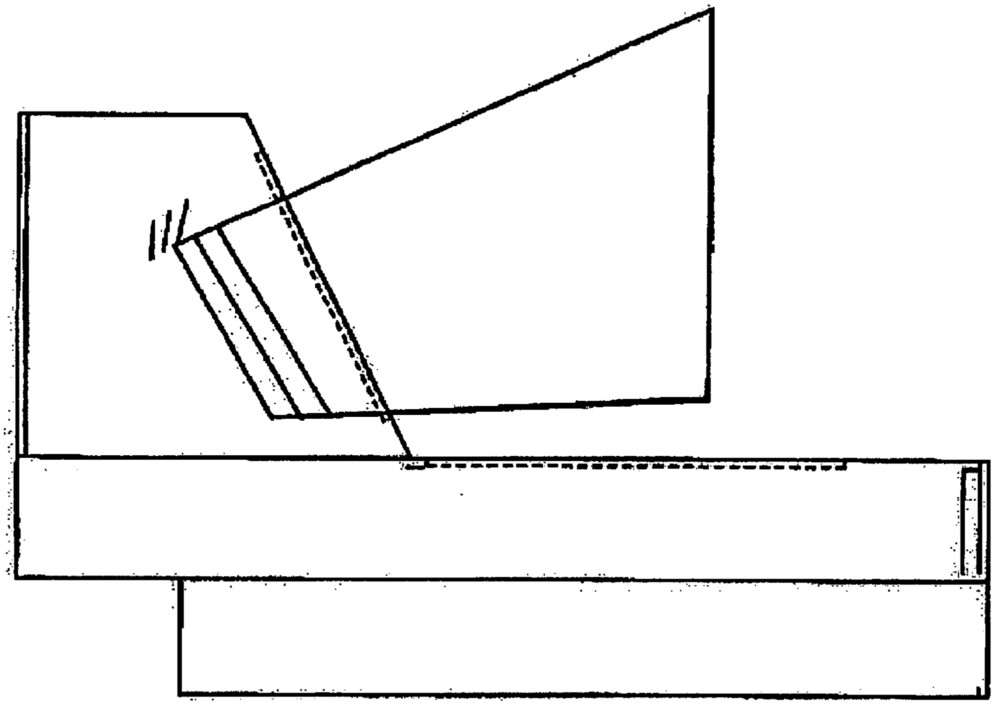
FIG. 5U5

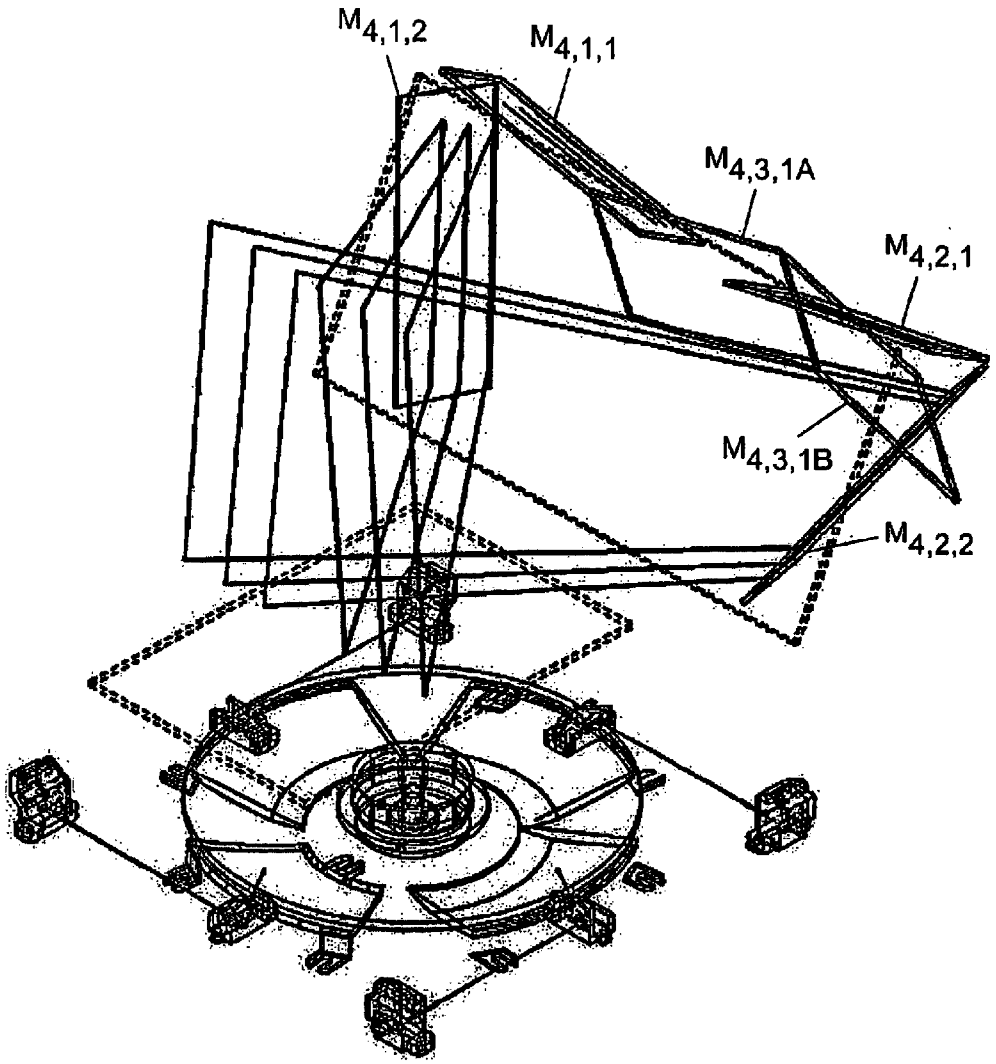
FIG. 5V1

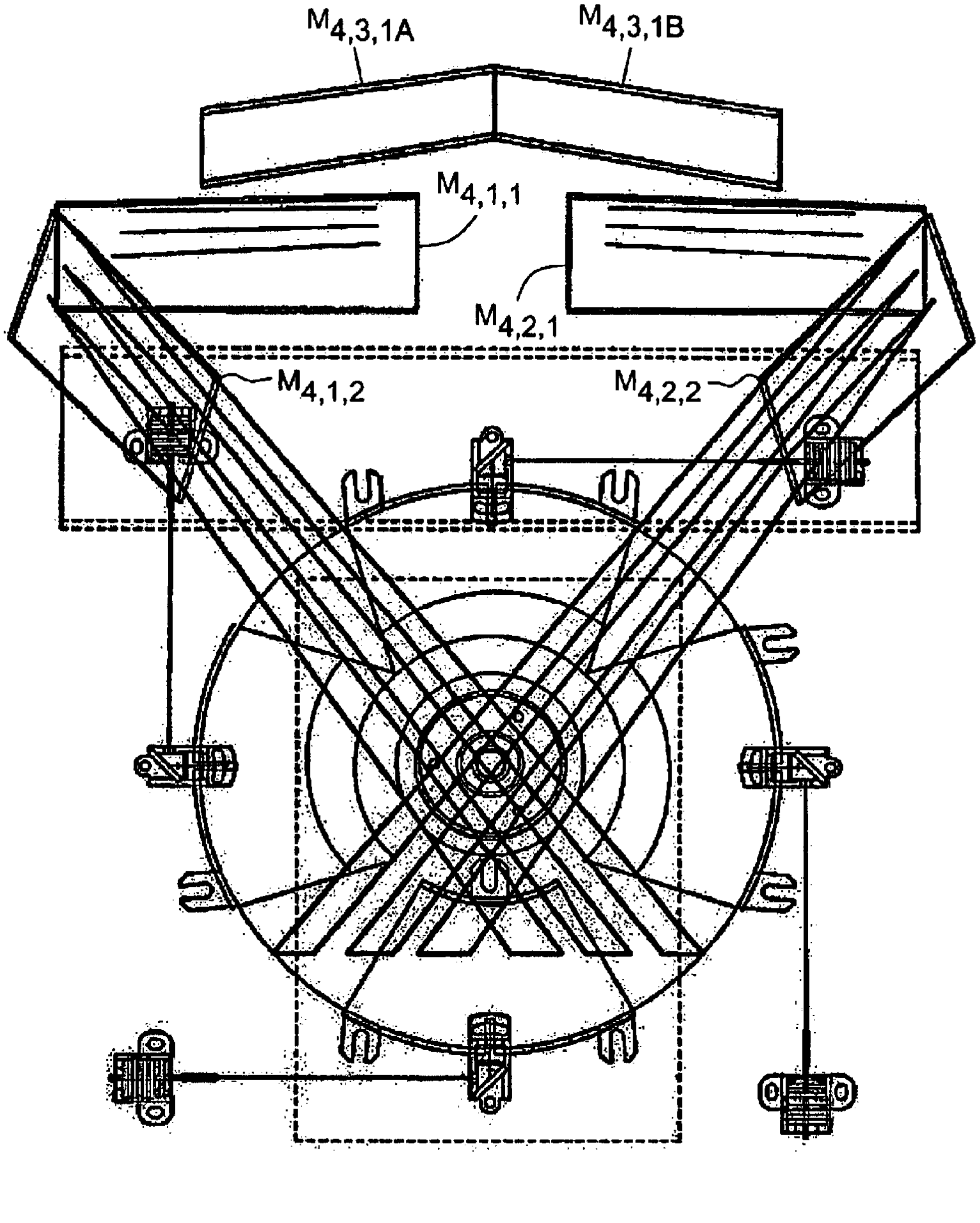
FIG. 5V2

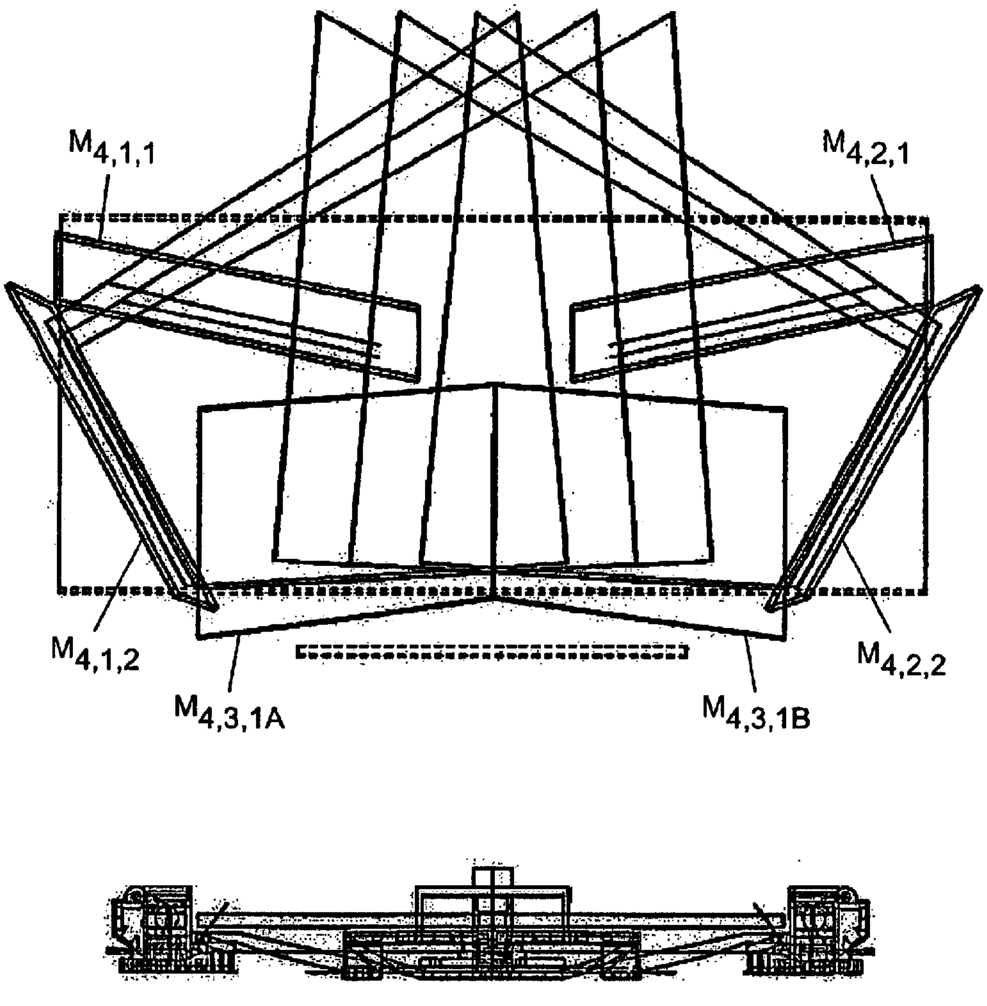
FIG. 5V3

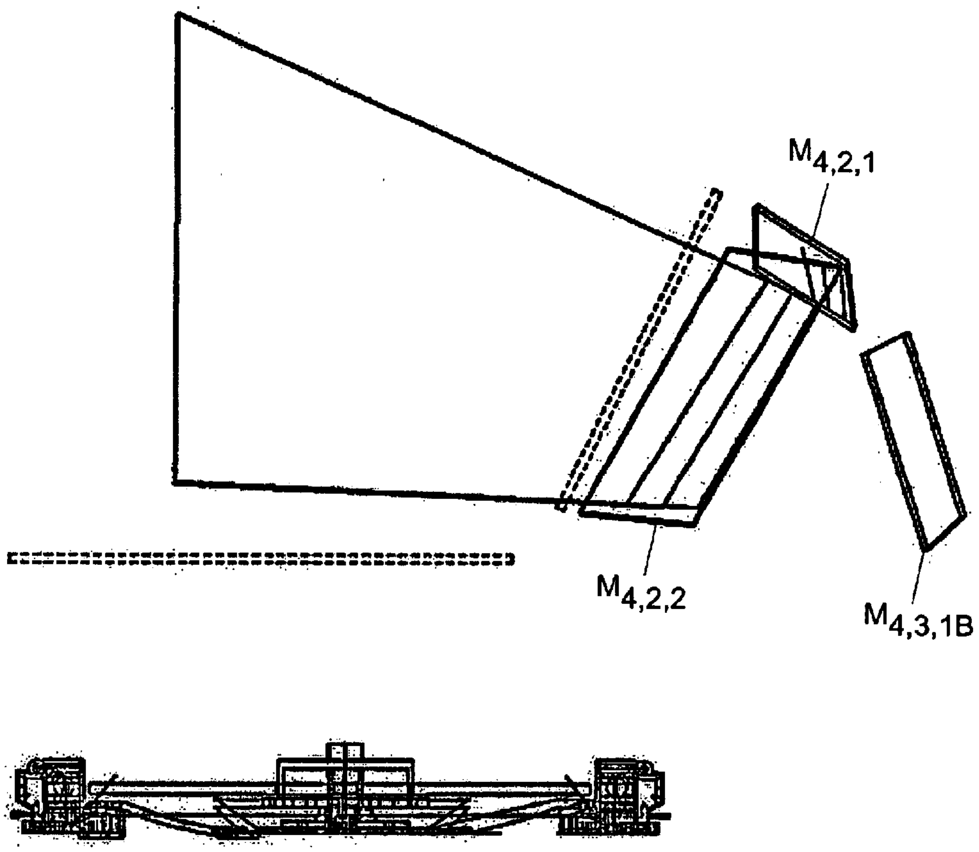
FIG. 5V4

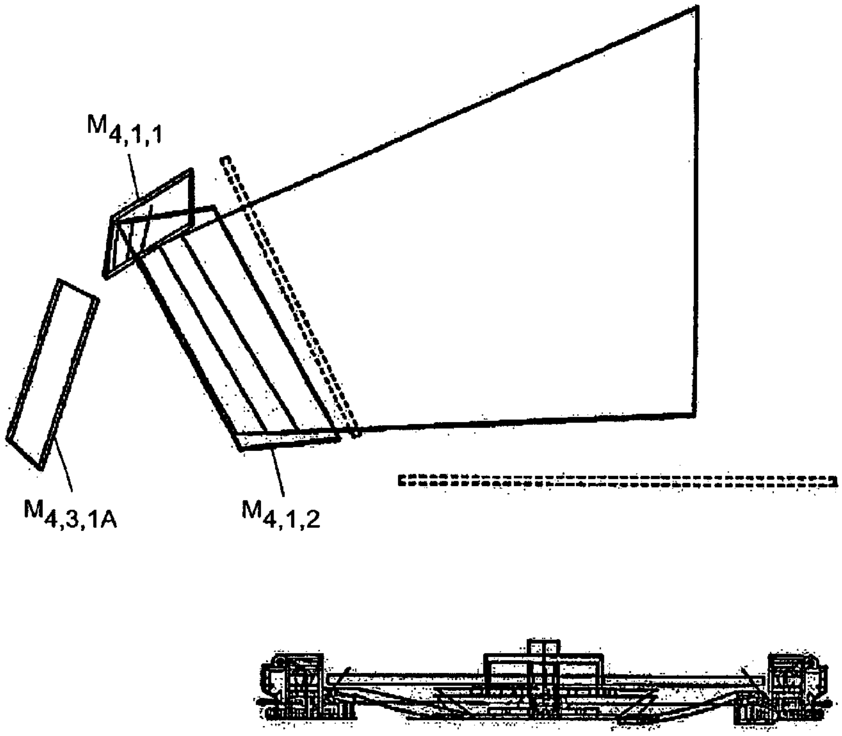
FIG. 5V5

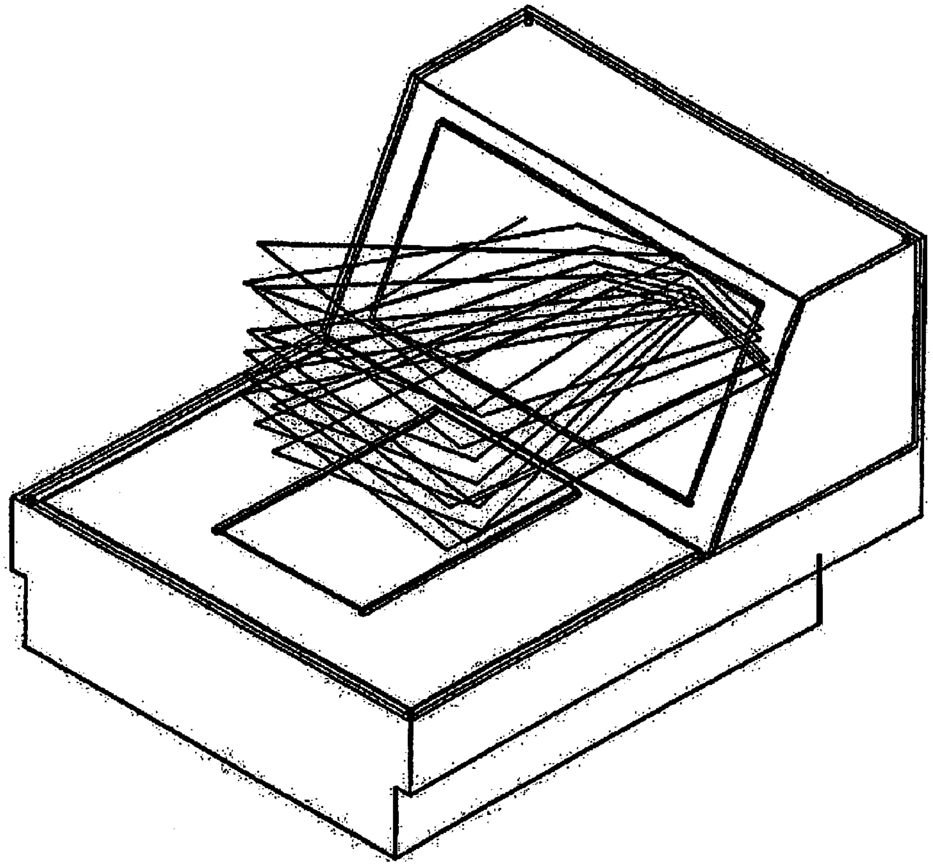
FIG. 5W1

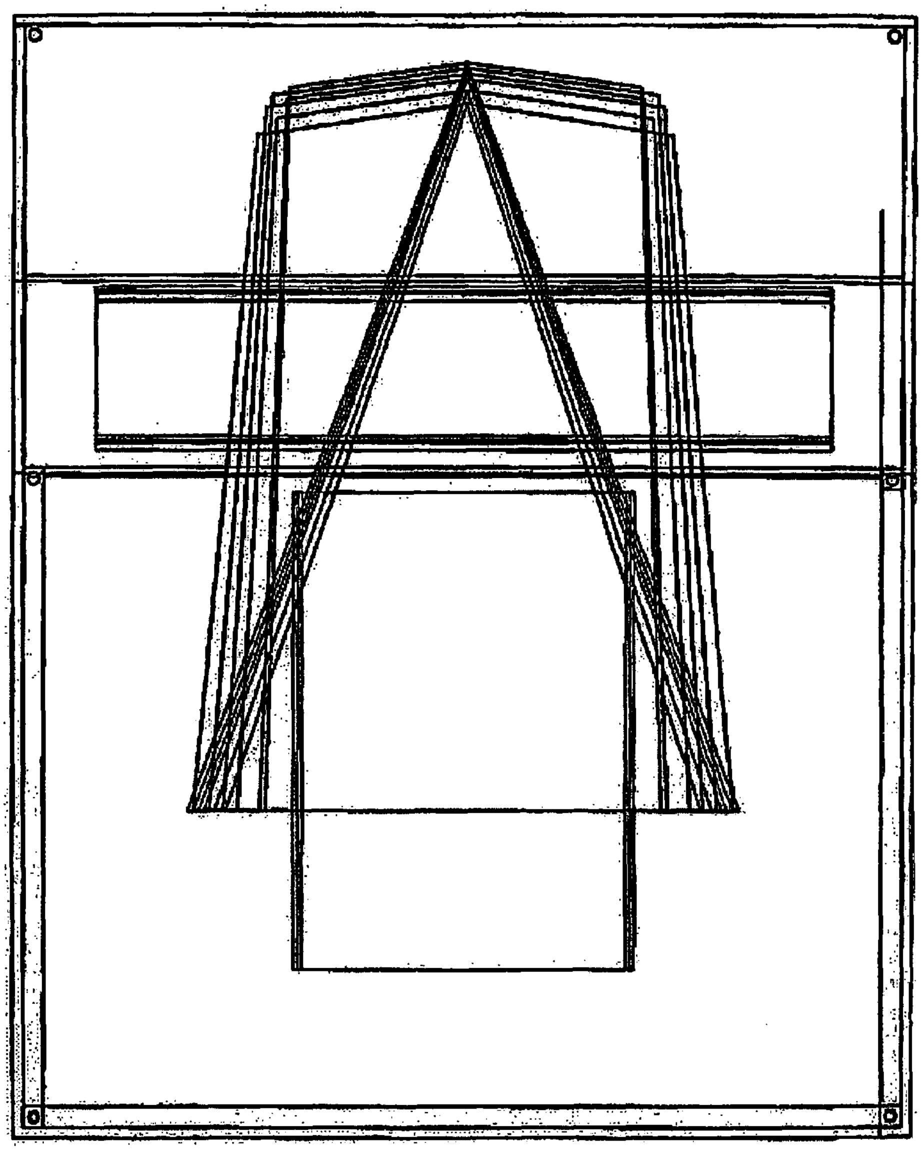
FIG. 5W2

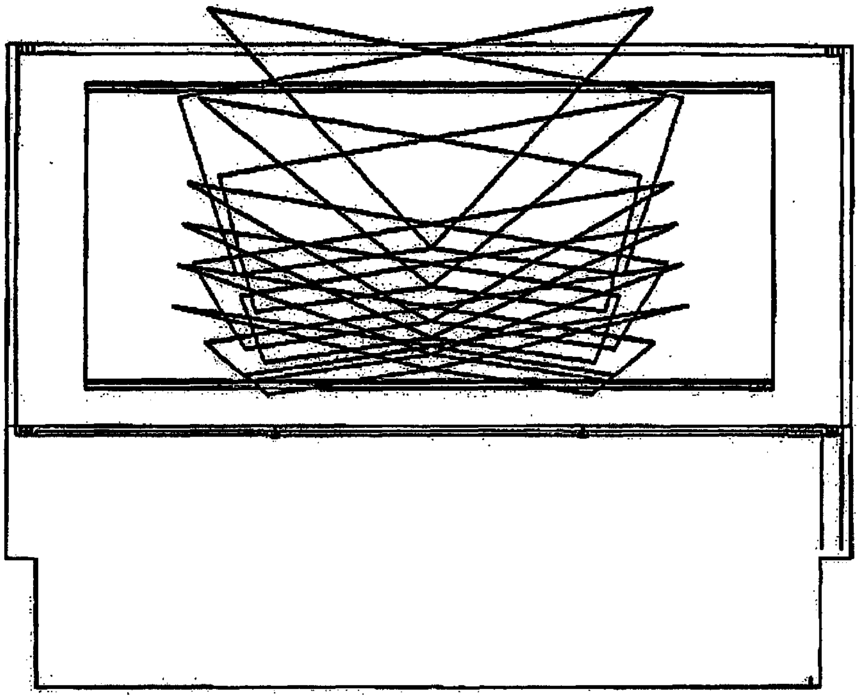
FIG. 5W3

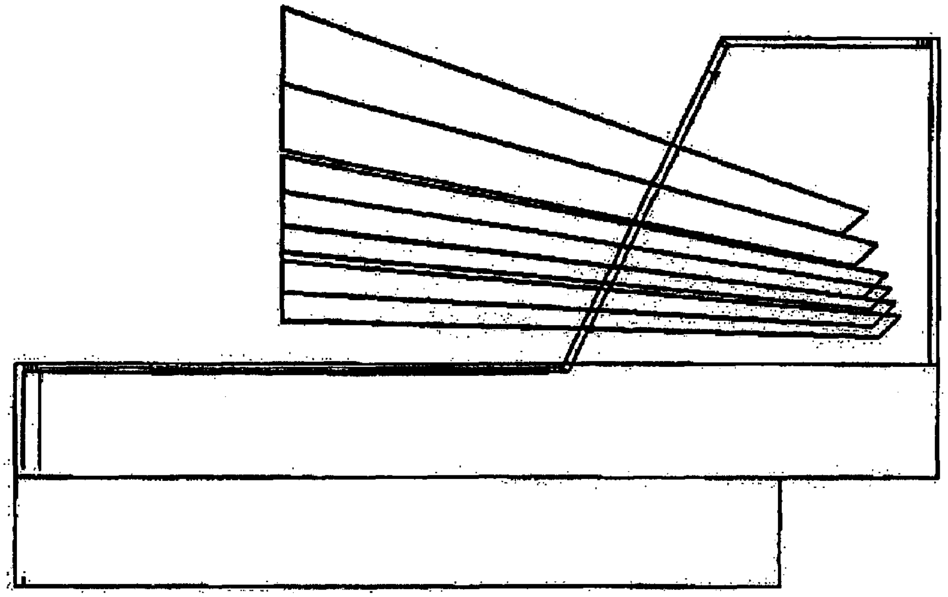
FIG. 5W4

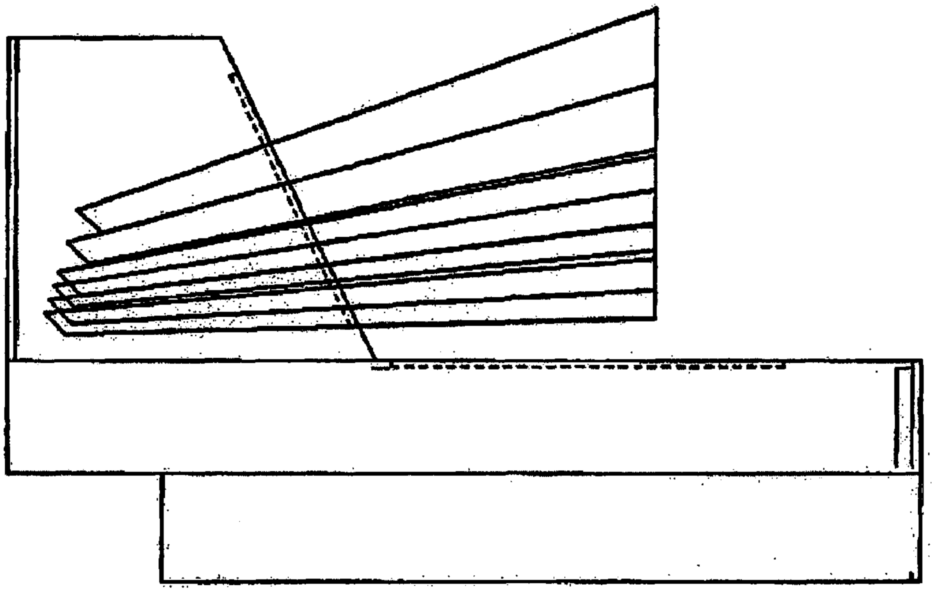
FIG. 5W5

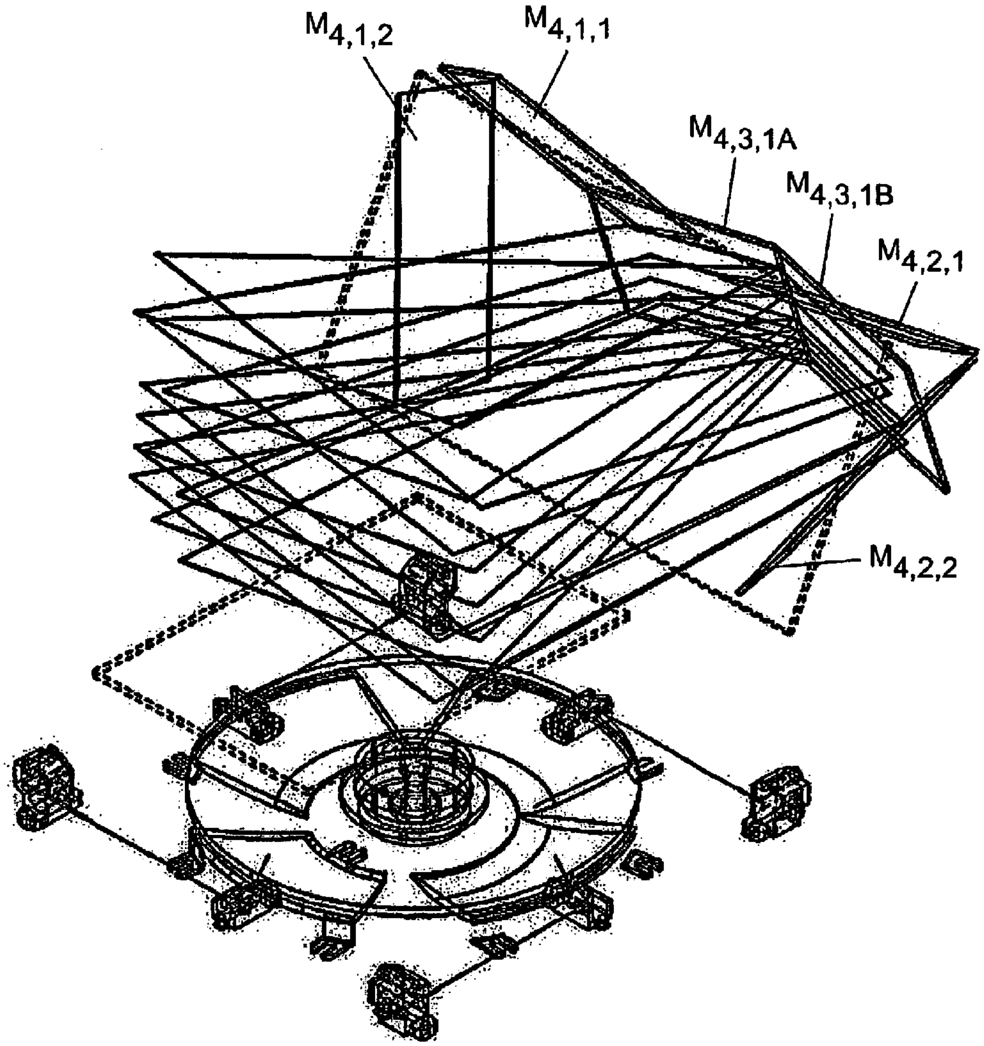
FIG. 5X1

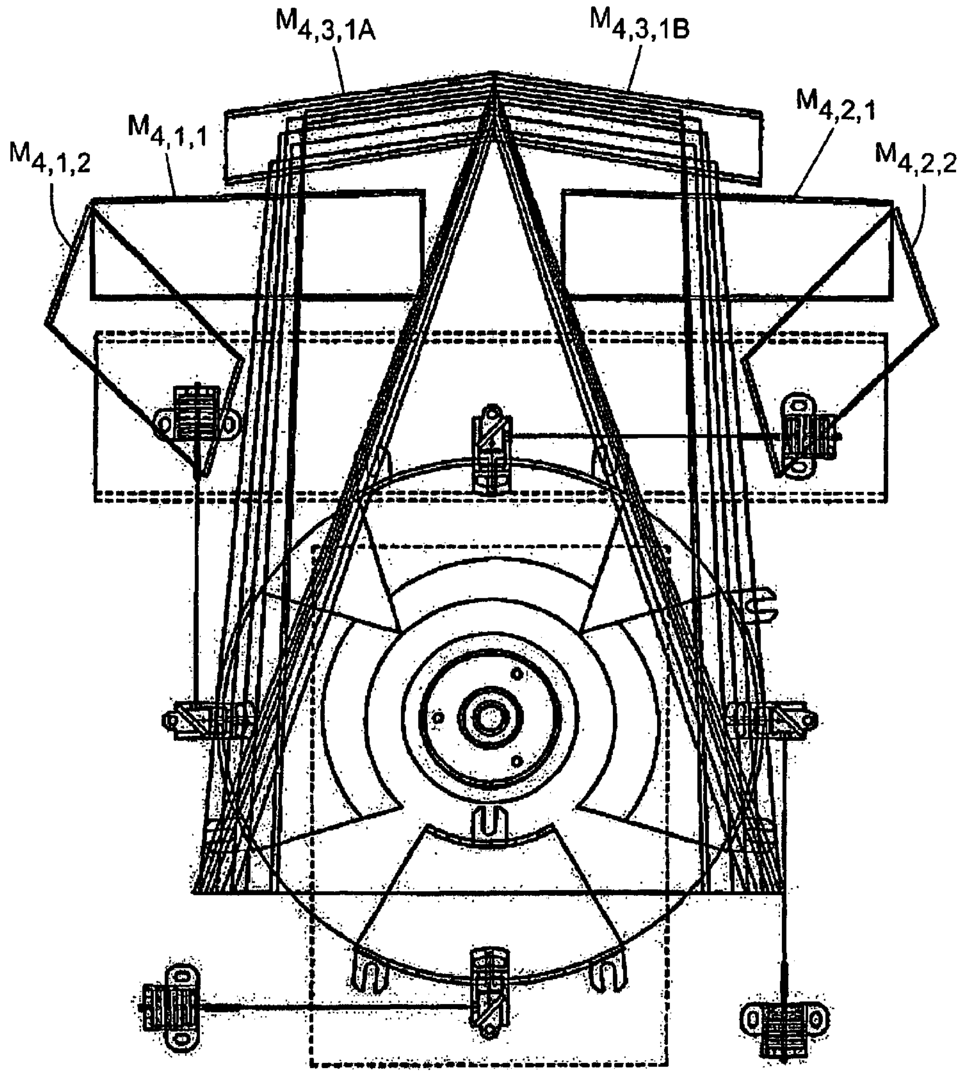
FIG. 5X2

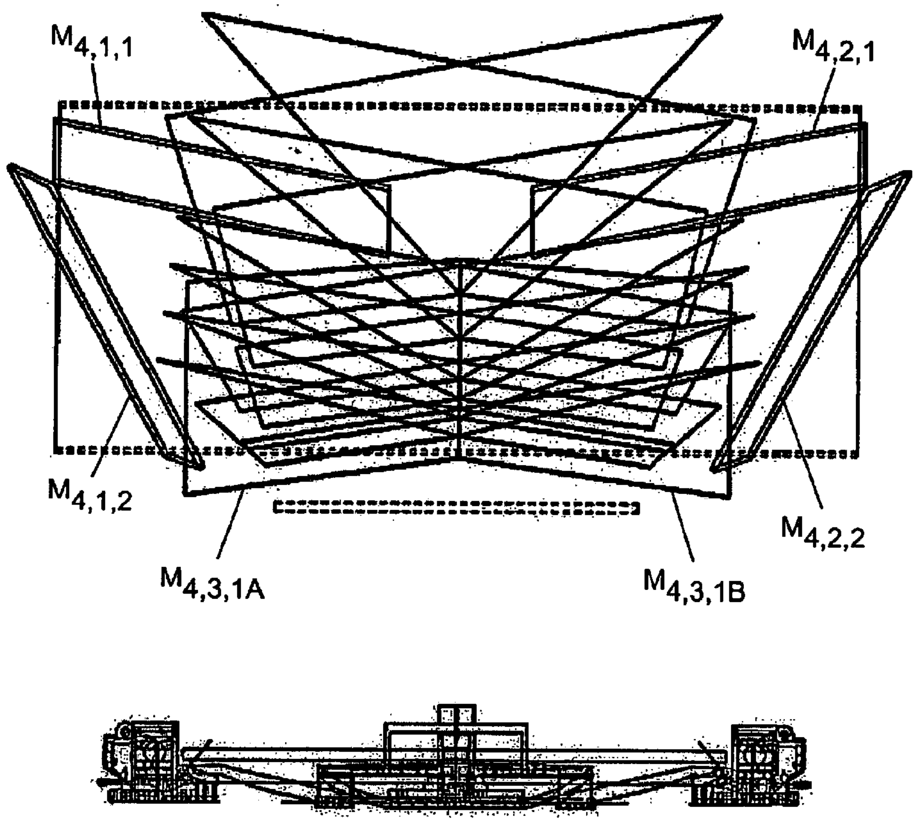
FIG. 5X3

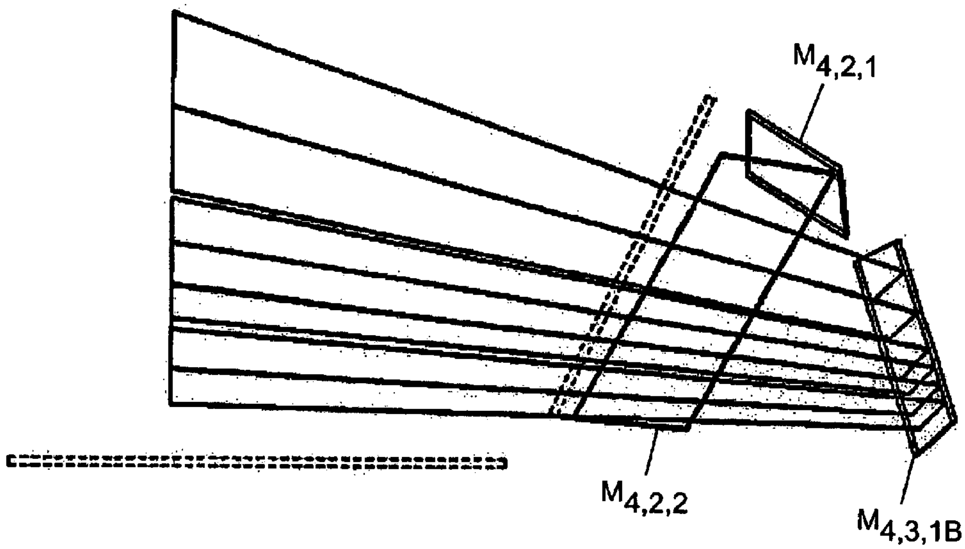
FIG. 5X4

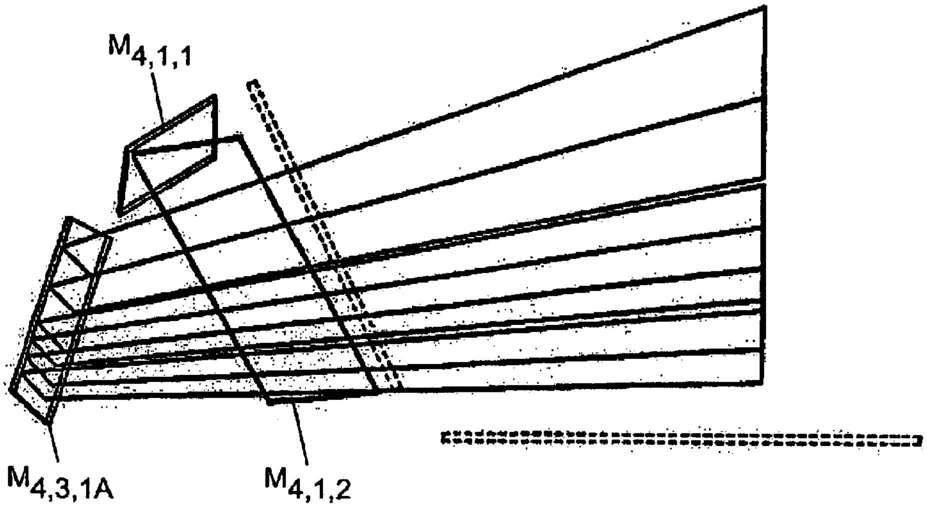
FIG. 5X5

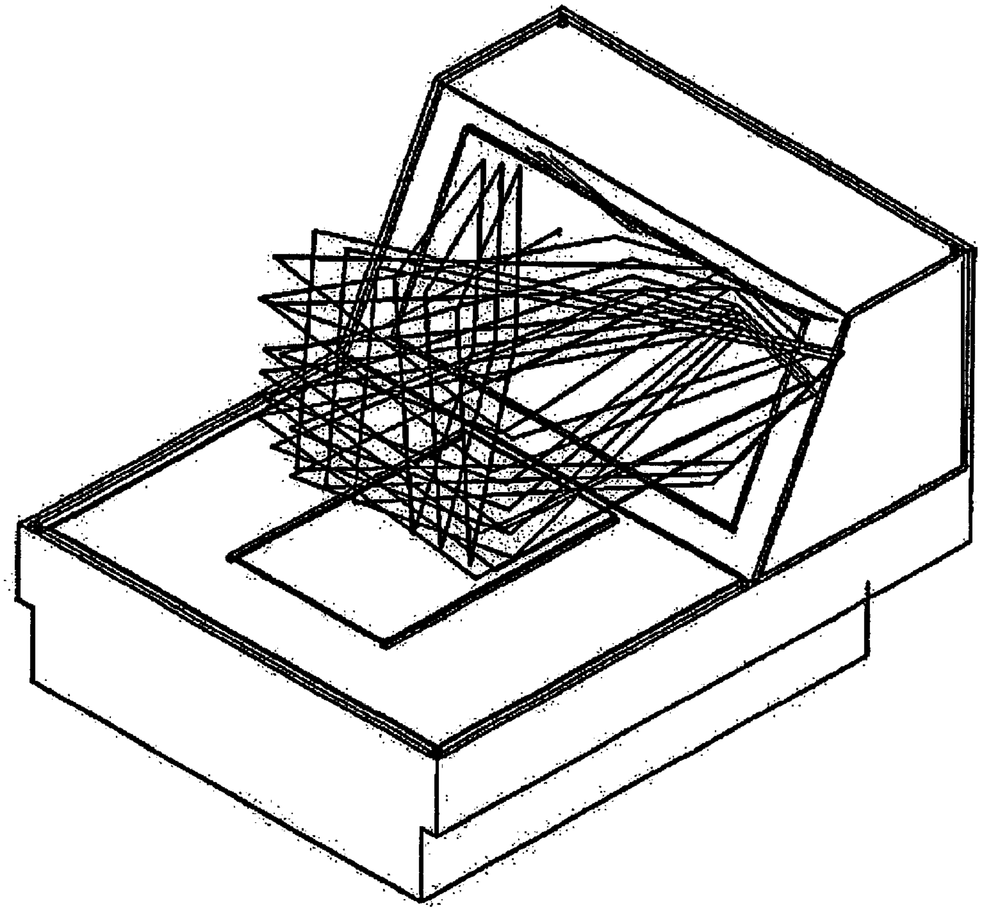
FIG. 5Y1

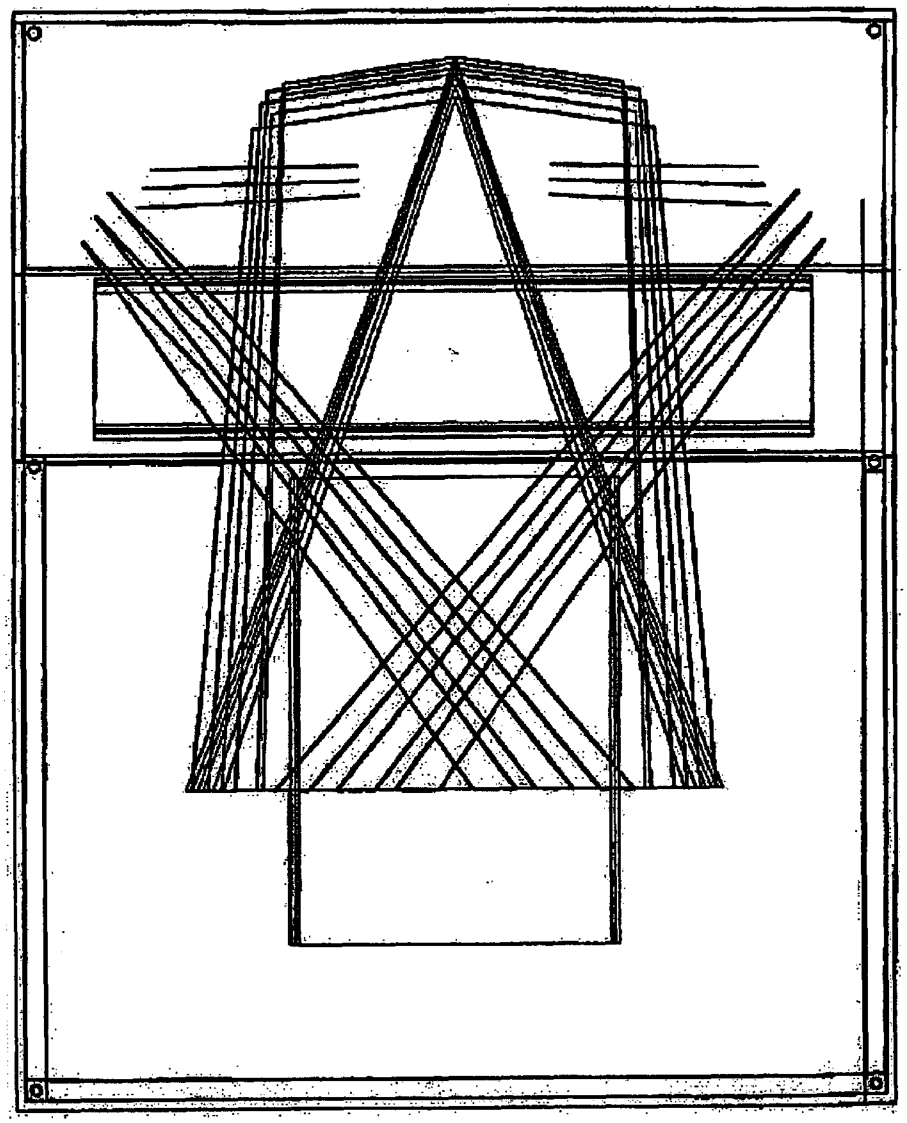
FIG. 5Y2

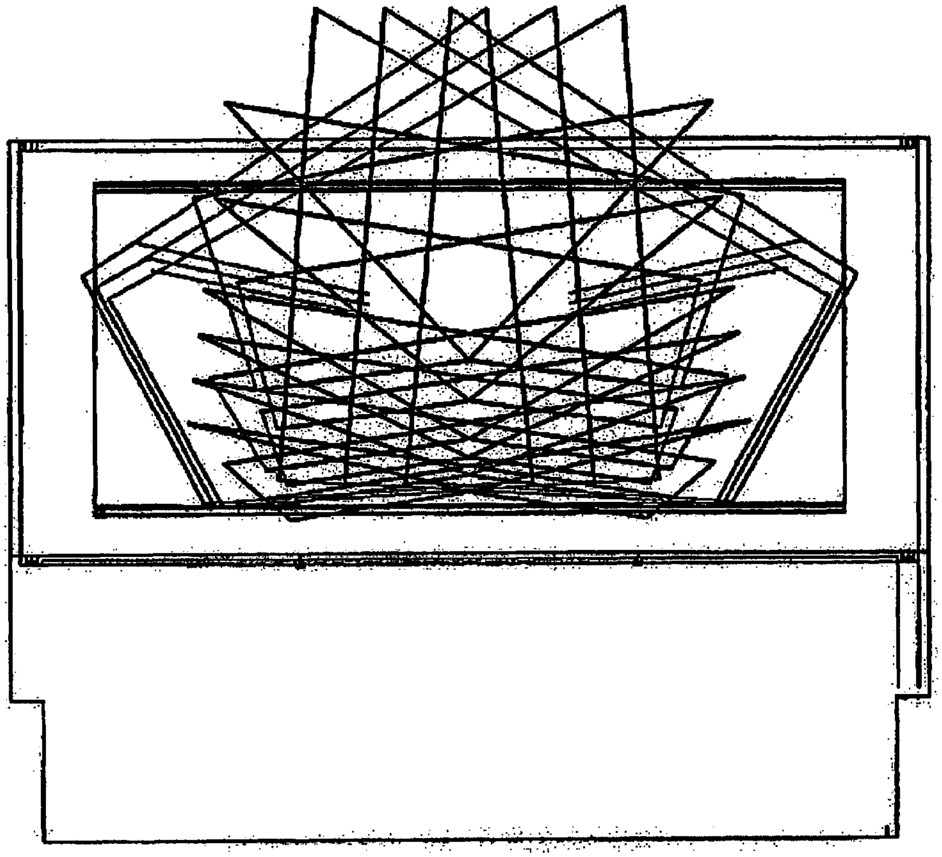
FIG. 5Y3

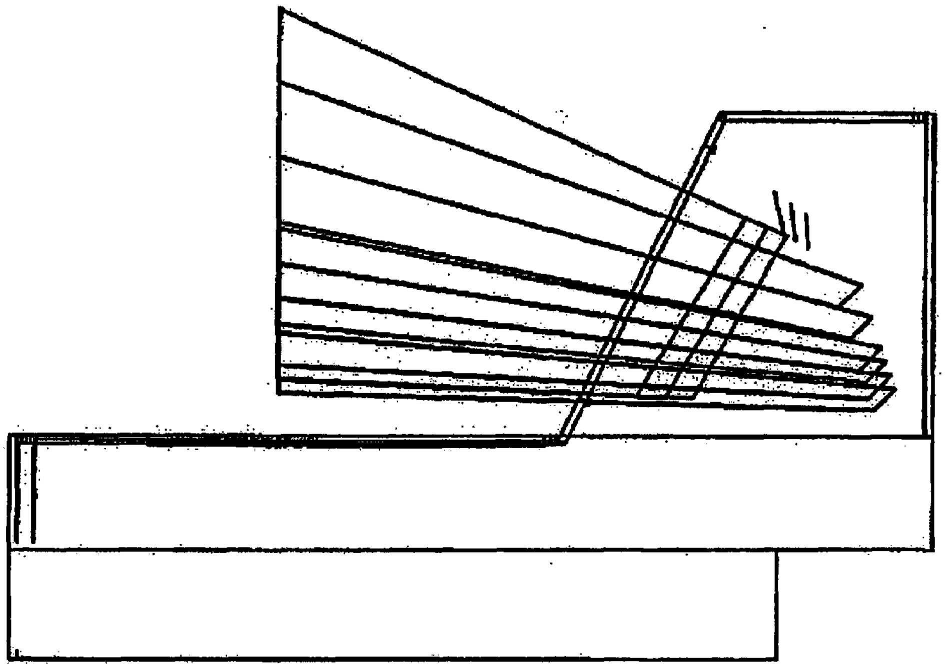
FIG. 5Y4

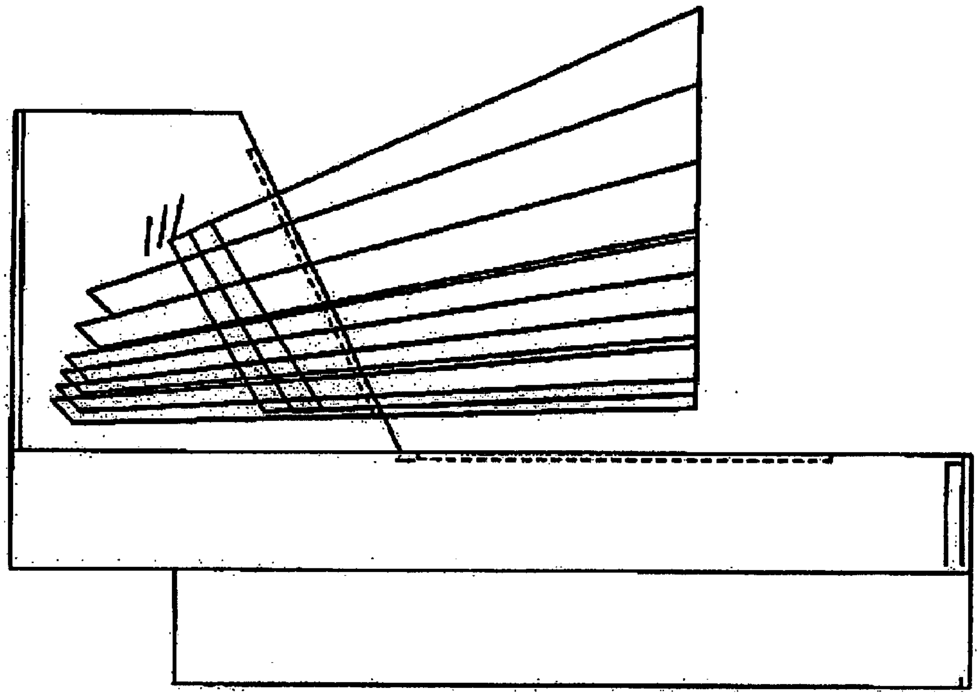
FIG. 5Y5

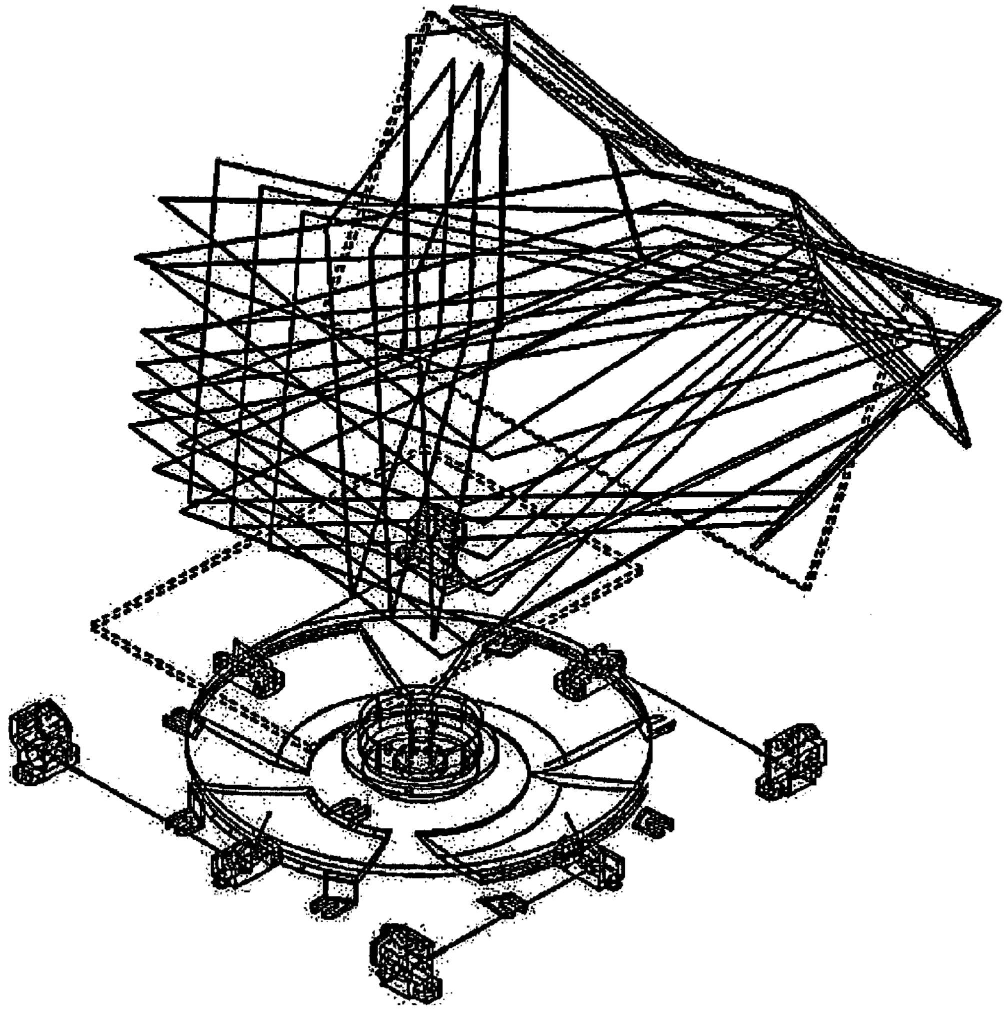
FIG. 5Z1

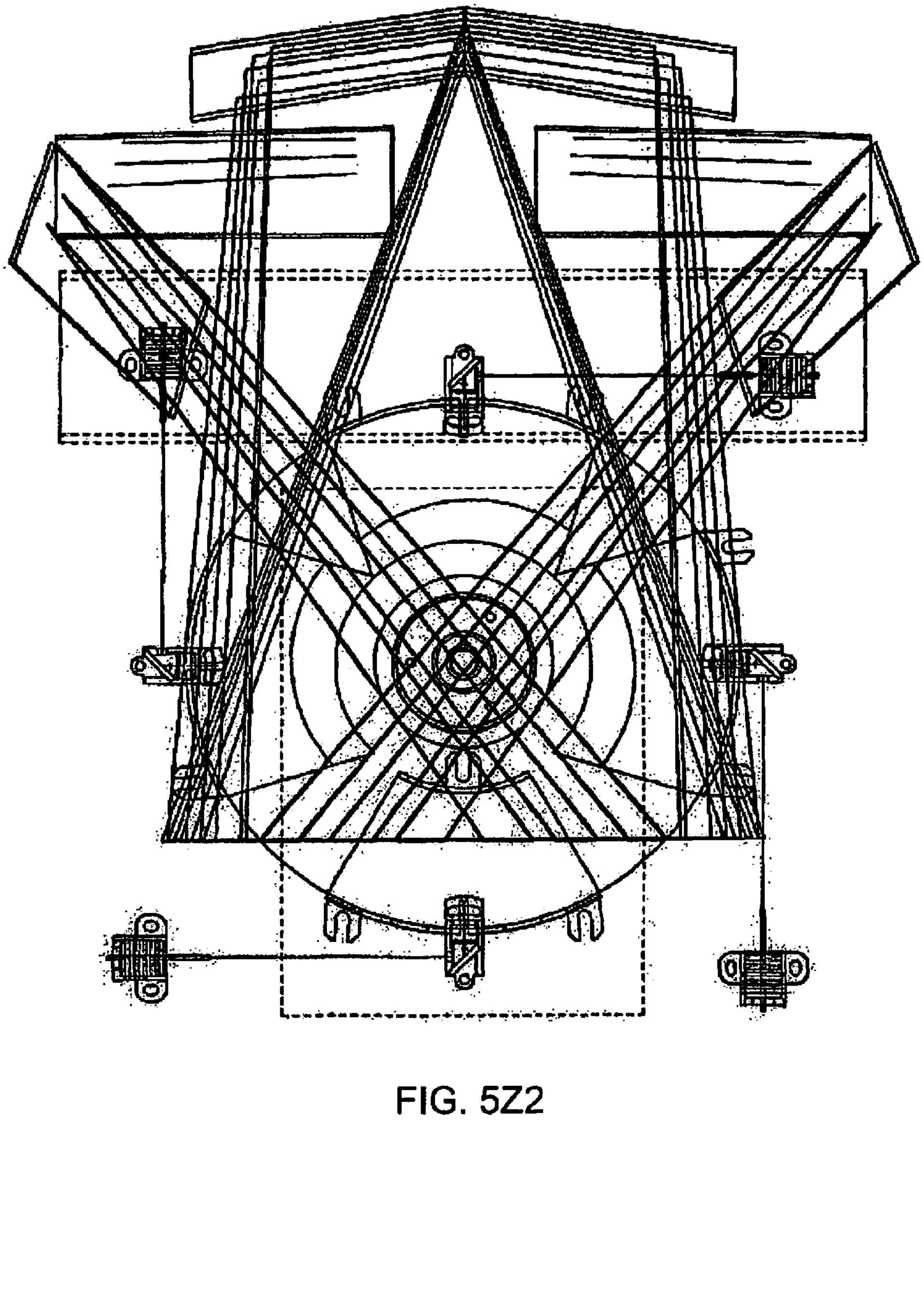
FIG. 5Z2

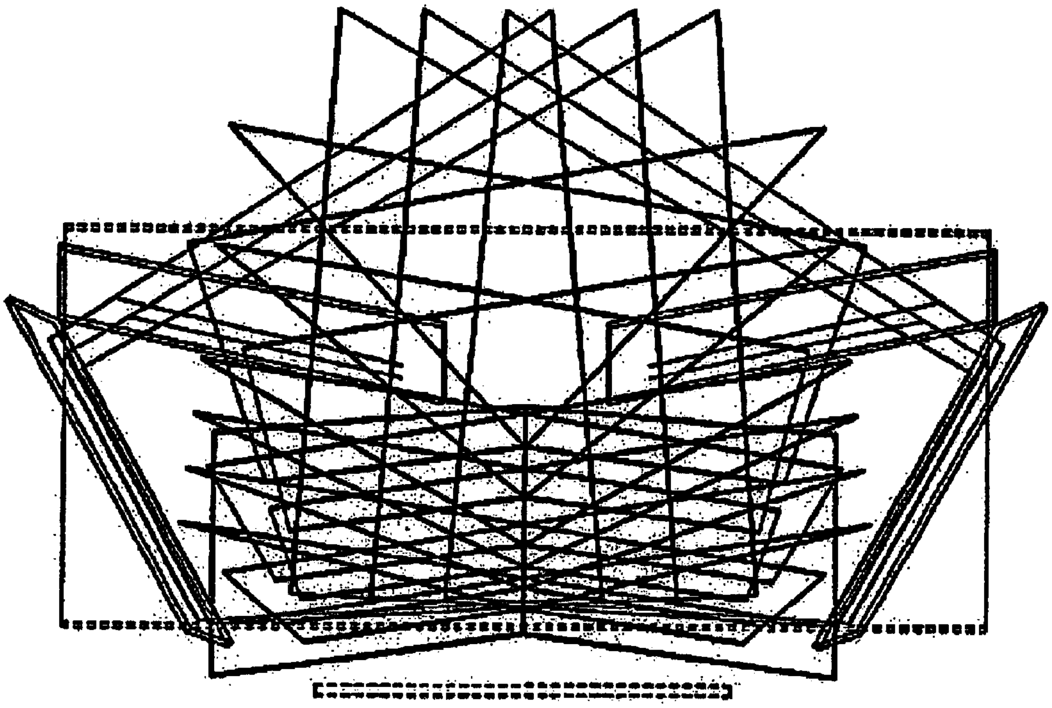
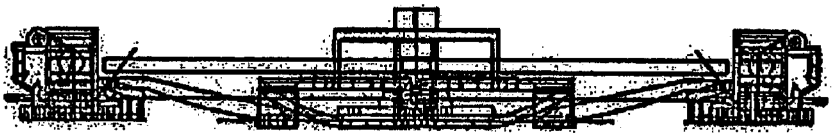
FIG. 5Z3

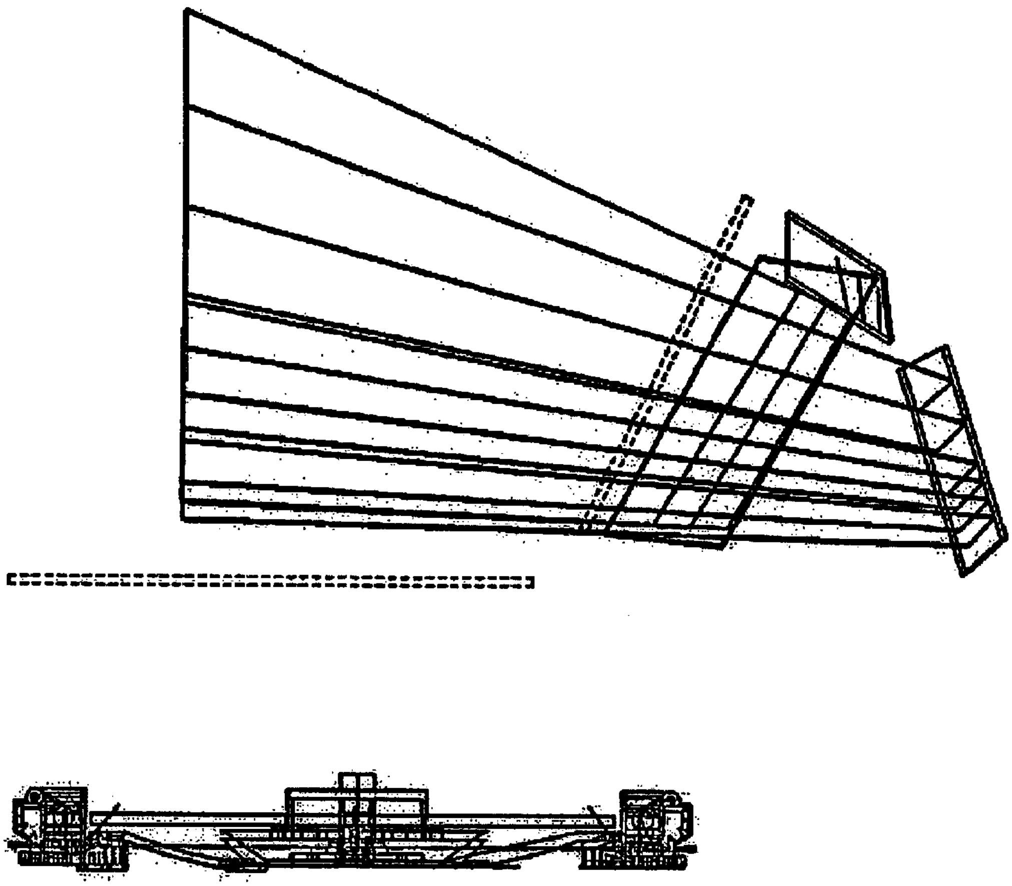
FIG. 5Z4

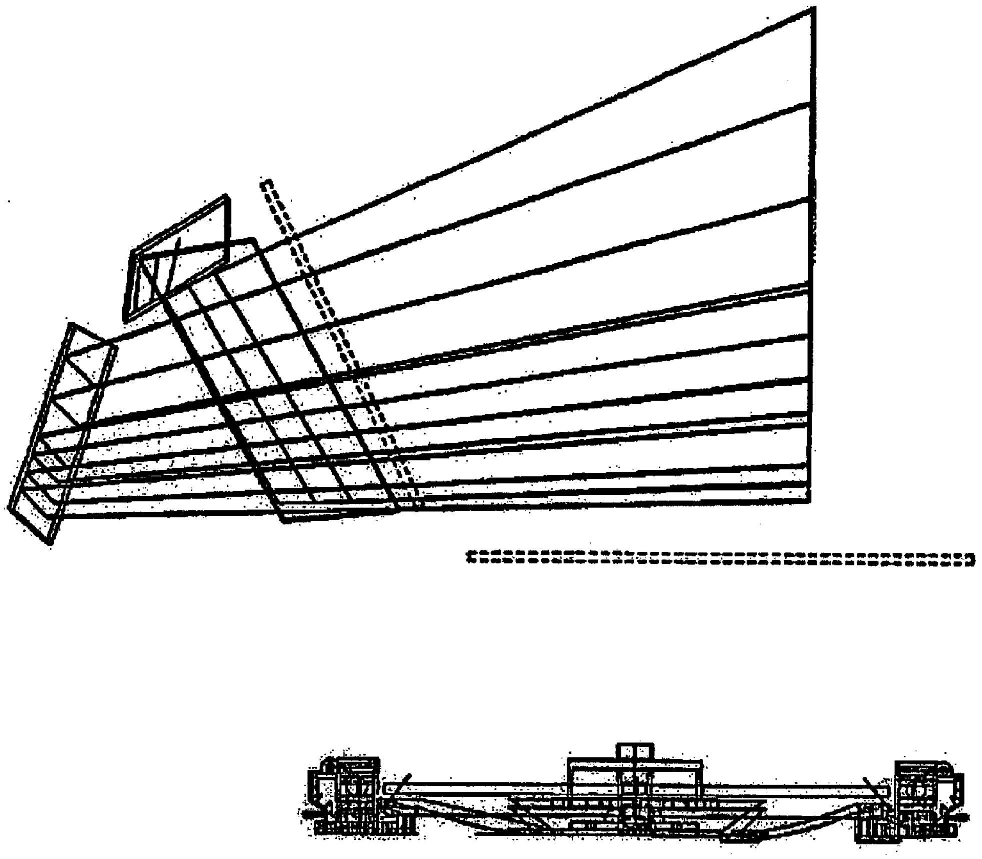
FIG. 5Z5

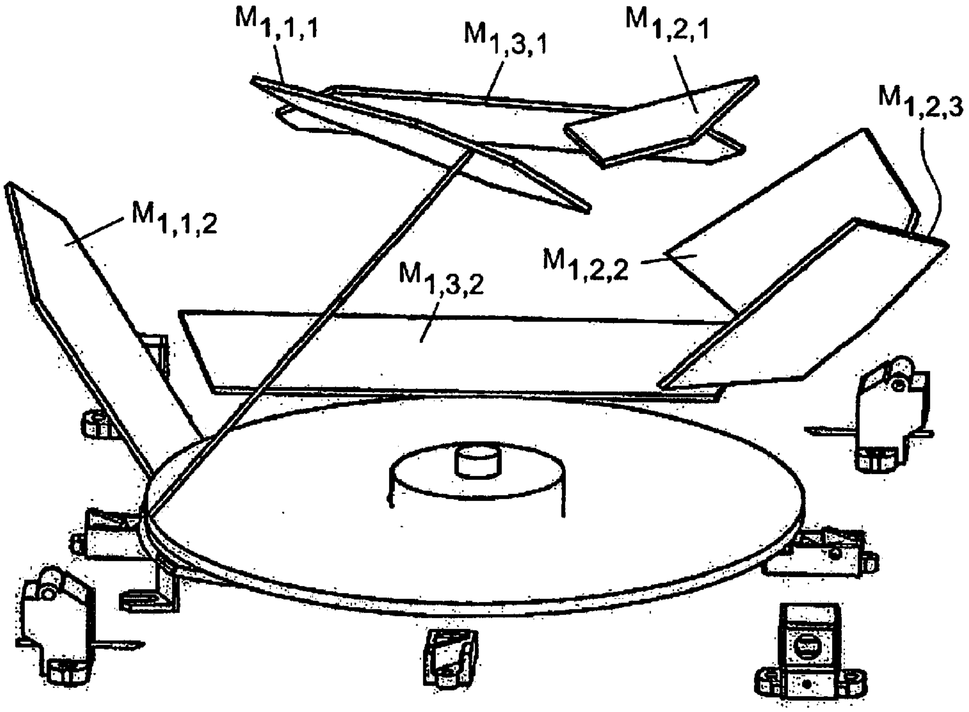
FIG. 6A1

| | N | O | P | Q | R | S | T | U | V | W | X |
|---|---|---|---|---|---|---|---|---|---|---|---|
| 1 | | | | | | | | | | | |
| 2 | | | | | | | | | | | |
| 3 | | | | | | | | | | | |
| 4 | Facet | 7 | | | | | | | | | |
| 5 | x | y | z | | | | | | | | |
| 6 | -0.616 | 0.000 | 0.788 | | | | | | | | |
| 7 | End | | | | Middle | | | | End | | |
| 8 | x | y | z | | x | y | z | | x | y | z |
| 9 | 0.419 | 0.416 | 0.807 | | 0.468 | 0.249 | 0.848 | | 0.494 | 0.048 | 0.868 |
| 10 | -0.253 | 0.917 | -0.310 | | -0.316 | 0.832 | -0.455 | | -0.387 | 0.704 | -0.596 |
| 11 | -0.469 | -0.414 | 0.781 | | -0.537 | -0.527 | 0.659 | | -0.603 | -0.626 | 0.494 |
| 12 | | | | | | | | | | | |
| 13 | | | | | | | | | | | |
| 14 | Mirror 1 Corners | | | | Mirror 2 Corners | | | | Mirror 3 Corners | | |
| 15 | x | y | z | | x | y | z | | x | y | z |
| 16 | 3.900 | 2.436 | 2.770 | | 1.700 | 4.102 | 1.300 | | | | |
| 17 | 4.100 | 1.879 | 2.400 | | 3.300 | 4.400 | 1.980 | | | | |
| 18 | 3.800 | 0.137 | 1.800 | | 3.400 | 3.990 | 1.500 | | | | |
| 19 | 3.150 | -0.737 | 1.800 | | 2.300 | 2.427 | -0.625 | | | | |
| 20 | 2.500 | -0.159 | 2.450 | | 1.700 | 2.524 | -0.625 | | | | |
| 21 | 2.650 | 0.757 | 2.770 | | 1.050 | 3.101 | -0.050 | | | | |
| 22 | | | | | | | | | | | |
| 23 | | | | | | | | | | | |
| 24 | | | | | | | | | | | |

FIG. 6A2

| | A | B | C | D | E | F | G | H | I | J | K | L |
|---|---|---|---|---|---|---|---|---|---|---|---|---|
| 1 | Station 1 | | | | | | | | | | | |
| 2 | | | | | | | | | | | | |
| 3 | | | | | | | | | | | | |
| 4 | High Elevation Left Skew | Facet | 9 | | | | | | | | | |
| 5 | (G2) | x | y | z | | | | | | | | |
| 6 | Vector from Module | -0.616 | 0.000 | 0.788 | | | | | | | | |
| 7 | | | End | | | | Middle | | | | End | |
| 8 | | x | y | z | | x | y | z | | x | y | z |
| 9 | Output Vectors From Disk | 0.378 | 0.445 | 0.812 | | 0.441 | 0.235 | 0.866 | | 0.464 | 0.068 | 0.883 |
| 10 | First Mirror Reflected Directions | -0.269 | 0.927 | -0.263 | | -0.349 | 0.823 | -0.448 | | -0.408 | 0.717 | -0.565 |
| 11 | Second Mirror Reflected Directions | -0.479 | -0.367 | 0.797 | | -0.566 | -0.512 | 0.647 | | -0.621 | -0.595 | 0.510 |
| 12 | Third Mirror Reflected Directions | | | | | | | | | | | |
| 13 | | | | | | | | | | | | |
| 14 | | | Mirror 1 Corners | | | | Mirror 2 Corners | | | | Mirror 3 Corners | |
| 15 | | x | y | z | | x | y | z | | x | y | z |
| 16 | 1 | 3.900 | 2.436 | 2.770 | | 1.700 | 4.102 | 1.300 | | | | |
| 17 | 2 | 4.100 | 1.879 | 2.400 | | 3.300 | 4.400 | 1.980 | | | | |
| 18 | 3 | 3.800 | 0.137 | 1.800 | | 3.400 | 3.990 | 1.500 | | | | |
| 19 | 4 | 3.150 | -0.737 | 1.800 | | 2.300 | 2.427 | -0.625 | | | | |
| 20 | 5 | 2.500 | -0.159 | 2.450 | | 1.700 | 2.524 | -0.625 | | | | |
| 21 | 6 | 2.650 | 0.757 | 2.770 | | 1.050 | 3.101 | -0.050 | | | | |
| 22 | 7 | | | | | | | | | | | |
| 23 | 8 | | | | | | | | | | | |

FIG. 6A3

| | Z | AA | AB | AC | AD | AE | AF | AG | AH | AI | AJ |
|---|---|---|---|---|---|---|---|---|---|---|---|
| 1 | | | | | | | | | | | |
| 2 | | | | | | | | | | | |
| 3 | | | | | | | | | | | |
| 4 | Facet | 11 | | | | | | | | | |
| 5 | x | y | z | | | | | | | | |
| 6 | -0.616 | 0.000 | 0.788 | | | | | | | | |
| 7 | End | | | | Middle | | | | End | | |
| 8 | x | y | z | | x | y | z | | x | y | z |
| 9 | 0.333 | 0.476 | 0.814 | | 0.415 | 0.220 | 0.883 | | 0.433 | 0.086 | 0.897 |
| 10 | -0.284 | 0.935 | -0.211 | | -0.382 | 0.813 | -0.440 | | -0.429 | 0.728 | -0.535 |
| 11 | -0.487 | -0.316 | 0.814 | | -0.594 | -0.496 | 0.633 | | -0.638 | -0.564 | 0.524 |
| 12 | | | | | | | | | | | |
| 13 | | | | | | | | | | | |
| 14 | Mirror 1 Corners | | | | Mirror 2 Corners | | | | Mirror 3 Corners | | |
| 15 | x | y | z | | x | y | z | | x | y | z |
| 16 | 3.900 | 2.436 | 2.770 | | 1.700 | 4.102 | 1.300 | | | | |
| 17 | 4.100 | 1.879 | 2.400 | | 3.300 | 4.400 | 1.980 | | | | |
| 18 | 3.800 | 0.137 | 1.800 | | 3.400 | 3.990 | 1.500 | | | | |
| 19 | 3.150 | -0.737 | 1.800 | | 2.300 | 2.427 | -0.625 | | | | |
| 20 | 2.500 | -0.159 | 2.450 | | 1.700 | 2.524 | -0.625 | | | | |
| 21 | 2.650 | 0.757 | 2.770 | | 1.050 | 3.101 | -0.050 | | | | |
| 22 | | | | | | | | | | | |
| 23 | | | | | | | | | | | |
| 24 | | | | | | | | | | | |

FIG. 6A4

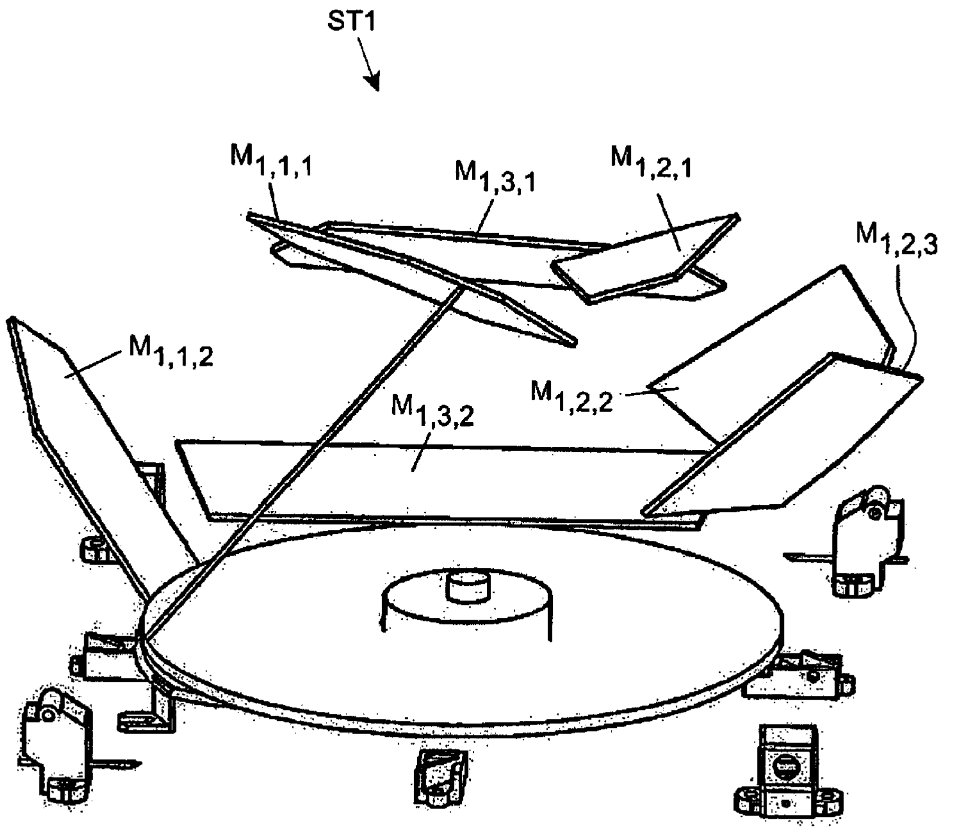
FIG. 6B1

| | N | O | P | Q | R | S | T | U | V | W | X |
|---|---|---|---|---|---|---|---|---|---|---|---|
| 25 | Facet | 8 | | | | | | | | | |
| 26 | x | y | z | | | | | | | | |
| 27 | -0.616 | 0.000 | 0.788 | | | | | | | | |
| 28 | | End | | | | Middle | | | | End | |
| 29 | x | y | z | | x | y | z | | x | y | z |
| 30 | 0.468 | -0.249 | 0.848 | | 0.468 | -0.249 | 0.848 | | 0.430 | -0.387 | 0.816 |
| 31 | 0.408 | -0.675 | -0.614 | | 0.408 | -0.675 | -0.614 | | 0.375 | -0.774 | -0.510 |
| 32 | -0.999 | 0.012 | -0.034 | | -0.999 | 0.012 | -0.034 | | -0.993 | -0.106 | 0.054 |
| 33 | -0.616 | 0.531 | 0.582 | | -0.616 | 0.531 | 0.582 | | -0.605 | 0.419 | 0.677 |
| 34 | | | | | | | | | | | |
| 35 | | | | | | | | | | | |
| 36 | | | | | | | | | | | |
| 37 | | | | | | | | | | | |
| 38 | | | | | | | | | | | |
| 39 | | | | | | | | | | | |
| 40 | | | | | | | | | | | |
| 41 | | | | | | | | | | | |
| 42 | | | | | | | | | | | |
| 43 | | | | | | | | | | | |
| 44 | | | | | | | | | | | |
| 45 | | | | | | | | | | | |

FIG. 6B2

| | A | B | C | D | E | F | G | H | I | J | K | L |
|---|---|---|---|---|---|---|---|---|---|---|---|---|
| 25 | High Elevation Right Skew | Facet | 10 | | | | | | | | | |
| 26 | (G1) | x | y | z | | | | | | | | |
| 27 | Vector from Module | -0.616 | 0.000 | 0.788 | | | | | | | | |
| 28 | | End | | | | Middle | | | | End | | |
| 29 | | x | y | z | | x | y | z | | x | y | z |
| 30 | Output Vectors From Disk | 0.441 | -0.235 | 0.866 | | 0.441 | -0.235 | 0.866 | | 0.398 | -0.391 | 0.830 |
| 31 | First Mirror Reflected Directions | 0.380 | -0.673 | -0.635 | | 0.380 | -0.673 | -0.635 | | 0.343 | -0.784 | -0.517 |
| 32 | Second Mirror Reflected Directions | -0.998 | 0.000 | -0.067 | | -0.998 | 0.000 | -0.067 | | -0.991 | -0.133 | 0.033 |
| 33 | Third Mirror Reflected Directions | -0.589 | 0.553 | 0.589 | | -0.589 | 0.553 | 0.589 | | -0.578 | 0.426 | 0.697 |
| 34 | | | | | | | | | | | | |
| 35 | | Mirror 1 Corners | | | | Mirror 2 Corners | | | | Mirror 3 Corners | | |
| 36 | | x | y | z | | x | y | z | | x | y | z |
| 37 | 1 | 2.550 | -1.630 | 2.650 | | 4.000 | -2.630 | 0.049 | | 3.746 | -3.750 | 1.000 |
| 38 | 2 | 4.150 | -2.267 | 2.770 | | 4.900 | -1.400 | 0.775 | | 1.371 | -3.300 | 2.100 |
| 39 | 3 | 3.950 | 0.196 | 2.060 | | 4.600 | -3.150 | 2.118 | | 1.159 | -1.600 | 0.800 |
| 40 | 4 | 2.420 | -0.309 | 2.270 | | 3.800 | -3.900 | 1.067 | | 2.824 | -2.000 | 0.100 |
| 41 | 5 | | | | | | | | | 3.771 | -2.700 | 0.100 |
| 42 | 6 | | | | | | | | | | | |
| 43 | 7 | | | | | | | | | | | |
| 44 | 8 | | | | | | | | | | | |
| 45 | | | | | | | | | | | | |

FIG. 6B3

| | Z | AA | AB | AC | AD | AE | AF | AG | AH | AI | AJ |
|---|---|---|---|---|---|---|---|---|---|---|---|
| 25 | Facet | 12 | | | | | | | | | |
| 26 | x | y | z | | | | | | | | |
| 27 | -0.616 | 0.000 | 0.788 | | | | | | | | |
| 28 | | End | | | | Middle | | | | End | |
| 29 | x | y | z | | x | y | z | | x | y | z |
| 30 | 0.415 | -0.220 | 0.883 | | 0.415 | -0.220 | 0.883 | | 0.369 | -0.387 | 0.845 |
| 31 | 0.351 | -0.669 | -0.655 | | 0.351 | -0.669 | -0.655 | | 0.312 | -0.788 | -0.530 |
| 32 | -0.995 | -0.012 | -0.099 | | -0.995 | -0.012 | -0.099 | | -0.988 | -0.153 | 0.007 |
| 33 | -0.562 | 0.574 | 0.596 | | -0.562 | 0.574 | 0.596 | | -0.550 | 0.439 | 0.710 |
| 34 | | | | | | | | | | | |
| 35 | | Mirror 1 Corners | | | | Mirror 2 Corners | | | | Mirror 3 Corners | |
| 36 | x | y | z | | x | y | z | | x | y | z |
| 37 | 2.550 | -1.630 | 2.650 | | 4.000 | -2.630 | 0.049 | | 3.746 | -3.750 | 1.000 |
| 38 | 4.150 | -2.267 | 2.770 | | 4.900 | -1.400 | 0.775 | | 1.371 | -3.300 | 2.100 |
| 39 | 3.950 | 0.196 | 2.060 | | 4.600 | -3.150 | 2.118 | | 1.159 | -1.600 | 0.800 |
| 40 | 2.420 | -0.309 | 2.270 | | 3.800 | -3.900 | 1.067 | | 2.824 | -2.000 | 0.100 |
| 41 | | | | | | | | | 3.771 | -2.700 | 0.100 |
| 42 | | | | | | | | | | | |
| 43 | | | | | | | | | | | |
| 44 | | | | | | | | | | | |
| 45 | | | | | | | | | | | |

FIG. 6B4

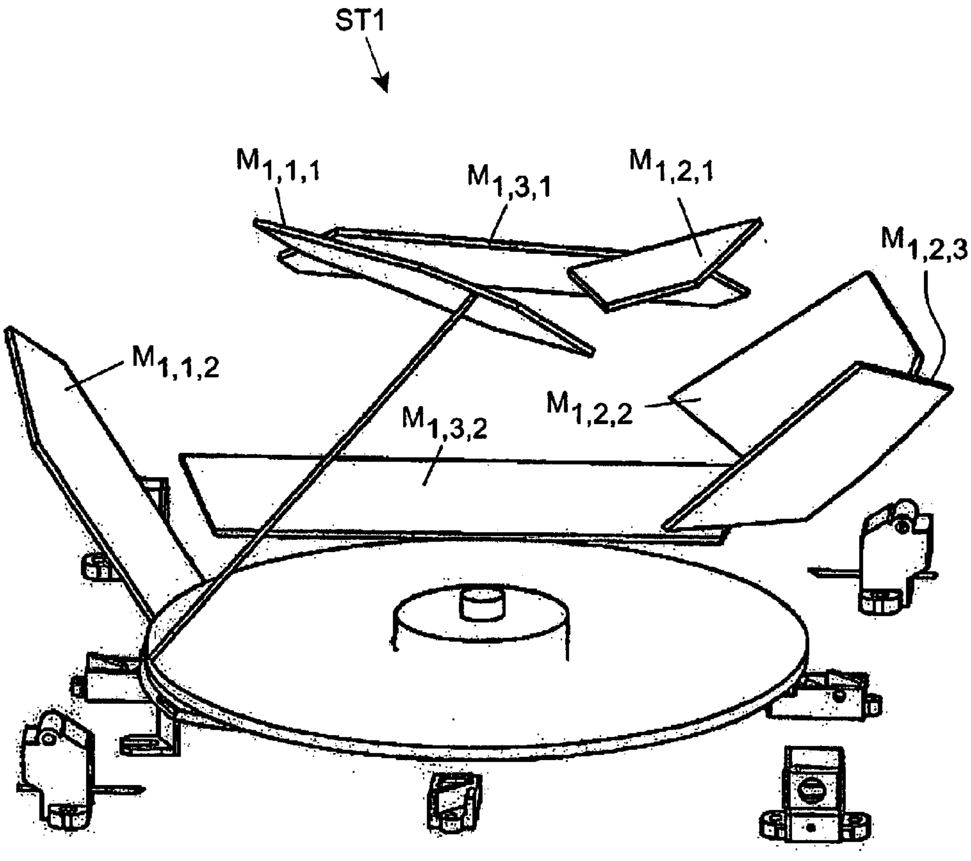
FIG. 6C1

| | N | O | P | Q | R | S | T | U | V | W | X |
|---|---|---|---|---|---|---|---|---|---|---|---|
| 46 | Facet | 1 | | | | | | | | | |
| 47 | x | y | z | | | | | | | | |
| 48 | -0.616 | 0.000 | 0.788 | | | | | | | | |
| 49 | End | | | | Middle | | | | End | | |
| 50 | x | y | z | | x | y | z | | x | y | z |
| 51 | 0.753 | 0.321 | 0.575 | | 0.788 | 0.000 | 0.616 | | 0.753 | -0.321 | 0.575 |
| 52 | -0.366 | 0.443 | -0.819 | | -0.425 | 0.132 | -0.896 | | -0.421 | -0.193 | -0.887 |
| 53 | -0.574 | 0.468 | 0.672 | | -0.653 | 0.160 | 0.740 | | -0.648 | -0.165 | 0.743 |
| 54 | | | | | | | | | | | |
| 55 | | | | | | | | | | | |
| 56 | Mirror 1 Corners | | | | Mirror 2 Corners | | | | Mirror 3 Corners | | |
| 57 | x | y | z | | x | y | z | | x | y | z |
| 58 | 4.250 | 1.500 | 2.547 | | 3.150 | 2.450 | 0.030 | | | | |
| 59 | 4.950 | 2.000 | 2.029 | | 4.500 | 2.800 | 0.213 | | | | |
| 60 | 5.150 | 1.800 | 1.851 | | 4.350 | -2.200 | 0.277 | | | | |
| 61 | 5.000 | -1.800 | 1.656 | | 3.050 | -1.850 | 0.089 | | | | |
| 62 | 4.750 | -1.950 | 1.844 | | | | | | | | |
| 63 | 4.100 | -1.500 | 2.405 | | | | | | | | |
| 64 | | | | | | | | | | | |
| 65 | | | | | | | | | | | |

FIG. 6C2

| | A | B | C | D | E | F | G | H | I | J | K | L |
|---|---|---|---|---|---|---|---|---|---|---|---|---|
| 46 | Low Elevation | Facet | 2 | | | | | | | | | |
| 47 | (G3) | x | y | z | | | | | | | | |
| 48 | Vector from Module | -0.616 | 0.000 | 0.788 | | | | | | | | |
| 49 | | | End | | | | Middle | | | | End | |
| 50 | | x | y | z | | x | y | z | | x | y | z |
| 51 | Output Vectors From Disk | 0.734 | 0.305 | 0.607 | | 0.766 | 0.000 | 0.643 | | 0.731 | -0.319 | 0.604 |
| 52 | First Mirror Reflected Directions | -0.402 | 0.429 | -0.809 | | -0.456 | 0.133 | -0.880 | | -0.453 | -0.190 | -0.871 |
| 53 | Second Mirror Reflected Directions | -0.607 | 0.454 | 0.653 | | -0.679 | 0.161 | 0.716 | | -0.675 | -0.162 | 0.719 |
| 54 | Third Mirror Reflected Directions | | | | | | | | | | | |
| 55 | | | | | | | | | | | | |
| 56 | | | Mirror 1 Corners | | | | Mirror 2 Corners | | | | Mirror 3 Corners | |
| 57 | | x | y | z | | x | y | z | | x | y | z |
| 58 | 1 | 4.250 | 1.500 | 2.547 | | 3.150 | 2.450 | 0.030 | | | | |
| 59 | 2 | 4.950 | 2.000 | 2.029 | | 4.500 | 2.800 | 0.213 | | | | |
| 60 | 3 | 5.150 | 1.800 | 1.851 | | 4.350 | -2.200 | 0.277 | | | | |
| 61 | 4 | 5.000 | -1.800 | 1.656 | | 3.050 | -1.850 | 0.089 | | | | |
| 62 | 5 | 4.750 | -1.950 | 1.844 | | | | | | | | |
| 63 | 6 | 4.100 | -1.500 | 2.405 | | | | | | | | |
| 64 | 7 | | | | | | | | | | | |
| 65 | 8 | | | | | | | | | | | |

FIG. 6C3

| | Z | AA | AB | AC | AD | AE | AF | AG | AH | AI | AJ |
|---|---|---|---|---|---|---|---|---|---|---|---|
| 46 | Facet | 3 | | | | | | | | | |
| 47 | x | y | z | | | | | | | | |
| 48 | -0.616 | 0.000 | 0.788 | | | | | | | | |
| 49 | | End | | | | Middle | | | | End | |
| 50 | x | y | z | | x | y | z | | x | y | z |
| 51 | 0.714 | 0.290 | 0.638 | | 0.743 | 0.000 | 0.669 | | 0.709 | -0.311 | 0.633 |
| 52 | -0.438 | 0.416 | -0.797 | | -0.487 | 0.134 | -0.863 | | -0.485 | -0.181 | -0.855 |
| 53 | -0.638 | 0.440 | 0.632 | | -0.704 | 0.161 | 0.692 | | -0.702 | -0.155 | 0.695 |
| 54 | | | | | | | | | | | |
| 55 | | | | | | | | | | | |
| 56 | | Mirror 1 Corners | | | | Mirror 2 Corners | | | | Mirror 3 Corners | |
| 57 | x | y | z | | x | y | z | | x | y | z |
| 58 | 4.250 | 1.500 | 2.547 | | 3.150 | 2.450 | 0.030 | | | | |
| 59 | 4.950 | 2.000 | 2.029 | | 4.500 | 2.800 | 0.213 | | | | |
| 60 | 5.150 | 1.800 | 1.851 | | 4.350 | -2.200 | 0.277 | | | | |
| 61 | 5.000 | -1.800 | 1.656 | | 3.050 | -1.850 | 0.089 | | | | |
| 62 | 4.750 | -1.950 | 1.844 | | | | | | | | |
| 63 | 4.100 | -1.500 | 2.405 | | | | | | | | |
| 64 | | | | | | | | | | | |
| 65 | | | | | | | | | | | |

FIG. 6C4

| | AL | AM | AN | AO | AP | AQ | AR | AS | AT | AU | AV |
|---|---|---|---|---|---|---|---|---|---|---|---|
| 46 | Facet | 4 | | | | | | | | | |
| 47 | x | y | z | | | | | | | | |
| 48 | -0.616 | 0.000 | 0.788 | | | | | | | | |
| 49 | End | | | | Middle | | | | End | | |
| 50 | x | y | z | | x | y | z | | x | y | z |
| 51 | 0.692 | 0.275 | 0.667 | | 0.719 | 0.000 | 0.695 | | 0.686 | -0.307 | 0.660 |
| 52 | -0.472 | 0.402 | -0.784 | | -0.517 | 0.135 | -0.846 | | -0.516 | -0.176 | -0.838 |
| 53 | -0.667 | 0.426 | 0.611 | | -0.728 | 0.161 | 0.666 | | -0.727 | -0.151 | 0.670 |
| 54 | | | | | | | | | | | |
| 55 | | | | | | | | | | | |
| 56 | Mirror 1 Corners | | | | Mirror 2 Corners | | | | Mirror 3 Corners | | |
| 57 | x | y | z | | x | y | z | | x | y | z |
| 58 | 4.250 | 1.500 | 2.547 | | 3.150 | 2.450 | 0.030 | | | | |
| 59 | 4.950 | 2.000 | 2.029 | | 4.500 | 2.800 | 0.213 | | | | |
| 60 | 5.150 | 1.800 | 1.851 | | 4.350 | -2.200 | 0.277 | | | | |
| 61 | 5.000 | -1.800 | 1.656 | | 3.050 | -1.850 | 0.089 | | | | |
| 62 | 4.750 | -1.950 | 1.844 | | | | | | | | |
| 63 | 4.100 | -1.500 | 2.405 | | | | | | | | |
| 64 | | | | | | | | | | | |
| 65 | | | | | | | | | | | |

FIG. 6C5

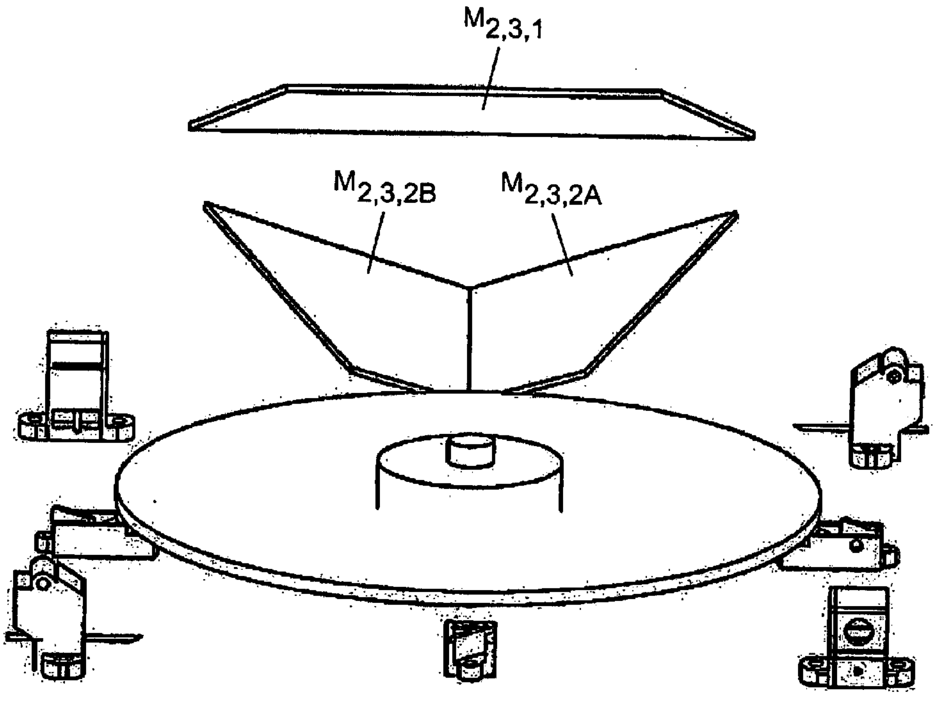
FIG. 6D1

| | N | O | P | Q | R | S | T | U | V | W | X |
|---|---|---|---|---|---|---|---|---|---|---|---|
| 46 | Facet | 1 | | | | | | | | | |
| 47 | x | y | z | | | | | | | | |
| 48 | -0.616 | 0.000 | 0.788 | | | | | | | | |
| 49 | | End | | | | Middle | | | | End | |
| 50 | x | y | z | | x | y | z | | x | y | z |
| 51 | 0.788 | 0.000 | 0.616 | | 0.788 | 0.000 | 0.616 | | 0.741 | -0.367 | 0.562 |
| 52 | -0.140 | 0.000 | -0.990 | | -0.140 | 0.000 | -0.990 | | -0.117 | -0.367 | -0.923 |
| 53 | -0.595 | 0.448 | 0.667 | | -0.595 | 0.448 | 0.667 | | -0.590 | 0.098 | 0.801 |
| 54 | | | | | | | | | | | |
| 55 | | | | | | | | | | | |
| 56 | | Mirror 1 Corners | | | | Mirror 2 Corners | | | | Mirror 3 Corners | |
| 57 | x | y | z | | x | y | z | | x | y | z |
| 58 | 3.750 | -1.600 | 2.509 | | 3.000 | 0.000 | -0.112 | | | | |
| 59 | 5.100 | -2.400 | 1.728 | | 4.800 | 0.000 | 0.382 | | | | |
| 60 | 5.100 | 2.400 | 1.728 | | 5.071 | -2.256 | 1.066 | | | | |
| 61 | 3.750 | 1.600 | 2.509 | | 5.071 | -2.256 | 1.066 | | | | |
| 62 | | | | | 3.060 | -1.000 | 0.175 | | | | |
| 63 | | | | | | | | | | | |
| 64 | | | | | | | | | | | |
| 65 | | | | | | | | | | | |
| 66 | | | | | | | | | | | |
| 67 | | | | | | | | | | | |
| 68 | | | | | | | | | | | |
| 69 | | | | | | | | | | | |
| 70 | | | | | | | | | | | |
| 71 | | | | | 3.000 | 0.000 | -0.112 | | | | |
| 72 | | | | | 4.800 | 0.000 | 0.382 | | | | |
| 73 | | | | | 5.071 | 2.256 | 1.066 | | | | |
| 74 | | | | | 5.071 | 2.256 | 1.066 | | | | |
| 75 | | | | | 3.060 | 1.000 | 0.175 | | | | |
| 76 | | | | | | | | | | | |

FIG. 6D2

| | Z | AA | AB | AC | AD | AE | AF | AG | AH | AI | AJ |
|---|---|---|---|---|---|---|---|---|---|---|---|
| 46 | Facet | 2 | | | | | | | | | |
| 47 | x | y | z | | | | | | | | |
| 48 | -0.616 | 0.000 | 0.788 | | | | | | | | |
| 49 | End | | | | Middle | | | | End | | |
| 50 | x | y | z | | x | y | z | | x | y | z |
| 51 | 0.766 | 0.000 | 0.643 | | 0.766 | 0.000 | 0.643 | | 0.711 | -0.395 | 0.581 |
| 52 | -0.175 | 0.000 | -0.985 | | -0.175 | 0.000 | -0.985 | | -0.149 | -0.395 | -0.907 |
| 53 | -0.623 | 0.440 | 0.647 | | -0.623 | 0.440 | 0.647 | | -0.614 | 0.062 | 0.787 |
| 54 | | | | | | | | | | | |
| 55 | | | | | | | | | | | |
| 56 | Mirror 1 Corners | | | | Mirror 2 Corners | | | | Mirror 3 Corners | | |
| 57 | x | y | z | | x | y | z | | x | y | z |
| 58 | 3.750 | -1.600 | 2.509 | | 3.000 | 0.000 | -0.112 | | | | |
| 59 | 5.100 | -2.400 | 1.728 | | 4.800 | 0.000 | 0.382 | | | | |
| 60 | 5.100 | 2.400 | 1.728 | | 5.071 | -2.256 | 1.066 | | | | |
| 61 | 3.750 | 1.600 | 2.509 | | 5.071 | -2.256 | 1.066 | | | | |
| 62 | | | | | 3.060 | -1.000 | 0.175 | | | | |
| 63 | | | | | | | | | | | |
| 64 | | | | | | | | | | | |
| 65 | | | | | | | | | | | |
| 66 | | | | | | | | | | | |
| 67 | | | | | | | | | | | |
| 68 | | | | | | | | | | | |
| 69 | | | | | | | | | | | |
| 70 | | | | | | | | | | | |
| 71 | | | | | 3.000 | 0.000 | -0.112 | | | | |
| 72 | | | | | 4.800 | 0.000 | 0.382 | | | | |
| 73 | | | | | 5.071 | 2.256 | 1.066 | | | | |
| 74 | | | | | 5.071 | 2.256 | 1.066 | | | | |
| 75 | | | | | 3.060 | 1.000 | 0.175 | | | | |
| 76 | | | | | | | | | | | |

FIG. 6D3

| | A | B | C | D | E | F | G | H | I | J | K | L |
|---|---|---|---|---|---|---|---|---|---|---|---|---|
| 46 | Low Elevation | Facet | 3 | | | | | | | | | |
| 47 | | x | y | z | | | | | | | | |
| 48 | Vector from Module | -0.616 | 0.000 | 0.788 | | | | | | | | |
| 49 | | | End | | | | Middle | | | | End | |
| 50 | | x | y | z | | x | y | z | | x | y | z |
| 51 | Output Vectors From Disk | 0.743 | 0.000 | 0.669 | | 0.743 | 0.000 | 0.669 | | 0.697 | -0.362 | 0.619 |
| 52 | First Mirror Reflected Directions | -0.209 | 0.000 | -0.978 | | -0.209 | 0.000 | -0.978 | | -0.189 | -0.362 | -0.913 |
| 53 | Second Mirror Reflected Directions | -0.649 | 0.433 | 0.625 | | -0.649 | 0.433 | 0.625 | | -0.648 | 0.089 | 0.757 |
| 54 | Third Mirror Reflected Directions | | | | | | | | | | | |
| 55 | | | | | | | | | | | | |
| 56 | | | Mirror 1 Corners | | | | Mirror 2 Corners | | | | Mirror 3 Corners | |
| 57 | | x | y | z | | x | y | z | | x | y | z |
| 58 | 1 | 3.750 | -1.600 | 2.509 | | 3.000 | 0.000 | -0.112 | | | | |
| 59 | 2 | 5.100 | -2.400 | 1.728 | | 4.800 | 0.000 | 0.382 | | | | |
| 60 | 3 | 5.100 | 2.400 | 1.728 | | 5.071 | -2.256 | 1.066 | | | | |
| 61 | 4 | 3.750 | 1.600 | 2.509 | | 5.071 | -2.256 | 1.066 | | | | |
| 62 | 5 | | | | | 3.060 | -1.000 | 0.175 | | | | |
| 63 | 6 | | | | | | | | | | | |
| 64 | 7 | | | | | | | | | | | |
| 65 | 8 | | | | | | | | | | | |
| 66 | | | | | | | | | | | | |
| 67 | | | | | | | | | | | | |
| 68 | | | | | | | | | | | | |
| 69 | **Note: Special Case!** | | | | | | | | | | | |
| 70 | | | | | | | | | | | | |
| 71 | **Second Part of Mirror 2** | | | | | 3.000 | 0.000 | -0.112 | | | | |
| 72 | | | | | | 4.800 | 0.000 | 0.382 | | | | |
| 73 | | | | | | 5.071 | 2.256 | 1.066 | | | | |
| 74 | | | | | | 5.071 | 2.256 | 1.066 | | | | |
| 75 | | | | | | 3.060 | 1.000 | 0.175 | | | | |
| 76 | | | | | | | | | | | | |
| 77 | | | | | | | | | | | | |

FIG. 6D4

| | AL | AM | AN | AO | AP | AQ | AR | AS | AT | AU | AV |
|---|---|---|---|---|---|---|---|---|---|---|---|
| 46 | Facet | 4 | | | | | | | | | |
| 47 | x | y | z | | | | | | | | |
| 48 | -0.616 | 0.000 | 0.788 | | | | | | | | |
| 49 | End | | | | Middle | | | | End | | |
| 50 | x | y | z | | x | y | z | | x | y | z |
| 51 | 0.719 | 0.000 | 0.695 | | 0.719 | 0.000 | 0.695 | | 0.664 | -0.395 | 0.635 |
| 52 | -0.243 | 0.000 | -0.970 | | -0.243 | 0.000 | -0.970 | | -0.220 | -0.395 | -0.892 |
| 53 | -0.675 | 0.425 | 0.603 | | -0.675 | 0.425 | 0.603 | | -0.668 | 0.046 | 0.742 |
| 54 | | | | | | | | | | | |
| 55 | | | | | | | | | | | |
| 56 | Mirror 1 Corners | | | | Mirror 2 Corners | | | | Mirror 3 Corners | | |
| 57 | x | y | z | | x | y | z | | x | y | z |
| 58 | 3.750 | -1.600 | 2.509 | | 3.000 | 0.000 | -0.112 | | | | |
| 59 | 5.100 | -2.400 | 1.728 | | 4.800 | 0.000 | 0.382 | | | | |
| 60 | 5.100 | 2.400 | 1.728 | | 5.071 | -2.256 | 1.066 | | | | |
| 61 | 3.750 | 1.600 | 2.509 | | 5.071 | -2.256 | 1.066 | | | | |
| 62 | | | | | 3.060 | -1.000 | 0.175 | | | | |
| 63 | | | | | | | | | | | |
| 64 | | | | | | | | | | | |
| 65 | | | | | | | | | | | |
| 66 | | | | | | | | | | | |
| 67 | | | | | | | | | | | |
| 68 | | | | | | | | | | | |
| 69 | | | | | | | | | | | |
| 70 | | | | | | | | | | | |
| 71 | | | | | 3.000 | 0.000 | -0.112 | | | | |
| 72 | | | | | 4.800 | 0.000 | 0.382 | | | | |
| 73 | | | | | 5.071 | 2.256 | 1.066 | | | | |
| 74 | | | | | 5.071 | 2.256 | 1.066 | | | | |
| 75 | | | | | 3.060 | 1.000 | 0.175 | | | | |
| 76 | | | | | | | | | | | |

FIG. 6D5

| | AX | AY | AZ | BA | BB | BC | BD | BE | BF | BG | BH |
|---|---|---|---|---|---|---|---|---|---|---|---|
| 46 | Facet | 5 | | | | | | | | | |
| 47 | x | y | z | | | | | | | | |
| 48 | -0.616 | 0.000 | 0.788 | | | | | | | | |
| 49 | | End | | | | Middle | | | | End | |
| 50 | x | y | z | | x | y | z | | x | y | z |
| 51 | 0.669 | 0.000 | 0.743 | | 0.669 | 0.000 | 0.743 | | 0.634 | -0.311 | 0.708 |
| 52 | -0.310 | 0.000 | -0.951 | | -0.310 | 0.000 | -0.951 | | -0.298 | -0.311 | -0.903 |
| 53 | -0.724 | 0.407 | 0.557 | | -0.724 | 0.407 | 0.557 | | -0.730 | 0.114 | 0.673 |
| 54 | | | | | | | | | | | |
| 55 | | | | | | | | | | | |
| 56 | Mirror 1 Corners | | | | Mirror 2 Corners | | | | Mirror 3 Corners | | |
| 57 | x | y | z | | x | y | z | | x | y | z |
| 58 | 3.750 | -1.600 | 2.509 | | 3.000 | 0.000 | -0.112 | | | | |
| 59 | 5.100 | -2.400 | 1.728 | | 4.800 | 0.000 | 0.382 | | | | |
| 60 | 5.100 | 2.400 | 1.728 | | 5.071 | -2.256 | 1.066 | | | | |
| 61 | 3.750 | 1.600 | 2.509 | | 5.071 | -2.256 | 1.066 | | | | |
| 62 | | | | | 3.060 | -1.000 | 0.175 | | | | |
| 63 | | | | | | | | | | | |
| 64 | | | | | | | | | | | |
| 65 | | | | | | | | | | | |
| 66 | | | | | | | | | | | |
| 67 | | | | | | | | | | | |
| 68 | | | | | | | | | | | |
| 69 | | | | | | | | | | | |
| 70 | | | | | | | | | | | |
| 71 | | | | | 3.000 | 0.000 | -0.112 | | | | |
| 72 | | | | | 4.800 | 0.000 | 0.382 | | | | |
| 73 | | | | | 5.071 | 2.256 | 1.066 | | | | |
| 74 | | | | | 5.071 | 2.256 | 1.066 | | | | |
| 75 | | | | | 3.060 | 1.000 | 0.175 | | | | |
| 76 | | | | | | | | | | | |

FIG. 6D6

| | BJ | BK | BL | BM | BN | BO | BP | BQ | BR | BS | BT | BU | BV | BW | BX |
|---|---|---|---|---|---|---|---|---|---|---|---|---|---|---|---|
| 46 | Facet | 6 | | | | | | | | | | | | | |
| 47 | x | y | z | | | | | | | | | | | | |
| 48 | -0.616 | 0.000 | 0.788 | | | | | | | | | | | | |
| 49 | End | | | | Middle | | | | End | | | | | | |
| 50 | x | y | z | | x | y | z | | x | y | z | | | | |
| 51 | 0.616 | 0.000 | 0.788 | | 0.616 | 0.000 | 0.788 | | 0.596 | -0.232 | 0.769 | | | | |
| 52 | -0.376 | 0.000 | -0.927 | | -0.376 | 0.000 | -0.927 | | -0.369 | -0.232 | -0.900 | | | | |
| 53 | -0.770 | 0.387 | 0.508 | | -0.770 | 0.387 | 0.508 | | -0.781 | 0.173 | 0.600 | | | | |
| 54 | | | | | | | | | | | | | | | |
| 55 | | | | | | | | | | | | | | | |
| 56 | Mirror 1 Corners | | | | Mirror 2 Corners | | | | Mirror 3 Corners | | | | | | |
| 57 | x | y | z | | x | y | z | | x | y | z | | | | |
| 58 | 3.750 | -1.600 | 2.509 | | 3.000 | 0.000 | -0.112 | | | | | | | | |
| 59 | 5.100 | -2.400 | 1.728 | | 4.800 | 0.000 | 0.382 | | | | | | | | |
| 60 | 5.100 | 2.400 | 1.728 | | 5.071 | -2.256 | 1.066 | | | | | | | | |
| 61 | 3.750 | 1.600 | 2.509 | | 5.071 | -2.256 | 1.066 | | | | | | | | |
| 62 | | | | | 3.060 | -1.000 | 0.175 | | | | | | | | |
| 63 | | | | | | | | | | | | | | | |
| 64 | | | | | | | | | | | | | | | |
| 65 | | | | | | | | | | | | | | | |
| 66 | | | | | | | | | | | | | | | |
| 67 | | | | | | | | | | | | | | | |
| 68 | | | | | | | | | | | | | | | |
| 69 | | | | | | | | | | | | | | | |
| 70 | | | | | | | | | | | | | | | |
| 71 | | | | | 3.000 | 0.000 | -0.112 | | | | | | | | |
| 72 | | | | | 4.800 | 0.000 | 0.382 | | | | | | | | |
| 73 | | | | | 5.071 | 2.256 | 1.066 | | | | | | | | |
| 74 | | | | | 5.071 | 2.256 | 1.066 | | | | | | | | |
| 75 | | | | | 3.060 | 1.000 | 0.175 | | | | | | | | |

FIG. 6D7

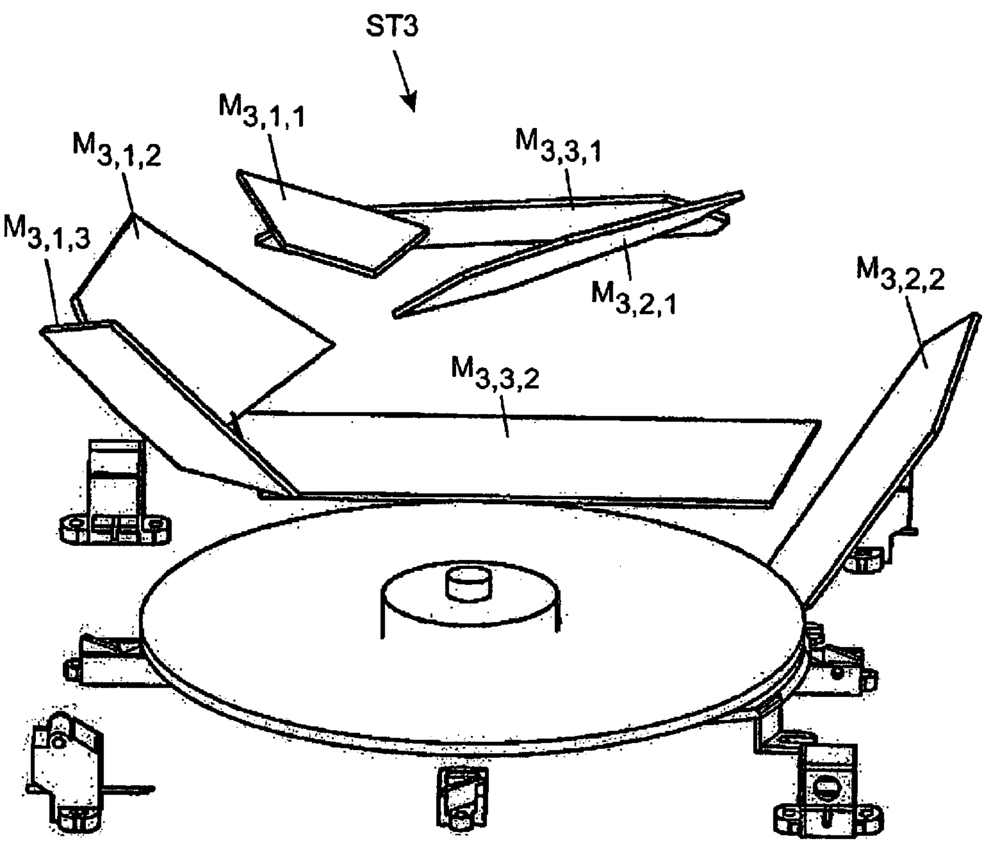
FIG. 6E1

| | N | O | P | Q | R | S | T | U | V | W | X |
|---|---|---|---|---|---|---|---|---|---|---|---|
| 1 | | | | | | | | | | | |
| 2 | | | | | | | | | | | |
| 3 | | | | | | | | | | | |
| 4 | Facet | 7 | | | | | | | | | |
| 5 | x | y | z | | | | | | | | |
| 6 | -0.616 | 0.000 | 0.788 | | | | | | | | |
| 7 | | End | | | | Middle | | | | End | |
| 8 | x | y | z | | x | y | z | | x | y | z |
| 9 | 0.468 | 0.249 | 0.848 | | 0.468 | 0.249 | 0.848 | | 0.430 | 0.387 | 0.816 |
| 10 | 0.408 | 0.675 | -0.614 | | 0.408 | 0.675 | -0.614 | | 0.375 | 0.774 | -0.510 |
| 11 | -0.999 | -0.012 | -0.034 | | -0.999 | -0.012 | -0.034 | | -0.993 | 0.106 | 0.054 |
| 12 | -0.616 | -0.531 | 0.582 | | -0.616 | -0.531 | 0.582 | | -0.605 | -0.419 | 0.677 |
| 13 | | | | | | | | | | | |
| 14 | | Mirror 1 Corners | | | | Mirror 2 Corners | | | | Mirror 3 Corners | |
| 15 | x | y | z | | x | y | z | | x | y | z |
| 16 | 2.550 | 1.630 | 2.650 | | 4.000 | 2.630 | 0.049 | | 3.746 | 3.750 | 1.000 |
| 17 | 4.150 | 2.267 | 2.770 | | 4.900 | 1.400 | 0.775 | | 1.371 | 3.300 | 2.100 |
| 18 | 3.950 | -0.196 | 2.060 | | 4.600 | 3.150 | 2.118 | | 1.159 | 1.600 | 0.800 |
| 19 | 2.420 | 0.309 | 2.270 | | 3.800 | 3.900 | 1.067 | | 2.824 | 2.000 | 0.100 |
| 20 | | | | | | | | | 3.771 | 2.700 | 0.100 |
| 21 | | | | | | | | | | | |
| 22 | | | | | | | | | | | |
| 23 | | | | | | | | | | | |
| 24 | | | | | | | | | | | |

FIG. 6E2

| | A | B | C | D | E | F | G | H | I | J | K | L |
|---|---|---|---|---|---|---|---|---|---|---|---|---|
| 1 | Station 3 | | | | | | | | | | | |
| 2 | | | | | | | | | | | | |
| 3 | | | | | | | | | | | | |
| 4 | High Elevation Left Skew | Facet | 9 | | | | | | | | | |
| 5 | (G2) | x | y | z | | | | | | | | |
| 6 | Vector from Module | -0.616 | 0.000 | 0.788 | | | | | | | | |
| 7 | | | End | | | | Middle | | | | End | |
| 8 | | x | y | z | | x | y | z | | x | y | z |
| 9 | Output Vectors From Disk | 0.441 | 0.235 | 0.866 | | 0.441 | 0.235 | 0.866 | | 0.398 | 0.391 | 0.830 |
| 10 | First Mirror Reflected Directions | 0.380 | 0.673 | -0.635 | | 0.380 | 0.673 | -0.635 | | 0.343 | 0.784 | -0.517 |
| 11 | Second Mirror Reflected Directions | -0.998 | 0.000 | -0.067 | | -0.998 | 0.000 | -0.067 | | -0.991 | 0.133 | 0.033 |
| 12 | Third Mirror Reflected Directions | -0.589 | -0.553 | 0.589 | | -0.589 | -0.553 | 0.589 | | -0.578 | -0.426 | 0.697 |
| 13 | | | | | | | | | | | | |
| 14 | | | Mirror 1 Corners | | | | Mirror 2 Corners | | | | Mirror 3 Corners | |
| 15 | | x | y | z | | x | y | z | | x | y | z |
| 16 | 1 | 2.550 | 1.630 | 2.650 | | 4.000 | 2.630 | 0.049 | | 3.746 | 3.750 | 1.000 |
| 17 | 2 | 4.150 | 2.267 | 2.770 | | 4.900 | 1.400 | 0.775 | | 1.371 | 3.300 | 2.100 |
| 18 | 3 | 3.950 | -0.196 | 2.060 | | 4.600 | 3.150 | 2.118 | | 1.159 | 1.600 | 0.800 |
| 19 | 4 | 2.420 | 0.309 | 2.270 | | 3.800 | 3.900 | 1.067 | | 2.824 | 2.000 | 0.100 |
| 20 | 5 | | | | | | | | | 3.771 | 2.700 | 0.100 |
| 21 | 6 | | | | | | | | | | | |
| 22 | 7 | | | | | | | | | | | |
| 23 | 8 | | | | | | | | | | | |

FIG. 6E3

| | Z | AA | AB | AC | AD | AE | AF | AG | AH | AI | AJ |
|---|---|---|---|---|---|---|---|---|---|---|---|
| 1 | | | | | | | | | | | |
| 2 | | | | | | | | | | | |
| 3 | | | | | | | | | | | |
| 4 | Facet | 11 | | | | | | | | | |
| 5 | x | y | z | | | | | | | | |
| 6 | -0.616 | 0.000 | 0.788 | | | | | | | | |
| 7 | End | | | | Middle | | | | End | | |
| 8 | x | y | z | | x | y | z | | x | y | z |
| 9 | 0.415 | 0.220 | 0.883 | | 0.415 | 0.220 | 0.883 | | 0.369 | 0.387 | 0.845 |
| 10 | 0.351 | 0.669 | -0.655 | | 0.351 | 0.669 | -0.655 | | 0.312 | 0.788 | -0.530 |
| 11 | -0.995 | 0.012 | -0.099 | | -0.995 | 0.012 | -0.099 | | -0.988 | 0.153 | 0.007 |
| 12 | -0.562 | -0.574 | 0.596 | | -0.562 | -0.574 | 0.596 | | -0.550 | -0.439 | 0.710 |
| 13 | | | | | | | | | | | |
| 14 | Mirror 1 Corners | | | | Mirror 2 Corners | | | | Mirror 3 Corners | | |
| 15 | x | y | z | | x | y | z | | x | y | z |
| 16 | 2.550 | 1.630 | 2.650 | | 4.000 | 2.630 | 0.049 | | 3.746 | 3.750 | 1.000 |
| 17 | 4.150 | 2.267 | 2.770 | | 4.900 | 1.400 | 0.775 | | 1.371 | 3.300 | 2.100 |
| 18 | 3.950 | -0.196 | 2.060 | | 4.600 | 3.150 | 2.118 | | 1.159 | 1.600 | 0.800 |
| 19 | 2.420 | 0.309 | 2.270 | | 3.800 | 3.900 | 1.067 | | 2.824 | 2.000 | 0.100 |
| 20 | | | | | | | | | 3.771 | 2.700 | 0.100 |
| 21 | | | | | | | | | | | |
| 22 | | | | | | | | | | | |
| 23 | | | | | | | | | | | |
| 24 | | | | | | | | | | | |

FIG. 6E4

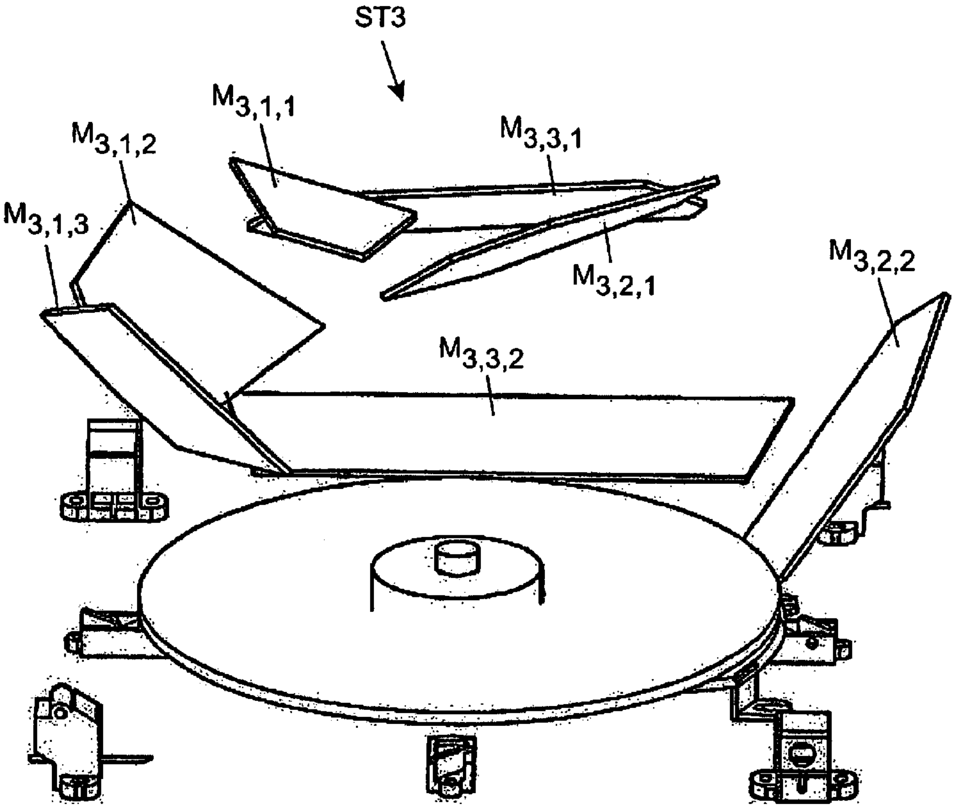
FIG. 6F1

| | N | O | P | Q | R | S | T | U | V | W | X |
|---|---|---|---|---|---|---|---|---|---|---|---|
| 25 | Facet | 8 | | | | | | | | | |
| 26 | x | y | z | | | | | | | | |
| 27 | -0.616 | 0.000 | 0.788 | | | | | | | | |
| 28 | End | | | | Middle | | | | End | | |
| 29 | x | y | z | | x | y | z | | x | y | z |
| 30 | 0.419 | -0.416 | 0.807 | | 0.468 | -0.249 | 0.848 | | 0.494 | -0.048 | 0.868 |
| 31 | -0.253 | -0.917 | -0.310 | | -0.316 | -0.832 | -0.455 | | -0.387 | -0.704 | -0.596 |
| 32 | -0.469 | 0.414 | 0.781 | | -0.537 | 0.527 | 0.659 | | -0.603 | 0.626 | 0.494 |
| 33 | | | | | | | | | | | |
| 34 | | | | | | | | | | | |
| 35 | Mirror 1 Corners | | | | Mirror 2 Corners | | | | Mirror 3 Corners | | |
| 36 | x | y | z | | x | y | z | | x | y | z |
| 37 | 3.900 | -2.436 | 2.770 | | 1.700 | -4.102 | 1.300 | | | | |
| 38 | 4.100 | -1.879 | 2.400 | | 3.300 | -4.400 | 1.980 | | | | |
| 39 | 3.800 | -0.137 | 1.800 | | 3.400 | -3.990 | 1.500 | | | | |
| 40 | 3.150 | 0.737 | 1.800 | | 2.300 | -2.427 | -0.625 | | | | |
| 41 | 2.500 | 0.159 | 2.450 | | 1.700 | -2.524 | -0.625 | | | | |
| 42 | 2.650 | -0.757 | 2.770 | | 1.050 | -3.101 | -0.050 | | | | |
| 43 | | | | | | | | | | | |
| 44 | | | | | | | | | | | |

FIG. 6F2

| | A | B | C | D | E | F | G | H | I | J | K | L |
|---|---|---|---|---|---|---|---|---|---|---|---|---|
| 25 | High Elevation Right Skew | Facet | 10 | | | | | | | | | |
| 26 | (G1) | x | y | z | | | | | | | | |
| 27 | Vector from Module | -0.616 | 0.000 | 0.788 | | | | | | | | |
| 28 | | | End | | | | Middle | | | | End | |
| 29 | | x | y | z | | x | y | z | | x | y | z |
| 30 | Output Vectors From Disk | 0.378 | -0.445 | 0.812 | | 0.441 | -0.235 | 0.866 | | 0.464 | -0.068 | 0.883 |
| 31 | First Mirror Reflected Directions | -0.269 | -0.927 | -0.263 | | -0.349 | -0.823 | -0.448 | | -0.408 | -0.717 | -0.565 |
| 32 | Second Mirror Reflected Directions | -0.479 | 0.367 | 0.797 | | -0.566 | 0.512 | 0.647 | | -0.621 | 0.595 | 0.510 |
| 33 | Third Mirror Reflected Directions | | | | | | | | | | | |
| 34 | | | | | | | | | | | | |
| 35 | | | Mirror 1 Corners | | | | Mirror 2 Corners | | | | Mirror 3 Corners | |
| 36 | | x | y | z | | x | y | z | | x | y | z |
| 37 | 1 | 3.900 | -2.436 | 2.770 | | 1.700 | -4.102 | 1.300 | | | | |
| 38 | 2 | 4.100 | -1.879 | 2.400 | | 3.300 | -4.400 | 1.980 | | | | |
| 39 | 3 | 3.800 | -0.137 | 1.800 | | 3.400 | -3.990 | 1.500 | | | | |
| 40 | 4 | 3.150 | 0.737 | 1.800 | | 2.300 | -2.427 | -0.625 | | | | |
| 41 | 5 | 2.500 | 0.159 | 2.450 | | 1.700 | -2.524 | -0.625 | | | | |
| 42 | 6 | 2.650 | -0.757 | 2.770 | | 1.050 | -3.101 | -0.050 | | | | |
| 43 | 7 | | | | | | | | | | | |
| 44 | 8 | | | | | | | | | | | |

FIG. 6F3

| | Z | AA | AB | AC | AD | AE | AF | AG | AH | AI | AJ |
|---|---|---|---|---|---|---|---|---|---|---|---|
| 25 | Facet | 12 | | | | | | | | | |
| 26 | x | y | z | | | | | | | | |
| 27 | -0.616 | 0.000 | 0.788 | | | | | | | | |
| 28 | End | | | | Middle | | | | End | | |
| 29 | x | y | z | | x | y | z | | x | y | z |
| 30 | 0.333 | -0.476 | 0.814 | | 0.415 | -0.220 | 0.883 | | 0.433 | -0.086 | 0.897 |
| 31 | -0.284 | -0.935 | -0.211 | | -0.382 | -0.813 | -0.440 | | -0.429 | -0.728 | -0.535 |
| 32 | -0.487 | 0.316 | 0.814 | | -0.594 | 0.496 | 0.633 | | -0.638 | 0.564 | 0.524 |
| 33 | | | | | | | | | | | |
| 34 | | | | | | | | | | | |
| 35 | Mirror 1 Corners | | | | Mirror 2 Corners | | | | Mirror 3 Corners | | |
| 36 | x | y | z | | x | y | z | | x | y | z |
| 37 | 3.900 | -2.436 | 2.770 | | 1.700 | -4.102 | 1.300 | | | | |
| 38 | 4.100 | -1.879 | 2.400 | | 3.300 | -4.400 | 1.980 | | | | |
| 39 | 3.800 | -0.137 | 1.800 | | 3.400 | -3.990 | 1.500 | | | | |
| 40 | 3.150 | 0.737 | 1.800 | | 2.300 | -2.427 | -0.625 | | | | |
| 41 | 2.500 | 0.159 | 2.450 | | 1.700 | -2.524 | -0.625 | | | | |
| 42 | 2.650 | -0.757 | 2.770 | | 1.050 | -3.101 | -0.050 | | | | |
| 43 | | | | | | | | | | | |
| 44 | | | | | | | | | | | |
| 45 | | | | | | | | | | | |

FIG. 6F4

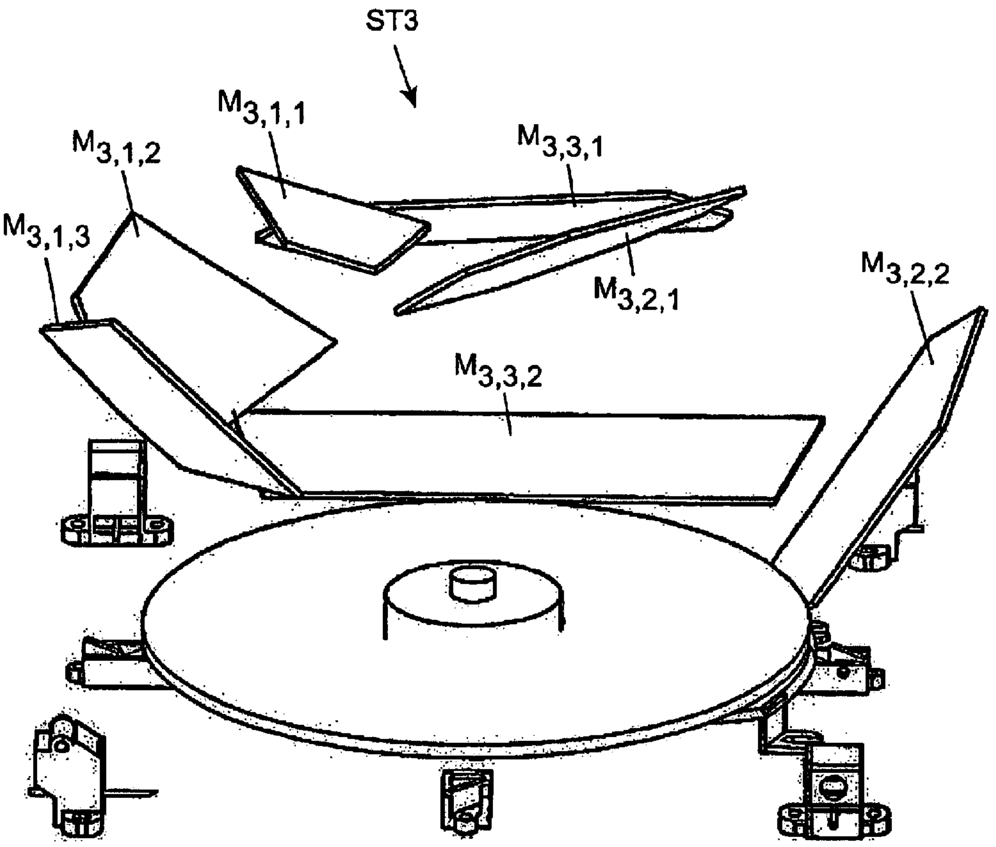
FIG. 6G1

| | N | O | P | Q | R | S | T | U | V | W | X |
|---|---|---|---|---|---|---|---|---|---|---|---|
| 46 | Facet | 1 | | | | | | | | | |
| 47 | x | y | z | | | | | | | | |
| 48 | -0.616 | 0.000 | 0.788 | | | | | | | | |
| 49 | End | | | | Middle | | | | End | | |
| 50 | x | y | z | | x | y | z | | x | y | z |
| 51 | 0.753 | -0.321 | 0.575 | | 0.788 | 0.000 | 0.616 | | 0.753 | 0.321 | 0.575 |
| 52 | -0.366 | -0.443 | -0.819 | | -0.425 | -0.132 | -0.896 | | -0.421 | 0.193 | -0.887 |
| 53 | -0.574 | -0.468 | 0.672 | | -0.653 | -0.160 | 0.740 | | -0.648 | 0.165 | 0.743 |
| 54 | | | | | | | | | | | |
| 55 | | | | | | | | | | | |
| 56 | Mirror 1 Corners | | | | Mirror 2 Corners | | | | Mirror 3 Corners | | |
| 57 | x | y | z | | x | y | z | | x | y | z |
| 58 | 4.250 | -1.500 | 2.547 | | 3.150 | -2.450 | 0.030 | | | | |
| 59 | 4.950 | -2.000 | 2.029 | | 4.500 | -2.800 | 0.213 | | | | |
| 60 | 5.150 | -1.800 | 1.851 | | 4.350 | 2.200 | 0.277 | | | | |
| 61 | 5.000 | 1.800 | 1.656 | | 3.050 | 1.850 | 0.089 | | | | |
| 62 | 4.750 | 1.950 | 1.844 | | | | | | | | |
| 63 | 4.100 | 1.500 | 2.405 | | | | | | | | |
| 64 | | | | | | | | | | | |
| 65 | | | | | | | | | | | |

FIG. 6G2

| | A | B | C | D | E | F | G | H | I | J | K | L |
|---|---|---|---|---|---|---|---|---|---|---|---|---|
| 46 | Low Elevation | Facet | 2 | | | | | | | | | |
| 47 | (G3) | x | y | z | | | | | | | | |
| 48 | Vector from Module | -0.616 | 0.000 | 0.788 | | | | | | | | |
| 49 | | End | | | | Middle | | | | End | | |
| 50 | | x | y | z | | x | y | z | | x | y | z |
| 51 | Output Vectors From Disk | 0.734 | -0.305 | 0.607 | | 0.766 | 0.000 | 0.643 | | 0.731 | 0.319 | 0.604 |
| 52 | First Mirror Reflected Directions | -0.402 | -0.429 | -0.809 | | -0.456 | -0.133 | -0.880 | | -0.453 | 0.190 | -0.871 |
| 53 | Second Mirror Reflected Directions | -0.607 | -0.454 | 0.653 | | -0.679 | -0.161 | 0.716 | | -0.675 | 0.162 | 0.719 |
| 54 | Third Mirror Reflected Directions | | | | | | | | | | | |
| 55 | | | | | | | | | | | | |
| 56 | | Mirror 1 Corners | | | | Mirror 2 Corners | | | | Mirror 3 Corners | | |
| 57 | | x | y | z | | x | y | z | | x | y | z |
| 58 | 1 | 4.250 | -1.500 | 2.547 | | 3.150 | -2.450 | 0.030 | | | | |
| 59 | 2 | 4.950 | -2.000 | 2.029 | | 4.500 | -2.800 | 0.213 | | | | |
| 60 | 3 | 5.150 | -1.800 | 1.851 | | 4.350 | 2.200 | 0.277 | | | | |
| 61 | 4 | 5.000 | 1.800 | 1.656 | | 3.050 | 1.850 | 0.089 | | | | |
| 62 | 5 | 4.750 | 1.950 | 1.844 | | | | | | | | |
| 63 | 6 | 4.100 | 1.500 | 2.405 | | | | | | | | |
| 64 | 7 | | | | | | | | | | | |
| 65 | 8 | | | | | | | | | | | |
| 66 | | | | | | | | | | | | |

FIG. 6G3

| | Z | AA | AB | AC | AD | AE | AF | AG | AH. | AI | AJ |
|---|---|---|---|---|---|---|---|---|---|---|---|
| 46 | Facet | 3 | | | | | | | | | |
| 47 | x | y | z | | | | | | | | |
| 48 | -0.616 | 0.000 | 0.788 | | | | | | | | |
| 49 | End | | | | Middle | | | | End | | |
| 50 | x | y | z | | x | y | z | | x | y | z |
| 51 | 0.714 | -0.290 | 0.638 | | 0.743 | 0.000 | 0.669 | | 0.709 | 0.311 | 0.633 |
| 52 | -0.438 | -0.416 | -0.797 | | -0.487 | -0.134 | -0.863 | | -0.485 | 0.181 | -0.855 |
| 53 | -0.638 | -0.440 | 0.632 | | -0.704 | -0.161 | 0.692 | | -0.702 | 0.155 | 0.695 |
| 54 | | | | | | | | | | | |
| 55 | | | | | | | | | | | |
| 56 | Mirror 1 Corners | | | | Mirror 2 Corners | | | | Mirror 3 Corners | | |
| 57 | x | y | z | | x | y | z | | x | y | z |
| 58 | 4.250 | -1.500 | 2.547 | | 3.150 | -2.450 | 0.030 | | | | |
| 59 | 4.950 | -2.000 | 2.029 | | 4.500 | -2.800 | 0.213 | | | | |
| 60 | 5.150 | -1.800 | 1.851 | | 4.350 | 2.200 | 0.277 | | | | |
| 61 | 5.000 | 1.800 | 1.656 | | 3.050 | 1.850 | 0.089 | | | | |
| 62 | 4.750 | 1.950 | 1.844 | | | | | | | | |
| 63 | 4.100 | 1.500 | 2.405 | | | | | | | | |
| 64 | | | | | | | | | | | |
| 65 | | | | | | | | | | | |

FIG. 6G4

| | AL | AM | AN | AO | AP | AQ | AR | AS | AT | AU | AV |
|---|---|---|---|---|---|---|---|---|---|---|---|
| 46 | Facet | 4 | | | | | | | | | |
| 47 | x | y | z | | | | | | | | |
| 48 | -0.616 | 0.000 | 0.788 | | | | | | | | |
| 49 | | End | | | | Middle | | | | End | |
| 50 | x | y | z | | x | y | z | | x | y | z |
| 51 | 0.692 | -0.275 | 0.667 | | 0.719 | 0.000 | 0.695 | | 0.686 | 0.307 | 0.660 |
| 52 | -0.472 | -0.402 | -0.784 | | -0.517 | -0.135 | -0.846 | | -0.516 | 0.176 | -0.838 |
| 53 | -0.667 | -0.426 | 0.611 | | -0.728 | -0.161 | 0.666 | | -0.727 | 0.151 | 0.670 |
| 54 | | | | | | | | | | | |
| 55 | | | | | | | | | | | |
| 56 | | Mirror 1 Corners | | | | Mirror 2 Corners | | | | Mirror 3 Corners | |
| 57 | x | y | z | | x | y | z | | x | y | z |
| 58 | 4.250 | -1.500 | 2.547 | | 3.150 | -2.450 | 0.030 | | | | |
| 59 | 4.950 | -2.000 | 2.029 | | 4.500 | -2.800 | 0.213 | | | | |
| 60 | 5.150 | -1.800 | 1.851 | | 4.350 | 2.200 | 0.277 | | | | |
| 61 | 5.000 | 1.800 | 1.656 | | 3.050 | 1.850 | 0.089 | | | | |
| 62 | 4.750 | 1.950 | 1.844 | | | | | | | | |
| 63 | 4.100 | 1.500 | 2.405 | | | | | | | | |
| 64 | | | | | | | | | | | |
| 65 | | | | | | | | | | | |

FIG. 6G5

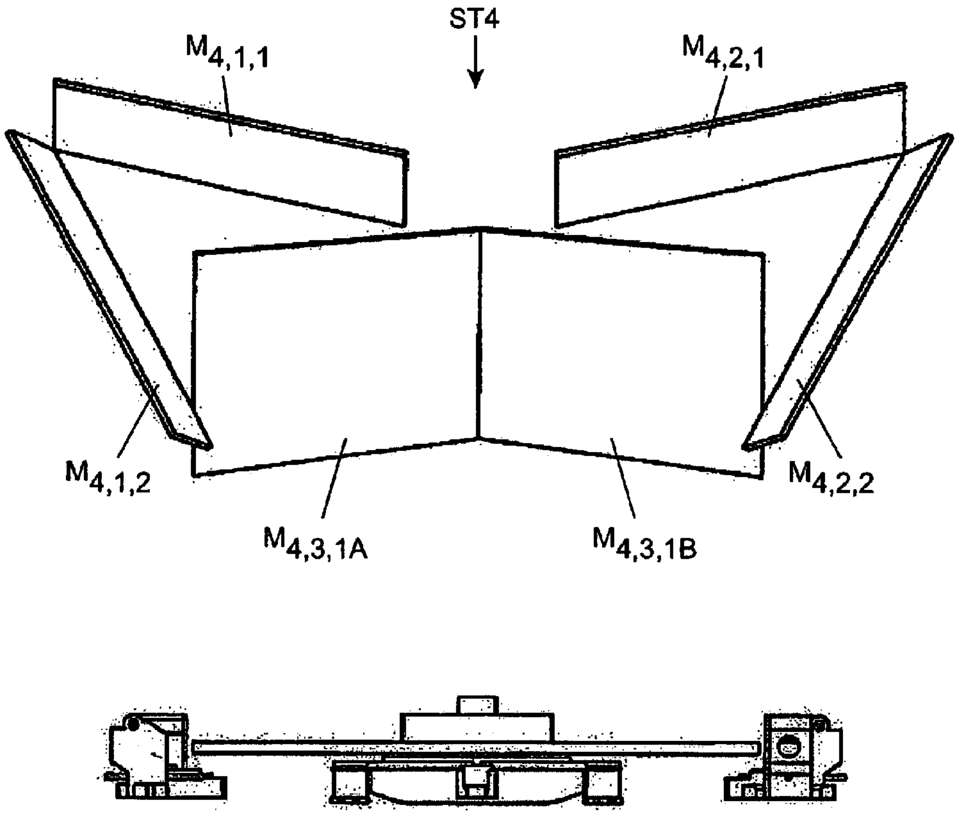
FIG. 6H1

| | N | O | P | Q | R | S | T | U | V | W | X |
|---|---|---|---|---|---|---|---|---|---|---|---|
| 1 | | | | | | | | | | | |
| 2 | | | | | | | | | | | |
| 3 | | | | | | | | | | | |
| 4 | Facet | 7 | | | | | | | | | |
| 5 | x | y | z | | | | | | | | |
| 6 | -0.616 | 0.000 | 0.788 | | | | | | | | |
| 7 | | End | | | | Middle | | | | End | |
| 8 | x | y | z | | x | y | z | | x | y | z |
| 9 | 0.399 | 0.468 | 0.789 | | 0.468 | 0.249 | 0.848 | | 0.481 | 0.180 | 0.858 |
| 10 | -0.433 | 0.736 | -0.519 | | -0.495 | 0.559 | -0.665 | | -0.511 | 0.500 | -0.700 |
| 11 | -0.737 | -0.585 | 0.339 | | -0.768 | -0.631 | 0.108 | | -0.771 | -0.636 | 0.038 |
| 12 | | | | | | | | | | | |
| 13 | | | | | | | | | | | |
| 14 | | Mirror 1 Corners | | | | Mirror 2 Corners | | | | Mirror 3 Corners | |
| 15 | x | y | z | | x | y | z | | x | y | z |
| 16 | 4.900 | 0.800 | 6.409 | | 2.850 | 3.200 | 3.370 | | | | |
| 17 | 6.100 | 0.800 | 5.645 | | 4.200 | 2.800 | 3.231 | | | | |
| 18 | 6.000 | 4.500 | 6.468 | | 5.950 | 4.500 | 6.464 | | | | |
| 19 | 4.900 | 4.500 | 7.168 | | 4.600 | 4.950 | 6.680 | | | | |
| 20 | | | | | | | | | | | |
| 21 | | | | | | | | | | | |
| 22 | | | | | | | | | | | |
| 23 | | | | | | | | | | | |

FIG. 6H2

| | A | B | C | D | E | F | G | H | I | J | K | L |
|---|---|---|---|---|---|---|---|---|---|---|---|---|
| 1 | Station 4 | | | | | | | | | | | |
| 2 | | | | | | | | | | | | |
| 3 | | | | | | | | | | | | |
| 4 | High Elevation Left Skew | Facet | 9 | | | | | | | | | |
| 5 | | x | y | z | | | | | | | | |
| 6 | Vector from Module | -0.616 | 0.000 | 0.788 | | | | | | | | |
| 7 | | | End | | | | Middle | | | | End | |
| 8 | | x | y | z | | x | y | z | | x | y | z |
| 9 | Output Vectors From Disk | 0.366 | 0.474 | 0.801 | | 0.441 | 0.235 | 0.866 | | 0.452 | 0.177 | 0.874 |
| 10 | First Mirror Reflected Directions | -0.458 | 0.739 | -0.494 | | -0.525 | 0.546 | -0.653 | | -0.538 | 0.496 | -0.681 |
| 11 | Second Mirror Reflected Directions | -0.755 | -0.556 | 0.348 | | -0.789 | -0.606 | 0.096 | | -0.792 | -0.610 | 0.037 |
| 12 | Third Mirror Reflected Directions | | | | | | | | | | | |
| 13 | | | | | | | | | | | | |
| 14 | | | Mirror 1 Corners | | | | Mirror 2 Corners | | | | Mirror 3 Corners | |
| 15 | | x | y | z | | x | y | z | | x | y | z |
| 16 | 1 | 4.900 | 0.800 | 6.409 | | 2.850 | 3.200 | 3.370 | | | | |
| 17 | 2 | 6.100 | 0.800 | 5.645 | | 4.200 | 2.800 | 3.231 | | | | |
| 18 | 3 | 6.000 | 4.500 | 6.468 | | 5.950 | 4.500 | 6.464 | | | | |
| 19 | 4 | 4.900 | 4.500 | 7.168 | | 4.600 | 4.950 | 6.680 | | | | |
| 20 | 5 | | | | | | | | | | | |
| 21 | 6 | | | | | | | | | | | |
| 22 | 7 | | | | | | | | | | | |

FIG. 6H3

| | Z | AA | AB | AC | AD | AE | AF | AG | AH | AI | AJ |
|---|---|---|---|---|---|---|---|---|---|---|---|
| 1 | | | | | | | | | | | |
| 2 | | | | | | | | | | | |
| 3 | | | | | | | | | | | |
| 4 | Facet | 11 | | | | | | | | | |
| 5 | x | y | z | | | | | | | | |
| 6 | -0.616 | 0.000 | 0.788 | | | | | | | | |
| 7 | End | | | | Middle | | | | End | | |
| 8 | x | y | z | | x | y | z | | x | y | z |
| 9 | 0.332 | 0.478 | 0.813 | | 0.415 | 0.220 | 0.883 | | 0.422 | 0.176 | 0.889 |
| 10 | -0.482 | 0.741 | -0.467 | | -0.554 | 0.533 | -0.640 | | -0.564 | 0.494 | -0.661 |
| 11 | -0.773 | -0.526 | 0.356 | | -0.810 | -0.581 | 0.084 | | -0.811 | -0.583 | 0.039 |
| 12 | | | | | | | | | | | |
| 13 | | | | | | | | | | | |
| 14 | Mirror 1 Corners | | | | Mirror 2 Corners | | | | Mirror 3 Corners | | |
| 15 | x | y | z | | x | y | z | | x | y | z |
| 16 | 4.900 | 0.800 | 6.409 | | 2.850 | 3.200 | 3.370 | | | | |
| 17 | 6.100 | 0.800 | 5.645 | | 4.200 | 2.800 | 3.231 | | | | |
| 18 | 6.000 | 4.500 | 6.468 | | 5.950 | 4.500 | 6.464 | | | | |
| 19 | 4.900 | 4.500 | 7.168 | | 4.600 | 4.950 | 6.680 | | | | |
| 20 | | | | | | | | | | | |
| 21 | | | | | | | | | | | |
| 22 | | | | | | | | | | | |
| 23 | | | | | | | | | | | |
| 24 | | | | | | | | | | | |

FIG. 6H4

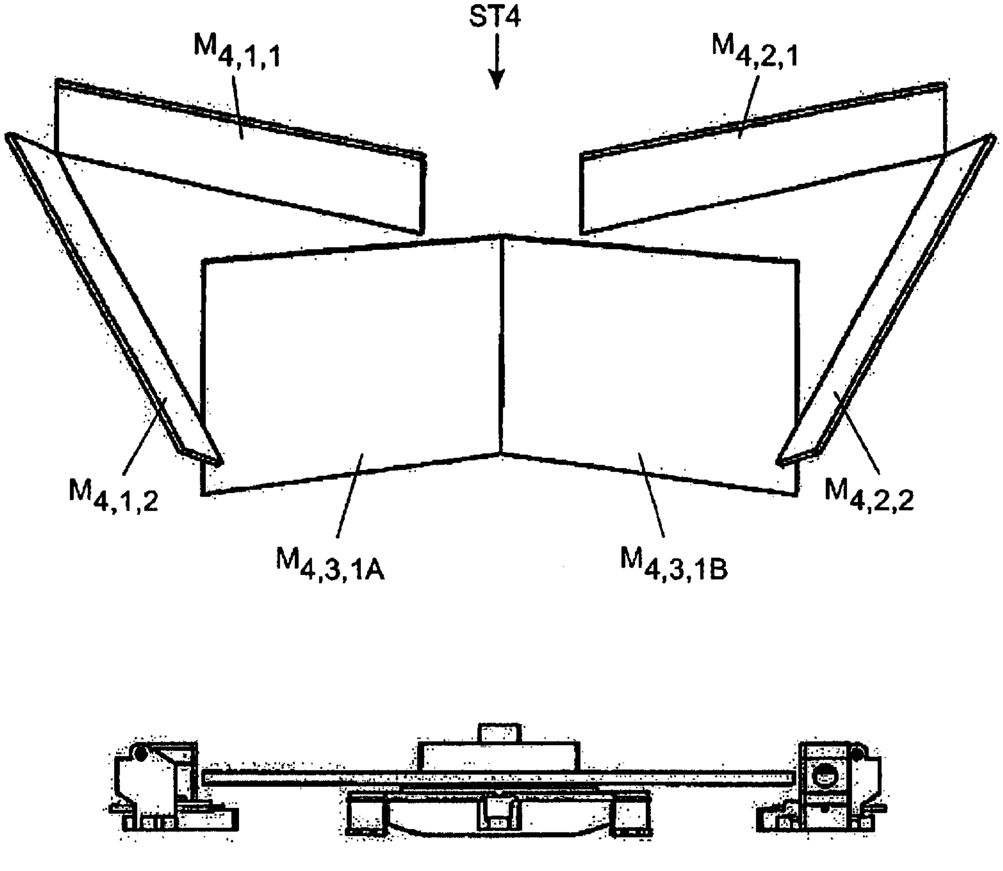
FIG. 6I1

| | N | O | P | Q | R | S | T | U | V | W | X |
|---|---|---|---|---|---|---|---|---|---|---|---|
| 25 | Facet | 8 | | | | | | | | | |
| 26 | x | y | z | | | | | | | | |
| 27 | -0.616 | 0.000 | 0.788 | | | | | | | | |
| 28 | End | | | | Middle | | | | End | | |
| 29 | x | y | z | | x | y | z | | x | y | z |
| 30 | 0.481 | -0.180 | 0.858 | | 0.468 | -0.249 | 0.848 | | 0.399 | -0.468 | 0.789 |
| 31 | -0.511 | -0.500 | -0.700 | | -0.495 | -0.559 | -0.665 | | -0.433 | -0.736 | -0.519 |
| 32 | -0.771 | 0.636 | 0.038 | | -0.768 | 0.631 | 0.108 | | -0.737 | 0.585 | 0.339 |
| 33 | | | | | | | | | | | |
| 34 | | | | | | | | | | | |
| 35 | Mirror 1 Corners | | | | Mirror 2 Corners | | | | Mirror 3 Corners | | |
| 36 | x | y | z | | x | y | z | | x | y | z |
| 37 | 4.900 | -0.800 | 6.409 | | 2.850 | -3.200 | 3.370 | | | | |
| 38 | 6.100 | -0.800 | 5.645 | | 4.200 | -2.800 | 3.231 | | | | |
| 39 | 6.000 | -4.500 | 6.468 | | 5.950 | -4.500 | 6.464 | | | | |
| 40 | 4.900 | -4.500 | 7.168 | | 4.600 | -4.950 | 6.680 | | | | |
| 41 | | | | | | | | | | | |
| 42 | | | | | | | | | | | |
| 43 | | | | | | | | | | | |

FIG. 6I2

| | A | B | C | D | E | F | G | H | I | J | K | L |
|---|---|---|---|---|---|---|---|---|---|---|---|---|
| 25 | High Elevation Right Skew | Facet | 10 | | | | | | | | | |
| 26 | | x | y | z | | | | | | | | |
| 27 | Vector from Module | -0.616 | 0.000 | 0.788 | | | | | | | | |
| 28 | | | End | | | | Middle | | | | End | |
| 29 | | x | y | z | | x | y | z | | x | y | z |
| 30 | Output Vectors From Disk | 0.452 | -0.177 | 0.874 | | 0.441 | -0.235 | 0.866 | | 0.366 | -0.474 | 0.801 |
| 31 | First Mirror Reflected Directions | -0.538 | -0.496 | -0.681 | | -0.525 | -0.546 | -0.653 | | -0.458 | -0.739 | -0.494 |
| 32 | Second Mirror Reflected Directions | -0.792 | 0.610 | 0.037 | | -0.789 | 0.606 | 0.096 | | -0.755 | 0.556 | 0.348 |
| 33 | Third Mirror Reflected Directions | | | | | | | | | | | |
| 34 | | | | | | | | | | | | |
| 35 | | | Mirror 1 Corners | | | | Mirror 2 Corners | | | | Mirror 3 Corners | |
| 36 | | x | y | z | | x | y | z | | x | y | z |
| 37 | 1 | 4.900 | -0.800 | 6.409 | | 2.850 | -3.200 | 3.370 | | | | |
| 38 | 2 | 6.100 | -0.800 | 5.645 | | 4.200 | -2.800 | 3.231 | | | | |
| 39 | 3 | 6.000 | -4.500 | 6.468 | | 5.950 | -4.500 | 6.464 | | | | |
| 40 | 4 | 4.900 | -4.500 | 7.168 | | 4.600 | -4.950 | 6.680 | | | | |
| 41 | 5 | | | | | | | | | | | |
| 42 | 6 | | | | | | | | | | | |
| 43 | 7 | | | | | | | | | | | |
| 44 | 8 | | | | | | | | | | | |

FIG. 6I3

| | Z | AA | AB | AC | AD | AE | AF | AG | AH | AI | AJ |
|---|---|---|---|---|---|---|---|---|---|---|---|
| 25 | Facet | 12 | | | | | | | | | |
| 26 | x | y | z | | | | | | | | |
| 27 | -0.616 | 0.000 | 0.788 | | | | | | | | |
| 28 | End | | | | Middle | | | | End | | |
| 29 | x | y | z | | x | y | z | | x | y | z |
| 30 | 0.422 | -0.176 | 0.889 | | 0.415 | -0.220 | 0.883 | | 0.332 | -0.478 | 0.813 |
| 31 | -0.564 | -0.494 | -0.661 | | -0.554 | -0.533 | -0.640 | | -0.482 | -0.741 | -0.467 |
| 32 | -0.811 | 0.583 | 0.039 | | -0.810 | 0.581 | 0.084 | | -0.773 | 0.526 | 0.356 |
| 33 | | | | | | | | | | | |
| 34 | | | | | | | | | | | |
| 35 | Mirror 1 Corners | | | | Mirror 2 Corners | | | | Mirror 3 Corners | | |
| 36 | x | y | z | | x | y | z | | x | y | z |
| 37 | 4.900 | -0.800 | 6.409 | | 2.850 | -3.200 | 3.370 | | | | |
| 38 | 6.100 | -0.800 | 5.645 | | 4.200 | -2.800 | 3.231 | | | | |
| 39 | 6.000 | -4.500 | 6.468 | | 5.950 | -4.500 | 6.464 | | | | |
| 40 | 4.900 | -4.500 | 7.168 | | 4.600 | -4.950 | 6.680 | | | | |
| 41 | | | | | | | | | | | |
| 42 | | | | | | | | | | | |
| 43 | | | | | | | | | | | |
| 44 | | | | | | | | | | | |

FIG. 6I4

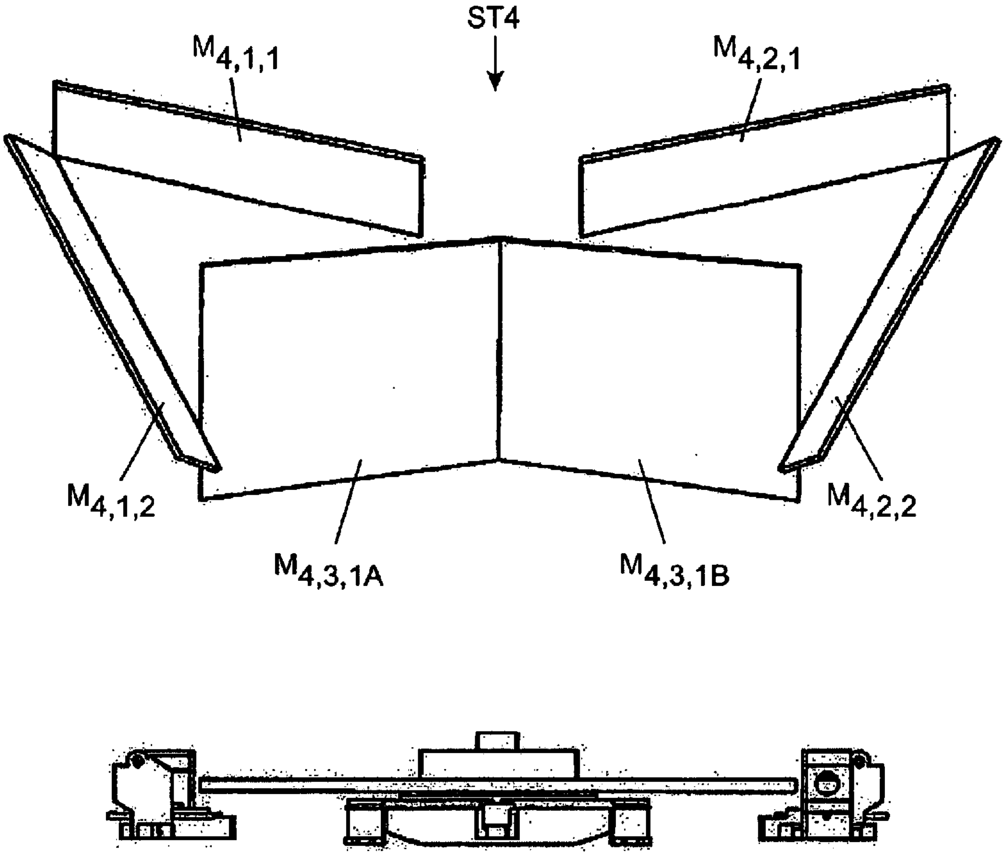
FIG. 6J1

| | N | O | P | Q | R | S | T | U | V | W | X |
|---|---|---|---|---|---|---|---|---|---|---|---|
| 46 | Facet | 1 | | | | | | | | | |
| 47 | x | y | z | | | | | | | | |
| 48 | -0.616 | 0.000 | 0.788 | | | | | | | | |
| 49 | End | | | | Middle | | | | End | | |
| 50 | x | y | z | | x | y | z | | x | y | z |
| 51 | 0.788 | 0.001 | 0.616 | | 0.788 | 0.000 | 0.616 | | 0.741 | -0.367 | 0.562 |
| 52 | -0.938 | 0.335 | 0.087 | | -0.939 | 0.334 | 0.087 | | -0.999 | -0.031 | 0.029 |
| 53 | | | | | | | | | | | |
| 54 | | | | | | | | | | | |
| 55 | | | | | | | | | | | |
| 56 | Mirror 1 Corners | | | | Mirror 2 Corners | | | | Mirror 3 Corners | | |
| 57 | x | y | z | | x | y | z | | x | y | z |
| 58 | 6.700 | 0.000 | 5.608 | | | | | | | | |
| 59 | 7.400 | 0.000 | 3.322 | | | | | | | | |
| 60 | 6.950 | -3.000 | 2.897 | | | | | | | | |
| 61 | 6.200 | -3.000 | 5.345 | | | | | | | | |
| 62 | | | | | | | | | | | |
| 63 | | | | | | | | | | | |
| 64 | | | | | | | | | | | |
| 65 | | | | | | | | | | | |
| 66 | | | | | | | | | | | |

FIG. 6J2

| | Z | AA | AB | AC | AD | AE | AF | AG | AH | AI | AJ |
|---|---|---|---|---|---|---|---|---|---|---|---|
| 46 | Facet | 2 | | | | | | | | | |
| 47 | x | y | z | | | | | | | | |
| 48 | -0.616 | 0.000 | 0.788 | | | | | | | | |
| 49 | | End | | | | Middle | | | | End | |
| 50 | x | y | z | | x | y | z | | x | y | z |
| 51 | 0.766 | 0.000 | 0.643 | | 0.766 | 0.000 | 0.643 | | 0.711 | -0.395 | 0.581 |
| 52 | -0.936 | 0.329 | 0.121 | | -0.936 | 0.329 | 0.121 | | -0.996 | -0.065 | 0.058 |
| 53 | | | | | | | | | | | |
| 54 | | | | | | | | | | | |
| 55 | | | | | | | | | | | |
| 56 | | Mirror 1 Corners | | | | Mirror 2 Corners | | | | Mirror 3 Corners | |
| 57 | x | y | z | | x | y | z | | x | y | z |
| 58 | 6.700 | 0.000 | 5.608 | | | | | | | | |
| 59 | 7.400 | 0.000 | 3.322 | | | | | | | | |
| 60 | 6.950 | -3.000 | 2.897 | | | | | | | | |
| 61 | 6.200 | -3.000 | 5.345 | | | | | | | | |
| 62 | | | | | | | | | | | |
| 63 | | | | | | | | | | | |
| 64 | | | | | | | | | | | |
| 65 | | | | | | | | | | | |
| 66 | | | | | | | | | | | |

FIG. 6J3

| | A | B | C | D | E | F | G | H | I | J | K | L |
|---|---|---|---|---|---|---|---|---|---|---|---|---|
| 46 | Low Elevation | Facet | 3 | | | | | | | | | |
| 47 | | x | y | z | | | | | | | | |
| 48 | Vector from Module | -0.616 | 0.000 | 0.788 | | | | | | | | |
| 49 | | | End | | | | Middle | | | | End | |
| 50 | | x | y | z | | x | y | z | | x | y | z |
| 51 | Output Vectors From Disk | 0.743 | 0.000 | 0.669 | | 0.743 | 0.000 | 0.669 | | 0.697 | -0.362 | 0.619 |
| 52 | First Mirror Reflected Directions | -0.933 | 0.324 | 0.156 | | -0.933 | 0.324 | 0.156 | | -0.994 | -0.035 | 0.101 |
| 53 | Second Mirror Reflected Directions | | | | | | | | | | | |
| 54 | Third Mirror Reflected Directions | | | | | | | | | | | |
| 55 | | | | | | | | | | | | |
| 56 | | | Mirror 1 Corners | | | | Mirror 2 Corners | | | | Mirror 3 Corners | |
| 57 | | x | y | z | | x | y | z | | x | y | z |
| 58 | 1 | 6.700 | 0.000 | 5.608 | | | | | | | | |
| 59 | 2 | 7.400 | 0.000 | 3.322 | | | | | | | | |
| 60 | 3 | 6.950 | -3.000 | 2.897 | | | | | | | | |
| 61 | 4 | 6.200 | -3.000 | 5.345 | | | | | | | | |
| 62 | 5 | | | | | | | | | | | |
| 63 | 6 | | | | | | | | | | | |
| 64 | 7 | | | | | | | | | | | |
| 65 | 8 | | | | | | | | | | | |
| 66 | | | | | | | | | | | | |

FIG. 6J4

| | AL | AM | AN | AO | AP | AQ | AR | AS | AT | AU | AV |
|---|---|---|---|---|---|---|---|---|---|---|---|
| 46 | Facet | 4 | | | | | | | | | |
| 47 | x | y | z | | | | | | | | |
| 48 | -0.616 | 0.000 | 0.788 | | | | | | | | |
| 49 | End | | | | Middle | | | | End | | |
| 50 | x | y | z | | x | y | z | | x | y | z |
| 51 | 0.719 | 0.000 | 0.695 | | 0.719 | 0.000 | 0.695 | | 0.664 | -0.395 | 0.635 |
| 52 | -0.929 | 0.319 | 0.190 | | -0.929 | 0.319 | 0.190 | | -0.989 | -0.075 | 0.129 |
| 53 | | | | | | | | | | | |
| 54 | | | | | | | | | | | |
| 55 | | | | | | | | | | | |
| 56 | Mirror 1 Corners | | | | Mirror 2 Corners | | | | Mirror 3 Corners | | |
| 57 | x | y | z | | x | y | z | | x | y | z |
| 58 | 6.700 | 0.000 | 5.608 | | | | | | | | |
| 59 | 7.400 | 0.000 | 3.322 | | | | | | | | |
| 60 | 6.950 | -3.000 | 2.897 | | | | | | | | |
| 61 | 6.200 | -3.000 | 5.345 | | | | | | | | |
| 62 | | | | | | | | | | | |
| 63 | | | | | | | | | | | |
| 64 | | | | | | | | | | | |
| 65 | | | | | | | | | | | |
| 66 | | | | | | | | | | | |

FIG. 6J5

| | AX | AY | AZ | BA | BB | BC | BD | BE | BF | BG | BH |
|---|---|---|---|---|---|---|---|---|---|---|---|
| 46 | Facet | 5 | | | | | | | | | |
| 47 | x | y | z | | | | | | | | |
| 48 | -0.616 | 0.000 | 0.788 | | | | | | | | |
| 49 | | End | | | | Middle | | | | End | |
| 50 | x | y | z | | x | y | z | | x | y | z |
| 51 | 0.669 | 0.000 | 0.743 | | 0.669 | 0.000 | 0.743 | | 0.621 | -0.362 | 0.695 |
| 52 | -0.916 | 0.307 | 0.257 | | -0.916 | 0.307 | 0.257 | | -0.977 | -0.052 | 0.206 |
| 53 | | | | | | | | | | | |
| 54 | | | | | | | | | | | |
| 55 | | | | | | | | | | | |
| 56 | | Mirror 1 Corners | | | | Mirror 2 Corners | | | | Mirror 3 Corners | |
| 57 | x | y | z | | x | y | z | | x | y | z |
| 58 | 6.700 | 0.000 | 5.608 | | | | | | | | |
| 59 | 7.400 | 0.000 | 3.322 | | | | | | | | |
| 60 | 6.950 | -3.000 | 2.897 | | | | | | | | |
| 61 | 6.200 | -3.000 | 5.345 | | | | | | | | |
| 62 | | | | | | | | | | | |
| 63 | | | | | | | | | | | |
| 64 | | | | | | | | | | | |
| 65 | | | | | | | | | | | |

FIG. 6J6

| | BJ | BK | BL | BM | BN | BO | BP | BQ | BR | BS | BT | BU |
|---|---|---|---|---|---|---|---|---|---|---|---|---|
| 46 | Facet | 6 | | | | | | | | | | |
| 47 | x | y | z | | | | | | | | | |
| 48 | -0.616 | 0.000 | 0.788 | | | | | | | | | |
| 49 | End | | | | Middle | | | | End | | | |
| 50 | x | y | z | | x | y | z | | x | y | z | |
| 51 | 0.616 | 0.000 | 0.788 | | 0.616 | 0.000 | 0.788 | | 0.561 | -0.380 | 0.735 | |
| 52 | -0.900 | 0.293 | 0.324 | | -0.900 | 0.293 | 0.324 | | -0.959 | -0.086 | 0.270 | |
| 53 | | | | | | | | | | | | |
| 54 | | | | | | | | | | | | |
| 55 | | | | | | | | | | | | |
| 56 | Mirror 1 Corners | | | | Mirror 2 Corners | | | | Mirror 3 Corners | | | |
| 57 | x | y | z | | x | y | z | | x | y | z | |
| 58 | 6.700 | 0.000 | 5.608 | | | | | | | | | |
| 59 | 7.400 | 0.000 | 3.322 | | | | | | | | | |
| 60 | 6.950 | -3.000 | 2.897 | | | | | | | | | |
| 61 | 6.200 | -3.000 | 5.345 | | | | | | | | | |
| 62 | | | | | | | | | | | | |
| 63 | | | | | | | | | | | | |
| 64 | | | | | | | | | | | | |
| 65 | | | | | | | | | | | | |

FIG. 6J7

BIOPTICAL LASER SCANNING SYSTEM PROVIDING 360° OF OMNIDIRECTIONAL BAR CODE SYMBOL SCANNING COVERAGE AT A POINT OF SALE (POS) STATION

RELATED CASES

This is a Continuation of application Ser. No. 09/551,887 filed Apr. 18, 2000 now U.S. Pat. No. 6,758,402; which is a Continuation-in-Part of application Ser. No. 08/949,915 filed Oct. 14, 1997, now U.S. Pat. No. 6,158,659; application Ser. No. 08/726,522 filed Oct. 7, 1996, now U.S. Pat. No. 6,073,846; which is a Continuation of application Ser. No. 08/573,949 filed Dec. 18, 1995, now abandoned; which is a Continuation-in-Part of application Ser. No. 08/615,054 filed Mar. 12, 1996, now U.S. Pat. No. 6,286,760; Ser. No. 08/476,069 field Jun. 7, 1995, now U.S. Pat. No. 5,591,953; Ser. No. 08/561,479 filed Nov. 20, 1995, now U.S. Pat. No. 5,661,292; which is a Continuation of Ser. No. 08/293,695 filed Aug. 19, 1994, now U.S. Pat. No. 5,468,951; Ser. No. 08/293,493 filed Aug. 19, 1994, now U.S. Pat. No. 5,525, 789; Ser. No. 08/475,376 filed Jun. 7, 1995, now U.S. Pat. No. 5,637,852; Ser. No. 08/439,224 filed May 11, 1995, now U.S. Pat. No. 5,627,359; and Ser. No. 08/292,237 filed Aug. 17, 1994, now U.S. Pat. No. 5,808,285; each commonly owned by Assignee, Metrologic Instruments, Inc., of Blackwood, N.J., and is incorporated herein by reference as if fully set forth herein.

BACKGROUND OF THE INVENTION

1. Field of Invention

The present invention relates generally to holographic laser scanners of ultra-compact design capable of reading bar code symbols in point-of-sale (POS) and other demanding scanning environments.

2. Brief Description of the Prior Art

The use of bar code symbols for product and article identification is well known in the art.

Presently, various types of bar code symbol scanners have been developed. In general, these bar code symbol readers can be classified into two distinct classes.

The first class of bar code symbol reader simultaneously illuminates all of the bars and spaces of a bar code symbol with light of a specific wavelength(s) in order to capture an image thereof for recognition and decoding purposes. Such scanners are commonly known as CCD scanners because they use CCD image detectors to detect images of the bar code symbols being read.

The second class of bar code symbol reader uses a focused light beam, typically a focused laser beam, to sequentially scan the bars and spaces of a bar code symbol to be read. This type of bar code symbol scanner is commonly called a "flying spot" scanner as the focused laser beam appears as "a spot of light that flies" across the bar code symbol being read. In general, laser bar code symbol scanners are subclassified further by the type of mechanism used to focus and scan the laser beam across bar code symbols.

The majority of laser scanners in use today, particular in retail environments, employ lenses and moving (i.e. rotating or oscillating) mirrors and/or other optical elements in order to focus and scan laser beams across bar code symbols during code symbol reading operations. In demanding retail scanning environments, it is common for such systems to have both bottom and side scanning windows to enable highly aggressive scanner performance, whereby the cashier need only drag a bar coded product past these scanning windows for the bar code thereon to be automatically read with minimal assistance of the cashier or checkout personal. Such dual scanning window systems are typically referred to as "bioptical" laser scanning systems as such systems employ two sets of optics disposed behind the bottom and side scanning windows thereof. Examples of polygon-based bioptical laser scanning systems are disclosed in U.S. Pat. No. 4,229,588 and U.S. Pat. No. 4,652,732, assigned to NCR, Inc., each incorporated herein by reference in its entirety.

In general, prior art bioptical laser scanning systems are generally more aggressive that conventional single scanning window systems. For this reason, bioptical scanning system are often deployed in demanding retail environments, such as supermarkets and high-volume department stores, where high check-out throughput is critical to achieving store profitability and customer satisfaction.

While prior art bioptical scanning systems represent a technological advance over most single scanning window system, prior art bioptical scanning systems in general suffered from various shortcomings and drawbacks.

In particular, by virtue of the dual scanning windows and supporting optics required by prior art bioptical laser scanning systems, such scanning systems have been physically larger than many retail environments would otherwise desire, as space near the point-of-sale is the most valuable space within the retail environment. Also, the laser scanning patterns of prior art bioptical laser scanning systems are not optimized in terms of scanning coverage and performance, and are generally expensive to manufacture by virtue of the large number of optical components presently required to constructed such laser scanning systems.

Thus, there is a great need in the art for an improved bioptical-type laser scanning bar code symbol reading system, while avoiding the shortcomings and drawbacks of prior art laser scanning systems and methodologies.

OBJECTS AND SUMMARY OF THE PRESENT INVENTION

Accordingly, a primary object of the present invention is to provide a novel bioptical-type holographic laser scanning system which is free of the shortcomings and drawbacks of prior art bioptical laser scanning systems and methodologies.

Another object of the present invention is to provide a bioptical holographic laser scanning system, wherein a plurality of pairs of quasi-orthogonal laser scanning planes are projected within predetermined regions of space contained within a 3-D scanning volume defined between the bottom and side scanning windows of the system.

Another object of the present invention is to provide a novel bioptical holographic laser scanning system, wherein the plurality of pairs of quasi-orthogonal laser scanning planes are produced using a holographic scanning disc having holographic scanning facets that have high and low elevation angle characteristics as well as left, right and zero skew angle characteristics.

Another object of the present invention is to provide a bioptical holographic laser scanning system, wherein the each pair of quasi-orthogonal laser scanning planes comprises a plurality of substantially-vertical laser scanning planes for reading bar code symbols having bar code elements (i.e. ladder-type bar code symbols) that are oriented substantially horizontal with respect to the bottom scanning window, and a plurality of substantially-horizontal laser scanning planes for reading bar code symbols having bar code elements (i.e. picket-fence type bar code symbols) that are oriented substantially vertical with respect to the bottom scanning window.

Another object of the present invention is to provide a bioptical holographic laser scanning system comprising a plurality of laser scanning stations, each of which produces a plurality of pairs of quasi-orthogonal laser scanning planes are projected within predetermined regions of space contained within a 3-D scanning volume defined between the bottom and side scanning windows of the system.

Another object of the present invention is to provide a bioptical holographic laser scanning system, wherein the plurality of pairs of quasi-orthogonal laser scanning planes are produced using a holographic scanning disc supporting holographic scanning facets having high and low elevation angle characteristics and left, right and zero skew angle characteristics.

Another object of the present invention is to provide a bioptical holographic laser scanning system, wherein each laser scanning station produces a plurality of pairs of quasi-orthogonal laser scanning planes which can read bar code symbol that is orientated with bar code elements arranged in either a substantially vertical (i.e. picket-fence) or substantially horizontal (i.e. ladder) configuration with respect to the horizontal scanning window of the system.

Another object of the present invention is to provide such a bioptical holographic laser scanning system employing four laser scanning systems, wherein the first and third laser scanning stations employ mirror groups and scanning facets having only high elevation characteristics and left and right skew angle characteristics so as to produce from each station a plurality of pairs of quasi-orthogonal laser scanning planes capable of reading bar code symbol orientated with bar code elements arranged in either a substantially vertical (i.e. picket-fence) or substantially horizontal (i.e. ladder) configuration with respect to the horizontal scanning window of the system.

Another object of the present invention is to provide such a bioptical holographic laser scanning system, wherein the second laser scanning station employs mirror groups and scanning facets having only low elevation characteristics and zero skew angle characteristics so as to produce from each station a plurality of pairs of quasi-orthogonal laser scanning planes capable of reading bar code symbol orientated with bar code elements arranged in either a substantially vertical (i.e. picket-fence) or substantially horizontal (i.e. ladder) configuration with respect to the horizontal scanning window of the system.

Another object of the present invention is to provide such a bioptical holographic laser scanning system, wherein the fourth laser scanning station employs mirror groups and scanning facets having only high elevation characteristics and zero skew angle characteristics so as to produce from each station a plurality of laser scanning planes capable of reading bar code symbol orientated with bar code elements arranged in either a substantially vertical (i.e. picket-fence) configuration with respect to the horizontal scanning window of the system.

Another object of the present invention is to provide a bioptical holographic laser scanning system, wherein the plurality of pairs of quasi-orthogonal laser scanning planes are produced using S-polarized laser beams directed incident the holographic scanning disc.

Another object of the present invention is to provide a bioptical holographic laser scanning system, wherein four symmetrically placed visible laser diodes (VLDs) are used to create the plurality of pairs of quasi-orthogonal laser scanning planes.

Another object of the present invention is to provide a bioptical holographic laser scanning system, wherein a single VLD is used to create the vertical window scan pattern, thereby minimizing crosstalk.

Another object of the present invention is to provide a bioptical holographic laser scanning system, wherein the sizes of the laser beam folding mirrors employed at each laser scanning station of the present invention are minimized.

Another object of the present invention is to provide a bioptical holographic laser scanning system, wherein blocking of light return paths by the laser beam folding mirrors has been eliminated.

Another object of the present invention is to provide a bioptical holographic laser scanning system, wherein mechanical interference between individual laser beam folding mirrors within the system has been eliminated.

Another object of the present invention is to provide a bioptical holographic laser scanning system, wherein the angles of incidence of the laser scanning beams at the horizontal scanning window have been optimized.

Another object of the present invention is to provide a bioptical holographic laser scanning system which generates a laser scanning pattern providing 360 degrees of scan coverage at a POS station, while the internal mirror-space volume of the scanning system has been minimized.

Another object of the present invention is to provide such a bioptical holographic laser scanning system, wherein the "sweet spot" of the 360 laser scanning pattern is located at and above the center of the horizontal (i.e. bottom) scanning window, regardless of the item orientation or location of the bar code on the item.

Another object of the present invention is to provide such a bioptical holographic laser scanning system, wherein the center of all groups of laser scanning planes generated by the system is directed toward the center of the horizontal scanning window, or to a line normal to the horizontal scanning window at the center thereof, thereby enhancing operator productivity by providing the feedback "beep" at substantially the same location above the horizontal scanning window for each and every item being scanned.

Another object of the present invention is to provide a bioptical holographic laser scanning system, wherein the size of the scan data collecting photodetector at each laser scanning station is minimized.

Another object of the present invention is to provide a bioptical holographic laser scanning system, wherein the location of the scan data collecting photodetector at each laser scanning station is determined using a novel spreadsheet-based design process that minimizes the vertical space required for placement of the parabolic light collection mirror beneath the scanning disc.

Another object of the present invention is to provide a bioptical holographic laser scanning system, wherein the size, shape and orientation of the scan data collecting photodetector at each laser scanning station is designed so that the lateral shift of the reflected beam image across the light sensitive surface of the photo detector, as a scanned item moves through the DOF region of the scanning station, results in a relatively uniform light level reaching the light sensitive surface of the photodetector.

Another object of the present invention is to provide a bioptical holographic laser scanning system, wherein use of the shift of the image across the data detector (as the item moves through the DOF region) to minimize the variation in signal.

Another object of the present invention is to provide a bioptical holographic laser scanning system, wherein partial facet-to-facet DOF overlap to optimize the DOF region while minimizing the effects of paper noise; and Another object of the present invention is to provide a bioptical holographic laser scanning system, which allows the same facets to be used for both the horizontal and vertical windows even though the distances to the items to be scanned is different for the two windows.

Another object of the present invention is to provide a bioptical holographic laser scanning system, wherein use of a 12 facet disk design to increase the signal level for a 6 inch disk, necessary for POS scanners, which must provide lower laser power levels at the scan windows.

Another object of the present invention is to provide a bioptical holographic laser scanning system, wherein use of an S-polarized beam at the disk to maximize signal and provide better resolution throughout the DOF region.

Another object of the present invention is to provide a bioptical holographic laser scanning system, wherein use of skew facets with symmetric Left/Right skew, which allows the same scan pattern to be produced by both the fore and aft scanning stations.

Another object of the present invention is to provide a bioptical holographic laser scanning system, wherein the vertical-window horizontal scan lines and the operator-side-station horizontal scan lines are split and tilted for enhanced scan coverage.

Another object of the present invention is to provide a bioptical holographic laser scanning system, wherein recessing selected portions of the scanner base plate allow reduction of the box height.

Another object of the present invention is to provide a bioptical holographic laser scanning system, wherein parabolic mirror with modified, non-sector-shaped, cross-section maximize light collection efficiency.

Another object of the present invention is to provide a bioptical holographic laser scanning system, wherein use of optimum skew angle for each of the skew facets provides maximum scan coverage while minimizing the mirror-space volume.

Another object of the present invention is to provide a bioptical holographic laser scanning system, wherein diffraction angles are selected to provide maximum scan coverage while still allowing complete blockage of the facet from undesired ambient light.

Another object of the present invention is to provide a bioptical holographic laser scanning system, wherein fixed beam blocker with optimum shape prohibits ambient light from entering the facets at the zero order beam angle, which light would otherwise be directed to the data detector by the parabolic mirror, thereby increasing the noise level.

Another object of the present invention is to provide a bioptical holographic laser scanning system, wherein undercut box design allows for a smaller scanner footprint in both the X-dimension and the Y-dimension.

Another object of the present invention is to provide a bioptical holographic laser scanning system, wherein turning the VLD off when the scan line is no longer in the window, thereby eliminating unwanted internal scattering of the laser light and extends the life of the laser.

Another object of the present invention is to provide a bioptical holographic laser scanning system capable of generating a complex of pairs of quasi-orthogonal laser scanning planes, each composed by a plurality of substantially-vertical laser scanning planes for reading bar code symbols having bar code elements (i.e. ladder-type bar code symbols) that are oriented substantially horizontal with respect to the bottom scanning window, and a plurality of substantially-horizontal laser scanning planes for reading bar code symbols having bar code elements (i.e. picket-fence type bar code symbols) that are oriented substantially vertical with respect to the bottom scanning window.

Another object of the present invention is to provide a bioptical holographic laser scanning system, wherein each scan data collecting photodetector is positioned behind a beam folding mirror having a small hole formed therethrough to allow the return light from a parabolic mirror beneath the scanning disc to reach the photodetector, thereby enabling optimum placement of the photodetector and nearly maximum use of the surface of the beam folding mirror for light collection while providing a light shield for the data detector.

Another object of the present invention is to provide a bioptical holographic laser scanning system, wherein the light collection efficiency of each scanning facet is optimized in order to compensate for variations in facet collection area during laser scanning operations.

Another object of the present invention is to provide a bioptical holographic laser scanning system, wherein a beam deflecting mirror is supported on the back side of each parabolic collection mirror, beneath a notch formed therein, to allow an incident laser beam, produced beyond the scanning disc, to be directed through the light collection mirror and onto the point of incidence of the scanning disc during scanning operation.

Another object of the present invention is to provide a bioptical holographic laser scanning system, wherein a single beam folding mirror is used as the last outgoing mirror to produce a plurality of different laser scanning planes that are projected out through the vertical scanning window, thereby allowing greater light collection for a given amount of space (or potentially less space).

Another object of the present invention is to provide a bioptical holographic laser scanning system, wherein a light pipe or other light guiding structure can be used to conduct collected light at a point of collection within the system, and guiding such light to a photodetector located at a convenient location within the system.

Another object of the present invention is to provide a bioptical holographic laser scanning system, wherein a light-collection cone can be used to reduce the size of the photodetector.

Another object of the present invention is to provide a bioptical holographic laser scanning system which produces a three-dimensional laser scanning volume that is substantially greater than the volume of the housing of the holographic laser scanner itself, and provides full omni-directional scanning within the laser scanning volume.

A further object of the present invention is to provide such a bioptical holographic laser scanning system, in which the three-dimensional laser scanning volume has multiple focal planes and a highly confined geometry extending about a projection axis extending from the scanning windows of the holographic scanning system.

A further object of the present invention is to provide such a bioptical holographic laser scanning system, in which laser light produced from a particular holographic optical element reflects off a bar code symbol, passes through the same holographic optical element, and is thereafter collimated for light intensity detection.

A further object of the present invention is to provide such a bioptical holographic laser scanning system, in which a plurality of lasers simultaneously produce a plurality of laser beams which are focused and scanned through the scanning volume by a rotating disc that supports a plurality of holographic facets.

A further object of the present invention is to provide such a bioptical holographic laser scanning system, in which the holographic optical elements on the rotating disc maximize the use of the disk space for light collection, while minimizing the laser beam velocity at the focal planes of each of the laser scan patterns, in order to minimize the electronic bandwidth required by the light detection and signal processing circuitry.

A further object of the present invention is to provide a compact bioptical holographic laser scanning system, in which substantially all of the available light collecting surface area on the scanning disc is utilized and the light collection efficiency of each holographic facet on the holographic scanning disc is substantially equal, thereby allowing the holographic laser scanner to use a holographic scanning disc having the smallest possible disc diameter.

A further object of the present invention is to provide such a bioptical holographic laser scanning system, in which laser beam astigmatism caused by the inherent astigmatic difference in each visible laser diode is effectively eliminated prior to the passage of the laser beam through the holographic optical elements on the rotating scanning disc.

A further object of the present invention is to provide such a bioptical holographic laser scanning system, in which the dispersion of the relatively broad spectral output of each visible laser diode by the holographic optical elements on the scanning disc is effectively automatically compensated for as the laser beam propagates from the visible laser diode, through an integrated optics assembly, and through the holographic optical elements on the rotating disc of the holographic laser scanner.

A further object of the present invention is to provide such a bioptical holographic laser scanning system, in which a conventional visible laser diode is used to produce a laser scanning beam, and a simple and inexpensive arrangement is provided for eliminating or minimizing the effects of the dispersion caused by the holographic disc of the laser scanner.

A further object of the present invention is to provide such a bioptical holographic laser scanning system, in which the inherent astigmatic difference in each visible laser diode is effectively eliminated prior to the laser beam passing through the holographic optical elements on the rotating disc.

A further object of the present invention is to provide such a bioptical holographic laser scanning system, in which the laser beam produced from each laser diode is processed by a single, ultra-compact optics module in order to circularize the laser beam produced by the laser diode, eliminate the inherent astigmatic difference therein, as well as compensate for wavelength-dependent variations in the spectral output of each visible laser diode, such as superluminescence, multi-mode lasing, and laser mode hopping, thereby allowing the use of the resulting laser beam in holographic scanning applications demanding large depths of field.

A further object of the present invention is to provide such a bioptical holographic laser scanning system, in which an independent light collection/detection subsystem is provided for each laser diode employed within the holographic laser scanner.

A further object of the present invention is to provide such a bioptical holographic laser scanning system, in which an independent signal processing channel is provided for each laser diode and light collection/detection subsystem in order to improve the signal processing speed of the system.

A further object of the present invention is to provide such a bioptical holographic laser scanning system, in which a plurality of signal processors are used for simultaneously processing the scan data signals produced from each of the photodetectors within the holographic laser scanner.

A further object of the present invention is to provide such a bioptical holographic laser scanning system, in which each facet on the holographic disc has an indication code which is encoded by the zero-th diffraction order of the outgoing laser beam and detected so as to determine which scanning planes are to be selectively filtered during the symbol decoding operations.

A further object of the present invention is to provide such a bioptical holographic laser scanning system, in which the zero-th diffractive order of the laser beam which passes directly through the respective holographic optical elements on the rotating disc is used to produce a start/home pulse for use with stitching-type decoding processes carried out within the scanner.

These and other objects of the present invention will become apparent hereinafter and in the claims to Invention.

BRIEF DESCRIPTION OF THE DRAWINGS

In order to more fully understand the Objects of the Present Invention, the following Detailed Description of the Illustrative Embodiments should be read in conjunction with the accompanying Figure Drawings in which:

FIG. 1A1 is a perspective view of the bioptical holographic laser scanning system of the present invention showing its bottom and side scanning windows formed with its compact scanner housing;

FIG. 1A2 is an elevated side view of the bioptical holographic laser scanning system of FIG. 1A;

FIG. 1C is a perspective view of the bioptical holographic laser scanning system of the present invention shown installed above a work surface (e.g. a conveyor belt structure) employed, for example, in manual sortation operations or the like;

FIG. 1D1 is a perspective view of the bioptical holographic scanning system of the illustrative embodiment of the present invention, shown with the top panels of its housing removed in order to reveal the holographic scanning disc mounted on its optical bench, and the first, second, third and fourth laser scanning stations disposed thereabout, wherein each laser scanning station comprises a laser beam production module, a set of laser beam folding mirrors, a light collecting/focusing mirror disposed beneath the scanning disc, a photodetector disposed above the scanning disc, and pair of analog/digital signal processing boards associated with the laser scanning station;

FIG. 1D2 is a perspective view of a wire-frame graphics model of the bioptical holographic scanning system of FIG. 1D, wherein the components thereof are shown using wire-frame modeling and the bottom and side scanning windows are indicated in dotted lines;

FIG. 2A1 is a perspective view of the bioptical holographic scanning system of the illustrative embodiment of the present invention, shown with its housing removed in order to reveal the holographic scanning disc rotatably mounted on its optical bench, and the first, second, third and fourth laser scanning stations disposed thereabout, wherein each laser scanning station comprises a laser beam production module, a set of laser beam folding mirrors, a light collecting/focusing mirror disposed beneath the scanning disc, a photodetector disposed above the scanning disc, and pair of analog/digital signal processing boards associated with the laser scanning station;

FIG. 2A2 is a perspective view of the bioptical holographic scanning system shown in FIG. 2A1, wherein the components thereof are shown using wire-frame graphics modeling and the bottom and side scanning windows are indicated in dotted lines;

FIG. 2B1 is a plan view of the bioptical holographic scanning system of the illustrative embodiment shown in FIG. 2A1;

FIG. 2B2 is a plan view of graphics the bioptical holographic scanning system shown in FIG. 2A1, wherein the components thereof are shown using wire-frame graphics modeling and the bottom and side scanning windows are indicated in dotted lines;

FIG. 2C1 is a first elevated side view of the bioptical holographic scanning system of FIG. 2A1, taken along the longitudinally extending reference plane passing through the axis of rotation of the scanning disc axis and disposed normal to the bottom scanning window indicated in dotted lines, wherein the components thereof are shown using solid modeling while the side scanning window is not shown;

FIG. 2C2 is a first elevated side view of the bioptical holographic scanning system shown in FIG. 2C1, wherein the components thereof are shown using wire-frame graphics modeling and the bottom and side scanning windows are indicated in dotted lines;

FIG. 2D1 is a second elevated side view of the bioptical holographic scanning system of FIG. 2A1, taken along the longitudinally extending reference plane passing through the axis of rotation of the scanning disc axis and disposed normal to the bottom scanning window indicated in dotted lines, wherein the components thereof are shown using solid modeling while the side scanning window is not shown;

FIG. 2D2 is a second elevated side view of the bioptical holographic scanning system shown in FIG. 2D1, wherein the components thereof are shown using wire-frame graphics modeling and the bottom and side scanning windows are indicated in dotted lines;

FIG. 2E1 is a third elevated side view of the bioptical holographic scanning system of FIG. 2A1, taken along the longitudinally extending reference plane passing through the axis of rotation of the scanning disc axis and disposed normal to the bottom scanning window indicated in dotted lines, wherein the components thereof are shown using solid modeling while the side scanning window is not shown;

FIG. 2E2 is a third elevated side view of the bioptical holographic scanning system shown in FIG. 2E1, wherein the components thereof are shown using wire-frame graphics modeling and the bottom and side scanning windows are indicated in dotted lines;

FIG. 2F1 is a perspective view of a subassembly from the bioptical holographic scanning system of the illustrative embodiment, comprising the optical bench of the system, the holographic scanning disc mounted thereon, the first, second, third and fourth laser beam production modules mounted about the perimeter of the holographic scanning disc, and the first, second, third and fourth associated parabolic light collection mirror structures mounted beneath the holographic scanning disc, adjacent the respective laser beam production modules;

FIG. 2F2 is a plan view of the subassembly of FIG. 2F2, showing the subcomponents thereof using wire-frame modeling;

FIG. 2G1 is a perspective view of the laser beam production module employed in each of the laser scanning stations in the biopticals holographic laser scanning system of FIG. 1A, wherein the components thereof are shown using solid graphics modeling techniques;

FIG. 2G2 is cross-sectional view of the laser beam production module depicted in FIG. 2G1, showing its subcomponents using wire-frame modeling techniques, as well as the propagation of the laser beam from its visible laser diode source, through its multi-function light diffractive grating, and reflected off its light reflective mirror, out towards the laser beam deflecting mirror adjacent the holographic scanning disc;

FIG. 2G3 is a cross-sectional view of the laser beam production module depicted in FIGS. 2G1 and 2G2, showing its subcomponents "solid-line" graphics modeling technology;

FIG. 2H1 is a perspective view of the laser beam deflection module employed in each of the laser scanning stations in the biopticals holographic laser scanning system of FIG. 1A, wherein the components thereof are shown using solid graphics modeling techniques;

FIG. 2H2 is a perspective view of the laser beam deflection module employed in each of the laser scanning stations in the biopticals holographic laser scanning system of FIG. 1A, using wire-frame graphics modeling techniques to show the spatial location of the subcomponents thereof within the laser beam reflection module;

FIG. 2J1 is a plan view of the holographic laser scanning disc and laser scanning stations associated with the bioptical holographic laser scanning system depicted in FIG. 1A, using solid graphics modeling techniques to show the position of the photodetector directly above the point of incidence of the laser beam on the holographic scanning disc in each laser scanning station thereof;

FIG. 2J2 is a plan view of the holographic laser scanning disc and laser scanning stations associated with the bioptical holographic laser scanning system depicted in FIG. 1A, using wire-frame graphics modeling techniques to show the position of the photodetector directly above the point of incidence of the laser beam on the holographic scanning disc in each laser scanning station thereof;

FIG. 3A1 is a plan view of the holographic scanning disc of the illustrative embodiment of the present invention, showing the boundaries of each i-th holographic optical facet mounted thereon about its axis of rotation, with the assigned facet number and selected disc design parameters imposed thereon for illustrative purposes;

FIG. 3A2 is a geometrical optics model of the process of producing the P(i,j)-th laser scanning plane of the system by directing the output laser beam from the j-th laser beam production module through i-th holographic scanning facet supported upon the holographic scanning disc as it rotates about its axis, wherein various parameters employed in the model, including diffraction angle, beam elevation angle and scan angle, are schematically defined;

FIG. 3A3 is a plan view of the geometrical optics model of FIG. 3A2, defining the skew angle of the scanning facet, also employed therein;

FIG. 3A4 is a table categorizing the twelve facets on the holographic scanning disc of the illustrative embodiment as either having (i) high elevation angle characteristics and left (i.e. positive) skew angle characteristics, (ii) high elevation angle characteristics and right (i.e. negative) skew angle characteristics and (iii) low elevation angle characteristics and no (i.e. zero) skew angle characteristics;

FIGS. 3A5A through 3A5C set forth a geometrical model that is used to describe how light rays from a laser beam production module are diffracted from a facet on the holographic scanning disc used in the leaser scanning system system of the present invention.

FIG. 3B provides a vector-based specification of the vertices of each laser beam folding mirrors employed in the first laser scanning station (ST1) of the bioptical holographic scanning system using position vectors defined with respect to local coordinate reference system $R_{local\ 1}$ symbolically embedded within the holographic scanning disc, as shown in FIG. 2A1;

FIG. 3C provides a vector-based specification of the vertices of each laser beam folding mirrors employed in the second laser scanning station (ST2) of the bioptical holographic scanning system using position vectors defined with respect to local coordinate reference system $R_{local\ 2}$ symbolically embedded within the holographic scanning disc, as shown in FIG. 2A1;

FIG. 3D provides a vector-based specification of the vertices of each laser beam folding mirrors employed in the third laser scanning station (ST3) of the bioptical holographic scanning system using position vectors defined with respect to local coordinate reference system $R_{local\ 3}$ symbolically embedded within the holographic scanning disc, as shown in FIG. 2A;

FIG. 3E provides a vector-based specification of the vertices of each laser beam folding mirrors employed in the fourth laser scanning station (ST4) of the bioptical holographic scanning system using position vectors defined with respect to local coordinate reference system $R_{local\ 4}$ symbolically embedded within the holographic scanning disc, as shown in FIG. 2A1;

FIGS. 3F1 and 3F2 set forth a table setting forth major physical, optical and electrical parameters which can be used to characterize to the bioptical holographic laser scanning system of the illustrative embodiment of the present invention;

FIGS. 3G1A, 3G1B, 3G2A, 3G2B, taken collectively, provide a table setting forth various physical and optical parameters characteristic of the holographic laser scanning disc employed in the illustrative embodiment of the bioptical holographic laser scanning system of the present invention;

FIGS. 3H1 through 3H3 provide a table setting forth the holographic exposure/recording angles (i.e. facet construction parameters) for mastering at 488 nanometers the holographic laser scanning disc employed in the illustrative embodiment of the bioptical holographic laser scanning system of the present invention;

FIGS. 3I1 and 3I2 provide a table setting forth the “modified” holographic exposure/recording angles (i.e. facet construction parameters) for mastering at 488 nanometers the holographic laser scanning disc employed in the illustrative embodiment, while correcting/compensating for post-processing residual gelatin swell associated with the holographic recording medium;

FIGS. 3J1 and 3J2 provide a table setting forth parameters used to analyze the focus shift and out-of-focus spot size for a converging laser reference beam;

FIG. 3K is a table setting forth the focal distances of each scanning facet on the holographic scanning disc of the illustrative embodiment of the present invention, as well as optical distances from each facet to the horizontal and vertical windows of the bioptical holographic scanning system of the illustrative embodiment;

FIGS. 3L1A, 3L1B, 3L2A, 3L2B, taken together provide a table setting forth CDRH/IEC calculations which verify that the bioptical holographic laser scanning system of the illustrative embodiment satisfies Laser Class requirements;

FIG. 5A1 is a perspective view of the bioptical holographic laser scanning system of the illustrative embodiment of the present invention, schematically illustrating the projection of each and every P(i,j)-th laser scanning plane generated within the three-dimensional scanning volume extending between the bottom and side scanning windows of the system during each complete revolution of the holographic laser scanning disc, wherein the prespecified depth of focus (DOF) and laser beam cross-section characteristics of each such laser scanning plane are specified by the holographic scanning facet generating the laser scanning plane;

FIG. 5A2 is an elevated side view of the bioptical holographic laser scanning system of the illustrative embodiment of the present invention, schematically illustrating the projection of each and every P(i,j)-th laser scanning plane generated within the three-dimensional scanning volume extending between the bottom and side scanning windows of the system during each complete revolution of the holographic laser scanning disc, wherein the prespecified depth of focus (DOF) and laser beam cross-section characteristics of each such laser scanning plane are specified by the holographic scanning facet generating the laser scanning plane;

FIG. 5A3 is a plan view of the bioptical holographic laser scanning system of the illustrative embodiment of the present invention, schematically illustrating the projection of each and every P(i,j)-th laser scanning plane generated within the three-dimensional scanning volume extending between the bottom and side scanning windows of the system during each complete revolution of the holographic laser scanning disc, wherein the prespecified depth of focus (DOF) and laser beam cross-section characteristics of each such laser scanning plane are specified by the holographic scanning facet generating the laser scanning plane;

FIG. 5A4 is an elevated side end view of the bioptical holographic laser scanning system of the illustrative embodiment of the present invention, schematically illustrating the projection of each and every P(i,j)-th laser scanning plane generated within the three-dimensional scanning volume extending between the bottom and side scanning windows of the system during each complete revolution of the holographic laser scanning disc, wherein the prespecified depth of focus (DOF) and laser beam cross-section characteristics of each such laser scanning plane are specified by the holographic scanning facet generating the laser scanning plane;

FIG. 5A5 is an elevated side view of the bioptical holographic laser scanning system of the illustrative embodiment of the present invention, schematically illustrating the projection of each and every P(i,j)-th laser scanning plane generated within the three-dimensional scanning volume extending between the bottom and side scanning windows of the system during each complete revolution of the holgraphic laser scanning dis, wherein the prespecified depth of focus (DOF) and laser beam cross-section characteristics of each such laser scanning plane are specified by the holographic scanning facet generating the laser scanning plane;

FIG. 5B1 is a perspective view of the bioptical holographic laser scanning system of the illustrative embodiment of the present invention, schematically illustrating the projection of substantially vertically-disposed laser scanning planes through the bottom scanning window for reading horizontally-oriented (i.e. ladder-type) bar code symbols, when scanning facets (Nos. 7, 9 and 11) having high elevation angle characteristics and left (i.e. positive) skew angle characteristics pass through the first laser scanning station (ST1) and generate laser scanning beams that reflect off the first group of beam folding mirrors (MG1@ST1) associated therewith during system operation;

FIG. 5B2 is a side view of the bioptical holographic laser scanning system of the illustrative embodiment of the present invention, schematically illustrating the projection of substantially vertically-disposed laser scanning planes through the bottom scanning window for reading horizontally-oriented (i.e. ladder-type) bar code symbols, when scanning facets (Nos. 7, 9 and 11) having high elevation angle characteristics and left (i.e. positive) skew angle characteristics pass through the first laser scanning station (ST1) and generate laser scanning beams that reflect off the first group of beam folding mirrors (MG1@ST1) associated therewith during system operation;

FIG. 5B3 is a plan view of the bioptical holographic laser scanning system of the illustrative embodiment of the present invention, schematically illustrating the projection of substantially vertically-disposed laser scanning planes through the bottom scanning window for reading horizontally-oriented (i.e. ladder-type) bar code symbols, when scanning facets (Nos. 7, 9 and 11) having high elevation angle characteristics and left (i.e. positive) skew angle characteristics pass through the first laser scanning station (ST1) and generate laser scanning beams that reflect off the first group of beam folding mirrors (MG1@ST1) associated therewith during system operation;

FIG. 5B4 is an elevated end view of the bioptical holographic laser scanning system of the illustrative embodiment of the present invention, schematically illustrating the projection of substantially vertically-disposed laser scanning planes through the bottom scanning window for reading horizontally-oriented (i.e. ladder-type) bar code symbols, when scanning facets (Nos. 7, 9 and 11) having high elevation angle characteristics and left (i.e. positive) skew angle characteristics pass through the first laser scanning station (ST1) and generate laser scanning beams that reflect off the first group of beam folding mirrors (MG1@ST1) associated therewith during system operation;

FIG. 5B5 is a side view of the bioptical holographic laser scanning system of the illustrative embodiment of the present invention, schematically illustrating the projection of substantially vertically-disposed laser scanning planes through the bottom scanning window for rading horizontally-oriented (i.e. ladder-type) bar code symbols, when scanning facets (Nos. 7, 9 and 11) having high elevation angle characteristics and left (i.e. positive) skew angle characteristics pass through the first laser scanning station (ST1) and generate laser scanning beams that reflect off the first group of beam folding mirrors (MG1ST1) associated therewith during system operation;

FIG. 5C1 is a perspective view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 7, 9 and 11) having high elevation angle characteristics and left (i.e. positive) skew angle characteristics pass through the first laser scanning station (ST1) and generate laser scanning beams that reflect off the first group of beam folding mirrors (MG1@ST1) associated therewith during system operation;

FIG. 5C2 is a plan view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 7, 9 and 11) having high elevation angle characteristics and left (i.e. positive) skew angle characteristics pass through the first laser scanning station (ST1) and generate laser scanning beams that reflect off the first group of beam folding mirrors (MG1@ST1) associated therewith during system operation;

FIG. 5C3 is an elevated end view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 7, 9 and 11) having high elevation angle characteristics and left (i.e. positive) skew angle characteristics pass through the first laser scanning station (ST1) and generate laser scanning beams that reflect off the first group of beam folding mirrors (MG1@ST1) associated therewith during system operation;

FIG. 5C4 is a first elevated side view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 7, 9 and 11) having high elevation angle characteristics and left (i.e. positive) skew angle characteristics pass through the first laser scanning station (ST1) and generate laser scanning beams that reflect off the first group of beam folding mirrors (MG1@ST1) associated therewith during system operation;

FIG. 5C5 is a second elevated side view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 7, 9 and 11) having high elevation angle characteristics and left (i.e. positive) skew angle characteristics pass through the first laser scanning station (ST1) and generate laser scanning beams that reflect off the first group of beam folding mirrors (MG1@ST1) associated therewith during system operation;

FIG. 5D1 is a perspective view of the bioptical holographic laser scanning system of the illustrative embodiment of the present invention, schematically illustrating the projection of substantially vertically-disposed laser scanning planes through the bottom scanning window for reading horizontally-oriented (i.e. ladder-type) bar code symbols, when scanning facets (Nos. 8, 10 and 12) having high elevation angle characteristics and right (i.e. negative) skew angle characteristics pass through the first laser scanning station (ST1) and generate laser scanning beams that reflect off the second group of beam folding mirrors (MG2@ST1) associated therewith during system operation;

FIG. 5D2 is a side view of the bioptical holographic laser scanning system of the illustrative embodiment of the present invention, schematically illustrating the projection of substantially vertically-disposed laser scanning planes through the bottom scanning window for reading horizontally-oriented (i.e. ladder-type) bar code symbols, when scanning facets (Nos. 8, 10 and 12) having high elevation angle characteristics and right (i.e. negative) skew angle characteristics pass through the first laser scanning station (ST1) and generate laser scanning beams that reflect off the second group of beam folding mirrors (MG2@ST1) associated therewith during system operation;

FIG. 5D3 is a plan view of the bioptical holographic laser scanning system of the illustrative embodiment of the present invention, schematically illustrating the projection of substantially vertically-disposed laser scanning planes through the bottom scanning window for reading horizontally-oriented (i.e. ladder-type) bar code symbols, when scanning facets (Nos. 8, 10 and 12) having high elevation angle characteristics and right (i.e. negative) skew angle characteristics pass through the first laser scanning station (ST1) and generate laser scanning beams that reflect off the second group of beam folding mirrors (MG2@ST1) associated therewith during system operation;

FIG. 5D4 is an elevated end view of the bioptical holographic laser scanning system of the illustrative embodiment of the present invention, schematically illustrating the projection of substantially vertically-disposed laser scanning planes through the bottom scanning window for reading horizontally-oriented (i.e. ladder-type) bar code symbols, when scanning facets (Nos. 8, 10 and 12) having high elevation angle characteristics and right (i.e. negative) skew angle characteristics pass through the first laser scanning station (ST1) and generate laser scanning beams that reflect off the second group of beam folding mirrors (MG2@ST1) associated therewith during system operation;

FIG. 5D5 is a side view of the bioptical holographic laser scanning system of the illustrative embodiment of the present invention, schematically illustrating the projection of substantially vertically-disposed laser scanning planes through the bottom scanning window for reading horizontally-oriented (i.e. ladder-type) bar code symbols, when scanning facets (Nos. 8, 10 and 12) having high elevation angle characteristics and right (i.e. negative) skew angle characteristics pass through the first laser scanning station (ST1) and generate laser scanning beams that reflect off the second group of beam folding mirrors (MG2ST1) associated therewith during system operation;

FIG. 5E1 is a perspective view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 8, 10 and 12) having high elevation angle characteristics and right (i.e. negative) skew angle characteristics pass through the first laser scanning station (ST1) and generate laser scanning beams that reflect off the second group of beam folding mirrors (MG2@ST1) associated therewith during system operation;

FIG. 5E2 is a plan view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 8, 10 and 12) having high elevation angle characteristics and right (i.e. negative) skew angle characteristics pass through the first laser scanning station (ST1) and generate laser scanning beams that reflect off the second group of beam folding mirrors (MG2@ST1) associated therewith during system operation;

FIG. 5E3 is an elevated end view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 8, 10 and 12) having high elevation angle characteristics and right (i.e. negative) skew angle characteristics pass through the first laser scanning station (ST1) and generate laser scanning beams that reflect off the second group of beam folding mirrors (MG2@ST1) associated therewith during system operation;

FIG. 5E4 is a first elevated side view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 8, 10 and 12) having high elevation angle characteristics and right (i.e. negative) skew angle characteristics pass through the first laser scanning station (ST1) and generate laser scanning beams that reflect off the second group of beam folding mirrors (MG2@ST1) associated therewith during system operation;

FIG. 5E5 is a second elevated side view of a wire-frame model of the laser scanning platform within the bioptical holographic laser scanning system of the illustrative embodiment, schematically illustrating the projection of substantially vertically-disposed laser scanning planes through the bottom scanning window for reading horizontally-oriented (i.e. ladder-type) bar code symbols, when scanning facets (Nos. 8, 10 and 12) having high elevation angle characteristics and right (i.e. negative) skew angle characteristics pass through the first laser scanning station (ST1) and generate laser scanning beams that reflect off the second group of beam folding mirrors (MG2@ST1) associated therewith during system operation;

FIG. 5F1 is a perspective view of the bioptical holographic laser scanning system of the illustrative embodiment of the present invention, schematically illustrating the projection of substantially horizontally-disposed laser scanning planes through the bottom scanning window for reading vertically-oriented (i.e. picket-fence type) bar code symbols, when scanning facets (Nos. 1 through 4) having low elevation angle characteristics and no (i.e. zero) skew angle characteristics pass through the first laser scanning station (ST1) and generate laser scanning beams that reflect off the third group of beam folding mirrors (MG3@ST1) associated therewith during system operation;

FIG. 5F2 is a plan view of the bioptical holographic laser scanning system of the illustrative embodiment of the present invention, schematically illustrating the projection of substantially horizontally-disposed laser scanning planes through the bottom scanning window for reading vertically-oriented (i.e. picket-fence-type) bar code symbols, when scanning facets (Nos. 1 through 4) having low elevation angle characteristics and no (i.e. zero) skew angle characteristics pass through the first laser scanning station (ST1) and generate laser scanning beams that reflect off the third group of beam folding mirrors (MG3@ST1) associated therewith during system operation;

FIG. 5F3 is an end view of the bioptical holographic laser scanning system of the illustrative embodiment of the present invention, schematically illustrating the projection of substantially horizontally-disposed laser scanning planes through the bottom scanning window for reading vertically-oriented (i.e. picket-fence type) bar code symbols, when scanning facets (Nos. 1 through 4) having low elevation angle characteristics and no (i.e. zero) skew angle characteristics pass through the first laser scanning station (ST1) and generate laser scanning beams that reflect off the third group of beam folding mirrors (MG3@ST1) associated therewith during system operation;

FIG. 5F4 is a first side view of the bioptical holographic laser scanning system of the illustrative embodiment of the present invention, schematically illustrating the projection of substantially horizontally-disposed laser scanning planes through the bottom scanning window for reading vertically-oriented (i.e. picket-fence type) bar code symbols, when scanning facets having low elevation angle characteristics and no (i.e. zero) skew angle characteristics pass through the first laser scanning station (ST1) and generate laser scanning beams that reflect off the third group of beam folding mirrors (MG3@ST1) associated therewith during system operation;

FIG. 5F5 is a second side view of the bioptical holographic laser scanning system of the illustrative embodiment of the present invention, schematically illustrating the projection of substantially horizontally-disposed laser scanning planes through the bottom scanning window for reading vertically-oriented (i.e. picket-fence type) bar code symbols, when scanning facets (Nos. 1 through 4) having low elevation angle characteristics and no (i.e. zero) skew angle characteristics pass through the first laser scanning station (ST1) and generate laser scanning beams that reflect off the third group of beam folding mirrors (MG3@ST1) associated therewith during system operation;

FIG. 5G1 is a perspective view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols, when scanning facets (Nos. 1–4) pass through the first laser scanning station (ST1) and generate laser scanning beams that reflect off the third group of beam folding mirrors (MG3@ST1) associated therewith during system operation;

FIG. 5G2 is a plan view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols, when scanning facets (Nos. 1–4) pass through the first laser scanning station (ST1) and generate laser scanning beams that reflect off the third group of beam folding mirrors (MG3@ST1) associated therewith during system operation;

FIG. 5G3 is an elevated end view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols, when scanning facets (Nos. 1–4) pass through the first laser scanning station (ST1) and generate laser scanning beams that reflect off the third group of beam folding mirrors (MG3@ST1) associated therewith during system operation;

FIG. 5G4 is a first elevated side view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols, when scanning facets (Nos. 1–4) pass through the when scanning facets (Nos. 1–4) pass through the first laser scanning station (ST1) and generate laser scanning beams that reflect off the third group of beam folding mirrors (MG3@ST1) associated therewith during system operation;

FIG. 5G5 is a second elevated side view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols, when scanning facets (Nos. 1–4) pass through the when scanning facets (Nos.1–4) pass through the first laser scanning station (ST1) and generate laser scanning beams that reflect off the third group of beam folding mirrors (MG3@ST1) associated therewith during system operation;

FIG. 5H1 is a perspective view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the first laser scanning station (ST1) and generate laser scanning beams that reflect off the first, second and third groups of beam folding mirrors (MG1@ST1, MG2@ST1 and MG3@ST1) associated therewith during system operation;

FIG. 5H2 is a plan view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the first laser scanning station (ST1) and generate laser scanning beams that reflect off the first, second and third groups of beam folding mirrors (MG1@ST1, MG2@ST1 and MG3@ST1) associated therewith during system operation;

FIG. 5H3 is an elevated end view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the first laser scanning station (ST1) and generate laser scanning beams that reflect off the first, second and third groups of beam folding mirrors (MG1@ST1, MG2@ST1 and MG3@ST1) associated therewith during system operation;

FIG. 5H4 is a first elevated side view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the first laser scanning station (ST1) and generate laser scanning beams that reflect off the first, second and third groups of beam folding mirrors (MG1@ST1, MG2@ST1 and MG@ST1) associated therewith during system operation;

FIG. 5H5 is a second elevated side view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the first laser scanning station (ST1) and generate laser scanning beams that reflect off the first, second and third groups of beam folding mirrors (MG1@ST1, MG2@ST1 and MG3@ST1) associated therewith during system operation;

FIG. 5H6 is a perspective view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the first laser scanning station (ST1) and generate laser scanning beams that reflect off the first, second and third groups of beam folding mirrors (MG1@ST1, MG2@ST1 and MG3@ST1) associated therewith during system operation;

FIG. 5H7 is a plan view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the first laser scanning station (ST1) and generate laser scanning beams that reflect off the first, second and third groups of beam folding mirrors (MG1@ST1, MG2@ST1 and MG3@ST1) associated therewith during system operation;

FIG. 5H8 is an elevated end view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) disc pass through the first laser scanning station (ST1) and generate laser scanning beams that reflect off the first, second and third groups of beam folding mirrors (MG1@ST1, MG2@ST1 and MG3@ST1) associated therewith during system operation;

FIG. 5H9 is a first elevated side view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) disc pass through the first laser scanning station (ST1) and generate laser scanning beams that reflect off the first, second and third groups of beam folding mirrors (MG1@ST1, MG2@ST1 and MG3@ST1) associated therewith during system operation;

FIG. 5H10 is a second elevated side view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) disc pass through the first laser scanning station (ST1) and generate laser scanning beams that reflect off the first, second and third groups of beam folding mirrors (MG1@ST1, MG2@ST1 and MG3@ST1) associated therewith during system operation;

FIG. 5I1 is a perspective view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5I2 is a plan view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5I3 is an elevated end view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5I4 is a first elevated side view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5I5 is a second elevated side view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5J1 is a perspective view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5J2 is a side view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5J3 is a plan view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5J4 is a first elevated end view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5J5 is a second elevated end view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1 through 6) having low elevation angle characteristics and no (i.e. zero) skew angle characteristics pass through the second laser scanning station (ST2) and generate laser scanning beams that reflect off the group of beam folding mirrors (MG3@ST2) associated therewith during system operation;

FIG. 5K1 is a perspective view of a wire-frame model of the laser scanning platform within the bioptical holographic laser scanning system of the illustrative embodiment, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the first group of beam folding mirrors (MG1@ST3) associated therewith during system operation;

FIG. 5K2 is a plan view of a wire-frame model of the laser scanning platform within the bioptical holographic laser scanning system of the illustrative embodiment, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the first group of beam folding mirrors (MG1@ST3) associated therewith during system operation;

FIG. 5K3 is an elevated end view of a wire-frame model of the laser scanning platform within the bioptical holographic laser scanning system of the illustrative embodiment, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the first group of beam folding mirrors (MG1@ST3) associated therewith during system operation;

FIG. 5K4 is a first elevated side view of a wire-frame model of the laser scanning platform within the bioptical holographic laser scanning system of the illustrative embodiment, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the first group of beam folding mirrors (MG1@ST3) associated therewith during system operation;

FIG. 5K5 is a second elevated side view of a wire-frame model of the laser scanning platform within the bioptical holographic laser scanning system of the illustrative embodiment, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the first group of beam folding mirrors (MG1@ST3) associated therewith during system operation;

FIG. 5L1 is a perspective view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the first group of beam folding mirrors (MG1@ST3) associated therewith during system operation;

FIG. 5L2 is a plan view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the group of beam folding mirrors (MG1@ST3) associated therewith during system operation;

FIG. 5L3 is an end view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the first group of beam folding mirrors (MG1@ST3) associated therewith during system operation;

FIG. 5L4 is a first side view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the group of beam folding mirrors (MG1@ST3) associated therewith during system operation;

Figure 1B:
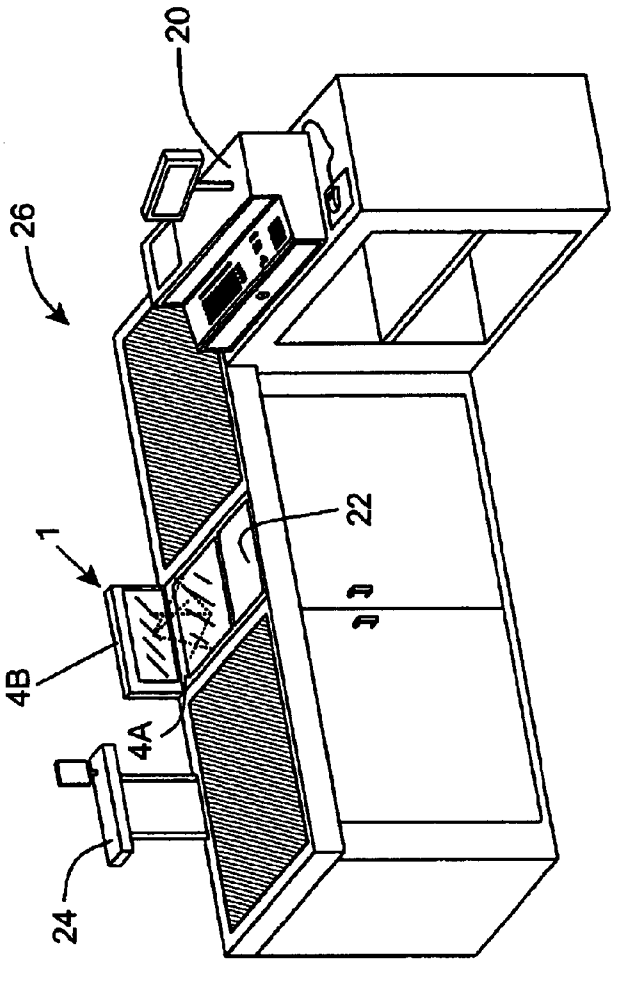
FIG. 1B is a perspective view of the bioptical holographic laser scanning system of the present invention shown installed in a Point-Of-Sale (POS) retail environment.
Figure 6K:
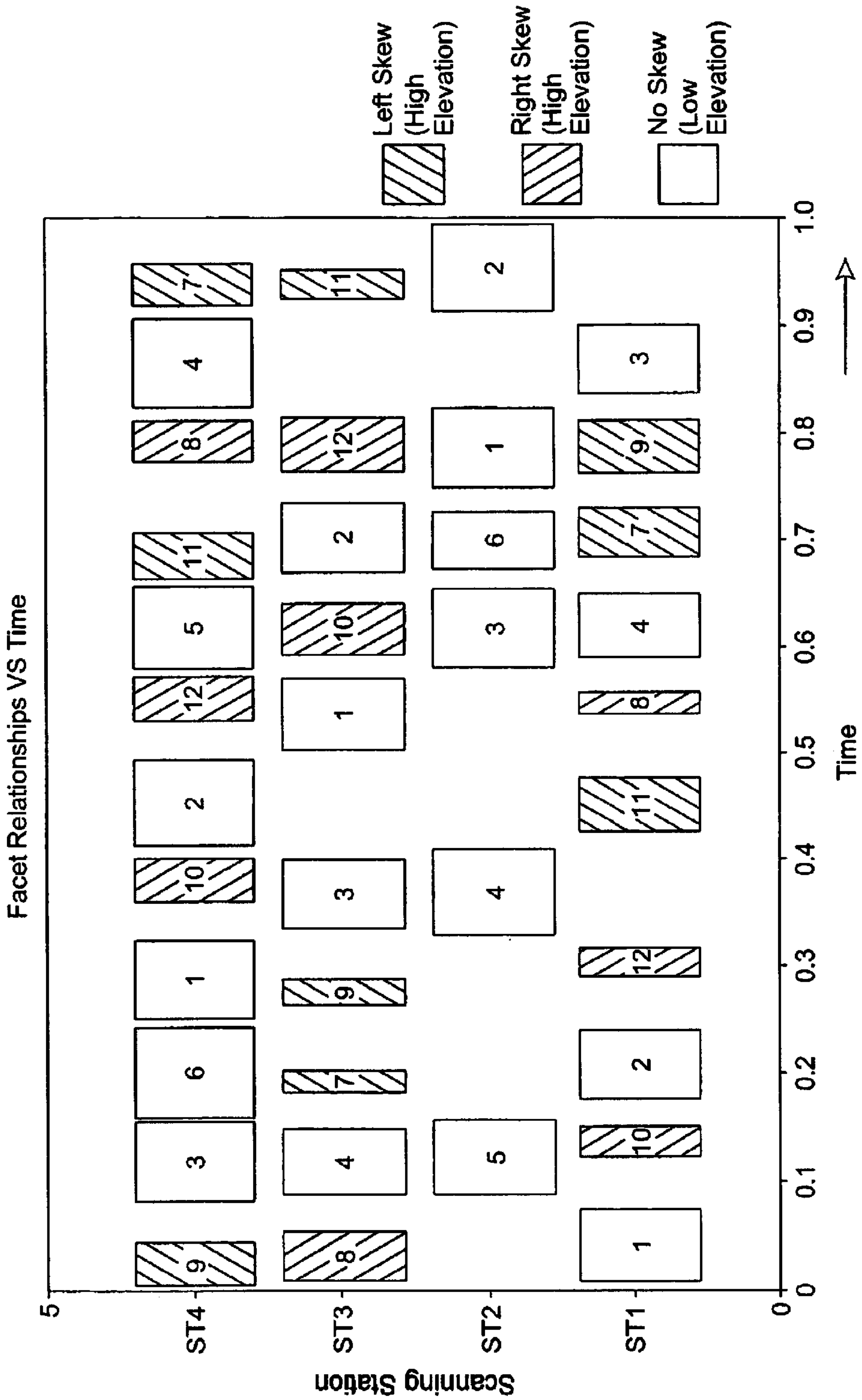

FIG. 5L5 is a second side view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 8, 10 and 12) having high elevation angle characteristics and right (i.e. negative) skew angle characteristics pass through the third laser scanning station (ST3) and generate laser scanning beams that reflect off the first group of beam folding mirrors (MG1@ST3) associated therewith during system operation;

FIG. 5M1 is a perspective view of a wire-frame model of the laser scanning platform within the bioptical holographic laser scanning system of the illustrative embodiment, schematically illustrating the projection of substantially vertically disposed laser scanning planes through the bottom scanning window for reading horizontally-oriented (i.e. ladder type) bar code symbols when scanning facets (Nos. 7, 9 and 11) having high elevation angle characteristics and left (i.e. positive) skew angle characteristics pass through the third laser scanning station (ST3) and generate laser scanning beams that reflect off the second group of beam folding mirrors (MG2@ST3) associated therewith during system operation;

FIG. 5M2 is a plan view of a wire-frame model of the laser scanning platform within the bioptical holographic laser scanning system of the illustrative embodiment, schematically illustrating the projection of substantially vertically disposed laser scanning planes through the bottom scanning window for reading horizontally-oriented (i.e. ladder type) bar code symbols when scanning facets (Nos. 7, 9 and 11) having high elevation angle characteristics and left (i.e. positive) skew angle characteristics pass through the third laser scanning station (ST3) and generate laser scanning beams that reflect off the second group of beam folding mirrors (MG2@ST3) associated therewith during system operation;

FIG. 5M3 is an elevated end view of a wire-frame model of the laser scanning platform within the bioptical holographic laser scanning system of the illustrative embodiment, schematically illustrating the projection of substantially vertically disposed laser scanning planes through the bottom scanning window for reading horizontally-oriented (i.e. ladder type) bar code symbols when scanning facets (Nos. 7, 9 and 11) having high elevation angle characteristics and left (i.e. positive) skew angle characteristics pass through the third laser scanning station (ST3) and generate laser scanning beams that reflect off the second group of beam folding mirrors (MG2@ST3) associated therewith during system operation;

FIG. 5M4 is a first elevated side view of a wire-frame model of the laser scanning platform within the bioptical holographic laser scanning system of the illustrative embodiment;

FIG. 5M5 is a second elevated side view of a wire-frame model of the laser scanning platform within the bioptical holographic laser scanning system of the illustrative embodiment, schematically illustrating the projection of substantially vertically disposed laser scanning planes through the bottom scanning window for reading horizontally-oriented (i.e. ladder type) bar code symbols when scanning facets (Nos. 7, 9 and 11) having high elevation angle characteristics and left (i.e. positive) skew angle characteristics pass through the third laser scanning station (ST3) and generate laser scanning beams that reflect off the second group of beam folding mirrors (MG2@ST3) associated therewith during system operation;

FIG. 5N1 is a perspective view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 7, 9 and 11) having high elevation angle characteristics and left (i.e. positive) skew angle characteristics pass through the third laser scanning station (ST3) and generate laser scanning beams that reflect off the second group of beam folding mirrors (MG2@ST3) associated therewith during system operation;

FIG. 5N2 is a plan view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 7, 9 and 11) having high elevation angle characteristics and left (i.e. positive) skew angle characteristics pass through the third laser scanning station (ST3) and generate laser scanning beams that reflect off the second group of beam folding mirrors (MG2@ST3) associated therewith during system operation;

FIG. 5N3 is an elevated end view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 7, 9 and 11) having high elevation angle characteristics and left (i.e. positive) skew angle characteristics pass through the third laser scanning station (ST3) and generate laser scanning beams that reflect off the second group of beam folding mirrors (MG2@ST3) associated therewith during system operation;

FIG. 5N4 is a first elevated side view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 7, 9 and 11) having high elevation angle characteristics and left (i.e. positive) skew angle characteristics pass through the third laser scanning station (ST3) and generate laser scanning beams that reflect off the second group of beam folding mirrors (MG2@ST3) associated therewith during system operation;

FIG. 5N5 is a second elevated side view of the bioptical holographic laser scanning system of the illustrative embodiment of the present invention, schematically illustrating the projection of substantially vertically disposed laser scanning planes through the bottom scanning window for reading horizontally-oriented (i.e. ladder type) bar code symbols when scanning facets (Nos. 7, 9 and 11) having high elevation angle characteristics and left (i.e. positive) skew angle characteristics pass through the third laser scanning station (ST3) and generate laser scanning beams that reflect off the second group of beam folding mirrors (MG2@ST3) associated therewith during system operation;

FIG. 5O1 is a perspective view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5O2 is a plan view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5O3 is an elevated end view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5O4 is a first elevated side view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5O5 is a second elevated side view of a wire-frame model of the laser scanning platform within the bioptical holographic laser scanning system of the illustrative embodiment, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5P1 is a perspective view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5P2 is a plan view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5P3 is an elevated end view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5P4 is a first elevated side view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5P5 is a second elevated side view of the bioptical holographic laser scanning system of the illustrative embodiment of the present invention, schematically illustrating the projection of substantially horizontally disposed laser scanning planes through the bottom scanning window for reading vertically-oriented (i.e. picket-fence type) bar code symbols when scanning facets (Nos. 1–4) having low elevation angle characteristics and no (i.e. zero) skew angle characteristics pass through the third laser scanning station (ST3) and generate laser scanning beams that reflect off the third group of beam folding mirrors (MG3@ST3) associated therewith during system operation;

FIG. 5Q1 is a perspective view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the third laser scanning station (ST3) and generate laser scanning beams that reflect off the first, second and third groups of beam folding mirrors (MG1@ST3, MG2@ST3 and MG3@ST3) associated therewith during system operation;

FIG. 5Q2 is a plan view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the third laser scanning station (ST3) and generate laser scanning beams that reflect off the first, second and third groups of beam folding mirrors (MG1@ST3, MG2@ST3 and MG3@ST3) associated therewith during system operation;

FIG. 5Q3 is an elevated end view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the third laser scanning station (ST3) and generate laser scanning beams that reflect off the first, second and third groups of beam folding mirrors (MG1@ST3. MG2@ST3 and MG3@ST3) associated therewith during system operation;

FIG. 5Q4 is a first elevated side view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the third laser scanning station (ST3) and generate laser scanning beams that reflect off the first, second and third groups of beam folding mirrors (MG1@ST3, MG2@ST3 and MG3@ST3) associated therewith during system operation;

FIG. 5Q5 is a second elevated side view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the first laser scanning station (ST1) and generate laser scanning beams that reflect off the first, second and third groups of beam folding mirrors (MG1@ST3, MG2@ST3 and MG3@ST3) associated therewith during system operation;

FIG. 5R1 is a perspective view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the third laser scanning station (ST3) and generate laser scanning beams that reflect off the first, second and third groups of beam folding mirrors (MG1@ST3, MG2@ST3 and MG3@ST3) associated therewith during system operation;

FIG. 5R2 is a plan view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) pass through the third laser scanning station (ST3) and generate laser scanning beams that reflect off the first, second and third groups of beam folding mirrors (MG1@ST3, MG2@ST3 and MG3@ST3) associated therewith during system operation;

FIG. 5R3 is an elevated end view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) disc pass through the third laser scanning station (ST3) and generate laser scanning beams that reflect off the first, second and third groups of beam folding mirrors (MG1@ST3, MG2@ST3 and MG3@ST3) associated therewith during system operation;

FIG. 5R4 is a first elevated side view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) disc pass through the third laser scanning station (ST3) and generate laser scanning beams that reflect off the first, second and third groups of beam folding mirrors (MG1@ST3, MG2@ST3 and MG3@ST3) associated therewith during system operation;

FIG. 5R5 is a second elevated side view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–4 and 7–12) disc pass through the third laser scanning station (ST3) and generate laser scanning beams that reflect off the first, second and third groups of beam folding mirrors (MG1@ST3, MG2@ST3 and MG3@ST3) associated therewith during system operation;

FIG. 5S1 is a perspective view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3, ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5S2 is a plan view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3, ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5S3 is an elevated end view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3, ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5S4 is a first elevated side view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3, ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5S5 is a second elevated side view of a wire-frame model of the laser scanning platform within the bioptical holographic laser scanning system of the illustrative embodiment, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3, ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5T1 is a perspective view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3 ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5T2 is a plan view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3., ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5T3 is an elevated end view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3, ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5T4 is a first elevated side view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3, ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5T5 is a second elevated side view of the bioptical holographic laser scanning system of the illustrative embodiment of the present invention, schematically illustrating the projection of both substantially horizontally and vertically disposed laser scanning planes through the bottom scanning window for reading vertically-oriented (i.e. picket-fence type) bar code symbols and horizontally-oriented (i.e. ladder type) bar code symbols, respectively, when scanning facets (Nos. 1–12) pass through the first, second and third laser scanning stations (ST3, ST2 and ST3) and generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation;

FIG. 5U1 is a perspective view of a wire-frame model of the laser scanning platform within the bioptical holographic laser scanning system of the illustrative embodiment, schematically illustrating the projection of substantially vertically disposed laser scanning planes through the side scanning window for reading horizontally-oriented (i.e. ladder type) bar code symbols, when scanning facets (Nos. 7–12) pass through the fourth laser scanning station (ST4) and generate laser scanning beams that reflect off the groups of beam folding mirrors (MG1@ST4 and MG2@ST4) associated therewith during system operation;

FIG. 5U2 is a plan view of a wire-frame model of the laser scanning platform within the bioptical holographic laser scanning system of the illustrative embodiment, schematically illustrating the projection of substantially vertically disposed laser scanning planes through the side scanning window for reading horizontally-oriented (i.e. ladder type) bar code symbols, when scanning facets (Nos. 7–12) pass through the fourth laser scanning station (ST4) and generate laser scanning beams that reflect off the first and second groups of beam folding mirrors (MG1@ST4 and MG2@ST4) associated therewith during system operation;

FIG. 5U3 is an elevated end view of a wire-frame model of the laser scanning platform within the bioptical holographic laser scanning system of the illustrative embodiment, schematically illustrating the projection of substantially vertically disposed laser scanning planes through the side scanning window for reading horizontally-oriented (i.e. ladder type) bar code symbols, when scanning facets (Nos. 7–12) pass through the fourth laser scanning station (ST4) and generate laser scanning beams that reflect off the first and second groups of beam folding mirrors (MG1@ST4 and MG2@ST4) associated therewith during system operation;

FIG. 5U4 is a first elevated side view of a wire-frame model of the laser scanning platform within the bioptical holographic laser scanning system of the illustrative embodiment, schematically illustrating the projection of substantially vertically disposed laser scanning planes through the side scanning window for reading horizontally-oriented (i.e. ladder type) bar code symbols, when scanning facets (Nos. 7–12) pass through the fourth laser scanning station (ST4) and generate laser scanning beams that reflect off the first and second groups of beam folding mirrors (MG1@ST4 and MG2@ST4) associated therewith during system operation;

FIG. 5U5 is a second elevated side view of a wire-frame model of the laser scanning platform within the bioptical holographic laser scanning system of the illustrative embodiment, schematically illustrating the projection of substantially vertically disposed laser scanning planes through the side scanning window for reading horizontally-oriented (i.e. ladder type) bar code symbols, when scanning facets (Nos. 7–12) pass through the fourth laser scanning station (ST4) and generate laser scanning beams that reflect off the first and second groups of beam folding mirrors (MG1@ST4 and MG2@ST4) associated therewith during system operation;

FIG. 5V1 is a perspective view of the bioptical holographic laser scanning system of the illustrative embodiment of the present invention, schematically illustrating the projection of substantially vertically disposed laser scanning planes through the side scanning window for reading horizontally-oriented (i.e. ladder type) bar code symbols, when scanning facets (Nos. 7–12) pass through the fourth laser scanning station (ST4) and generate laser scanning beams that reflect off the first and second groups of beam folding mirrors (MG1@ST4 and MG2@ST4) associated therewith during system operation;

FIG. 5V2 is a perspective view of the bioptical holographic laser scanning system of the illustrative embodiment of the present invention, schematically illustrating the projection of substantially vertically disposed laser scanning planes through the side scanning window for reading horizontally-oriented (i.e. ladder type) bar code symbols, when scanning facets (Nos. 7-12) pass through the fourth laser scanning station (ST4) and generate laser scanning beams that reflect off the first and second groups of beam folding mirrors (MG1ST4 and MG2ST4) associated therewith during system operation;

FIG. 5V3 is an elevated end view of the bioptical holographic laser scanning system of the illustrative embodiment of the present invention, schematically illustrating the projection of substantially vertically disposed laser scanning planes through the side scanning window for reading horizontally-oriented (i.e. ladder type) bar code symbols, when scanning facets (Nos. 7–12) pass through the fourth laser scanning station (ST4) and generate laser scanning beams that reflect off the first and second groups of beam folding mirrors (MG1@ST4 and MG2@ST4) associated therewith during system operation;

FIG. 5V4 is a first elevated side view of the bioptical holographic laser scanning system of the illustrative embodiment of the present invention, schematically illustrating the projection of substantially vertically disposed laser scanning planes through the side scanning window for reading horizontally-oriented (i.e. ladder type) bar code symbols, when scanning facets (Nos. 7–12) pass through the fourth laser scanning station (ST4) and generate laser scanning beams that reflect off the first and second groups of beam folding mirrors (MG1@ST4 and MG2@ST4) associated therewith during system operation;

FIG. 5V5 is a second elevated side view of the bioptical holographic laser scanning system of the illustrative embodiment of the present invention, schematically illustrating the projection of substantially vertically disposed laser scanning planes through the side scanning window for reading horizontally-oriented (i.e. ladder type) bar code symbols, when scanning facets (Nos. 7–12) pass through the fourth laser scanning station (ST4) and generate laser scanning beams that reflect off the first and second groups of beam folding mirrors (MG1@ST4 and MG2@ST4) associated therewith during system operation;

FIG. 5W1 is a perspective view of a wire-frame model of the laser scanning platform within the bioptical holographic laser scanning system of the illustrative embodiment, schematically illustrating the projection of substantially horizontally disposed laser scanning planes through the side scanning window for reading vertically-oriented (i.e. picket-fence type) bar code symbols, when scanning facets (Nos. 1–6) pass through the fourth laser scanning station (ST4) and generate laser scanning beams that reflect off the third group of beam folding mirrors (MG3@ST4) associated therewith during system operation;

FIG. 5W2 is a plan view of a wire-frame model of the laser scanning platform within the bioptical holographic laser scanning system of the illustrative embodiment, schematically illustrating the projection of substantially horizontally disposed laser scanning planes through the side scanning window for reading vertically-oriented (i.e. picket-fence type) bar code symbols, when scanning facets (Nos. 1–6) pass through the fourth laser scanning station (ST4) and generate laser scanning beams that reflect off the third group of beam folding mirrors (MG3@ST4) associated therewith during system operation;

FIG. 5W3 is an end view of a wire-frame model of the laser scanning plantform within the bioptical holographic laser scanning system of the illustrative embodiment, schematically illustrating the projection of substantially horizontally disposed laser scanning planes through the side scanning window for reading vertically-oriented (i.e. picket-fence type) bar code symbols, when scanning facets (Nos. 1-6) pass through the fourth laser scanning station (ST4) and generate laser scanning beams that reflect off the third group of beam folding mirrors (MG3ST4) associated therewith during system operation;

FIG. 5W4 is a first elevated side view of a wire-frame model of the laser scanning platform within the bioptical holographic laser scanning system of the illustrative embodiment, schematically illustrating the projection of substantially horizontally disposed laser scanning planes through the side scanning window for reading vertically-oriented (i.e. picket-fence type) bar code symbols, when scanning facets (Nos. 1–6) pass through the fourth laser scanning station (ST4) and generate laser scanning beams that reflect off the third group of beam folding mirrors (MG3@ST4) associated therewith during system operation;

FIG. 5W5 is a second elevated side view of a wire-frame model of the laser scanning platform within the bioptical holographic laser scanning system of the illustrative embodiment, schematically illustrating the projection of substantially horizontally disposed laser scanning planes through the side scanning window for reading vertically-oriented (i.e. picket-fence type) bar code symbols, when scanning facets (Nos. 1–6) pass through the fourth laser scanning station (ST4) and generate laser scanning beams that reflect off the third group of beam folding mirrors (MG3@ST4) associated therewith during system operation;

FIG. 5X1 is a perspective view of the bioptical holographic laser scanning system of the illustrative embodiment of the present invention, schematically illustrating the projection of substantially horizontally disposed laser scanning planes through the side scanning window for reading vertically-oriented (i.e. picket-fence type) bar code symbols, when scanning facets (Nos. 1–6) pass through the fourth laser scanning station (ST4) and generate laser scanning beams that reflect off the third group of beam folding mirrors (MG3@ST4) associated therewith during system operation;

FIG. 5X2 is a plan view of the bioptical holographic laser scanning system of the illustrative embodiment of the present invention, schematically illustrating the projection of substantially horizontally disposed laser scanning planes through the side scanning window for reading vertically-oriented (i.e. picket-fence type) bar code symbols, when scanning facets (Nos. 1–6) pass through the fourth laser scanning station (ST4) and generate laser scanning beams that reflect off the third group of beam folding mirrors (MG3@ST4) associated therewith during system operation;

FIG. 5X3 is an elevated end view of the bioptical holographic laser scanning system of the illustrative embodiment of the present invention, schematically illustrating the projection of substantially horizontally disposed laser scanning planes through the side scanning window for reading vertically-oriented (i.e. picket-fence type) bar code symbols, when scanning facets (Nos. 1–6) pass through the fourth laser scanning station (ST4) and generate laser scanning beams that reflect off the third group of beam folding mirrors (MG3@ST4) associated therewith during system operation;

FIG. 5X4 is a first elevated side view of the bioptical holographic laser scanning system of the illustrative embodiment of the present invention, schematically illustrating the projection of substantially horizontally disposed laser scanning planes through the side scanning window for reading vertically-oriented (i.e. picket-fence type) bar code symbols, when scanning facets (Nos. 1–6) pass through the fourth laser scanning station (ST4) and generate laser scanning beams that reflect off the third group of beam folding mirrors (MG3@ST4) associated therewith during system operation;

FIG. 5X5 is a second elevated side view of the bioptical holographic laser scanning system of the illustrative embodiment of the present invention, schematically illustrating the projection of substantially horizontally disposed laser scanning planes through the side scanning window for reading vertically-oriented (i.e. picket-fence type) bar code symbols, when scanning facets (Nos. 1–6) pass through the fourth laser scanning station (ST4) and generate laser scanning beams that reflect off the third group of beam folding mirrors (MG3@ST4) associated therewith during system operation;

FIG. 5Y1 is a perspective view of a wire-frame model of the laser scanning platform within the bioptical holographic laser scanning system of the illustrative embodiment, schematically illustrating the projection of both substantially horizontally and vertically disposed laser scanning planes through the side scanning window for reading vertically-oriented (i.e. picket-fence type) bar code symbols and horizontally-oriented (i.e. ladder type) bar code symbols, respectively, when scanning facets (Nos. 1–12) pass through the fourth laser scanning station (ST4) and generate laser scanning beams that reflect off the first, second and third groups of beam folding mirrors (MG1@ST4, MG2@ST4 and MG3@ST4) associated therewith during system operation;

FIG. 5Y2 is a plan view of a wire-frame model of the laser scanning platform within the bioptical holographic laser scanning system of the illustrative embodiment, schematically illustrating the projection of both substantially horizontally and vertically disposed laser scanning planes through the side scanning window for reading vertically-oriented (i.e. picket-fence type) bar code symbols and horizontally-oriented (i.e. ladder type) bar code symbols, respectively, when scanning facets (Nos. 1–12) pass through the fourth laser scanning station (ST4) and generate laser scanning beams that reflect off the first, second and third groups of beam folding mirrors (MG1@ST4, MG2@ST4 and MG3@ST4) associated therewith during system operation;

FIG. 5Y3 is a end view of a wire-frame model of the laser scanning platform within the bioptical holographic laser scanning system of the illustrative embodiment, schematically illustrating the projection of both substantially horizontally and vertically disposed laser scanning planes through the side scanning window for reading vertically-oriented (i.e. picket- fence type) bar code symbols and horizontally-oriented (i.e. ladder type) bar code symbols, respectively, when scanning facets (Nos. 1-12) pass through the fourth laser scanning station (ST4) and generate laser scanning beams that reflect off the first, second and third groups of beam folding mirrors (MG1ST4, MG2ST4 and MG3ST4) associated therewith during system operation;

FIG. 5Y4 is a first elevated side view of a wire-frame model of the laser scanning platform within the bioptical holographic laser scanning system of the illustrative embodiment, schematically illustrating the projection of both substantially horizontally and vertically disposed laser scanning planes through the side scanning window for reading vertically-oriented (i.e. picket-fence type) bar code symbols and horizontally-oriented (i.e. ladder type) bar code symbols, respectively, when scanning facets (Nos. 1–12) pass through the fourth laser scanning station (ST4) and generate laser scanning beams that reflect off the first, second and third groups of beam folding mirrors (MG1@ST4, MG2@ST4 and MG3@ST4) associated therewith during system operation;

FIG. 5Y5 is a second elevated side view of a wire-frame model of the laser scanning platform within the bioptical holographic laser scanning system of the illustrative embodiment, schematically illustrating the projection of both substantially horizontally and vertically disposed laser scanning planes through the side scanning window for reading vertically-oriented (i.e. picket-fence type) bar code symbols and horizontally-oriented (i.e. ladder type) bar code symbols, respectively, when scanning facets (Nos. 1–12) pass through the fourth laser scanning station (ST4) and generate laser scanning beams that reflect off the first, second and third groups of beam folding mirrors (MG1@ST4, MG2@ST4 and MG3@ST4) associated therewith during system operation;

FIG. 5Z1 is a perspective view of the bioptical holographic laser scanning system of the illustrative embodiment of the present invention, schematically illustrating the projection of both substantially horizontally and vertically disposed laser scanning planes through the side scanning window for reading vertically-oriented (i.e. picket-fence type) bar code symbols and horizontally-oriented (i.e. ladder type) bar code symbols, respectively, when scanning facets (Nos. 1–12) pass through the fourth laser scanning station (ST4) and generate laser scanning beams that reflect off the first, second and third groups of beam folding mirrors (MG1@ST4, MG2@ST4 and MG3@ST4) associated therewith during system operation;

FIG. 5Z2 is a plan view of the bioptical holographic laser scanning system of the illustrative embodiment of the present invention, schematically illustrating the projection of both substantially horizontally and vertically disposed laser scanning planes through the side scanning window for reading vertically-oriented (i.e. picket-fence type) bar code symbols and horizontally-oriented (i.e. ladder type) bar code symbols, respectively, when scanning facets (Nos. 1–12) pass through the fourth laser scanning station (ST4) and generate laser scanning beams that reflect off the first, second and third groups of beam folding mirrors (MG1@ST4, MG2@ST4 and MG3@ST4) associated therewith during system operation;

FIG. 5Z3 is an elevated end view of the bioptical holographic laser scanning system of the illustrative embodiment of the present invention, schematically illustrating the projection of both substantially horizontally and vertically disposed laser scanning planes through the side scanning window for reading vertically-oriented (i.e. picket-fence type) bar code symbols and horizontally-oriented (i.e. ladder type) bar code symbols, respectively, when scanning facets (Nos. 1–12) pass through the fourth laser scanning station (ST4) and generate laser scanning beams that reflect off the first, second and third groups of beam folding mirrors (MG1@ST4, MG2@ST4 and MG3@ST4) associated therewith during system operation;

FIG. 5Z4 is a first elevated side view of the bioptical holographic laser scanning system of the illustrative embodiment of the present invention, schematically illustrating the projection of both substantially horizontally and vertically disposed laser scanning planes through the side scanning window for reading vertically-oriented (i.e. picket-fence type) bar code symbols and horizontally-oriented (i.e. ladder type) bar code symbols, respectively, when scanning facets (Nos. 1–12) pass through the fourth laser scanning station (ST4) and generate laser scanning beams that reflect off the first, second and third groups of beam folding mirrors (MG1@ST4, MG2@ST4 and MG3@ST4) associated therewith during system operation;

FIG. 5Z5 is a second elevated side view of the bioptical holographic laser scanning system of the illustrative embodiment of the present invention, schematically illustrating the projection of both substantially horizontally and vertically disposed laser scanning planes through the side scanning window for reading vertically-oriented (i.e. picket-fence type) bar code symbols and horizontally-oriented (i.e. ladder type) bar code symbols, respectively, when scanning facets (Nos. 1–12) pass through the fourth laser scanning station (ST4) and generate laser scanning beams that reflect off the first, second and third groups of beam folding mirrors (MG1@ST4, MG2@ST4 and MG3@ST4) associated therewith during system operation;

FIG. 6A1 is a perspective view of a solid model of the first laser scanning station (ST1) and holographic scanning disc in the bioptical holographic laser scanning system of the illustrative embodiment, showing the generalized outgoing optical path of a laser beam produced by a scanning facet (i.e. Facet Nos. 7, 9 and 11) having high elevation angle characteristics and positive (i.e. left) skew angle characteristics, causing the laser beam to be reflected off the first group of beam folding mirrors (MG1@ST1) associated with the first laser scanning station (ST1) and projected out the bottom scanning window of the system;

FIG. 6A2 is a spreadsheet-type information table listing (i) the unit coordinates specifying, relative to the first local coordinate reference system R1, the direction of the laser beam incident the scanning disc at laser scanning station ST1, and (ii) four sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by rotating scanning facet No. 7, reflected off the two beam folding mirrors in group MG1@ST1 thereof, and ultimately projected through the bottom scanning window of the system towards the focal point of the scanning facet, as illustrated in FIGS. 5B1 through 5C5;

FIG. 6A3 is a spreadsheet-type information table listing (i) the unit coordinates specifying, relative to the first local coordinate reference system R1, the direction of the laser beam incident the scanning disc at laser scanning station ST1, and (ii) four sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by rotating scanning facet No. 9, reflected off the two beam folding mirrors in group MG1@ST1 thereof, and ultimately projected through the bottom scanning window of the system towards the focal point of the scanning facet, as illustrated in FIGS. 5B1 through 5C5;

FIG. 6A4 is a spreadsheet-type information table listing (i) the unit coordinates specifying, relative to the first local coordinate reference system R1, the direction of the laser beam incident the scanning disc at laser scanning station ST1, and (ii) four sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by rotating scanning facet No. 11, reflected off the two beam folding mirrors in group MG1@ST1 thereof, and ultimately projected through the bottom scanning window of the system towards the focal point of the scanning facet, as illustrated in FIGS. 5B1 through 5C5;

FIG. 6B1 is a perspective view of a solid model of the first laser scanning station (ST1) and holographic scanning disc in the bioptical holographic laser scanning system of the illustrative embodiment, showing the generalized outgoing optical path of a laser beam produced by a scanning facet (i.e. Facet Nos. 8, 10 and 12) having high elevation angle characteristics and negative (i.e. right) skew angle characteristics, causing the laser beam to be reflected off the second group of beam folding mirrors (MG2@ST1) associated with the first laser scanning station (ST1) and projected out the bottom scanning window of the system;

FIG. 6B2 is a spreadsheet-type information table listing (i) the unit coordinates specifying, relative to the first local coordinate reference system R1, the direction of the laser beam incident the scanning disc at laser scanning station ST1, and (ii) three sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by scanning facet No. 8, reflected off the three beam folding mirrors in group MG2@ST1 thereof, and ultimately projected through the bottom scanning window of the system towards the focal point of the scanning facet, as illustrated in FIGS. 5D1 through 5E5;

FIG. 6B3 is a spreadsheet-type information table listing (i) the unit coordinates specifying, relative to the first local coordinate reference system R1, the direction of the laser beam incident the scanning disc at laser scanning station ST1, and (ii) three sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by scanning facet No. 10, reflected off the three beam folding mirrors in group MG2@ST1 thereof, and ultimately projected through the bottom scanning window of the system towards the focal point of the scanning facet, as illustrated in FIGS. 5D1 through 5E5;

FIG. 6B4 is a spreadsheet-type information table listing (i) the unit coordinates specifying, relative to the first local coordinate reference system R1, the direction of the laser beam incident the scanning disc at laser scanning station ST1, and (ii) three sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by scanning facet No. 12, reflected off the three beam folding mirrors in group MG2@ST1 thereof, and ultimately projected through the bottom scanning window of the system towards the focal point of the scanning facet, as illustrated in FIGS. 5D1 through SE5;

FIG. 6C1 is a perspective view of a solid model of the first laser scanning station (ST1) and holographic scanning disc in the bioptical holographic laser scanning system of the illustrative embodiment, showing the generalized outgoing optical path of a laser beam produced by a scanning facet (i.e. Facet Nos. 1–4) having low elevation angle characteristics and no (i.e. zero) skew angle characteristics, causing the laser beam to be reflected off the third group of beam folding mirrors (MG3@ST1) associated with the first laser scanning station (ST1) and projected out the bottom scanning window of the system;

FIG. 6C2 is a spreadsheet-type information table listing (i) the unit coordinates specifying, relative to the first local coordinate reference system R1, the direction of the laser beam incident the scanning disc at laser scanning station ST1, and (ii) three sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by scanning facet No. 1, reflected off the two beam folding mirrors in group MG3@ST1 thereof, and ultimately projected through the bottom scanning window of the system towards the focal point of the scanning facet, as illustrated in FIGS. 5F1 through 5G5;

FIG. 6C3 is a spreadsheet-type information table listing (i) the unit coordinates specifying, relative to the first local coordinate reference system R1, the direction of the laser beam incident the scanning disc at laser scanning station ST1, and (ii) three sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by scanning facet No. 2, reflected off the two beam folding mirrors in group MG3@ST1 thereof, and ultimately projected through the bottom scanning window of the system towards the focal point of the scanning facet, as illustrated in FIGS. 5F1 through 5G5;

FIG. 6C4 is a spreadsheet-type information table listing (i) the unit coordinates specifying, relative to the first local coordinate reference system R1, the direction of the laser beam incident the scanning disc at laser scanning station ST1, and (ii) three sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by scanning facet No. 3, reflected off the two beam folding mirrors in group MG3@ST1 thereof, and ultimately projected through the bottom scanning window of the system towards the focal point of the scanning facet, as illustrated in FIGS. 5F1 through 5G5;

FIG. 6C5 is a spreadsheet-type information table listing (i) the unit coordinates specifying, relative to the first local coordinate reference system R1, the direction of the laser beam incident the scanning disc at laser scanning station ST1, and (ii) three sets of x,y,z coordinates specifying, relative to the first local coordinate reference system R1, the outgoing optical paths of three different laser scanning beams defining the beginning, middle and end portions of a substantially planar laser scanning plane that is produced when the incident laser scanning beam at scanning station ST1 is diffracted by scanning facet No. 4, reflected off the two beam folding mirrors in group MG3@ST1 thereof, and ultimately projected through the bottom scanning window of the system towards the focal point of the scanning facet, as illustrated in FIGS. 5F1 through 5G5;

FIG. 6D1 is a perspective view of a solid model of the second laser scanning station (ST2) and holographic scanning disc in the bioptical holographic laser scanning system of the illustrative embodiment, showing the generalized outgoing optical path of a laser beam produced by a scanning facet (i.e. Facet Nos. 1–6) having low elevation angle characteristics and no (i.e. zero) skew angle characteristics, causing the laser beam to be reflected off the group of beam folding mirrors (MG3@ST2) associated with the first laser scanning station (ST2) and projected out the bottom scanning window of the system;

FIG. 6D2 is a spreadsheet-type information table listing (i) the unit coordinates specifying, relative to the second local coordinate reference system R2, the direction of the laser beam incident the scanning disc at laser scanning station ST2, and (ii) three sets of x,y,z coordinates specifying, relative to the second local coordinate reference system R2, the outgoing optical paths of three different laser scanning beams defining the beginning, middle and end portions of a substantially planar laser scanning plane that is produced when the incident laser scanning beam at scanning station ST2 is diffracted by scanning facet No. 1, reflected off the three beam folding mirrors in group MG3@ST2 thereof, and ultimately projected through the bottom scanning window of the system towards the focal point of the scanning facet, as illustrated in FIGS. 5I1 through 5J5;

FIG. 6D3 is a spreadsheet-type information table listing (i) the unit coordinates specifying, relative to the second local coordinate reference system R2, the direction of the laser beam incident the scanning disc at laser scanning station ST2, and (ii) three sets of x,y,z coordinates specifying, relative to the second local coordinate reference system R2, the outgoing optical paths of three different laser scanning beams defining the beginning, middle and end portions of a substantially planar laser scanning plane that is produced when the incident laser scanning beam at scanning station ST2 is diffracted by scanning facet No. 2, reflected off the three beam folding mirrors in group MG3@ST2 thereof, and ultimately projected through the bottom scanning window of the system towards the focal point of the scanning facet, as illustrated in FIGS. 5I1 through 5J5;

FIG. 6D4 is a spreadsheet-type information table listing (i) the unit coordinates specifying, relative to the second local coordinate reference system R2, the direction of the laser beam incident the scanning disc at laser scanning station ST2, and (ii) three sets of x,y,z coordinates specifying, relative to the second local coordinate reference system R2, the outgoing optical paths of three different laser scanning beams defining the beginning, middle and end portions of a substantially planar laser scanning plane that is produced when the incident laser scanning beam at scanning station ST2 is diffracted by scanning facet No. 3, reflected off the three beam folding mirrors in group MG3@ST2 thereof, and ultimately projected through the bottom scanning window of the system towards the focal point of the scanning facet, as illustrated in FIGS. 5I1 through 5J5;

FIG. 6D5 is a spreadsheet-type information table listing (i) the unit coordinates specifying, relative to the second local coordinate reference system R2, the direction of the laser beam incident the scanning disc at laser scanning station ST2, and (ii) three sets of x,y,z coordinates specifying, relative to the second local coordinate reference system R2, the outgoing optical paths of three different laser scanning beams defining the beginning, middle and end portions of a substantially planar laser scanning plane that is produced when the incident laser scanning beam at scanning station ST2 is diffracted by scanning facet No. 4, reflected off the three beam folding mirrors in group MG3@ST2 thereof, and ultimately projected through the bottom scanning window of the system towards the focal point of the scanning facet, as illustrated in FIGS. 5I1 through 5J5;

FIG. 6D6 is a spreadsheet-type information table listing (i) the unit coordinates specifying, relative to the second local coordinate reference system R2, the direction of the laser beam incident the scanning disc at laser scanning station ST2, and (ii) three sets of x,y,z coordinates specifying, relative to the second local coordinate reference system R2, the outgoing optical paths of three different laser scanning beams defining the beginning, middle and end portions of a substantially planar laser scanning plane that is produced when the incident laser scanning beam at scanning station ST2 is diffracted by scanning facet No. 5, reflected off the three beam folding mirrors in group MG3@ST2 thereof, and ultimately projected through the bottom scanning window of the system towards the focal point of the scanning facet, as illustrated in FIGS. 5I1 through 5J5;

FIG. 6D7 is a spreadsheet-type information table listing (i) the unit coordinates specifying, relative to the second local coordinate reference system R2, the direction of the laser beam incident the scanning disc at laser scanning station ST2, and (ii) three sets of x,y,z coordinates specifying, relative to the second local coordinate reference system R2, the outgoing optical paths of three different laser scanning beams defining the beginning, middle and end portions of a substantially planar laser scanning plane that is produced when the incident laser scanning beam at scanning station ST2 is diffracted by scanning facet No. 6, reflected off the three beam folding mirrors in group MG3@ST2 thereof, and ultimately projected through the bottom scanning window of the system towards the focal point of the scanning facet, as illustrated in FIGS. 5I1 through 5J5;

FIG. 6E1 is a perspective view of a solid model of the third laser scanning station (ST3) and holographic scanning disc in the bioptical holographic laser scanning system of the illustrative embodiment, showing the generalized outgoing optical path of a laser beam produced by a scanning facet (i.e. Facet Nos. 7, 9 and 11) having high elevation angle characteristics and positive (i.e. left) skew angle characteristics, causing the laser beam to be reflected off the first group of beam folding mirrors (MG1@ST3) associated with the third laser scanning station (ST3) and projected out the bottom scanning window of the system;

FIG. 6E2 is a spreadsheet-type information table listing (i) the unit coordinates specifying, relative to the third local coordinate reference system R3, the direction of the laser beam incident the scanning disc at laser scanning station ST3, and (ii) three sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 7, reflected off the three beam folding mirrors in group MG1@ST3 thereof, and ultimately projected through the bottom scanning window of the system towards the focal point of the scanning facet, as illustrated in FIGS. 5M1 through 5N5;

FIG. 6E3 is a spreadsheet-type information table listing (i) the unit coordinates specifying, relative to the third local coordinate reference system R3, the direction of the laser beam incident the scanning disc at laser scanning station ST3, and (ii) three sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 9, reflected off the three beam folding mirrors in group MG1@ST3 thereof, and ultimately projected through the bottom scanning window of the system towards the focal point of the scanning facet, as illustrated in FIGS. 5M1 through SN5;

FIG. 6E4 is a spreadsheet-type information table listing (i) the unit coordinates specifying, relative to the third local coordinate reference system R3, the direction of the laser beam incident the scanning disc at laser scanning station ST3, and (ii) three sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 11, reflected off the three beam folding mirrors in group MG1@ST3 thereof, and ultimately projected through the bottom scanning window of the system towards the focal point of the scanning facet, as illustrated in FIGS. 5K1 through 5L5;

FIG. 6F1 is a perspective view of a solid model of the third laser scanning station (ST3) and holographic scanning disc in the bioptical holographic laser scanning system of the illustrative embodiment, showing the generalized outgoing optical path of a laser beam produced by a scanning facet (i.e. Facet Nos. 8, 10 and 12) having high elevation angle characteristics and positive (i.e. left) skew angle characteristics, causing the laser beam to be reflected off the second group of beam folding mirrors (MG2) associated with the third laser scanning station (ST3) and projected out the bottom scanning window of the system;

FIG. 6F2 is a spreadsheet-type information table listing (i) the unit coordinates specifying, relative to the third local coordinate reference system R3, the direction of the laser beam incident the scanning disc at laser scanning station ST3, and (ii) four sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 8, reflected off the two beam folding mirrors in group MG2@ST3 thereof, and ultimately projected through the bottom scanning window of the system towards the focal point of the scanning facet, as illustrated in FIGS. 5M1 through 5N5;

FIG. 6F3 is a spreadsheet-type information table listing (i) the unit coordinates specifying, relative to the third local coordinate reference system R3, the direction of the laser beam incident the scanning disc at laser scanning station ST3, and (ii) four sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 10, reflected off the two beam folding mirrors in group MG2@ST3 thereof, and ultimately projected through the bottom scanning window of the system towards the focal point of the scanning facet, as illustrated in FIGS. 5M1 through 5N5;

FIG. 6F4 is a spreadsheet-type information table listing (i) the unit coordinates specifying, relative to the third local coordinate reference system R3, the direction of the laser beam incident the scanning disc at laser scanning station ST3, and (ii) four sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 12, reflected off the two beam folding mirrors in group MG2@ST3 thereof, and ultimately projected through the bottom scanning window of the system towards the focal point of the scanning facet, as illustrated in FIGS. 5M1 through 5N5;

FIG. 6G1 is a perspective view of a solid model of the third laser scanning station (ST3) and holographic scanning disc in the bioptical holographic laser scanning system of the illustrative embodiment, showing the generalized outgoing optical path of a laser beam produced by a scanning facet (i.e. Facet Nos. 1–4) having low elevation angle characteristics and no (i.e. zero) skew angle characteristics, causing the laser beam to be reflected off the third group of beam folding mirrors (MG3@ST3) associated with the third laser scanning station (ST3) and projected out the bottom scanning window of the system;

FIG. 6G2 is a spreadsheet-type information table listing (i) the unit coordinates specifying, relative to the third local coordinate reference system R3, the direction of the laser beam incident the scanning disc at laser scanning station ST3, and (ii) three sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 1, reflected off two beam folding mirrors in group MG3@ST3 thereof, and ultimately projected through the bottom scanning window of the system towards the focal point of the scanning facet, as illustrated in FIGS. 5O1 through 5P5;

FIG. 6G3 is a spreadsheet-type information table listing (i) the unit coordinates specifying, relative to the third local coordinate reference system R3, the direction of the laser beam incident the scanning disc at laser scanning station ST3, and (ii) three sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 2, reflected off two beam folding mirrors in group MG3@ST3 thereof, and ultimately projected through the bottom scanning window of the system towards the focal point of the scanning facet, as illustrated in FIGS. 5O1 through 5P5;

FIG. 6G4 is a spreadsheet-type information table listing (i) the unit coordinates specifying, relative to the third local coordinate reference system R3, the direction of the laser beam incident the scanning disc at laser scanning station ST3, and (ii) three sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 3, reflected off two beam folding mirrors in group MG3@ST3 thereof, and ultimately projected through the bottom scanning window of the system towards the focal point of the scanning facet, as illustrated in FIGS. 5O1 through 5P5;

FIG. 6G5 is a spreadsheet-type information table listing (i) the unit coordinates specifying, relative to the third local coordinate reference system R3, the direction of the laser beam incident the scanning disc at laser scanning station ST3, and (ii) three sets of x,y,z coordinates specifying, relative to the third local coordinate reference system R3, the outgoing optical paths of three different laser scanning beams defining the beginning, middle and end portions of a substantially planar laser scanning plane that is produced when the incident laser scanning beam at scanning station ST3 is diffracted by scanning facet No. 4, reflected off two beam folding mirrors in group MG3@ST3 thereof, and ultimately projected through the bottom scanning window of the system towards the focal point of the scanning facet, as illustrated in FIGS. 5O1 through 5P5;

FIG. 6H1 is a perspective view of a solid model of the fourth laser scanning station (ST4) and holographic scanning disc in the bioptical holographic laser scanning system of the illustrative embodiment, showing the generalized outgoing optical path of a laser beam produced by a scanning facet (i.e. Facet Nos. 7, 9 and 11) having high elevation angle characteristics and positive (i.e. left) skew angle characteristics, causing the laser beam to be reflected off the first group of beam folding mirrors (MG1@ST4) associated with the third laser scanning station (ST4) and projected out the bottom scanning window of the system;

FIG. 6H2 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 7, reflected off the two beam folding mirrors in group MG1@ST4 thereof, and ultimately projected through the bottom scanning window of the system towards the focal point of the scanning facet, as illustrated in FIGS. 5U1 through 5V5;

FIG. 6H3 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 9, reflected off the two beam folding mirrors in group MG1@ST4 thereof, and ultimately projected through the bottom scanning window of the system towards the focal point of the scanning facet, as illustrated in FIGS. 5U1 through 5V5;

FIG. 6H4 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 11, reflected off the two beam folding mirrors in group MG1@ST4 thereof, and ultimately projected through the bottom scanning window of the system towards the focal point of the scanning facet, as illustrated in FIGS. 5U1 through SV5;

FIG. 6I1 is a perspective view of a solid model of the fourth laser scanning station (ST4) and holographic scanning disc in the bioptical holographic laser scanning system of the illustrative embodiment, showing the generalized outgoing optical path of a laser beam produced by a scanning facet (i.e. Facet Nos. 8, 10 and 12) having high elevation angle characteristics and negative (i.e. right) skew angle characteristics, causing the laser beam to be reflected off the second group of beam folding mirrors (MG2@ST4) associated with the fourth laser scanning station (ST4) and projected out the bottom scanning window of the system;

FIG. 6I2 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 8, reflected off the two beam folding mirrors in group MG2@ST4 thereof, and ultimately projected through the bottom scanning window of the system towards the focal point of the scanning facet, as illustrated in FIGS. 5U1 through 5V5;

FIG. 6I3 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 10, reflected off the two beam folding mirrors in group MG2@ST4 thereof, and ultimately projected through the bottom scanning window of the system towards the focal point of the scanning facet, as illustrated in FIGS. 5U1 through 5V5;

FIG. 6I4 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 12, reflected off the two beam folding mirrors in group MG2@ST4 thereof, and ultimately projected through the bottom scanning window of the system towards the focal point of the scanning facet, as illustrated in FIGS. 5U1 through 5V5;

FIG. 6J1 is a perspective view of a solid model of the fourth laser scanning station (ST4) and holographic scanning disc in the bioptical holographic laser scanning system of the illustrative embodiment, showing the generalized outgoing optical path of a laser beam produced by a scanning facet (i.e. Facet Nos. 1–6) having low elevation angle characteristics and no (i.e. zero) skew angle characteristics, causing the laser beam to be reflected off the third group of beam folding mirrors (MG3@ST4) associated with the fourth laser scanning station (ST4) and projected out the bottom scanning window of the system;

FIG. 6J2 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 1, reflected off one beam folding mirror in group MG3@ST4, and ultimately projected through the bottom scanning window of the system towards the focal point of the scanning facet, as illustrated in FIGS. 5W1 through 5V5;

FIG. 6J3 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 2, reflected off one beam folding mirror in group MG3@ST4, and ultimately projected through the bottom scanning window of the system towards the focal point of the scanning facet, as illustrated in FIGS. 5W1 through 5V5;

FIG. 6J4 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 3, reflected off one beam folding mirror in group MG3@ST4, and ultimately projected through the bottom scanning window of the system towards the focal point of the scanning facet, as illustrated in FIGS. 5W1 through 5V5;

FIG. 6J5 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 4, reflected off one beam folding mirror in group MG3@ST4, and ultimately projected through the bottom scanning window of the system towards the focal point of the scanning facet, as illustrated in FIGS. 5W1 through 5V5;

FIG. 6J6 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 5, reflected off one beam folding mirror in group MG3@ST4, and ultimately projected through the bottom scanning window of the system towards the focal point of the scanning facet, as illustrated in FIGS. 5W1 through 5V5;

FIG. 6J7 is a spreadsheet-type information table listing (i) the unit coordinates specifying, relative to the fourth local coordinate reference system R4, the direction of the laser beam incident the scanning disc at laser scanning station ST4, and (ii) three sets of x,y,z coordinates specifying, relative to the fourth local coordinate reference system R4, the outgoing optical paths of three different laser scanning beams defining the beginning, middle and end portions of a substantially planar laser scanning plane that is produced when the incident laser scanning beam at scanning station ST4 is diffracted by scanning facet No. 6, reflected off one beam folding mirror in group MG3@ST4, and ultimately projected through the bottom scanning window of the system towards the focal point of the scanning facet, as illustrated in FIGS. 5W1 through 5V5; and FIG. 6K is a schematic representation indicating the time sequential order in which each laser scanning facet is used to generate a laser scanning planes from each of the laser scanning stations employed within the bioptical holographic laser scanning system of the illustrative embodiment, wherein each scanning facet is indexed by facet index i and each laser scanning station is indexed by station index j.

DETAILED DESCRIPTION OF THE ILLUSTRATIVE EMBODIMENTS OF THE PRESENT INVENTION

Referring to the figures in the accompanying Drawings, the various illustrative embodiments of the bioptical holographic laser scanner of the present invention will be described in great detail.

In the illustrative embodiments, the apparatus of the present invention is realized in the form of an automatic code symbol reading system having a high-speed bioptical holographic laser scanning mechanism as well as a scan data processor for decode processing scan data signals produced thereby. However, for the sake of convenience of expression, the term "bioptical holographic laser scanner" shall be used hereinafter to denote the bar code symbol reading system which employs the bioptical holographic laser scanning mechanism of the present invention.

As shown in FIG. 1A, the bioptical holographic laser scanner of the first illustrative embodiment of the present invention 1 has a compact housing 2 having a first housing portion 4A, and a second housing portion 4B which projects from one end of the first housing portion in an orthogonal manner. When the holographic laser scanner 1 is installed within a counter-top surface, as shown in FIG. 1B, the first housing portion 4A oriented horizontally, whereas the second housing portion 4B is oriented vertically with respect to the POS station. Thus throughout the Specification and claims hereof, the terms first housing portion and horizontally-disposed housing portion may be used interchangeably but refer to the same structure; likewise, the terms the terms second housing portion and vertically-disposed housing portion may be used interchangeably but refer to the same structure.

In the illustrative embodiment, the total height of the scanner housing is 8.73 inches, with width and length dimensions of 10.90 and 14.86 inches, respectively, to provide a total internal housing volume ("scanner volume") $V_{housing}$ of about 1624.3 cubic inches with a scanner housing depth of 3.41 inches. As will be described in greater detail below, the total three-dimensional scanning volume produced by this ultra-compact housing is about 432 cubic inches with a scanning depth of field of about 6.0 inches measured from the bottom scanning window 16 and about 8.0 inches measured from the side scanning window 18. Importantly, the resolution of the bar code symbol that the scanning pattern of the illustrative embodiment can resolve at any location within the specified three-dimensional laser scanning volume $V_{scanning}$ is on the order of about 0.006 inches minimum element width. It is understood, however, this scanning resolution may be greater or lesser depending on the particular embodiment of the present invention.

Figure 1C:
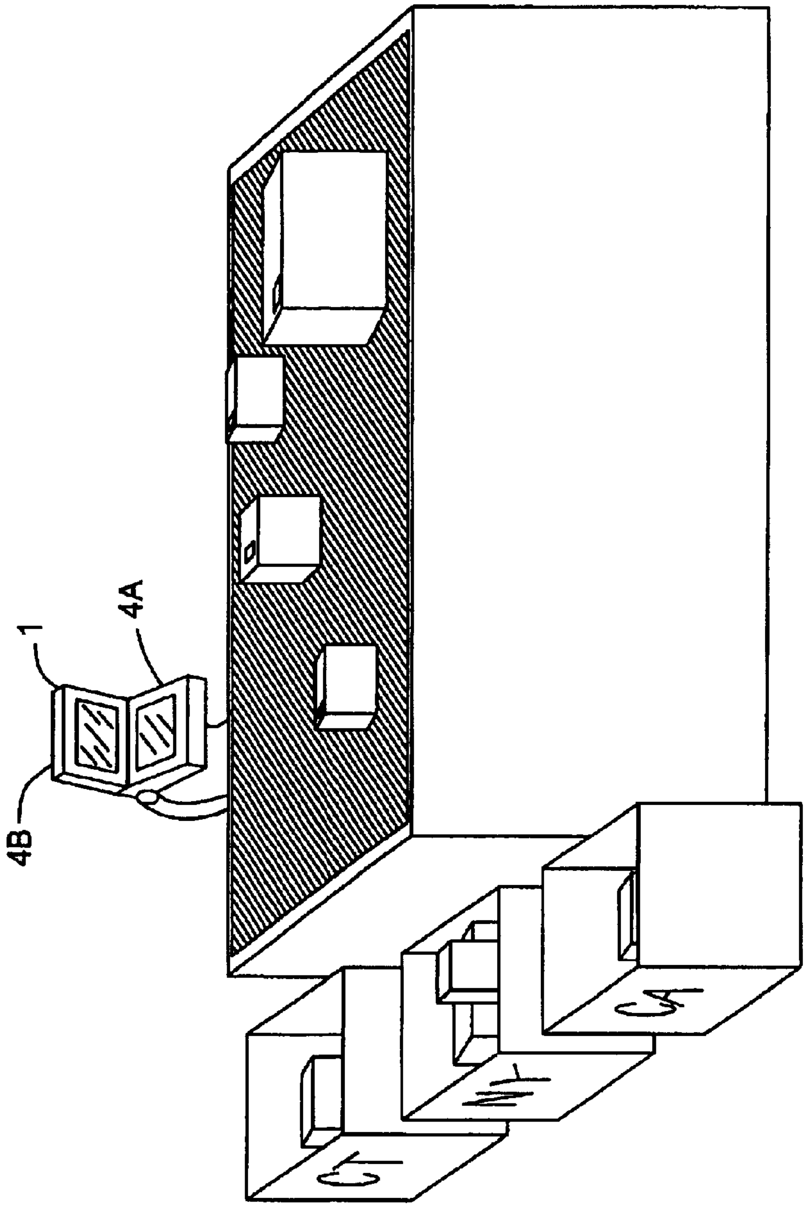

The bioptical holographic laser scanning bar code symbol reading system of the present invention 1 shown in FIG. 1A can be used in a diverse variety of bar code symbol scanning applications. As shown in FIG. 1B, the bioptical holographic laser scanner 1 can be installed within the countertop of a point-of-sale (POS) station 26, having a computer-based cash register 20, a weigh-scale 22 mounted within the counter adjacent the laser scanner, and an automated transaction terminal (ATM) supported upon a courtesy stand in a conventional manner. Alternatively, as shown in FIG. 1C, the bioptical holographic laser scanner can be installed above a conveyor belt structure as part of a manually-assisted parcel sorting operation being carried out, for example, during inventory control and management operations.

As shown in FIGS. 1D1, 1E, 2A1, 2B, 2B2 and 2C1, the bioptical holographic scanning system of the illustrative embodiment comprises a holographic scanning disc 30 mounted on an optical bench 32; first, second, third and fourth laser scanning stations indicated by ST1, ST2, ST3 and ST4, respectively, and symmetrically arranged about the holographic laser scanning station at different angular locations. As will be described in greater detail hereinafter, each laser scanning generates a laser scanning beam that is directed through a different, yet fixed point of incidence on laser scanning disc 30. As shown in FIG. 2B1, the point of incidences associated with the second and fourth laser scanning stations ST2 and ST4 are aligned with a (central) longitudinal reference axis LRA disposed within the central plane of the scanning disc and bisecting both the bottom and vertical housing portions of the holographic laser scanning system. As shown in FIG. 2B1, the first and third laser scanning stations ST1 and ST2 are disposed on opposite sides of the longitudinal reference axis, and are aligned with a transverse reference axis TRA, also disposed within the central plane of the scanning disc, and passing through the points of incidence associated with the first and third laser scanning stations ST3 and ST4, as shown.

As will be described in greater detail hereinafter, the position, geometry and orientation of each of the subcomponents of each laser scanning station are locally defined with respect to a hybrid Cartesian/Polar coordinate reference system symbolically embedded within the holographic scanning disc. Thus, four locally-defined (hybrid Cartesian/Polar) coordinate reference systems $R_{local\ 1}$, $R_{local\ 2}$, $R_{local\ 3}$ and $R_{local\ 4}$ are used to specify the position, geometry and orientation of each of the subcomponents of the first, second, third and fourth laser scanning stations ST1, ST2, ST3, and ST4, respectively. However, as will be described in detail hereinafter, each of these coordinate measurements eventually must be translated back to a globally-defined coordinate reference system $R_{global}$ symbolically embedded within the holographic scanning disc of the system. As shown in FIG.

2A1, the global coordinate reference system $R_{global}$ is symbolically embedded within holographic scanning system as follows the x and x axes of the global coordinate reference system extend within the central plane of the holographic scanning disc, such that the x axis is aligned with the transverse reference axis TRA passing through the point of incidences associated with the first and third laser scanning stations ST3 and ST4, the y axis is aligned with the longitudinal reference axis LRA passing through the point of incidences associated with the second and fourth laser scanning stations ST2 and ST4, while the z axis of the global coordinate reference system is aligned with the axis of rotation of the holographic scanning disc.

With the global coordinate reference system symbolically embedded within the holographic scanning system, as defined hereinabove; each of the four locally defined coordinate reference frames $R_{local\ 1}$, $R_{local\ 2}$, $R_{local\ 3}$ and $R_{local\ 4}$ are defined as follows: the first local coordinate reference system $R_{local\ 1}$ is aligned with the global coordinate reference system $R_{global}$; the second local coordinate reference system $R_{local\ 2}$ is rotated 90 degrees counter-clockwise in the X-Y plane of the global coordinate reference system $R_{global}$, so that its x axis of $R_{local\ 2}$ is aligned with the point of incidence associated with the second laser scanning station ST2; the third local coordinate reference system $R_{local\ 3}$ is rotated 180 degrees counter-clockwise in the X-Y plane of the global coordinate reference system $R_{global}$, so that the x axis of $R_{local\ 3}$ is aligned with the point of incidence associated with the third laser scanning station ST3; and the fourth local coordinate reference system $R_{local\ 4}$ is rotated 270 degrees counter-clockwise in the X-Y plane of the global coordinate reference system $R_{global}$, so that the x axis of $R_{local\ 4}$ is aligned with the point of incidence associated with the fourth laser scanning station ST4. Coordinate values of points specified in any one of these local coordinate reference systems using vectors referenced therefrom can be converted into corresponding coordinate values referenced with respect to the global coordinate reference system $R_{global}$ using homogeneous transformations known in the art 3-D geometrical modeling art.

The holographic scanning disc 30 employed in the system hereof comprises two glass plates 32A and 32B, between which are supported a plurality of specially designed holographic optical elements (HOEs), referred to hereinafter as "holographic scanning facets" or "holographic facets". In the illustrative embodiments, twelve holographic scanning facets are supported on the scanning disc. Each holographic facet 34 is realized as a volume transmission-type light diffraction hologram having a slanted fringe structure having variations in spatial frequency to provide a characteristic focal length $f_i$. The light diffraction efficiency of such volume light diffraction holograms, as a function of incidence angle $A_i$, modulation depth $\Delta n_i$, or recording media losses, is described in great detail in the celebrated paper entitled "*Coupled Wave Theory for Thick Hologram Gratings*" by Herwig Kogelnik, published in The Bell System Technical Journal (BSTJ), Volume.8, Number 9, at Pages 2909–2947, in November 1969, incorporated herein by reference in its entirety.

In a conventional manner, the glass support plates 32A and 32B forming part of the holographic scanning disc hereof are mounted to a support hub, as shown in FIGS. 1D1, and 2A2. In turn, the support hub 2 is mounted to the shaft of a high-speed, electric motor 40. For purposes of simplicity of description, when describing the laser scanning stations of the present invention, reference will be made to the first laser scanning station denoted as ST1. While the beam folding mirror arrangement employed in laser scanning stations ST1, ST3 and ST4 are quite different, as will be described in great detail hereinafter, the beam folding mirror arrangement of the third laser scanning station ST3 is similar to the beam folding mirror arrangement employed in laser scanning station ST1, except that the location of these mirror arrangements about the transverse reference axis TRA are reversed. Despite such differences, the laser scanning stations ST2, ST3 and ST4 have substantially similar structure, and operate in substantially the same manner as the first laser scanning station ST1. Thus, when describing the components which each of the laser scanning stations have in common, reference will be made to the first laser station, for purpose of illustration and compact description.

As best shown in FIG. 3A1, the holographic facets on holographic scanning disc 30 are arranged on the surface thereof in a manner which utilizes substantially all of the light collecting surface area provided between the outer radius of the scanning disc, $r_{outer}$, and the inner radius thereof, $r_{inner}$. In the illustrative embodiment, twelve (12) holographic scanning facets are used in conjunction with the four independent laser beam sources provided by the four laser scanning stations of the system, so as to project from the bottom and side scanning windows of the system, an omni-directional laser scanning pattern consisting of 50 laser scanning planes cyclically generated at a rate in excess of 1000 times per second. It is understood, however, this number will vary from embodiment to embodiment of the present invention and thus shall not form a limitation thereof.

In the illustrative embodiment of the present invention, there are three different types of facets on the holographic scanning disc hereof. These facet types are based on (i) beam elevation angle characteristics of the facet, and (ii) skew angle characteristics thereof, schematically defined in FIGS. 3A2 and 3A3, respectively. As shown in the table of FIG. 3A4, the first class of facets have High Elevation (HE) angle characteristics and Left (i.e. positive) Skew (LS) angle characteristics; the second class of facets have High Elevation (HE) angle characteristics and Right (i.e. negative) Skew (RS) angle characteristics; and the third class of facets have Low Elevation (LE) angle characteristics and no (i.e. zero) Skew (LS) angle characteristics. As shown in FIGS. 3A2 and 3A3, skew angle characteristics are referenced by counter-clockwise rotation within the local coordinate reference system of interest. Thus, left (i.e. positive) skew angle characteristics are indicated when the plane, within which the outgoing laser beam is diffracted, deflects towards to left side of the XZ plane as the scanning facets sweeps across the point of incidence of the associated laser scanning station, whereas right (i.e. negative) skew angle characteristics are indicated when he plane, within which the outgoing laser beam is diffracted, deflects towards to right side of the XZ plane as the scanning facets sweeps across the point of incidence of the associated laser scanning station. No (i.e. zero) skew angle characteristics are indicated when the plane, within which the outgoing laser beam is diffracted, is deflected towards neither the left or right side of the XZ plane as the scanning facets sweeps across the point of incidence of the associated laser scanning station, but rather remains centrally disposed about the XZ plane. As will become apparent hereinafter, the use of holographic scanning facets having such diverse elevation and skew characteristics enables the design and construction of a bioptical holographic laser scanning system employing multiple laser scanning stations, each having a plurality of beam folding mirrors that are compactly arranged within a minimized region of volumetric space, required in space-constricted POS-type scanning applications.

Laser beams passing through scanning facets having High Elevation (HE) angle characteristics and Left (i.e. positive) Skew (LS) angle characteristics are deflected towards the beam folding mirrors arranged on the left side of hosting laser scanning station, at a high elevation angle (or low diffraction angle by definition). Laser beams passing through scanning facets having High Elevation (HE) angle characteristics and Right (i.e. negative) Skew (RS) angle characteristics are deflected towards the beam folding mirrors arranged on the right side of hosting laser scanning station, at a high elevation angle (or low diffraction angle by definition). Laser beams passing through scanning facets having Low Elevation (LE) angle characteristics and No Skew (LS) angle characteristics are not deflected towards either side of hosting laser scanning station, at a low elevation angle (or high diffraction angle by definition), but instead remain centered about the point of incidence at the laser scanning station.

As schematically illustrated in FIG. 3A1, each facet on the holographic scanning disc 30 is assigned a unique facet number. As indicated in the table of FIG. 3A4, scanning facets assigned numbers 7, 9 and 11 in the illustrative design are classified into a first facet group (i.e. class) indicated by G1, as each scanning facet in this first facet group has both High Elevation (HE) angle characteristics and Left (i.e. negative) Skew (LS) angle characteristics as indicated in the spreadsheet disc design parameter table of FIGS. 3G1A, 3G1B, 3G2A and 3G2B. Facets assigned numbers 8, 10 and 12 are classified into a second facet group indicated by G2, as each scanning facet in this second facet group has both High Elevation (HE) angle characteristics and Right Skew (RS) angle characteristics, as indicated in the spreadsheet disc design parameter table of FIGS. 3G1A, 3G1B,3G2A and 3G2B. Facets assigned numbers 1–6 are classified into the third facet group, as each scanning facet in this third facet group has both Low Elevation (LE) angle characteristics and Left Skew (LS) angle characteristics, as indicated in the spreadsheet disc design parameter table of FIGS. 3G1A, 3G1B, 3G2A, and 3G2B. By virtue of such characteristics, the scanning facets in each of these three different facet groups produces an outgoing laser beam that is diffracted along a different direction of skew, and therefore, is designed to cooperate with a different group of laser beam folding mirrors in order to generate particular components of the complex omnidirectional laser scanning pattern of the present invention. Such features of the bioptical holographic scanning system of the present invention will be illustrated in great detail hereinafter.

As best shown in FIGS. 1D1, 1E, 2B2, 2C1, 2K, 2N, and 2O, the first laser scanning station (ST1) comprises: a first laser beam production module 41A mounted on the optical bench 42 of the system, preferably outside the outer periphery of the holographic scanning disc 30, as shown in FIG. 2A2 and 2B2; a first laser beam directing mirror 43A, disposed beneath the edge of the scanning disc, below the first point of incidence associated with the first scanning station ST1, for directing the laser beam output from the first laser beam production module 41A, through the first point of incidence at a fixed angle of incidence which, as indicated in the spreadsheet of FIGS. 3F1 and 3F2, is substantially equal for each laser scanning station in the system; three groups of laser beam folding mirrors, MG1@ST1, MG2@ST1 and MG3@ST1 which are arranged about the first point of incidence at the first scanning station ST1, and cooperate with the three groups of scanning facets G1, G2 and G3 on the scanning disc, respectively, so as to generate and project different groups of laser scanning planes through the bottom scanning window 16, as graphically illustrated in FIGS. 5B1 through 5H5, and vectorally specified in FIGS. 6A1 through 6C5; a first light collecting/focusing mirror structure (e.g. parabolic light collecting mirror or parabolic surface emulating volume reflection hologram) 70A disposed beneath holographic scanning disc 30 adjacent the first laser beam directing mirror 43A and first point of incidence at scanning station ST1; a first photodetector 45A disposed substantially above the first point of incidence at scanning station ST1 at a predetermined (i.e. minimized) height above the holographic scanning disc 30; and a first set of analog and digital signal processing boards 50 and 55, associated with the first laser scanning station ST1, and mounted within the compact scanner housing, for processing analog and digital scan data signals as described in detail in Applicants' U.S. patent application Ser. No. 08/949,915 filed Oct. 14, 1997, and incorporated herein by reference, incorporated herein by reference in its entirety.

For purposes of illustration and conciseness of description, each laser beam folding mirror in each mirror group arranged at each laser scanning station ST1, ST2, ST3 and ST4, is assigned a unique mirror identification code (i.e. indicator) throughout the drawings hereof. Each mirror identification code conforms to the syntactical structure $M_{i,j,k}$, wherein: index i represents the scanning station number (e.g. i=1 for ST1); index j represents the mirror group number (e.g. j=1 for mirrors which cooperate with scanning facets in group G1); and index k represents the mirror number in the mirror group assigned by the sequential order that the outgoing laser beam reflects off the mirrors during the laser scanning plane generation process (e.g. k=1 for mirrors which cause an outgoing laser beam to undergo its first reflection after diffracting through a scanning facet).

Referring to FIGS. 2K, 2N, 2O and 3B and using the mirror identification conventions set forth above, the laser beam folding mirrors employed at the first scanning station ST1 can be conveniently indexed as follows: mirror group MG1@ST1, containing facets that generate left skewed outgoing laser beams, has two beam folding mirrors indicated by $M_{1,1,1}$ and $M_{1,1,2}$ in FIGS. 5B1 through 5C5, and 6A1 through 6A4; mirror group MG2@ST1, containing facets that generate right skewed outgoing laser beams, has three beam folding mirrors indicated by $M_{1,2,1}$, $M_{1,2,2}$ and $M_{1,2,3}$ in FIGS. 5B1 through 5H5, and 6D1 through 6E5; and mirror group MG3@ST1, containing facets that do not generate skewed outgoing laser beams, has two beam folding mirrors indicated by $M_{1,3,1}$ and $M_{1,3,2}$ in FIGS. 5F1 through 5G5, and 6C1 through 6C5.

The position and orientation of each beam folding mirror employed at scanning station ST1 relative to the first locally-defined coordinate reference system $R_{local\ 1}$ is specified by a set of position vectors pointing from the from the origin of this local coordinate reference system to the vertices of each such beam folding mirror element (i.e. light reflective surface patch) which has been optimized in terms of occupying a minimal volume within the scanner housing without compromising the performance of its beam folding function. The x,y,z coordinates of these vertex-specifying vectors are set forth in the spreadsheet table of FIGS. 3B, organized according to the three mirror groups MG1@ST1, MG2@ST1 and MG3@ST1 employed at laser scanning station ST1. Notably, the first vertex of each facet in these mirror groups is repeated in the table of FIG. 3B, to traverse a closed path in 3-D space, specifying the perimetrical boundaries of these optimally-trimmed beam folding mirrors employed in the scanning system of the illustrative embodiment.

As shown in FIG. 3B, the mirrors in each mirror group of scanning station ST1 are arranged in the order that the beam folding mirror performs its beam folding (i.e. light reflection) function upon the outgoing diffracted laser beam produced by a scanning facet associated with a facet group corresponding to the mirror group. Notably, at scanning station ST1, two light reflection operations are performed by the mirror groups MG1@ST1 and MG3@ST1 upon the outgoing diffracted laser beams, whereas three light reflection operations are performed by mirror group MG2@ST1 upon the outgoing diffracted laser beams. Also, certain beam reflecting mirrors (e.g. $M_{1,1,1}$ and $M_{1,1,2}$) have six vertices, while some mirrors have four vertices (e.g. $M_{1,3,2}$ and $M_{1,1,2}$), and yet other mirrors (e.g. $M_{1,1,2}$) have five vertices. As will be described in greater detail hereinafter, the exact number of vertices of each beam folding mirror will depend on the laser scanning plane being generated by the outgoing laser beam, the geometrical characteristics of the overall 3-D scanning pattern to be generated from the holographic scanning system in the particular scanning application at hand, and physical constraints within the scanner housing. Also, while the coordinate values for the vertices of each beam folding mirror specify the surface area, position and orientation of each mirror employed in the first laser scanning station ST1, it is understood that other mirror surface areas, positions and orientations can and may be used to realize other embodiments of the first laser scanning station ST1 in accordance with the principles of the present invention taught herein.

As best shown in FIGS. 1D1, 1E, 2B2, 2C1 and 2L, the second laser scanning station (ST2) comprises: a second laser beam production module 41B mounted on the optical bench 42 of the system, preferably outside the outer periphery of the holographic scanning disc 30, as shown in FIG. 2A2 and 2B2; a second laser beam directing mirror 43B, disposed beneath the edge of the scanning disc, below the second point of incidence associated with the second scanning station ST2, for directing the laser beam output from the first laser beam production module 41B, through the first point of incidence at a fixed angle of incidence; one group of laser beam folding mirrors, MG3@ST2, which are arranged about the second point of incidence at the second scanning station ST2, and cooperate with the corresponding group of scanning facets G3 on the scanning disc so as to generate and project different groups of laser scanning planes through the bottom scanning window 16, as graphically illustrated in FIGS. 5I1 through 5J5, and vectorally specified in FIGS. 6D1 through 6D7; a second light collecting/focusing mirror structure (e.g. parabolic light collecting mirror or parabolic surface emulating volume-type hologram) 70B disposed beneath holographic scanning disc 30 adjacent the second laser beam directing mirror 43B and the second point of incidence at scanning station ST2; a second photodetector 45B disposed substantially above the second point of incidence at scanning station ST2 at a predetermined (i.e. minimized) height above the holographic scanning disc 30; and a second set of analog and digital signal processing boards 50B and 55B, associated with the second laser scanning station ST2, and mounted within the compact scanner housing, for processing analog and digital scan data signals as described in detail in Applicants' U.S. patent application Ser. No. 08/949,915 filed Oct. 14, 1997, and incorporated herein by reference, incorporated herein by reference in its entirety.

Figure 1E:
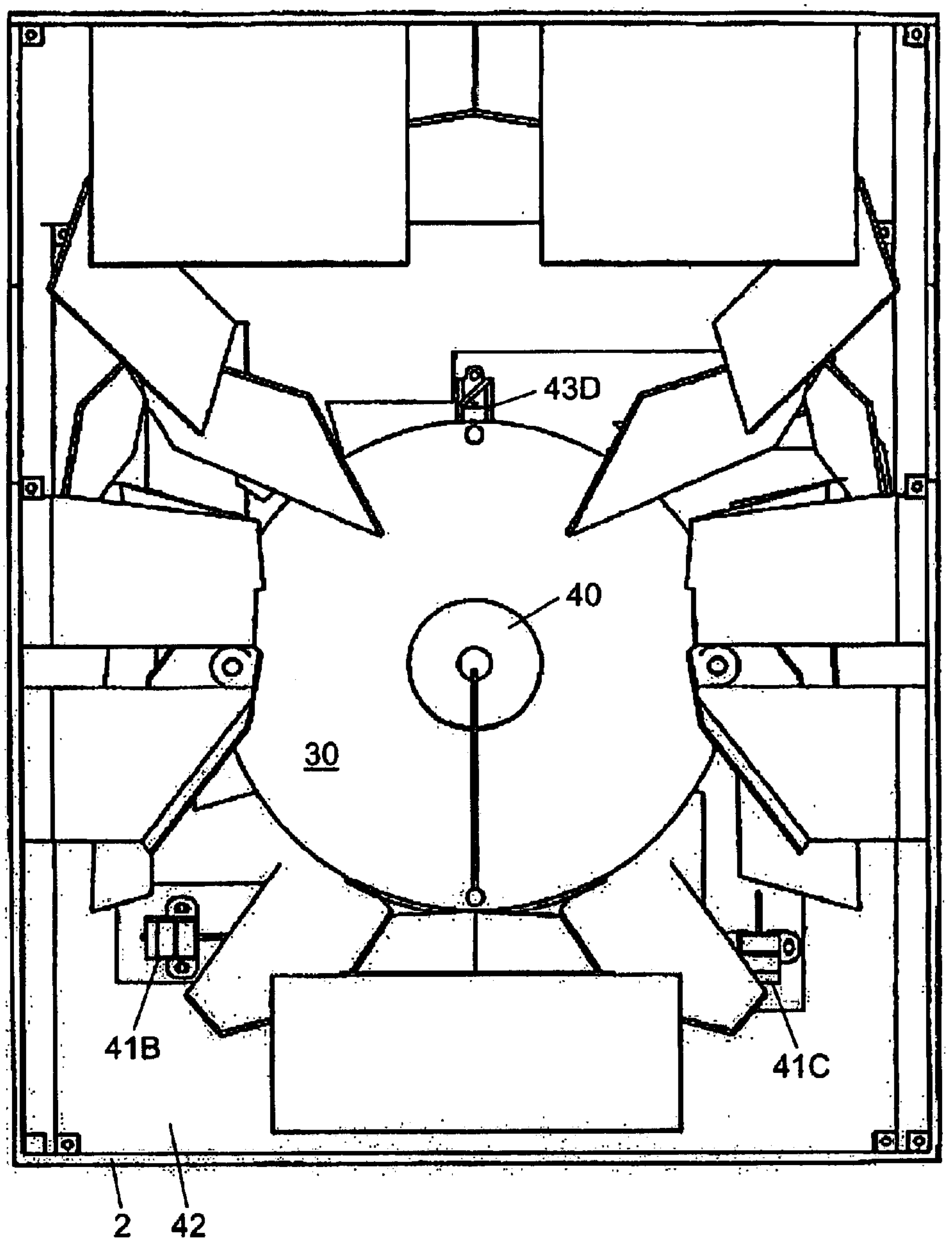
FIG. 1E is a plane view of the bioptical holographic scanning system shown in FIG. 1D.
Figure 1F:
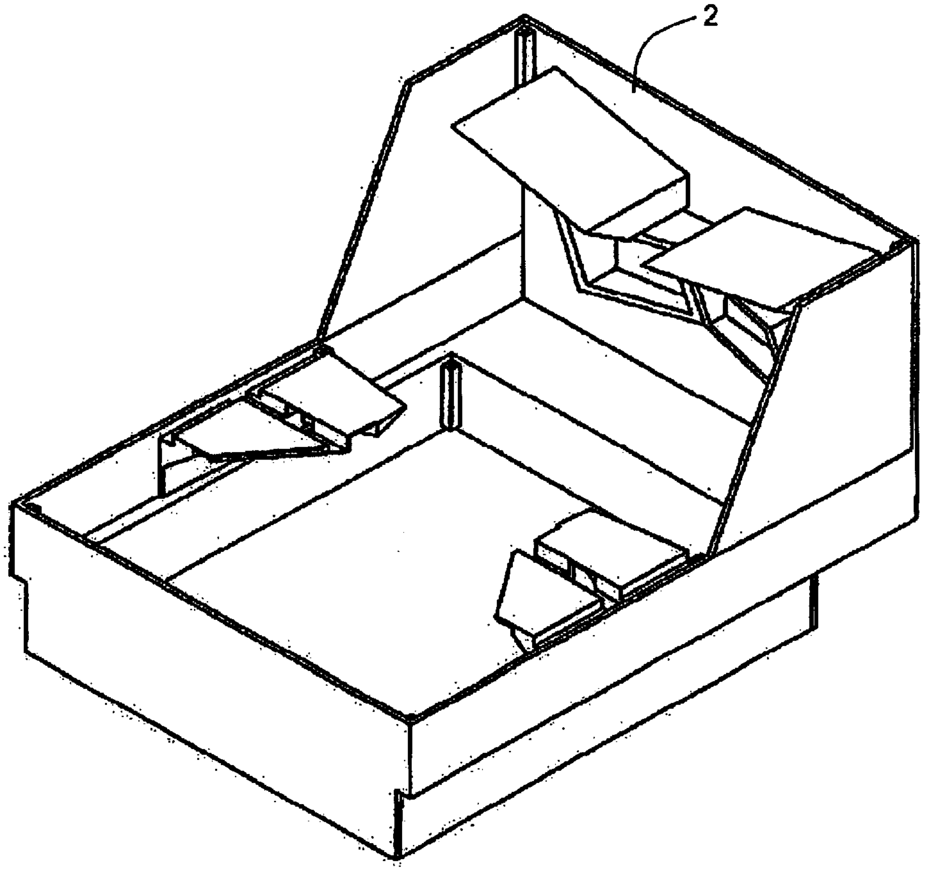
FIG. 1F is a perspective view of the scanner housing employed in the bioptical holographic scanning system of FIG. 1E, show with its top cover panels removed therefrom.
Figure 1G:
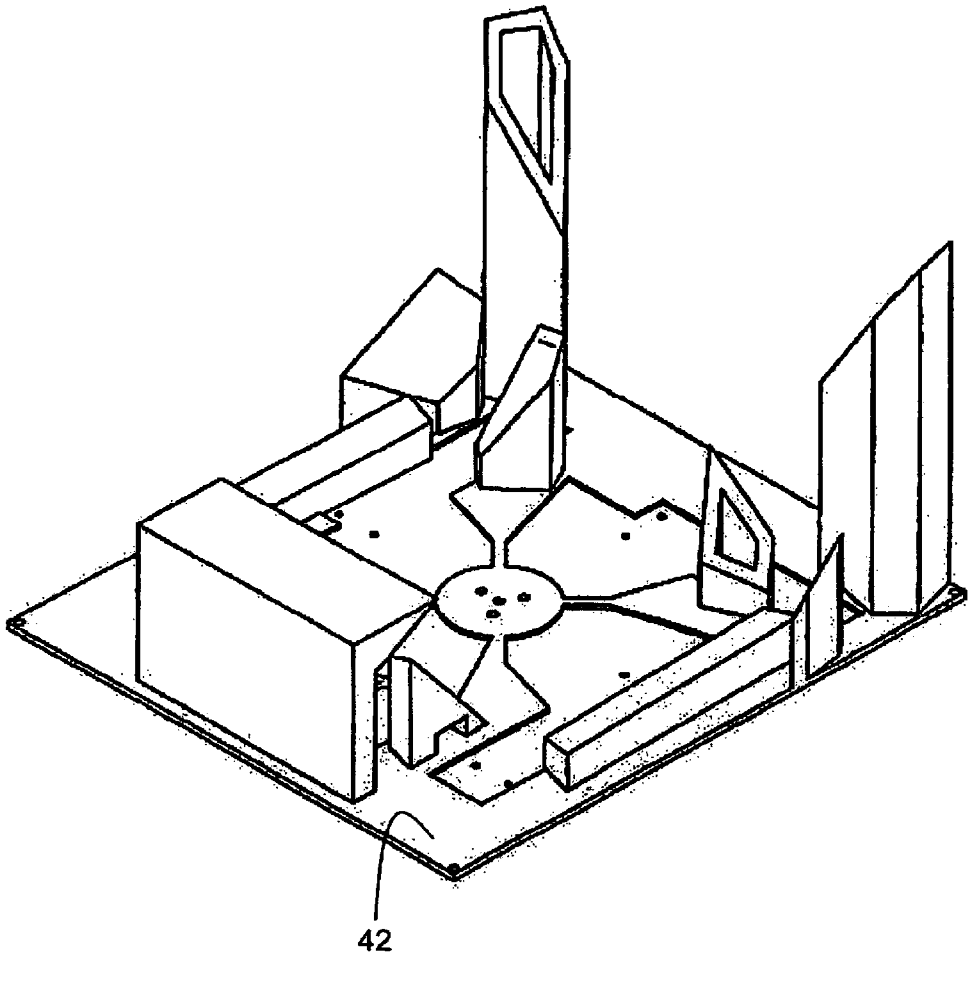
FIG. 1G is a perspective view of the optical bench employed in the bioptical holographic scanning system of FIG. 1D.
Figure 1H:
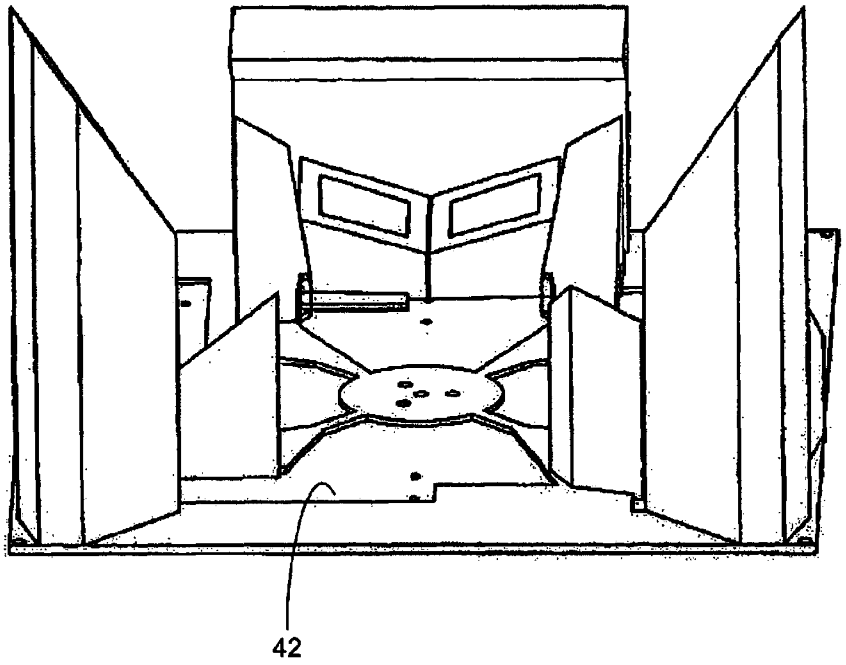
FIG. 1H is a perspective view of the optical bench employed in the bioptical holographic scanning system of FIG. 1D.
Figure 2I:
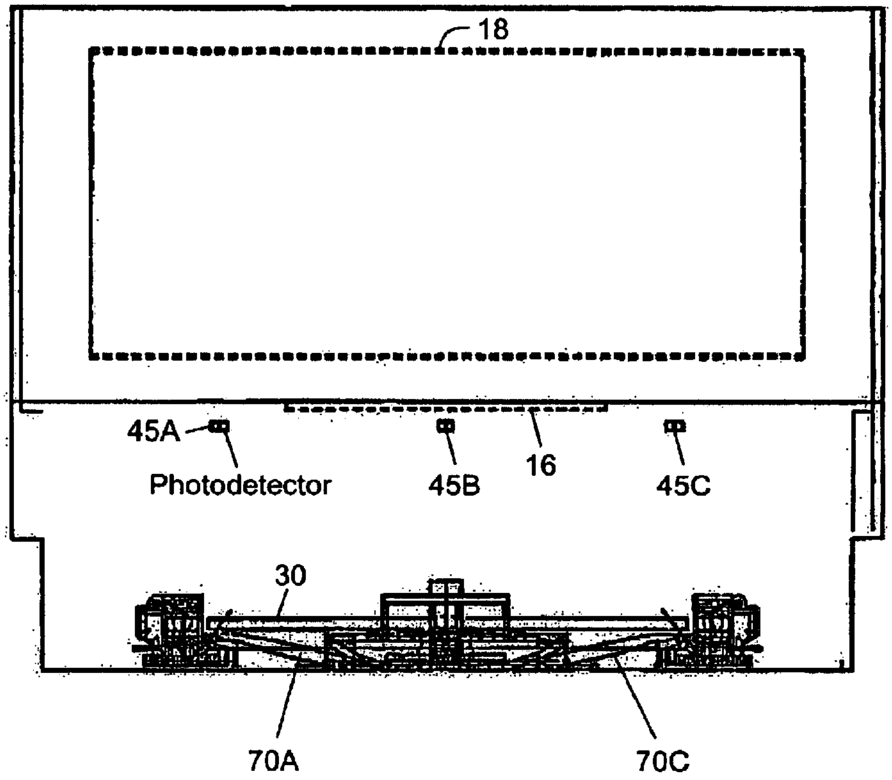
FIG. 2I is an elevated side view of the holographic laser scanning disc and laser scanning stations associated with the bioptical holographic laser scanning system depicted in FIG. 1A, using wire-frame modeling techniques to show the position of the photodetector directly above the point of incidence of the laser beam on each holographic scanning disc in each laser scanning station thereof.
Figure 2K:
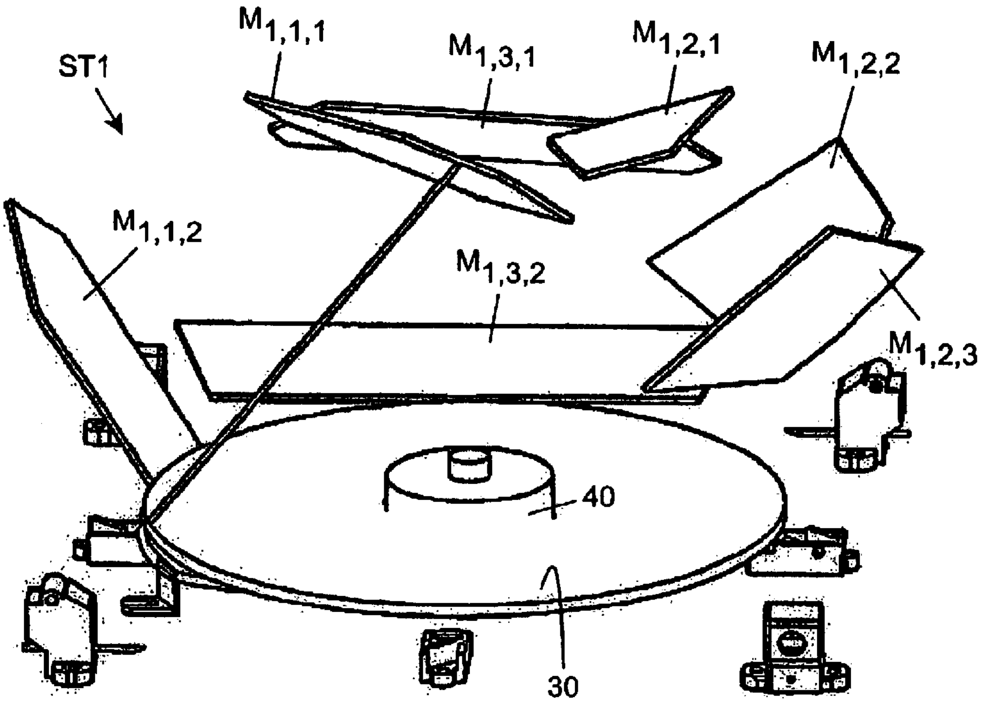
FIG. 2K is a perspective view of the first laser scanning station (ST1) in the bioptical holographic laser scanning system of the present invention, showing solid models of its laser beam production and direction modules disposed about the edge of the holographic laser scanning disc, and associated first, second and third groups of laser beam folding mirrors, wherein the laser beam folding mirrors associated with the first group ($M_{i,j,k}$ where the group index j is i=1) cooperate with laser beams generated from scanning facets having high elevation angle and positive (i.e. left) skew angle characteristics, the laser beam folding mirrors associated with the second group ($M_{i,j,k}$ where the group index j is j=2) cooperate with laser beams generated from scanning facets having high elevation angle and negative (i.e. right) skew angle characteristics, and the laser beam folding mirrors associated with the first group ($M_{i,j,k}$ where the group index j is j=3) cooperate with laser beams generated from scanning facets having low elevation angle and zero (i.e. no) skew angle characteristics.
Figure 2L:
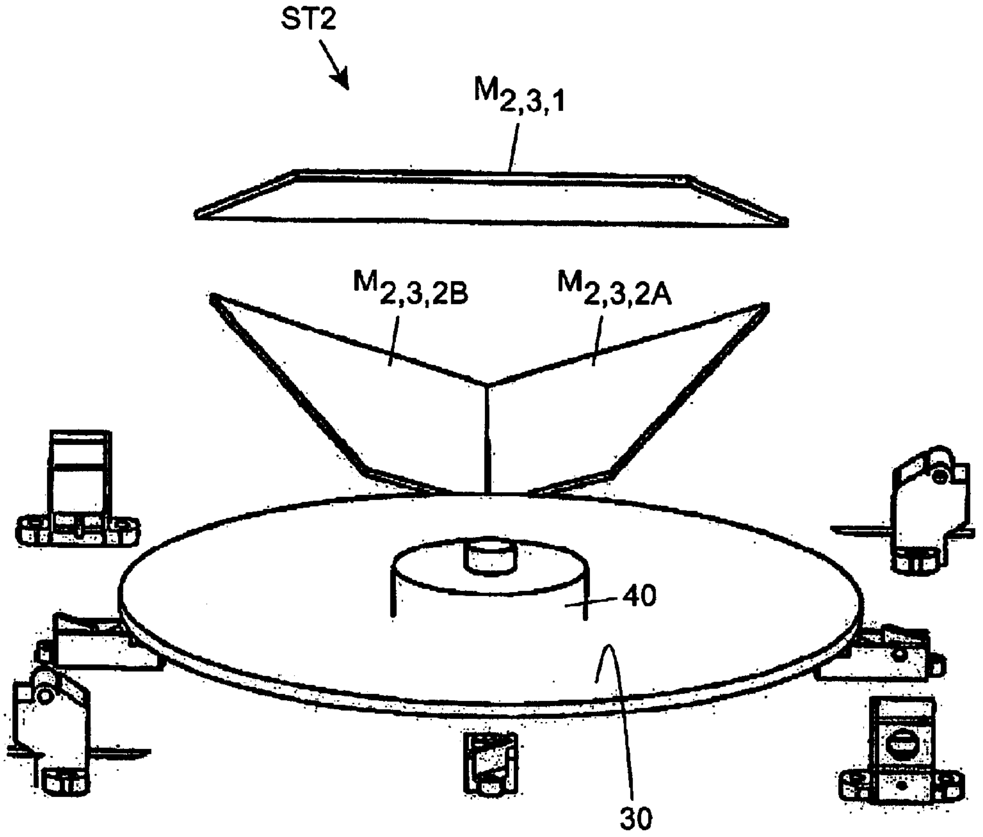
FIG. 2L is a perspective view of the second laser scanning station (ST2) in the bioptical holographic laser scanning system of the present invention, showing solid models of its laser beam production and direction modules disposed about the edge of the holographic laser scanning disc, and associated group of laser beam folding mirrors, wherein the laser beam folding mirrors associated the group ($M_{ijk}$ where the group index j is j=3) cooperate with laser beams generated from scanning facets having low elevation angle and zero (i.e. no) skew angle characteristics.

Referring to FIGS. 2L and 3C and using the mirror identification conventions disclosed above, the laser beam folding mirrors employed at the second scanning station ST2 can be conveniently indexed as follows: mirror group MG3@ST2, containing facets that do not generate skewed outgoing laser beams, has two beam folding mirrors indicated by $M_{1,3,1}$, and $M_{1,3,2}$ shown in FIGS. 5I1 through 5J5, and 6D1 through 6D7.

The position and orientation of each beam folding mirror employed at the second scanning station ST2 relative to the second locally-defined coordinate reference system $R_{local\ 2}$ is specified by a set of position vectors pointing from the from the origin of this local coordinate reference system to the vertices of each such beam folding mirror element (i.e. light reflective surface patch) which has been optimized in terms of occupying a minimal volume within the scanner housing without compromising the performance of its beam folding function. The x,y,z coordinates of these vertex-specifying vectors are set forth in the spreadsheet table of FIGS. 3C, organized according to the three mirror groups MG1@ST2, MG2@ST2 and MG3@ST2 employed at laser scanning station ST2. Notably, the first vertex of each facet in these mirror groups is repeated in the table of FIG. 3C, to traverse a closed path in 3-D space, specifying the perimetrical boundaries of these optimally-trimmed beam folding mirrors employed in the scanning system of the illustrative embodiment.

As shown in FIG. 3C, the mirrors in each mirror group of scanning station ST2 are arranged in the order that the beam folding mirror performs its beam folding (i.e. light reflection) function upon the outgoing diffracted laser beam produced by a scanning facets associated with a facet group corresponding to the mirror group. Notably, at scanning station ST2, two light reflection operations are performed by the mirror group MG3@ST2 upon the outgoing diffracted laser beams. Also, while beam reflecting mirror $M_{2,3,1}$ has four vertices, mirrors $M_{2,3,1A}$ and $M_{2,3,1B}$ have five vertices. As will be described in greater detail hereinafter, the exact number of vertices of each beam folding mirror at scanning station ST2 will depend on the laser scanning plane being generated by the outgoing laser beam, the geometrical characteristics of the overall 3-D scanning pattern to be generated from the holographic scanning system in the particular scanning application at hand, and physical constraints within the scanner housing. Also, while the coordinate values for the vertices of each beam folding mirror specify the surface area, position and orientation of each mirror employed in the second laser scanning station ST2, it is understood that other mirror surface areas, positions and orientations can and may be used to realize other embodiments of the second laser scanning station ST2 in accordance with the principles of the present invention taught herein.

As best shown in FIGS. 1D1, 1E, 2B2, 2C1, 2M, 2N and 2O, the third laser scanning station (ST2) comprises: a third laser beam production module 41C mounted on the optical bench 42 of the system, preferably outside the outer periphery of the holographic scanning disc 30, as shown in FIG. 2A2 and 2B2; a third laser beam directing mirror 43C, disposed beneath the edge of the scanning disc, below the third point of incidence associated with the third scanning station ST3, for directing the laser beam output from the third laser beam production module 41C, through the third point of incidence at a fixed angle of incidence; three groups of laser beam folding mirrors, MG1@ST3, MG2@ST3 and MG3@ST3 which are arranged about the third point of incidence at the third scanning station ST3, and cooperate with the three groups of scanning facets MG1@ST3, MG2@ST3 and MG3@ST3 on the scanning disc, respectively, so as to generate and project different groups of laser scanning planes through the bottom scanning window 16, as graphically illustrated in FIGS. 5K1 through 5R5, and vectorally specified in FIGS. 6E1 through 6G5; a third light collecting/focusing mirror structure (e.g. parabolic light collecting mirror or parabolic surface emulating volume reflection hologram) 70C disposed beneath holographic scanning disc 30 adjacent the third laser beam directing mirror 43C and the third point of incidence at scanning station ST3; a third photodetector 45C disposed substantially above the third point of incidence at scanning station ST3 at a predetermined (i.e. minimized) height above the holographic scanning disc 30; and a third set of analog and digital signal processing boards 50C and 55C, associated with the third laser scanning station ST3, and mounted within the compact scanner housing, for processing analog and digital scan data signals as described in detail in Applicants' U.S. patent application Ser. No. 08/949,915 filed Oct. 14, 1997, and incorporated herein by reference, incorporated herein by reference in its entirety.

Figure 2M:
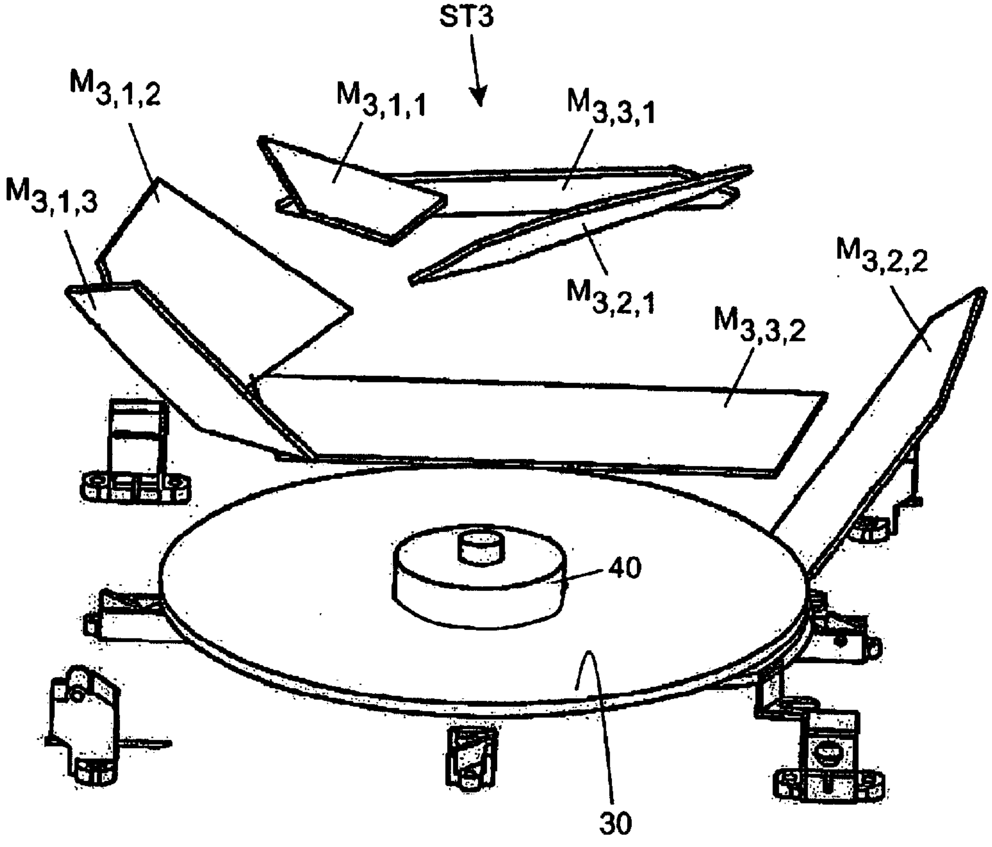
FIG. 2M is a perspective view of the third laser scanning station (ST3) in the bioptical holographic laser scanning system of the present invention, showing solid models of its laser beam production and direction modules disposed about the edge of the holographic laser scanning disc, and associated first, second and third groups of laser beam folding mirrors, wherein the laser beam folding mirrors associated with the first group ($M_{i,j,k}$ where the group index j is i=1) cooperate with laser beams generated from scanning facets having high elevation angle and positive (i.e. left) skew angle characteristics, the laser beam folding mirrors associated with the second group ($M_{i,j\ k}$ where the group index j is j=2) cooperate with laser beams generated from scanning facets having high elevation angle and negative (i.e. right) skew angle characteristics, and the laser beam folding mirrors associated with the first group ($M_{i,j,k}$ where the group index j is j=3) cooperate with laser beams generated from scanning facets having low elevation angle and zero (i.e. no) skew angle characteristics.
Figure 2N:
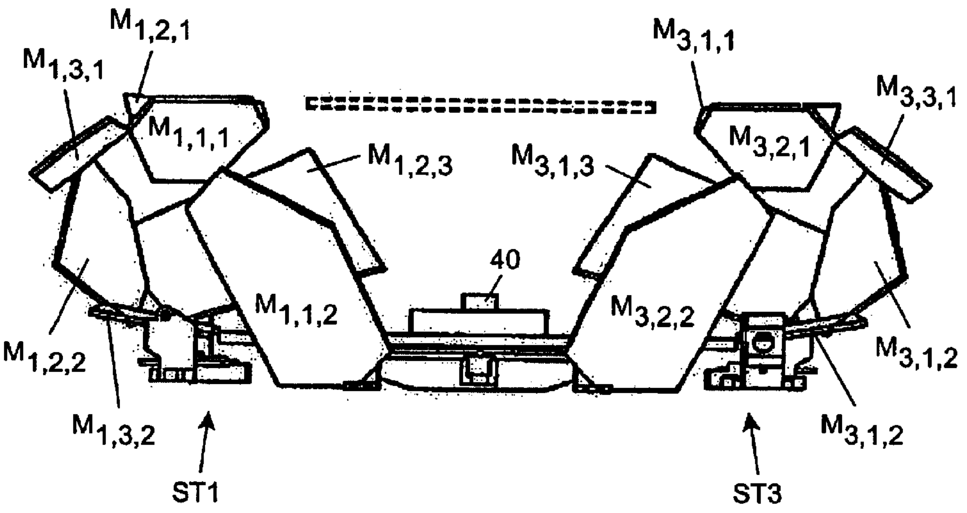
FIG. 2N is an elevated side view of the first and third laser scanning stations (ST1 and ST3) in the bioptical holographic laser scanning system of the present invention, showing solid models of its laser beam production and direction modules disposed about the edge of the holographic laser scanning disc, and associated first, second and third groups of laser beam folding mirrors.
Figure 2O:
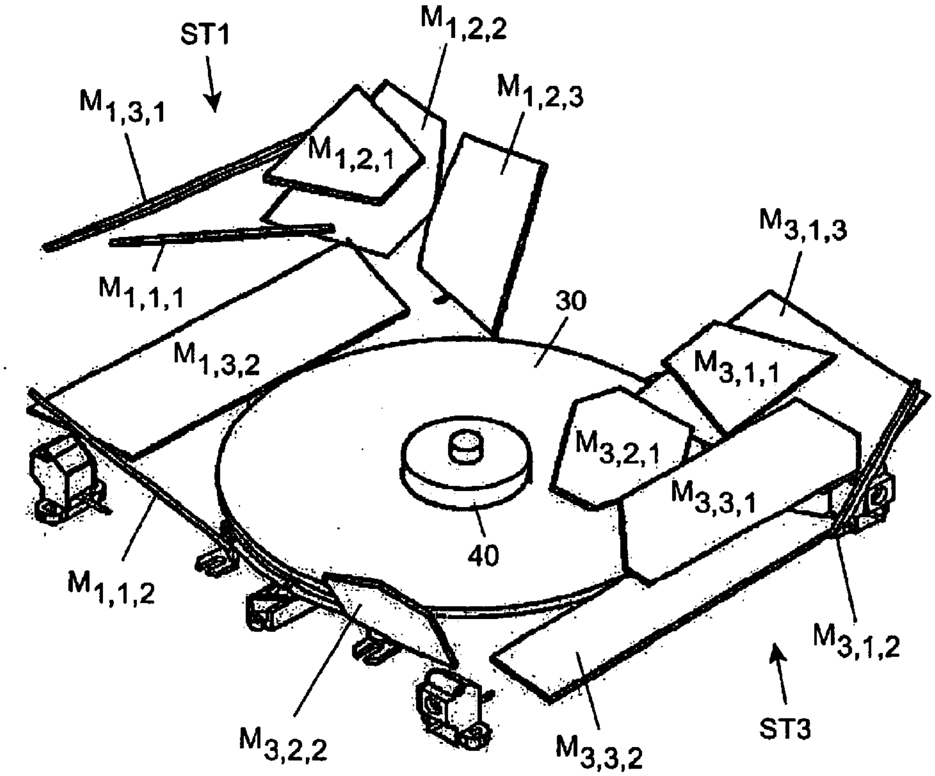
FIG. 2O is a perspective view of the first and third laser scanning stations (ST1 and ST3) in the bioptical holographic laser scanning system of the present invention, showing solid models of its laser beam production and direction modules disposed about the edge of the holographic laser scanning disc, and associated first, second and third groups of laser beam folding mirrors.
Figure 2P:
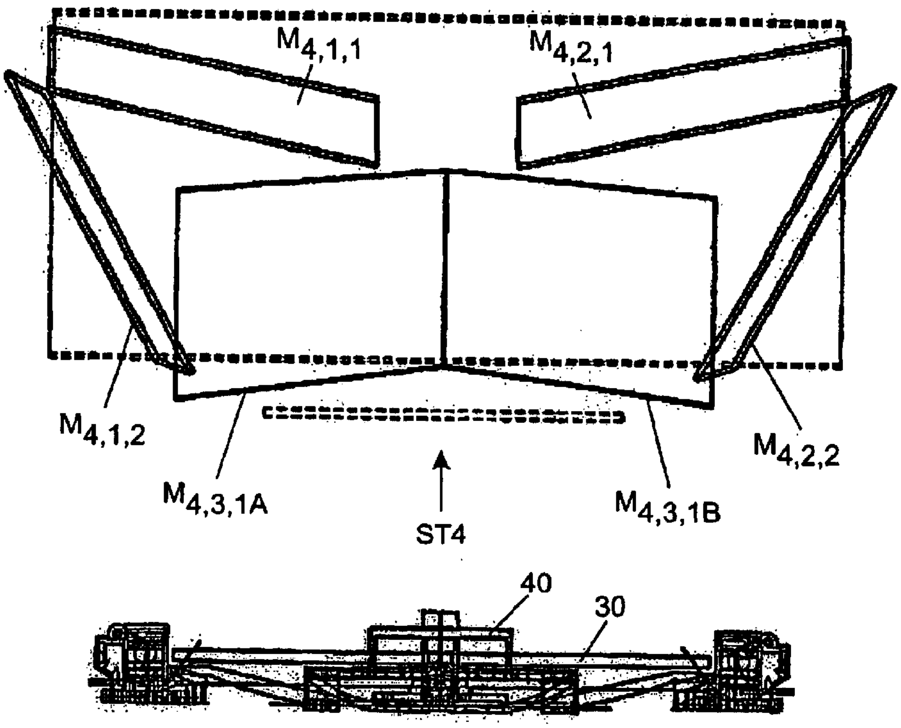
FIG. 2P is a perspective view of the fourth laser scanning station (ST4) in the bioptical holographic laser scanning system of the present invention, showing solid models of its laser beam production and direction modules disposed about the edge of the holographic laser scanning disc, and associated first, second and third groups of laser beam folding mirrors, wherein the laser beam folding mirrors associated with the first group ($M_{i,j,k}$ where the group index j is i=1) cooperate with laser beams generated from scanning facets having high elevation angle and positive (i.e. left) skew angle characteristics, the laser beam folding mirrors associated with the second group ($M_{i,j,\ k}$ where the group index j is j=2) cooperate with laser beams generated from scanning facets having high elevation angle and negative (i.e. right) skew angle characteristics, and the laser beam folding mirrors associated with the first group ($M_{i,j,k}$ where the group index j is j=3) cooperate with laser beams generated from scanning facets having low elevation angle and zero (i.e. no) skew angle characteristics.
Figure 2Q:
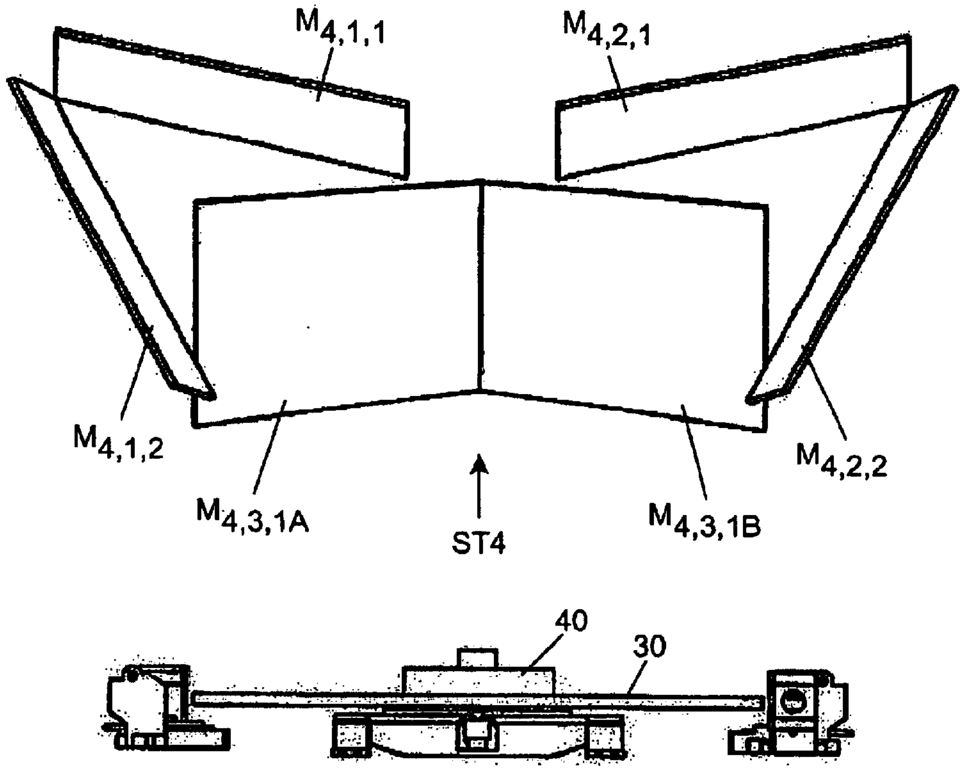
FIG. 2Q is an elevated side view of the fourth laser scanning stations (ST4) in the bioptical holographic laser scanning system of the present invention, showing solid models of its laser beam production and direction modules disposed about the edge of the holographic laser scanning disc, and associated first, second and third groups of laser beam folding mirrors.

Referring to FIGS. 2M and 3D and using the mirror identification conventions set forth above, the laser beam folding mirrors employed at the third scanning station ST3 can be conveniently indexed as follows: mirror group MG1@ST3, containing facets that generate left (i.e. positive) skewed outgoing laser beams, has three beam folding mirrors indicated by $M_{3,1,1,}$ and $M_{3,1,2}$ and $M_{3,1,3}$ shown in FIGS. 5M1 through 5N5, and FIGS. 6E1 through 6G5; mirror group MG2@ST3, containing facets that generate right (i.e. negative) skewed outgoing laser beams, has two beam folding mirrors indicated by $M_{3,3,1,}$ and $M_{3,2,2}$ shown in FIGS. 5K1 through 5L5, and FIGS. 6F1 through 6F4; and mirror group MG3@ST3, containing facets that do not generate skewed outgoing laser beams, has two beam folding mirrors indicated by $M_{3,3,1,}$ and $M_{3,3,2}$ shown in FIGS. 5O1 through 5P5, and FIGS. 6G1 through 6G5.

The position and orientation of each beam folding mirror employed at scanning station ST3 relative to the third locally-defined coordinate reference system $R_{local\ 3}$ is specified by a set of position vectors pointing from the from the origin of this local coordinate reference system to the vertices of each such beam folding mirror element (i.e. light reflective surface patch) which has been optimized in terms of occupying a minimal volume within the scanner housing without compromising the performance of its beam folding function. The x,y,z coordinates of these vertex-specifying vectors are set forth in the spreadsheet table of FIGS. 3D, organized according to the three mirror groups MG1@ST3, MG2@ST3 and MG3@ST3 employed at laser scanning station ST3. Notably, the first vertex of each facet in these mirror groups is repeated in the table of FIG. 3D, to traverse a closed path in 3-D space, specifying the perimetrical boundaries of these optimally-trimmed beam folding mirrors employed in the scanning system of the illustrative embodiment.

As shown in FIG. 3D, the mirrors in each mirror group of scanning station ST3 are arranged in the order that the beam folding mirror performs its beam folding (i.e. light reflection) function upon the outgoing diffracted laser beam produced by a scanning facet associated with a facet group corresponding to the mirror group. Notably, at scanning station ST3, two light reflection operations are performed by the mirror groups MG2@ST3 and MG3@ST3 upon the outgoing diffracted laser beams, whereas three light reflection operations are performed by mirror group MG1@ST3 upon the outgoing diffracted laser beams. Also, certain beam reflecting mirrors (e.g. $M_{3,2,1}$ and $M_{3,2,2}$) have six vertices, while some mirrors have four vertices (e.g. $M_{3,1,2}$ and $M_{3,3,2}$), and yet other mirrors (e.g. $M_{3,1,3}$) have five vertices. As will be described in greater detail hereinafter, the exact number of vertices of each beam folding mirror will depend on the laser scanning plane being generated by the outgoing laser beam, the geometrical characteristics of the overall 3-D scanning pattern to be generated from the holographic scanning system in the particular scanning application at hand, and physical constraints within the scanner housing. Also, while the coordinate values for the vertices of each beam folding mirror specify the surface area, position and orientation of each mirror employed in the third laser scanning station ST3, it is understood that other mirror surface areas, positions and orientations can and may be used to realize other embodiments of the third laser scanning station ST3 in accordance with the principles of the present invention taught herein.

As best shown in FIGS. 1D1, 1E, 2B2, 2C1, 2N, 2P and 2Q, the fourth laser scanning station (ST4) comprises: a fourth laser beam production module 41D mounted on the optical bench 42 of the system, preferably outside the outer periphery of the holographic scanning disc 30, as shown in FIG. 2A2 and 2B2; a fourth laser beam directing mirror 43D, disposed beneath the edge of the scanning disc, below the fourth point of incidence associated with the fourth scanning station ST4, for directing the laser beam output from the fourth laser beam production module 41D, through the fourth point of incidence at a fixed angle of incidence; three groups of laser beam folding mirrors, MG1@ST4, MG2@ST4 and MG3@ST4 which are arranged about the fourth point of incidence at the fourth scanning station ST4, and cooperate with the three groups of scanning facets G1, G2 and G3 on the scanning disc, respectively, so as to generate and project different groups of laser scanning planes through the side bottom scanning window 18, as graphically illustrated in FIGS. 5U1 through 5Z4, and vectorally specified in FIGS. 6H1 through 6J7; a fourth light collecting/focusing mirror structure (e.g. parabolic light collecting mirror or parabolic surface emulating volume reflection hologram) 700 disposed beneath holographic scanning disc 30 adjacent the fourth laser beam directing mirror 43D and the fourth point of incidence at scanning station ST4; a fourth photodetector 45D disposed substantially above the fourth point of incidence at scanning station ST4 at a predetermined (i.e. minimized) height above the holographic scanning disc 30; and a fourth set of analog and digital signal processing boards 50D and 55D, associated with the fourth laser scanning station ST4, and mounted within the compact scanner housing, for processing analog and digital scan data signals as described in detail in Applicants' U.S. patent application Ser. No. 08/949,915 filed Oct. 14, 1997, and incorporated herein by reference, incorporated herein by reference in its entirety.

Referring to FIGS. 2N, 2P, 2Q, and 3E and using the mirror identification conventions set forth above, the laser beam folding mirrors employed at the fourth scanning station ST4 can be conveniently indexed as follows: mirror group MG1@ST4, containing facets that generate left (i.e. positive) skewed outgoing laser beams, has two beam folding mirrors indicated by $M_{4,1,1,}$ and $M_{4,1,2}$ shown in FIGS. 5U1 through 5V5, and FIGS. 6H1 through 6H4; mirror group MG2@ST4, containing facets that generate right (i.e. negative) skewed outgoing laser beams, has two beam folding mirrors indicated by $M_{4,2,1,}$ and $M_{4,2,2}$ shown in FIGS. 5U1 through 5V5, and FIGS. 6I1 through 614; and mirror group MG3@ST4, containing facets that do not generate skewed outgoing laser beams, has two (i.e. a pair of split-type) beam folding mirrors indicated by $M_{4,3,1A,}$ and $M_{4,3,1B}$ shown in FIGS. 5W1 through 5V5, and FIGS. 6J1 through 6J7.

The position and orientation of each beam folding mirror employed at scanning station ST4 relative to the fourth locally-defined coordinate reference system $R_{local\ 4}$ is specified by a set of position vectors pointing from the from the origin of this local coordinate reference system to the vertices of each such beam folding mirror element (i.e. light reflective surface patch) which has been optimized in terms of occupying a minimal volume within the scanner housing without compromising the performance of its beam folding function. The x,y,z coordinates of these vertex-specifying vectors are set forth in the spreadsheet table of FIGS. 3E, organized according to the three mirror groups MG1@ST4, MG2@ST4 and MG3@ST4 employed at laser scanning station ST4. Notably, the first vertex of each facet in these mirror groups is repeated in the table of FIG. 3E, to traverse a closed path in 3-D space, specifying the perimetrical boundaries of these optimally-trimmed beam folding mirrors employed in the scanning system of the illustrative embodiment.

As shown in FIG. 3E, the mirrors in each mirror group of scanning station ST4 are arranged in the order that the beam folding mirror performs its beam folding (i.e. light reflection) function upon the outgoing diffracted laser beam produced by a scanning facet associated with a facet group corresponding to the mirror group. Notably, at scanning station ST4, two light reflection operations are performed by the mirror groups MG1@ST4 and MG1@ST4 upon the outgoing diffracted laser beams, whereas one light reflection operation is performed by mirror group MG3@ST4 upon the outgoing diffracted laser beams. Notably, while all mirrors in the mirror groups of scanning station have four vertices, it is understood that in alternative embodiments of the present invention, the beam folding mirrors in such mirror groups may have more or less than four vertices, depending on the laser scanning planes being generated by the outgoing laser beams, the geometrical characteristics of the overall 3-D scanning pattern to be generated from the holographic scanning system in the particular scanning application at hand, and physical constraints within the scanner housing. Also, while the coordinate values for the vertices of each beam folding mirror specify the surface area, position and orientation of each mirror employed in the fourth laser scanning station ST4, it is understood that other mirror surface areas, positions and orientations can and may be used to realize other embodiments of the fourth laser scanning station ST4 in accordance with the principles of the present invention taught herein.

In the illustrative embodiment of the present invention, certain of the laser beam folding mirrors associated with scanning stations ST1 and ST3, and all of the beam folding mirrors associated with scanning station ST4 are physically supported using a first mirror support platform, formed with the scanner housing. All of the beam folding mirrors associated with the second laser scanning station ST2, and certain of beam folding mirrors associated with laser scanning stations ST1 are physically supported using a second mirror support platform associated with optical bench 42 of the scanning system. Preferably, these mirror mounting support structures, as well as the components of the scanning housing are made from a high-impact plastic using injection molding techniques well known in the art. The vectices of the laser beam folding mirrors used at each scanning station can be used to create molds for making such mirror support structures.

During operation of the bioptical laser scanning system hereof, each laser beam production module 41A, 41B, 41C and 41D cooperates with the holographic scanning disc 30 and produces from its internal visible laser diode(VLD) 153, a laser beam having desired beam cross-sectional characteristics (e.g. the beam aspect ratio of an ellipse or circle) and being essentially free of astigmatism and beam-dispersion that is otherwise associated with a laser beam directly transmitted from a VLD through a prior art rotating holographic scanning facet during laser beam scanning operations. When an incident laser beam from the VLD passes through a particular holographic scanning facet at the point of incidence of the laser scanning station of the present invention, it is diffracted in a prespecified "outgoing" direction (i.e. at an angle of diffraction $B_i$) determined by the skew angle $\theta_{skew}$ and elevation angle $\theta_{elevation}$ determined during the holographic disc design process of the present invention. The function of the multiple groups of laser beam folding mirrors associated with each laser scanning station is to change (i.e. fold) the direction of the outgoing diffracted laser beam from its outgoing direction off the scanning disc, into the direction required to generate its corresponding laser scanning plane in front of the bottom and side scanning window 16 and 18. The actual laser scanning planes produced by the laser scanning stations of the system are geometrically specified in FIGS. 5A1 through 5Z4, and vectorally specified in FIGS. 6A1 through 6J7. Notably, when a produced laser scanning plane is intersected by a planar surface (e.g. associated with an object bearing a bar code symbol), a linear scanline is projected on the intersected surface. The angular dimensions of each resulting scanning plane are determined by the Scan Angle, $\theta_{Si}$ associated with the geometry of the scanning facet, and the Scan Angle Multiplication Factor, $M_i$ associated therewith, which will be discussed in greater detail hereinafter.

When a bar code symbol is scanned by any one of the laser scanning planes projected from the bottom or side scanning windows of the system, the incident laser light scanned across the object is intensity modulated by the absorptive properties of the scanned object and scattered according to Lambert's Law (for diffuse reflective surfaces). A portion of this laser light is reflected back along the outgoing ray (optical) path, off the same group of beam folding mirrors employed during the corresponding laser beam generation process, and thereafter passes through the same holographic scanning facet that generated the corresponding scanning plane only $T_{transit}=2-f_i/c$ seconds before, where c is the speed of light. As the reflected laser light passes through the holographic scanning facet on its return path towards the parabolic mirror structure disposed beneath the holographic scanning disc, the incoming light rays enter the holographic scanning facet close to the Bragg angle thereof (i.e. $B_i$) and thus (once again) are strongly diffracted towards the parabolic mirror along its optical axis. The parabolic mirror associated with each laser scanning station, in turn, focuses these collected light rays and redirects the same through the holographic scanning facet at angles sufficiently far off the Bragg angle (i.e. $A_i$) so that they are transmitted therethrough towards the photodetector disposed directly above the point of incidence at the laser scanning station with minimal losses due to internal diffraction within the holographic facet. A novel method of designing the light collection/focusing/detection subsystem of the present invention will be described in great detail hereinafter.

As will be described in greater detail hereinafter, the geometry of each holographic facet has been designed so that (1) each of the twelve holographic facets supported thereon has substantially the same (i.e. equal) Lambertian light collecting efficiency, independent of its focal length, and (2) the collective surface area of all of the holographic facets occupies (i.e. uses) all of the available light collecting surface area between the outer radius and inner radius of the scanning disc. The advantage of this aspect of the present invention is that optical-based scan data signals with maximum signal-to-noise (SNR) ratio are produced and collected at the photodetector of each laser scanning station in the system. This, of course, implies higher performance and higher quality scan data signals for signal processing purposes.

As shown in FIG. 3A1, each holographic facet on the surface of the scanning disc is specified by a set of geometrical parameters, a set of optical parameters, and a set of holographic recording parameters. The geometrical parameters define various physical characteristics of the facet in issue, such as the location of the facet on the disc specified by its preassigned facet number (e.g. n=1, 2, 3, . . . , or 12), its light collecting surface $Area_i$ (designed to exhibit a high diffraction efficiency to incoming light rays on Bragg), the Angle of the facet $\theta_{roti}$, the adjusted Rotation Angle of the facet $\theta'_{roti}$ actual scan angle of the facet $\theta_{Sweepi}$ (accounting for beam diameter $d_{beam}$ and interfaced gaps $d_{gap}$), and the surface boundaries $SB_i$ occupied by the holographic facet on the scanning disc, which typically will be irregular in shape by virtue of the optimized light collecting surface area of the holographic disc). The optical parameters associated with each holographic facet include the wavelength λ at which the object beam is designed to be reconstructed, the angle of incidence of the holographic facet $A_i$, the angle of diffraction thereof $B_i$, its scan angle multiplication factor $M_i$, the focal length $f_i$ of the facet, etc. Unlike the other parameters associated with each facet, the recording parameters define: the thickness of the recording medium T (e.g. dichromate gelatin or Dupont photopolymer) used during the recording of the holographic facet; the average bulk index of refraction of the recording medium; and the modulation depth (i.e. modulation-index) $\Delta n_i$ associated with fringe structure formed in the recording medium. Collectively, these parameters shall be referred to as “construction parameters” as these parameters are required to construct the holographic facet with which they are associated.

In the scanning system of the present invention, the principal function of each holographic facet on the scanning disc is to deflect an incident laser beam along a particular path in 3-D space in order to generate a corresponding scanning plane within the 3-D laser scanning volume produced by the laser scanning system hereof. Collectively, the complex of laser scanning planes produced by the plurality of holographic facets in cooperation with the four laser beam production modules ST1, ST2, ST3, ad ST4 creates an omni-directional scanning pattern within the highly-defined 3-D scanning volume of the scanning system between the space occupied by the bottom and side scanning windows of the system.

As shown in the timing diagram of FIG. 6K, the bioptical holographic laser scanner of the illustrative embodiment cyclically generates a complex omni-directional 3-D laser scanning pattern from both the bottom and side scanning windows 16 and 18 thereof. This complex omni-directional scanning pattern is graphically illustrated in FIGS. 5A1 through 5A5, and the scanning plane components of this pattern are graphically illustrated in FIGS. 5A6 through 5Z4. The 3-D laser scanning pattern of the illustrative embodiment consists of 50 different laser scanning planes, having different depths of focus, which cooperate in order to generate a plurality of pairs of quasi-orthogonal laser scanning patterns within the 3-D scanning volume of the system, thereby enabling true omnidirectional scanning of bar code symbols having minimum bar elements on the order of about 0.006 inches or less. Greater details of the laser scanning pattern of the present invention will be described hereinbelow.

As shown in FIGS. 2E through 2E3 and 2F1 through 2H3, the four laser production modules 41A, 41B, 41C and 41D are mounted on a base plate (i.e. optical bench) 42 in FIG. 1G, about the axis of rotation of the shaft of electric motor 41, at the angular locations specified in FIGS. 2B1 and 2B2, detailed above. As shown in FIGS. 2G1 through 2G3, each laser beam production module comprises: a visible laser diode (VLD) 153 and an aspheric collimating lens (L1) 81 supported within the bore of a housing 82 mounted upon the optical bench 42 of the module housing; a multi-function light diffractive grating 83 having a fixed spatial frequency and disposed at incident angle relative to the outgoing laser beam collimated from lens 81 for changing properties of the incident laser beam so that the aspect-ratio thereof is controlled, beam dispersion is minimized upon the laser beam exiting the holographic scanning disc; a beam folding mirror 84 supported at the edge of housing for directing the output laser beam through the scanning disc at the point of incidence, at the angle of incidence; and a photodetector 84 supported within a housing 82 and disposed along the optical axis of the VLD 81 for detecting the zeroeth diffraction order as the incident laser beam is transmitted through the multifunction light diffractive grating 83, and producing an electrical signal indicative of the detected intensity. Details for designing the multi-function light diffractive grating and configuring the laser scanning beam module of the illustrative embodiment is described in great detail in Applicants' prior U.S. patent application Ser. No. 08/949,915 filed Oct. 14, 1997, and incorporated herein by reference, incorporated herein by reference in its entirety.

In each laser scanning station (ST1, ST2, ST3 and ST4) of the illustrative embodiment, the laser beam production module serves several important functions. The module produces a circularized laser beam that is directed at the point of incidence, located at $r_o$, on the rotating scanning disk, at the prespecified angle of incidence $\theta_i$ (i.e. 90°-$A_i$), which, in the illustrative embodiment, is precisely the same for all facets thereon. Also, the module produces a laser beam that is free of VLD-related astigmatism, and exhibits minimum dispersion when diffracted by the scanning disk, as taught by Applicants in U.S. patent application Ser. No. 08/949,915 filed Oct. 14, 1997, and incorporated herein by reference.

As shown in FIGS. 2H1 and 2H2, each laser beam directing module 41A, 41B, 41C and 41D, cooperating with laser beam directing modules 43A, 43B, 43C and 43D, respectively, comprises an optical bench 90 which is stationarily mounted upon the optical bench of the scanning system, as shown in FIGS. 1E and 2A2. As shown in FIGS. 2H1 and 2H2, the optical bench 90 supports a first planar mirror 91 which reflects the laser beam output from its associated laser beam production module at about a 90 degree angle, onto a second planar mirror 92 also supported by the optical bench. As shown, the second planar mirror 92 is disposed at an angle relative to the central plane of the scanning disc to that the beam reflecting off the second planar mirror 92 is directed onto the point of incidence of the associated scanning station at the predetermined angle of incidence.

As shown in FIGS. 2I through 2J2, scan data photodetectors 45A and 45C associated with laser scanning stations ST1 and ST3 are mounted substantially above the first and third point of incidences, whereas scan data photodetectors 45B and 45D associated with laser scanning stations ST2 and ST4 are mounted substantially above the second and fourth point of incidences so that these devices do not block or otherwise interfere with the returning (i.e. incoming) laser light rays reflecting off light reflective surfaces (e.g. product surfaces, bar code symbols, etc) during laser scanning and light collecting operations. In practice, each photodetector 45A, 45B, 45C and 45D is supported in its respective position by a photodetector support frame or like structure which is stationarily mounted to the optical bench 42 by way one or more support elements (not shown for purposes of clarity). The electrical analog scan data signal produced from each photodetector is processed in a conventional manner by its analog scan data signal processing board which can be supported upon photodetector support frame, or by other suitable support mechanisms known in the art. Notably, the height of the photodetector support structure, referenced to the base plate (i.e. optical bench) 42, will be chosen to be less than the maximum height of the base/bottom portion of the scanner housing.

As best shown in FIGS. 2I and 2J2, the parabolic light collecting mirror structure 70A (70B, 70C, 70D) associated with each laser scanning station is disposed beneath the holographic scanning disc, about the x axis of the locally embedded coordinate system of the laser scanning station. While certainly not apparent, precise placement of the parabolic light collecting element (e.g. mirror) relative to the holographic facets on the scanning disc is a critical requirement for effective light detection by the photodetector associated with each laser scanning station. Placement of the photodetector 45A at the focal point of the parabolic light focusing mirror 70A alone is not sufficient for optimal light detection in the light detection subsystem of the present invention. Careful analysis must be accorded to the light diffraction efficiency of the facets on the holographic scanning disc and to the polarization state(s) of collected and focused light rays being transmitted therethrough for detection. As will become more apparent hereinafter, the purpose of such light diffraction efficiency analysis ensures the realization of two important conditions, namely: (i) that substantially all of the incoming light rays reflected off an object (e.g. bar code symbol) and passing through the holographic facet (producing the corresponding instant scanning beam) are collected by the parabolic light collecting mirror; and (ii) that all of the light rays collected by the parabolic light collecting mirror are focused through the same holographic facet onto the photodetector associated with the station, with minimal loss associated with light diffraction and refractive scattering within the holographic facet. A detailed procedure will be described hereinafter for designing the parabolic light collecting mirror for each laser scanning station in order to satisfy the critical operating conditions specified above.

As shown in FIGS. 2A and 2B1, the four digital scan data signal processing boards 55A, 55B, 55C and 55D are arranged in such a manner within the scanner housing to receive and provide for processing the analog scan data signals produced from analog scan data signal processing boards 50A, 50B, 50C, and 50D respectively. Each of the analog signal processing boards 50A, 50B, 50C and 50D, with it scan data photodetector mounted thereto, can be mounted above the corresponding laser beam directing mirror module 43A, 43B, 43C and 43D, set back slightly in a radial direction along the x axis of the locally embedded coordinate reference system. In practice, each analog scan data signal can be made very small and narrow to occupy the available space provided in such "return ray free" locations within the scanner housing. Digital scan data signal processing boards 55A, 55B, 55C and 55D can be mounted virtually anywhere within the side portion of the scanner housing which does not cause interference with outgoing and incoming (i.e. return) laser light rays. A central processing board 60 can also be mounted within the vertical housing portion of the scanner housing, for processing signals produced from the digital scan data signal processing boards. A conventional power supply board can be mounted upon the base plate (i.e. optical bench) 42 of the system, preferably within one of the corners of the system. The function of the digital scan data signal processing boards, the central processing board, and the power supply board will be described in greater detail in connection with the functional system diagram of FIG. 4. As shown, electrical cables are used to conduct electrical signals from each analog scan data signal processing board to its associated digital scan data signal processing board, and from each digital scan data signal processing board to the central processing board. Regulated power supply voltages are provided to the central signal processing board 60 by way of an electrical harness (not shown), for distribution to the various electrical and electro-optical devices requiring electrical power within the holographic laser scanner. In a conventional manner, electrical power from a standard 120 Volt, 60 HZ, power supply is provided to the power supply board by way of flexible electrical wiring (not shown). Symbol character data produced from the central processing board is transmitted over a serial data transmission cable connected to a serial output (i.e. standard RS232) communications jack installed through a wall in the scanner housing. This data can be transmitted to any host device by way of a serial (or parallel) data communications cable, RF signal transceiver, or other communication mechanism known in the art.

As shown in FIGS. 1A, the bottom and side scanning windows 16 and 18 have light transmission apertures of substantially planar extent. Bottom light transmission aperture is substantially parallel to the holographic scanning disc rotatably supported upon the shaft of electric motor 41, whereas the side light transmission aperture is substantially perpendicular thereto. In order to seal off the optical components of the scanning system from dust, moisture and the like, laser scanning windows 16 and 18, preferably fabricated from a high impact plastic material, are installed over their corresponding light transmission apertures using a rubber gasket and conventional mounting techniques. In the illustrative embodiment, each laser scanning window 16 and 18 has spectrally-selective light transmission characteristics which, in conjunction with a spectrally-selective filters 16A, 16B, 16C, 16D installed before each photodetector within the housing, forms a narrow-band spectral filtering subsystem that performs two different functions. The first function of the narrow-band spectral filtering subsystem is to transmit only the optical wavelengths in the red region of the visible spectrum in order to impart a reddish color or semi-transparent character to the laser scanning window. This makes the internal optical components less visible and thus remarkably improves the external appearance of the holographic laser scanning system. This feature also makes the holographic laser scanner less intimidating to customers at point-of-sale (POS) stations where it may be used. The second function of the narrow-band spectral filtering subsystem is to transmit to the photodetector for detection, only the narrow band of spectral components comprising the outgoing laser beam produced by the associated laser beam production module. Details regarding this optical filtering subsystem are disclosed in copending application Ser. No.

08/439,224, entitled "Laser Bar Code Symbol Scanner Employing Optical Filtering With Narrow Band-Pass Characteristics and Spatially Separated Optical Filter Elements" filed on May 11, 1995, which is incorporated herein by reference in its entirety.

When using multiple laser beam sources in any holographic laser scanning system, the problem of "cross-talk" among the neighboring light detection subsystems typically arises and must be adequately resolved. The cause of the cross-talk problem is well known. It is due to the fact that the spectral components of one laser beam are detected by a neighboring photodetector. While certainly not apparent, the holographic scanning disc of the present invention has been designed so that light rays produced from one laser beam (e.g. j=1) and reflected off a scanned code symbol anywhere within the laser scanning volume $V_{scanning}$ will fall incident upon the light collecting region of the scanning disc associated with a neighboring light detection subsystem in an off-Bragg condition. Consequently, the signal level of "neighboring" incoming scan data signals are virtually undetectable by each photodetector in the holographic laser scanner of the present invention. The optical characteristics of the scanning facets on the scanning disc which makes this feature possible will be described in greater detail hereinafter during the description of the scanning disc design process hereof.

As best shown in FIG. 3A1, the holographic scanning disc of the present invention is unlike any other prior art laser scanning disc in three important respects. Firstly, virtually all of the utilizable surface area of the scanning disc, defined between the outer edge of the support hub 40 and the outer edge of the scanning disc, is occupied by the collective surface area of all twenty holographic scanning facets that have been laid out over this defined region. Secondly, each holographic scanning facet has substantially the same Lambertian light collection efficiency as all other scanning facets. Unlike conventional laser scanning discs, the geometry of each holographic facet on the scanning disc of the present invention is apparently irregular, arbitrary and perhaps even fanciful to the eyes of onlookers. The fact is, however, that this is not the case. As taught in Applicants' U.S. patent application Ser. No. 08/949,915 filed Oct. 14, 1997, and incorporated herein by reference, the scanning disc design process employed herein comprises two major stages: a first, "analytical modeling stage" during which particular optical and geometrical parameters are determined for each holographic facet within a complex set of scanning system constraints; and a second, "holographic facet layout stage", during which the scanning disc designer lays out each holographic facet on the support disc so that virtually all of the available surface area thereon is utilized by the resulting layout. While the disc design method allows certain geometrical parameters associated with each designed holographic facet to be selected on the basis of discretion and judgement of the disc designer (preferably using a computer-aided (CAD) tool) during the holographic facet layout stage, certain geometrical parameters, however, such as the total surface area of each facet Area, its Scan Sweep Rotation (or Sweep Angle $\theta'_{rot}$) and its inner radius $r_i$ are determined during the analytical modeling stage by the geometrical structure (e.g. its scanline length, focal plane, and relative position in the scan pattern) associated with the corresponding laser scanline P(i,j) produced by the holographic facet within a particular focal plane of the prespecified laser scanning pattern. Consequently, particular parameters determined during the analytical modeling stage of the design process operate as constraints upon the disc designer during the facet layout stage of the process. Thus, the holographic facets realized on the scanning disc of the present invention have particular geometrical characteristics that are directly determined by geometrical properties of the laser scanning pattern produced therefrom, as well as the optical properties associated with the laser beam and the holographic facets realized on the scanning disc.

Figure 4A:
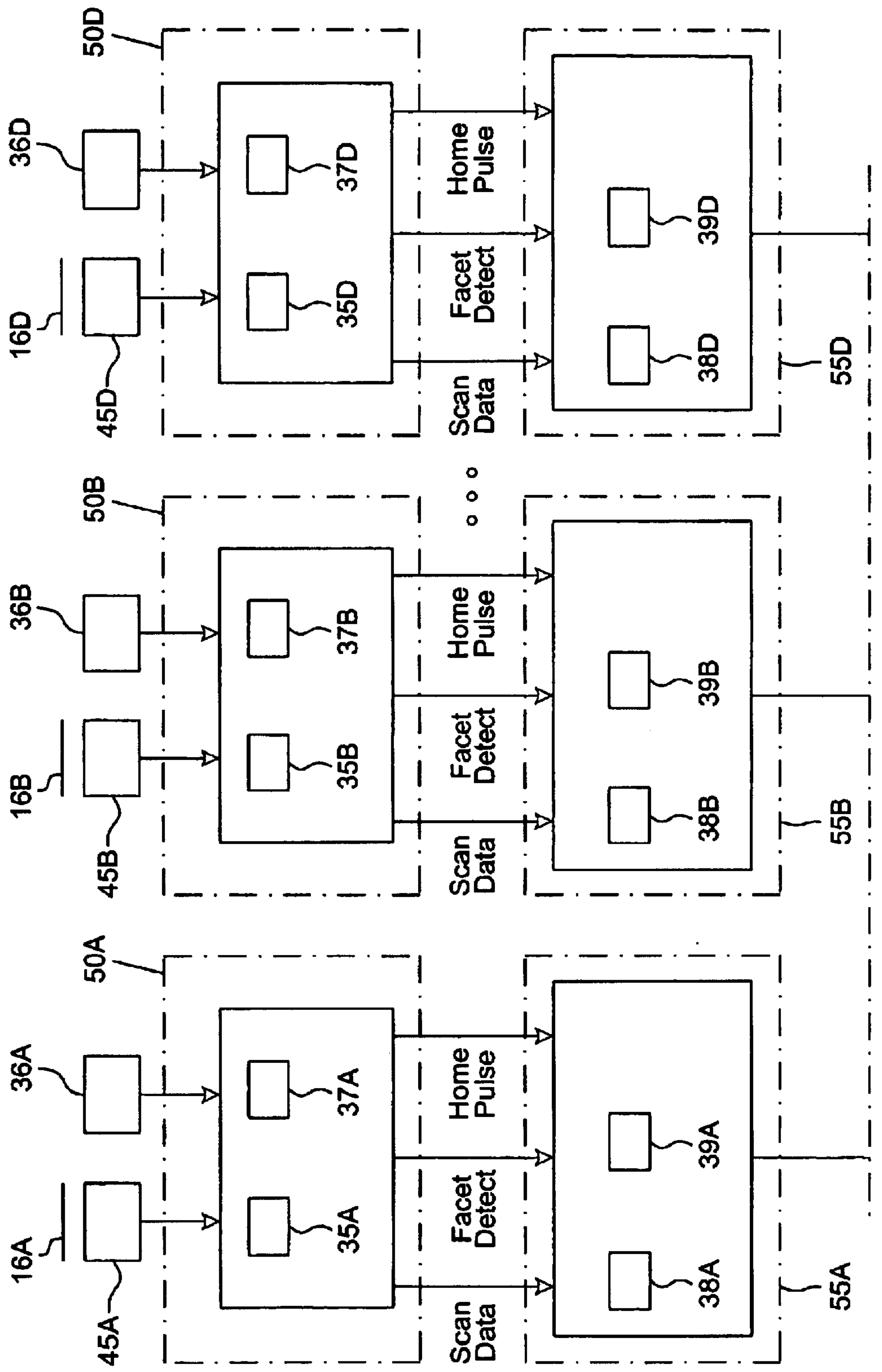
FIGS. 4A, 4B and 4C set forth a block functional diagram of bioptical holographic laser scanning system of the illustrative embodiment of the present invention, showing the major components of the system and their relation to each other.
Figure 4B:
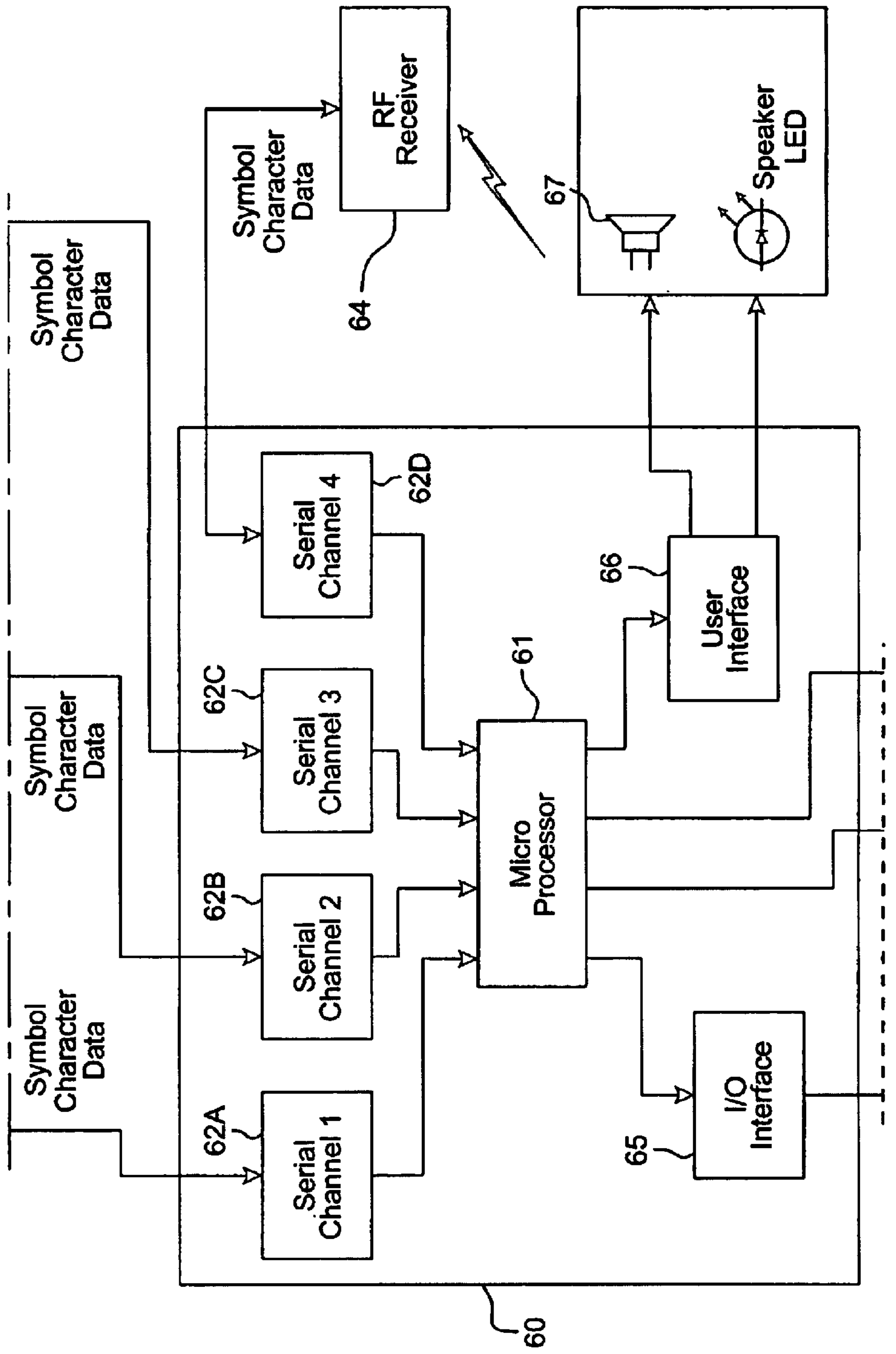
Figure 4C:
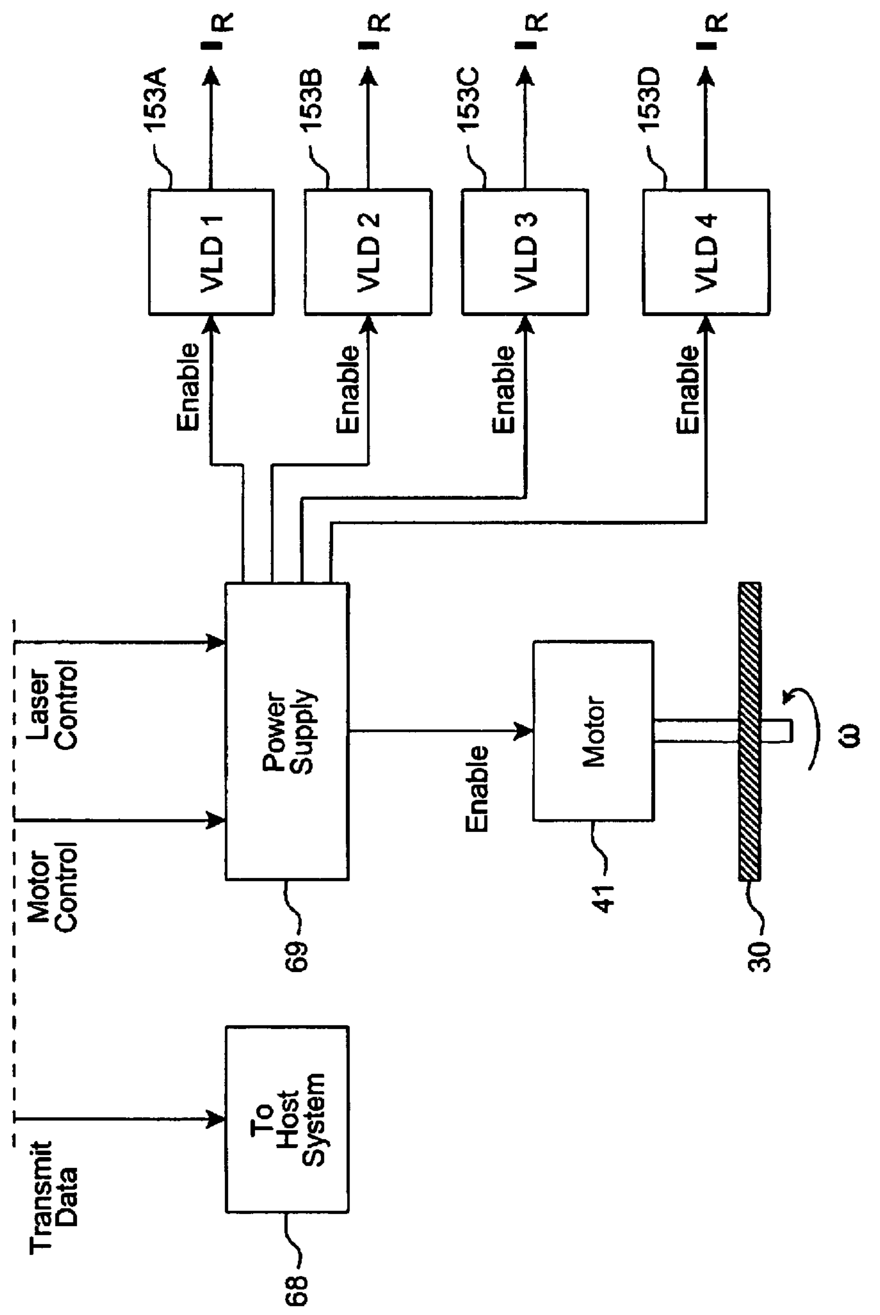
Figure 512:
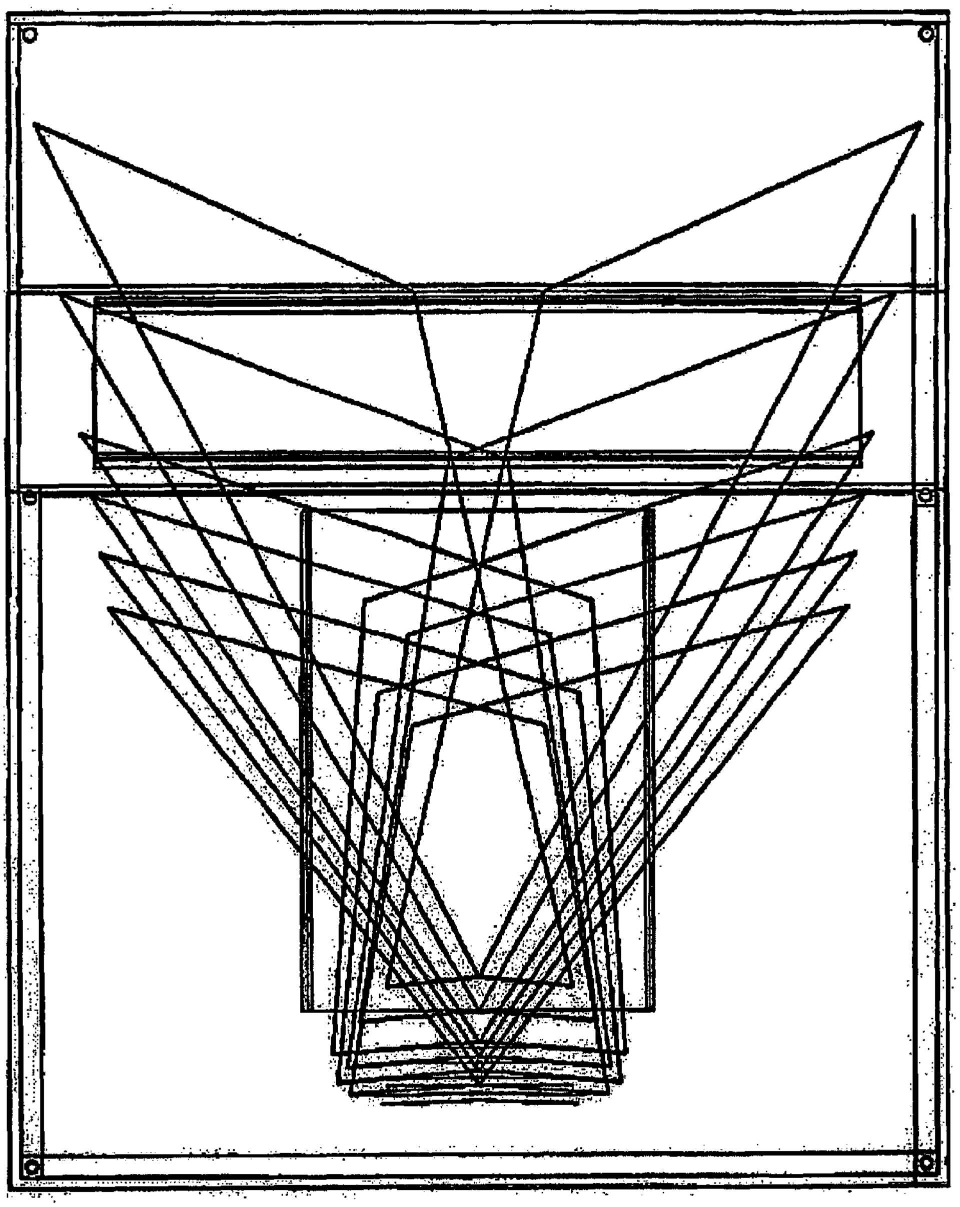
Figure 513:
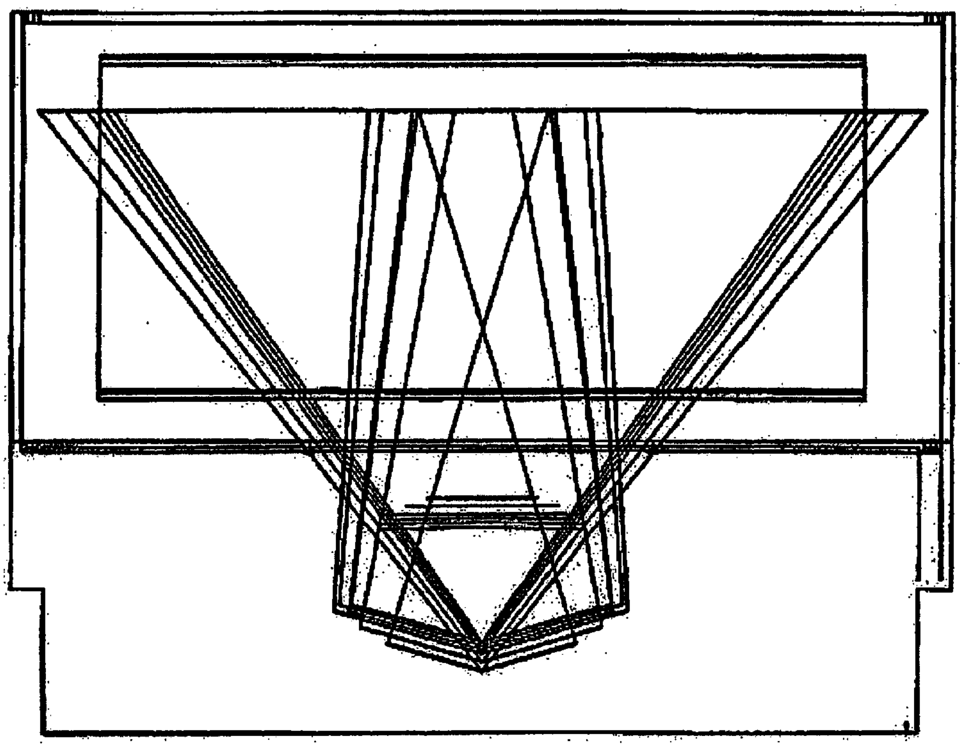
Figure 514:
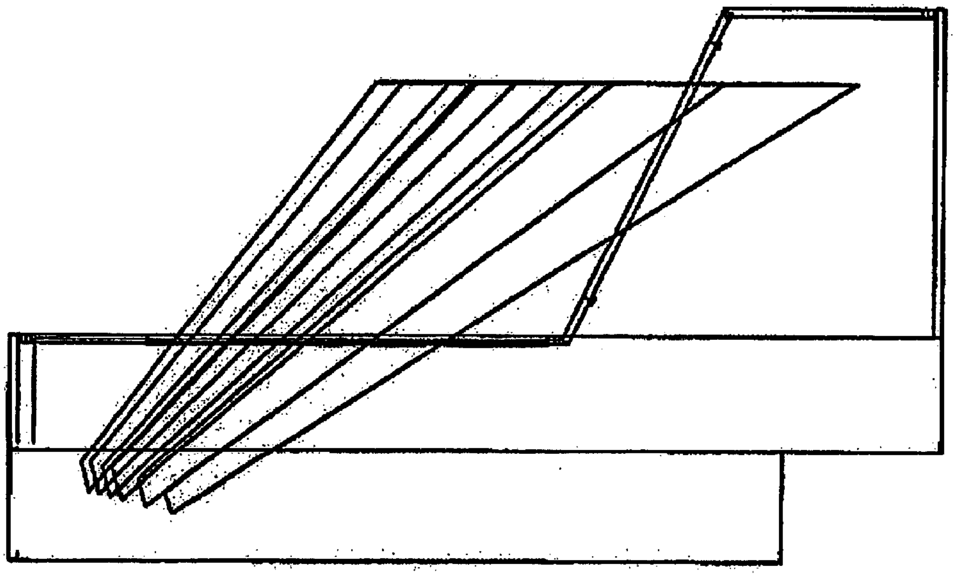
Figure 502:
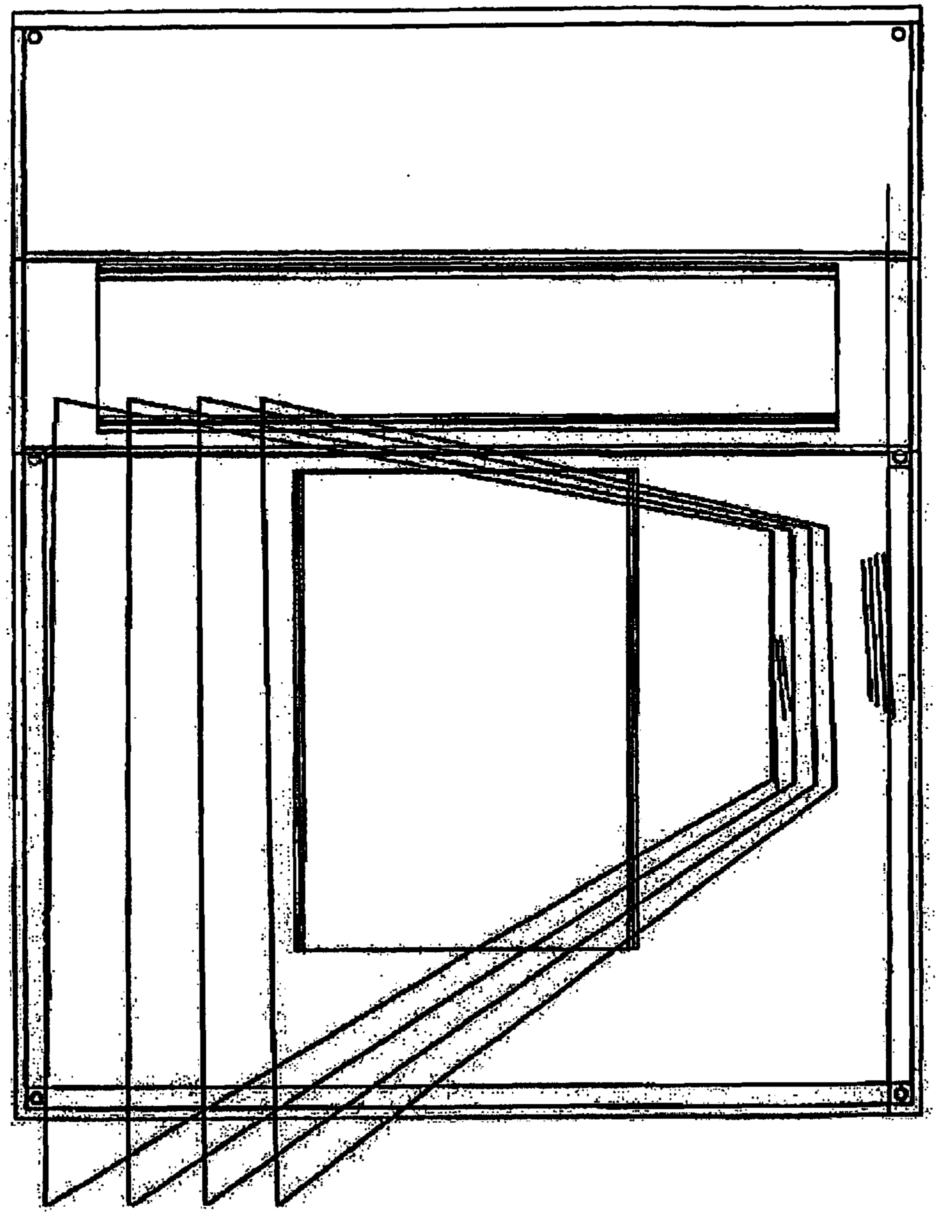
Figure 503:
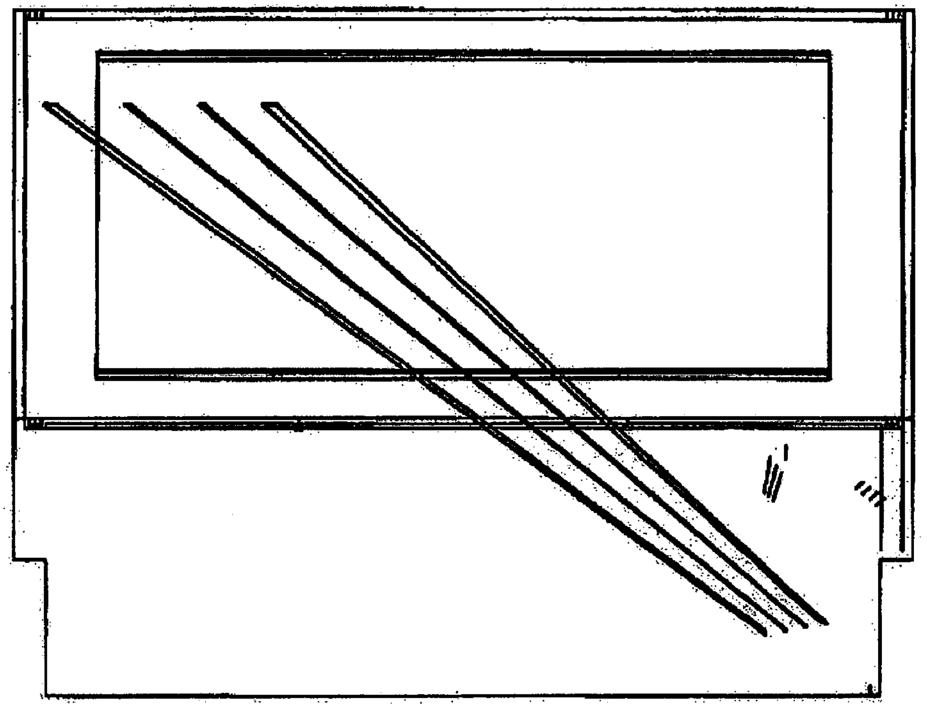
Figure 504:
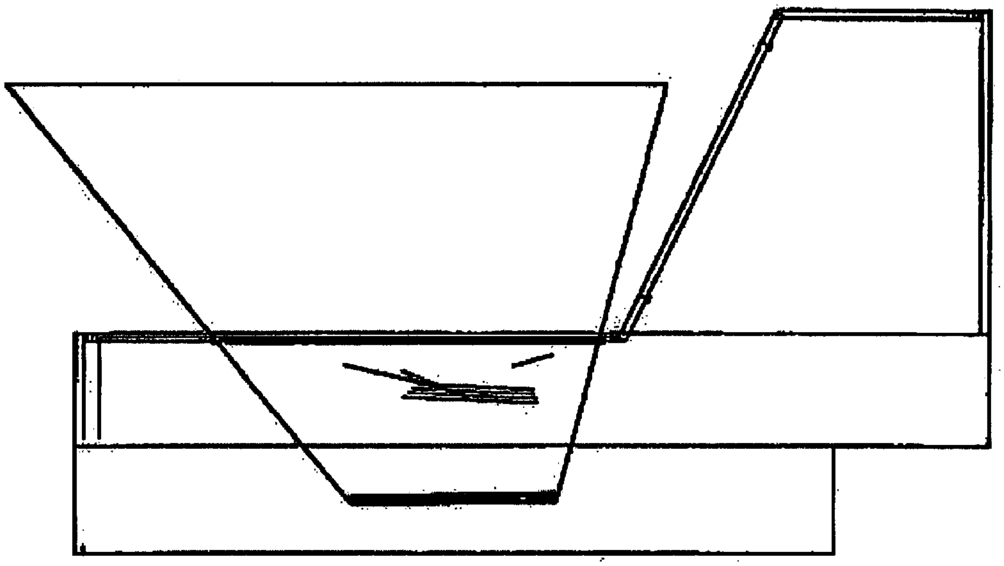
Figure 505:
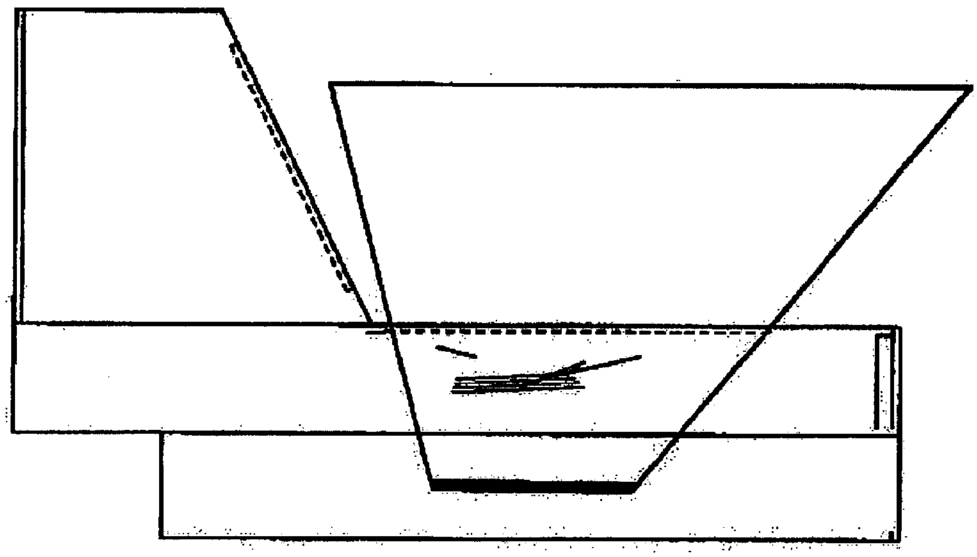

As shown in the system diagram of FIGS. 4A through 4C, the holographic laser scanning system of the present invention comprises a number of system components, many of which are realized on boards that have been hereinbefore described. For sake of simplicity, it will be best to describe these system components by describing the components realized on each of the above-described boards, and thereafter describe the interfaces and interaction therebetween.

In the illustrative embodiment, each analog scan data signal processing board 50A, 50B, 50C and 50D has the following components mounted thereon: an associated photodetector 45A (45B, 45C, 45D) (e.g. a silicon photocell) for detection of analog scan data signals (as described); an analog signal processing circuit 50A (50B, 50C, 50D) for processing detected analog scan data signals; a 0-th diffraction order signal detector 36A (36B, 36C, 36D) for detecting the low-level, 0-th diffraction order signal produced from each holographic facet on the rotating scanning disc during scanner operation; and associated signal processing circuitry 37A (37B, 37C, 37D) for detecting a prespecified pulse in the optical signal produced by the 0-th diffraction order signal detector and generating a synchronizing signal S(t) containing a periodic pulse pattern. As will be described below in greater detail, the function of the synchronizing signal S(t) is to indicate when a particular holographic facet (e.g. Facet No. i=1) produces its 0-th order optical signal, for purposes of linking detected scan data signals with the particular holographic facets that generated them during the scanning process.

In the illustrative embodiment, each photodetector 45A, 45B, 45C and 45D is realized as an opto-electronic device and each analog signal processing (e.g. preamplification and A/D conversion) circuit 35A (35B, 35C, 35D) aboard the analog signal processing board is realized as an Application Specific Integrated Circuit (ASIC) chip. These chips are suitably mounted onto a small printed circuit (PC) board, along with electrical connectors which allow for interfacing with other boards within the scanner housing. With all of its components mounted thereon, each PC board is suitably mounted within the scanner housing.

In a conventional manner, the optical scan data signal $D_0$ focused onto the photodetector 45A (45B, 45C or 45D) during laser scanning operations is produced by light rays associated with a diffracted laser beam being scanned across a light reflective surface (e.g. the bars and spaces of a bar code symbol) and scattering thereof, whereupon the polarization state distribution of the scattered light rays is typically altered when the scanned surface exhibits diffuse reflective characteristics. Thereafter, a portion of the scattered light rays are reflected along the same outgoing light ray paths toward the holographic facet which produced the scanned laser beam. These reflected light rays are collected by the scanning facet and ultimately focused onto the photodetector of the associated light detection subsystem by its parabolic light reflecting mirror disposed beneath the scanning disc. The function of each photodetector is to detect variations in the amplitude (i.e. intensity) of optical scan data signal $D_0$, and produce in response thereto an electrical analog scan data signal $D_1$ which corresponds to such intensity variations. When a photodetector with suitable light sensitivity characteristics is used, the amplitude variations of electrical analog scan data signal $D_1$ will linearly correspond to light reflection characteristics of the scanned surface (e.g. the scanned bar code symbol). The function of the analog signal processing circuitry is to band-pass filter and preamplify the electrical analog scan data signal $D_1$, in order to improve the SNR of the output signal.

In the illustrative embodiment, each digital scan data signal processing board 55A (55B, 55C, 55D) is constructed the same. On each of these signal processing boards, programmable digitizing circuit 38A (38B, 38C, 38D) is realized as a second ASIC chip. Also, a programmed decode computer 39A (39B, 39C, 39D) is realized as a microprocessor and associated program and data storage memory and system buses, for carrying out symbol decoding operations. In the illustrative embodiment, the ASIC chips, the microprocessor, its associated memory and systems buses are all mounted on a single printed circuit (PC) board, using suitable electrical connectors, in a manner well known in the art.

The function of the A/D conversion circuit is to perform a simple thresholding function in order to convert the electrical analog scan data signal $D_1$ into a corresponding digital scan data signal $D_2$ having first and second (i.e. binary) signal levels which correspond to the bars and spaces of the bar code symbol being scanned. In practice, the digital scan data signal $D_2$ appears as a pulse-width modulated type signal as the first and second signal levels thereof vary in proportion to the width of bars and spaces in the scanned bar code symbol.

The function of the programmable digitizing circuit is to convert the digital scan data signal D2, associated with each scanned bar code symbol, into a corresponding sequence of digital words (i.e. a sequence of digital count values) $D_3$. Notably, in the digital word sequence D3, each digital word represents the time length associated with each first or second signal level in the corresponding digital scan data signal $D_2$. Preferably, these digital count values are in a suitable digital format for use in carrying out various symbol decoding operations which, like the scanning pattern and volume of the present invention, will be determined primarily by the particular scanning application at hand. Reference is made to U.S. Pat. No. 5,343,027 to Knowles, incorporated herein by reference, as it provides technical details regarding the design and construction of microelectronic digitizing circuits suitable for use in the holographic laser scanner of the present invention.

In bar code symbol scanning applications, the function of the programmed decode computer is to receive each digital word sequence $D_3$ produced from the digitizing circuit, and subject it to one or more bar code symbol decoding algorithms in order to determine which bar code symbol is indicated (i.e. represented) by the digital word sequence $D_3$, originally derived from corresponding scan data signal $D_1$ detected by the photodetector associated with the decode computer. In more general scanning applications, the function of the programmed decode computer is to receive each digital word sequence $D_3$ produced from the digitizing circuit, and subject it to one or more pattern recognition algorithms (e.g. character recognition algorithms) in order to determine which pattern is indicated by the digital word sequence $D_3$. In bar code symbol reading applications, in which scanned code symbols can be any one of a number of symbologies, a bar code symbol decoding algorithm with auto-discrimination capabilities can be used in a manner known in the art.

As shown in FIGS. 4A through 4C, the central processing board 60 comprises a number of components mounted on a small PC board, namely: a programmed microprocessor 61 with a system bus and associated program and data storage memory, for controlling the system operation of the holographic laser scanner and performing other auxiliary functions; first, second, third and forth serial data channels 62A, 62B, 62C and 62D, for receiving serial data input from the programmable decode computers and RF receiver/base unit 64; an input/output (I/O) interface circuit 65 for interfacing with and transmitting symbol character data and other information to host computer system 68 (e.g. central computer, cash register, etc.); and a user-interface circuit 65 for providing drive signals to an audio-transducer 67 and LED-based visual indicators used to signal successful symbol reading operations to users and the like. In the illustrative embodiment, each serial data channel is be realized as an RS232 port, although it is understood that other structures may be used to realize the function performed thereby. The programmed control computer 61 also produces motor control signals, and laser control signals during system operation. These control signals are received as input by a power supply circuit 69 realized on the power supply PC board, identified hereinabove. Other input signals to the power supply circuit 69 include a 120 Volt, 60 Hz line voltage signal from a standard power distribution circuit. On the basis of the received input signals, the power supply circuit produces as output, (1) laser source enable signals to drive VLDs 153A, 153B, 153C, and 153D, respectively, and (2) motor enable signals in order to drive the scanning disc motor 41.

In the illustrative embodiment, RF base unit 64 is realized on a very small PC board mounted on the base plate 42 within the scanner housing. Preferably, RF base unit 64 is constructed according to the teachings of copending U.S. application Ser. No. 08/292,237 filed Aug. 17, 1995, also incorporated herein by reference. The function of the base unit is to receive data-packet modulated carrier signals transmitted from a remotely situated bar code symbol reader, data collection unit, or other device capable of transmitting data packet modulated carrier signals of the type described in said application Ser. No. 08/292,237, supra.

In some holographic scanning applications, where omnidirectional scanning cannot be ensured at all regions within a prespecified scanning volume, it may be useful to use scan data produced either (i) from the same laser scanning plane reproduced many times over a very short time duration while the code symbol is being scanned therethrough, or (ii) from several different scanning planes spatially contiguous within a prespecified portion of the scanning volume. In the first instance, if the bar code symbol is moved through a partial region of the scanning volume, a number of partial scan data signal fragments associated with the moved bar code symbol can be acquired by a particular scanning plane being cyclically generated over an ultra-short period of time (e.g. 1–3 milliseconds), thereby providing sufficient scan data to read the bar code symbol. In the second instance, if the bar code symbol is within the scanning volume, a number of partial scan data signal fragments associated with the bar code symbol can be acquired by several different scanning planes being simultaneously generated by the three laser scanning stations of the system hereof, thereby providing sufficient scan data to read the bar code symbol, that is, provided such scan data can be identified and collectively gathered at a particular decode processor for symbol decoding operations.

In order to allow the bioptical holographic scanner of the present invention to use symbol decoding algorithms that operate upon partial scan data signal fragments, as described above, the 0-th order signal detector and its associated processing circuitry are used to produce a periodic signal X(t), as discussed briefly above. As the periodic signal X(t) is generated by the 0-th order of the incident laser beam passing through the outer radial portion of each holographic facet on the rotating scanning disc, this signal will include a pulse at the occurrence of each holographic facet interface. However, in order to uniquely identify a particular facet for reference purposes, a "gap" of prespecified width $d_{gap}$, as shown in FIG. 3A1, is formed between two prespecified facets (i.e. i=1 and 6) at the radial distance through which the incident laser beam passes. Thus, in addition to the periodic inter-facet pulses, the periodic signal X(t) also includes a "synchronizing pulse" produced by the prespecified "gap" which is detectable every $T=2\pi/\omega$ [seconds], where $\omega$ is the constant angular velocity of the holographic scanning disc maintained by the scanning disc motor and associated driver control circuitry. Thus, while the function of the 0-th order light detector is to detect the 0-th diffractive order of the incident laser beam, the function of its associated signal processing circuitry is to (1) detect the periodic occurrence of the "synchronizing pulse" in the periodic signal X(t) and (2) simultaneously generate a periodic synchronizing signal S(t) containing only the periodic synchronizing pulse stream. The construction of such pulse detection and signal generation circuitry is well known within the ordinary skill of those in the art.

As each synchronizing pulse in the synchronizing signal S(t) is synchronous with the "reference" holographic facet on the scanning disc, the decode processor (i.e. computer) (39A, 39B, 39C, 39D) provided with this periodic signal can readily "link up" or relate, on a real-time basis, (1) each analog scan data signal $D_1$ it receives with (2) the particular holographic facet on the scanning disc that generated the analog scan data signal. To perform such signal-to-facet relating operations, the decode computer is provided with information regarding the order in which the holographic facets are arranged on the scanning disc. Such facet order information can be represented as a sequence of facet numbers (e.g. i=1, 6, 3, 9, 7, 4, 8, 11, 5, 12, 2, 10, 1) stored within the associated memory of each decode processor. By producing both a scan data signal and a synchronizing signal S(t) as described above, thee holographic scanner of the present invention can readily carry out a diverse repertoire of symbol decoding processes which use partial scan data signal fragments during the symbol reading process. The advantages of this feature of the system will become apparent hereinafter.

In code symbol reading applications where partial scan data signal fragments are used to decode scanned code symbols, the synchronizing signal S(t) described above can be used to identify a set of digital word sequences $D_3$, (i.e. $\{D_3\}$), associated with a set of time-sequentially generated laser scanning beams produced by a particular holographic facet on the scanning disc. In such applications, each set of digital word sequences can be used to decode a partially scanned code symbol and produce symbol character data representative of the scanned code symbol. In code symbol reading applications where complete scan data signals are used to decode scanned code symbols, the synchronizing signal S(t) described above need not be used, as the digital word sequence $D_3$ corresponding to the completely scanned bar code symbol is sufficient to carry out symbol decoding operations using conventional symbol decoding algorithms known in the art.

Referring to FIGS. 5A1 through 5Z4, the omnidirectional laser scanning pattern generated by the bioptical holographic scanner hereof is illustrated in greater detail.

In FIGS. 5A1 through 5A4, all of the laser scanning planes that are projected through the bottom and side scanning windows during the course of a complete revolution of the holographic scanning disc are shown simultaneously. It is understood, however, that at any instant in time, only four scanning planes (i.e. scanlines) are being simultaneously generated, but that during a complete revolution of the holographic scanning disc, all 50 scanning planes are generated from four scanning stations of the system. The order in which each scanning plane is produced during a single revolution of the scanning disc is described by the schematic representation shown in FIG. 6K. Notably, as shown in FIG. 6K, different angular portions of different scanning facets are used at different laser scanning stations in order to generate laser scanning planes that produce laser scan lines of particular lengths at particular depths of focus and spatial regions in the 3-D scanning volume of the system. For example, as shown in FIG. 6K, at the laser scanning station ST1, only a small angular portions of scanning facet Nos. 8, 10, and 12 are used to generate laser scanning planes from the bottom scanning window using mirror groups MG2@ST1, whereas substantially greater angular portions of scanning facet Nos. 7, 9 and 11 are employed to generate laser scanning planes from the bottom scanning window using mirror groups MG1@ST1, and almost the entire angular extent of scanning facet Nos. 1, 2, 3 and 4 are used to generate laser scanning planes from the bottom scanning window using mirror groups MG3@ST1. At scanning station ST4, substantially the entire angular extent of scanning facet Nos. 1, 2, 3 and 4 are used to generate laser scanning planes from the side scanning window using mirror groups MG3@ST4.

In order to more fully appreciate complexity and capabilities associated with the omnidirectional laser scanning pattern of the present invention, it will be helpful to describe the structure of such subcomponents, as well as the manner in which such subcomponents are generated by particular holographic facets on the rotating scanning disc passing through particular laser scanning stations. Also, it will be helpful to show how, when such subcomponents of the laser scanning pattern are spatially combined within the space occupied between the bottom and side scanning windows, pairs of quasi-orthogonal scanning planes are produced therewithin to form the complete omnidirectional scanning pattern during each complete revolution of the holographic scanning disc.

As shown in FIGS. 5B1 through C5, when scanning facets (Nos. 7, 9 and 11) having high elevation angle characteristics and left (i.e. positive) skew angle characteristics pass through the first laser scanning station (ST1), these scanning facets sequentially generate laser scanning beams that reflect off the first group of beam folding mirrors (MG1@ST1) associated therewith during system operation, and project substantially vertically-disposed laser scanning planes through the bottom scanning window for reading horizontally-oriented (i.e. ladder-type) bar code symbols.

As shown in FIGS. 5D1 through SE5, when scanning facets (Nos. 8, 10 and 12) having high elevation angle characteristics and right (i.e. negative) skew angle characteristics pass through the first laser scanning station (ST1), ), these scanning facets sequentially generate laser scanning beams that reflect off the second group of beam folding mirrors (MG2@ST1) associated therewith during system operation, and project substantially vertically-disposed laser scanning planes through the bottom scanning window for reading horizontally-oriented (i.e. ladder-type) bar code symbols.

As shown in FIGS. 5F1 through 5G5, when scanning facets (Nos. 1 through 4) having low elevation angle characteristics and no (i.e. zero) skew angle characteristics pass through the first laser scanning station (ST1), these scanning facets sequentially generate laser scanning beams that reflect off the third group of beam folding mirrors (MG3@ST1) associated therewith during system operation, and project substantially horizontally-disposed laser scanning planes through the bottom scanning window for reading vertically-oriented (i.e. picket-fence type) bar code symbols.

As shown in FIGS. 5H1 through 5H10, when scanning facets (Nos. 1–4 and 7–12) pass through the first laser scanning station (ST1), they sequentially generate laser scanning beams that reflect off the first, second and third groups of beam folding mirrors (MG1@ST1, MG2@ST1 and MG3@ST1) associated therewith during system operation, and project both substantially horizontally and vertically disposed laser scanning planes through the bottom scanning window for reading vertically-oriented (i.e. picket-fence type) bar code symbols and horizontally-oriented (i.e. ladder type) bar code symbols, respectively.

As shown in FIGS. 5K1 through 5L5, when scanning facets (Nos. 8, 10 and 12) having high elevation angle characteristics and right (i.e. negative) skew angle characteristics pass through the third laser scanning station (ST3), these scanning facets sequentially generate laser scanning beams that reflect off the first group of beam folding mirrors (MG1@ST3) associated therewith during system operation, and project substantially vertically disposed laser scanning planes through the bottom scanning window for reading horizontally-oriented (i.e. ladder type) bar code symbols.

As shown in FIGS. 5M1 through 5N5, when scanning facets (Nos. 7, 9 and 11) having high elevation angle characteristics and left (i.e. positive) skew angle characteristics pass through the third laser scanning station (ST3), these scanning facets sequentially generate laser scanning beams that reflect off the second group of beam folding mirrors (MG2@ST3) associated therewith during system operation, and project substantially vertically disposed laser scanning planes through the bottom scanning window for reading horizontally-oriented (i.e. ladder type) bar code symbols.

As shown in FIGS. 5O1 through 5P5, when scanning facets (Nos. 1–4) having low elevation angle characteristics and no (i.e. zero) skew angle characteristics pass through the third laser scanning station (ST3), these scanning facets sequentially generate laser scanning beams that reflect off the third group of beam folding mirrors (MG3@ST3) associated therewith, and project substantially horizontally disposed laser scanning planes through the bottom scanning window for reading vertically-oriented (i.e. picket-fence type) bar code symbols during system operation.

As shown in FIGS. 5Q1 through 5R5, when scanning facets (Nos. 1–4 and 7–12) pass through the third laser scanning station (ST3), these scanning facets sequentially generate laser scanning beams that reflect off the first, second and third groups of beam folding mirrors (MG1@ST3, MG2@ST3 and MG3@ST3) associated therewith during system operation, an project both substantially horizontally and vertically disposed laser scanning planes through the bottom scanning window for reading vertically-oriented (i.e. picket-fence type) bar code symbols and horizontally-oriented (i.e. ladder type) bar code symbols, respectively.

As shown in FIGS. 5S1 through 5T5, when scanning facets (Nos. 1–12) pass through the first, second and third laser scanning stations (ST3, ST2 and ST3), these scanning facets sequentially generate laser scanning beams that reflect off the groups of beam folding mirrors (MG1@ST1, MG2@ST1, MG3@ST1, MG3@ST2, (MG1@ST3, MG2@ST3 and MG3@ST3) associated therewith during system operation, and project both substantially horizontally and vertically disposed laser scanning planes through the bottom scanning window for reading vertically-oriented (i.e. picket-fence type) bar code symbols and horizontally-oriented (i.e. ladder type) bar code symbols, respectively.

As shown in FIGS. 5U1 through 5V5, when scanning facets (Nos. 7–12) pass through the fourth laser scanning station (ST4), these scanning facets sequentially generate laser scanning beams that reflect off the groups of beam folding mirrors (MG1@ST4 and MG2@ST4) associated therewith during system operation, and project substantially vertically disposed laser scanning planes through the side scanning window for reading horizontally-oriented (i.e. ladder type) bar code symbols.

As shown in FIGS. 5W1 through 5X5, when scanning facets (Nos. 1–6) pass through the fourth laser scanning station (ST4), these scanning facets sequentially generate laser scanning beams that reflect off the third group of beam folding mirrors (MG3@ST4) associated therewith during system operation, and project substantially horizontally disposed laser scanning planes through the side scanning window for reading vertically-oriented (i.e. picket-fence type) bar code symbols.

As shown in FIGS. 5Y1 through 5Z4, when scanning facets (Nos. 1–12) pass through the fourth laser scanning station (ST4), these scanning facets sequentially generate laser scanning beams that reflect off the first, second and third groups of beam folding mirrors (MG1@ST4, MG2@ST4 and MG3@ST4) associated therewith during system operation, and project both substantially horizontally and vertically disposed laser scanning planes through the side scanning window for reading vertically-oriented (i.e. picket-fence type) bar code symbols and horizontally-oriented (i.e. ladder type) bar code symbols, respectively.

The time sequential order in which each laser scanning plane is cyclically generated from the bioptical holographic laser scanning system of the illustrative embodiment described above, is shown in the schematic "facet versus timing" diagram of FIG. 6K.

The bioptical holographic laser scanning system of the illustrative embodiment described in detail above can be designed and constructed using the general techniques disclosed in U.S. patent application Ser. No. 08/949,915 filed Oct. 14, 1997, and incorporated herein by reference. In particular, the holographic optical elements (HOEs) on the holographic scanning disc of the system can be constructed using the construction parameters set forth in the spreadsheet table of FIGS. 3H1, 3H2, 3H3, 3I1, and 3I2. Likewise, the laser beam production modules employed at each scanning station can be designed using the general design and construction techniques taught in Applicants' U.S. patent application Ser. No. 08/949,915 filed Oct. 14, 1997, and incorporated herein by reference, incorporated hereby reference.

The holographic laser scanning system of the present invention can be modified in various ways. For example, more or less groups of beam folding mirrors can be added to each laser scanning station within the system. Also more or less laser scanning stations might be employed within the system. Such modifications might be practiced in order to provide an omnidirectional laser scanning pattern having scanning performance characteristics optimized for a specialized scanning application.

While the scanning disc of the illustrative embodiment employed facets having low elevation angle characteristics and no (i.e. zero) skew angle characteristics, it is understood that it might be desirable in particular applications to use scanning facets having low elevation angle characteristics and left and/or right skew angle characteristics to as to enable a compact scanner design in a particular application.

While the various embodiments of the holographic laser scanner hereof have been described in connection with linear (1-D) bar code symbol scanning applications, it should be clear, however, that the scanning apparatus and methods of the present invention are equally suited for scanning 2-D bar code symbols, as well as alphanumeric characters (e.g. textual information) in optical character recognition (OCR) applications, as well as scanning graphical images in graphical scanning arts.

Several modifications to the illustrative embodiments have been described above. It is understood, however, that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. A bioptical laser scanning system providing 360° omnidirectional bar code symbol scanning coverage at a point of sale (POS) station, said bioptical laser scanning system comprising:

a horizontal section integrally connected to a vertical section;

a horizontal-scanning window formed in said horizontal section;

a vertical-scanning window formed in said vertical section, and being substantially orthogonal to said bottom-scanning window;

a first plurality of laser beam folding mirrors disposed within said horizontal section;

a second plurality of laser beam folding mirrors disposed within said vertical section;

a first laser beam production module for producing first laser beam, and a second laser beam production module for producing a second laser beam;

a rotating scanning element disposed within said horizontal section and having multiple surfaces rotating about an axis of rotation, for (i) scanning said laser beam and producing a first laser scanning beam that reflects off said first plurality of laser beam folding mirrors to generate and project a first plurality of laser scanning planes through said horizontal-scanning window, and (ii) scanning said second laser beam and producing a second laser scanning beam that reflects off said second plurality of laser beam folding mirrors to generate and project a second plurality of laser scanning through said vertical-scanning window, whereby said first and second pluralities of laser scanning planes (i) intersect within predetermined scan regions contained within a 3-D scanning volume defined between said horizontal-scanning and vertical-scanning windows, and (ii) generate a plurality of groups of intersecting laser scanning planes within said 3-D scanning volume, and wherein said plurality of groups of intersecting laser scanning planes form a complex omni-directional 3-D laser scanning pattern within said 3-D scanning volume capable of scanning a bar code symbol located on the surface of an object presented within said 3-D scanning volume at any orientation and from any direction at said POS station so as to provide 360° of omnidirectional bar code symbol scanning coverage at said POS station.

2. The bioptical laser scanning system of claim 1, wherein the height dimension of the said horizontal section is less than about 4.5 inches for installation of said horizontal section within a countertop surface at said POS.

3. The bioptical laser scanning system of claim 2, wherein each said group of intersecting laser scanning planes comprises (i) a plurality of substantially-vertical laser scanning planes for reading bar code symbols having bar code elements (i.e., ladder type bar code symbols) that are oriented substantially horizontal with respect to said horizontal-scanning window, and (ii) a plurality of substantially-horizontal laser scanning plane for reading bar code symbols having bar code elements (i.e., picket-fence type bar code symbols) that are oriented substantially vertical with respect to said horizontal-scanning window.

4. The bioptical laser scanning system of claim 1, wherein said first laser beam production module comprises a first visible laser diode (VLD), and said second laser beam production module comprises a second visible laser diode (VLD).

5. The bioptical laser scanning system of claim 1, wherein said rotating scanning element comprises a holographic scanning disc having a plurality of holographic scanning facets.

6. The bioptical laser scanning system of claim 5, wherein said plurality of holographic scanning facets are classifiable into a first class of facets having High Elevation (HE) angle characteristics, and a second class of facets having Low Elevation (LE) angle characteristics.

7. The bioptical laser scanning system of claim 1, wherein said complex omni-directional 3-D laser scanning pattern is generated from said horizontal-scanning window and said vertical-scanning window during each revolution of said rotating scanning element.

* * * * *